United States Patent
Rosen et al.

(10) Patent No.: US 12,486,274 B2
(45) Date of Patent: Dec. 2, 2025

(54) SUBSTITUTED PYRAZOLO-PYRIMIDINES AND USES THEREOF

(71) Applicant: Verge Analytics, Inc., South San Francisco, CA (US)

(72) Inventors: Mark D. Rosen, South San Francisco, CA (US); Robert A. Galemmo, Jr., San Francisco, CA (US); Weiling Liang, South San Francisco, CA (US); Brian Kopec, South San Francisco, CA (US); Irene Y. Choi-Muckerheide, Pacifica, CA (US); Jane Rhodes, South San Francisco, CA (US)

(73) Assignee: Verge Analytics, Inc., South San Francisco, CA (US)

( * ) Notice: Subject to any disclaimer, the term of this patent is extended or adjusted under 35 U.S.C. 154(b) by 737 days.

(21) Appl. No.: 17/792,304

(22) PCT Filed: Jan. 12, 2021

(86) PCT No.: PCT/US2021/013077
§ 371 (c)(1),
(2) Date: Jul. 12, 2022

(87) PCT Pub. No.: WO2021/146192
PCT Pub. Date: Jul. 22, 2021

(65) Prior Publication Data
US 2023/0133203 A1    May 4, 2023

Related U.S. Application Data

(60) Provisional application No. 63/074,388, filed on Sep. 3, 2020, provisional application No. 62/960,412, filed on Jan. 13, 2020.

(51) Int. Cl.
*C07D 487/04* (2006.01)
*A61P 25/28* (2006.01)

(52) U.S. Cl.
CPC ............ *C07D 487/04* (2013.01); *A61P 25/28* (2018.01); *C07B 2200/05* (2013.01)

(58) Field of Classification Search
CPC ........ C07D 487/04; A61P 25/28; A61P 21/00; A61P 25/00; A61P 3/00; A61P 35/00; C07B 2200/05; A61K 31/5377
See application file for complete search history.

(56) References Cited

U.S. PATENT DOCUMENTS

| | | |
|---|---|---|
| 6,194,410 B1 | 2/2001 | Bös et al. |
| 6,384,032 B1 | 5/2002 | Ono et al. |
| 6,423,751 B1 | 7/2002 | Liao |
| 6,680,315 B2 | 1/2004 | Ono et al. |
| 7,045,517 B2 | 5/2006 | Ono et al. |
| 7,473,694 B2 | 1/2009 | Unoki et al. |
| 7,531,536 B2 | 5/2009 | Bebbington et al. |
| 7,550,470 B2 | 6/2009 | Fraley |
| 7,557,110 B2 | 7/2009 | Kataoka et al. |
| 7,645,762 B2 | 1/2010 | Paruch et al. |
| 7,700,583 B2 | 4/2010 | Gundertofte et al. |
| 7,951,820 B2 | 5/2011 | Bebbington et al. |
| 8,314,098 B2 | 11/2012 | Yamamoto et al. |
| 8,486,938 B2 | 7/2013 | Babaoglu et al. |
| 8,551,981 B2 | 10/2013 | Calderwood et al. |
| 8,697,698 B2 | 4/2014 | Bebbington et al. |
| 8,969,376 B2 | 3/2015 | Kawanishi et al. |
| 8,980,878 B2 | 3/2015 | Siegel et al. |
| 9,096,605 B2 | 8/2015 | Lin et al. |
| 9,656,996 B2 | 5/2017 | Xu et al. |
| 9,981,976 B2 | 5/2018 | Tahari et al. |
| 10,138,247 B2 | 11/2018 | Dymek et al. |
| 10,702,534 B2 | 7/2020 | Landrette et al. |
| 10,729,694 B2 | 8/2020 | Lichenstein et al. |
| 10,751,345 B2 | 8/2020 | Lichenstein et al. |
| 10,758,545 B2 | 9/2020 | Ichida et al. |
| 10,765,682 B2 | 9/2020 | Beeharry et al. |
| 11,266,654 B2 | 3/2022 | Lichenstein et al. |
| 11,352,354 B2 | 6/2022 | Deng et al. |
| 11,439,649 B2 | 9/2022 | Lichenstein et al. |
| 11,471,460 B2 | 10/2022 | DePamphilis et al. |
| 2002/0082259 A1 | 6/2002 | Ono et al. |
| 2004/0053926 A1 | 3/2004 | Ono et al. |

(Continued)

FOREIGN PATENT DOCUMENTS

| | | |
|---|---|---|
| CN | 103242341 A | 8/2013 |
| CN | 105820175 A | 8/2016 |

(Continued)

OTHER PUBLICATIONS

Cai, Xinming, et al. "PIKfyve, a Class III PI Kinase, Is the Target of the Small Molecular IL-12/IL-23 Inhibitor Apilimod and a Player in Toll-like Receptor Signaling." Chemistry & Biology, vol. 20, No. 7, Jul. 2013, pp. 912-921. DOI.org (Crossref), https://doi.org/10.1016/j.chembiol.2013.05.010. (Year: 2013).*

International Search Report issued in International Application No. PCT/US2021/013077, dated May 19, 2021, 9 pages.

U.S. Appl. No. 17/910,082, filed Sep. 8, 2022, Mark D. Rosen.

Bakkar et al., "The M1311V variant of ATP7A is associated with impaired trafficking and copper homeostasis in models of motor neuron disease", Neurobiology of Disease, vol. 149, 105228, pp. 1-29 (2021).

(Continued)

*Primary Examiner* — Clinton A Brooks
*Assistant Examiner* — Kyle Nottingham
(74) *Attorney, Agent, or Firm* — McNeill PLLC

(57) ABSTRACT

The present disclosure provides compounds that are inhibitors of PIKfyve kinases useful for the treatment of neurological diseases treatable by inhibition of PIKfyve. Also provided are pharmaceutical compositions containing such compounds, and methods of treatment using such compounds.

29 Claims, No Drawings

(56) References Cited

U.S. PATENT DOCUMENTS

| | | |
|---|---|---|
| 2005/0038023 A1 | 2/2005 | Bebbington et al. |
| 2006/0069090 A1 | 3/2006 | Ono et al. |
| 2006/0258658 A1 | 11/2006 | Bebbington et al. |
| 2007/0027156 A1 | 2/2007 | Nakai et al. |
| 2009/0176778 A1 | 7/2009 | Schmitz et al. |
| 2010/0204265 A1 | 8/2010 | Baskaran et al. |
| 2011/0098267 A1 | 4/2011 | Babu et al. |
| 2011/0294781 A1* | 12/2011 | Yamamoto ............. A61P 25/00 514/233.2 |
| 2012/0083498 A1 | 4/2012 | Kashanchi |
| 2013/0096128 A1 | 4/2013 | Bebbington et al. |
| 2018/0036420 A1 | 2/2018 | Xu et al. |
| 2018/0050041 A1 | 2/2018 | Conrad et al. |
| 2018/0141969 A1 | 5/2018 | Hwang et al. |
| 2018/0199623 A1 | 7/2018 | Bebee et al. |
| 2018/0265464 A1 | 9/2018 | Edinger et al. |
| 2018/0280403 A1 | 10/2018 | Landrette et al. |
| 2019/0070166 A1 | 3/2019 | Postrel |
| 2020/0079780 A1 | 3/2020 | Romanov et al. |
| 2020/0165246 A1 | 5/2020 | Deng et al. |
| 2020/0199136 A1 | 6/2020 | Smrcina et al. |
| 2020/0306255 A1 | 10/2020 | Conrad et al. |
| 2020/0369649 A1 | 11/2020 | DePamphilis et al. |
| 2021/0002296 A1 | 1/2021 | Mainolfi et al. |
| 2021/0033597 A1 | 2/2021 | Ichida et al. |
| 2021/0047405 A1 | 2/2021 | Nobles et al. |
| 2021/0062160 A1 | 3/2021 | Rohwer et al. |
| 2021/0077500 A1 | 3/2021 | Landrette et al. |
| 2021/0139486 A1 | 5/2021 | Mohan et al. |
| 2021/0244743 A1 | 8/2021 | Landrette et al. |
| 2021/0338683 A1 | 11/2021 | Ichida et al. |
| 2022/0144838 A1 | 5/2022 | Fong et al. |
| 2022/0160741 A1 | 5/2022 | Newman et al. |
| 2022/0168402 A1 | 6/2022 | Cantley et al. |
| 2022/0267332 A1 | 8/2022 | Cai et al. |
| 2022/0332723 A1 | 10/2022 | Kotian et al. |
| 2022/0380769 A1 | 12/2022 | Equels et al. |
| 2022/0409617 A1 | 12/2022 | Edinger |
| 2022/0411804 A1 | 12/2022 | Chang et al. |
| 2023/0038929 A1 | 2/2023 | Rosen |
| 2023/0069069 A1 | 3/2023 | Lichenstein et al. |
| 2023/0133203 A1 | 5/2023 | Rosen |

FOREIGN PATENT DOCUMENTS

| | | |
|---|---|---|
| CN | 105963300 A | 9/2016 |
| CN | 106957303 A | 7/2017 |
| CN | 107163061 A | 9/2017 |
| CN | 108586486 A | 9/2018 |
| CN | 112142744 A | 12/2020 |
| EP | 1277738 A1 | 1/2003 |
| EP | 2520659 A1 | 11/2012 |
| EP | 3096757 A1 | 11/2016 |
| EP | 3215159 A1 | 9/2017 |
| EP | 3253389 A1 | 12/2017 |
| EP | 3215157 B1 | 4/2019 |
| EP | 3215158 B1 | 5/2019 |
| EP | 3581184 B1 | 2/2021 |
| EP | 3325014 B1 | 5/2021 |
| JP | 2004277337 A | 10/2004 |
| JP | 2006160628 A | 6/2006 |
| JP | 2013060438 A | 4/2013 |
| JP | 5531066 B2 | 6/2014 |
| JP | 6220059 B2 | 10/2017 |
| WO | 2000078757 A1 | 12/2000 |
| WO | 2002087513 A2 | 11/2002 |
| WO | 2002088079 A2 | 11/2002 |
| WO | 2002088080 A2 | 11/2002 |
| WO | 2002102313 A2 | 12/2002 |
| WO | 2002102314 A2 | 12/2002 |
| WO | 2002102315 A2 | 12/2002 |
| WO | 2004017950 A2 | 3/2004 |
| WO | 2005000404 A2 | 1/2005 |
| WO | 2005009539 A2 | 2/2005 |
| WO | 2005023806 A2 | 3/2005 |
| WO | 2005046603 A2 | 5/2005 |
| WO | 2005046698 A1 | 5/2005 |
| WO | 2006007532 A2 | 1/2006 |
| WO | 2006010567 A1 | 2/2006 |
| WO | 2006034402 A2 | 3/2006 |
| WO | 2006053109 A1 | 5/2006 |
| WO | 2006055747 A2 | 5/2006 |
| WO | 2006081389 A1 | 8/2006 |
| WO | 2006081391 A2 | 8/2006 |
| WO | 2006083477 A2 | 8/2006 |
| WO | 2006128129 A2 | 11/2006 |
| WO | 2006128172 A2 | 11/2006 |
| WO | 2007023110 A2 | 3/2007 |
| WO | 2007023382 A2 | 3/2007 |
| WO | 2007050980 A2 | 5/2007 |
| WO | 2007060404 A1 | 5/2007 |
| WO | 2007071688 A1 | 6/2007 |
| WO | 2007087427 A2 | 8/2007 |
| WO | 2007087429 A2 | 8/2007 |
| WO | 2007087441 A2 | 8/2007 |
| WO | 2007087442 A2 | 8/2007 |
| WO | 2007087443 A2 | 8/2007 |
| WO | 2007089904 A2 | 8/2007 |
| WO | 2007090852 A1 | 8/2007 |
| WO | 2007109362 A2 | 9/2007 |
| WO | 2007112093 A2 | 10/2007 |
| WO | 2007114323 A1 | 10/2007 |
| WO | 2007127183 A1 | 11/2007 |
| WO | 2008008359 A2 | 1/2008 |
| WO | 2008024302 A2 | 2/2008 |
| WO | 2008024303 A2 | 2/2008 |
| WO | 2008024304 A2 | 2/2008 |
| WO | 2008039520 A2 | 4/2008 |
| WO | 2008057246 A2 | 5/2008 |
| WO | 2008063504 A2 | 5/2008 |
| WO | 2008103310 A1 | 8/2008 |
| WO | 2008130570 A1 | 10/2008 |
| WO | 2008132502 A1 | 11/2008 |
| WO | 2008136976 A2 | 11/2008 |
| WO | 2008147626 A2 | 12/2008 |
| WO | 2009007753 A2 | 1/2009 |
| WO | 2009015254 A1 | 1/2009 |
| WO | 2009016410 A2 | 2/2009 |
| WO | 2009017818 A1 | 2/2009 |
| WO | 2009017819 A1 | 2/2009 |
| WO | 2009017831 A1 | 2/2009 |
| WO | 2009020631 A2 | 2/2009 |
| WO | 2009038775 A1 | 3/2009 |
| WO | 2009070567 A1 | 6/2009 |
| WO | 2009089305 A1 | 7/2009 |
| WO | 2009100406 A2 | 8/2009 |
| WO | 2009105257 A1 | 8/2009 |
| WO | 2010039236 A1 | 4/2010 |
| WO | 2010039237 A1 | 4/2010 |
| WO | 2010039238 A1 | 4/2010 |
| WO | 2010052569 A2 | 5/2010 |
| WO | 2010086040 A1 | 8/2010 |
| WO | 2010091409 A1 | 8/2010 |
| WO | 2010118207 A1 | 10/2010 |
| WO | 2011031979 A1 | 3/2011 |
| WO | 2011081171 A1 | 7/2011 |
| WO | 2011105628 A1 | 9/2011 |
| WO | 2011146727 A1 | 11/2011 |
| WO | 2012027240 A1 | 3/2012 |
| WO | 2012037116 A2 | 3/2012 |
| WO | 2012047569 A2 | 4/2012 |
| WO | 2012064808 A1 | 5/2012 |
| WO | 2012103081 A1 | 8/2012 |
| WO | 2012112245 A1 | 8/2012 |
| WO | 2012147890 A1 | 11/2012 |
| WO | 2012170827 A2 | 12/2012 |
| WO | 2013028263 A1 | 2/2013 |
| WO | 2013063385 A1 | 5/2013 |
| WO | 2015112888 A1 | 7/2015 |
| WO | 2015118434 A1 | 8/2015 |
| WO | 2015173683 A1 | 11/2015 |
| WO | 2016033445 A1 | 3/2016 |
| WO | 2016073871 A1 | 5/2016 |

(56) References Cited

FOREIGN PATENT DOCUMENTS

| | | |
|---|---|---|
| WO | 2016073877 A1 | 5/2016 |
| WO | 2016073884 A1 | 5/2016 |
| WO | 2016112072 A1 | 7/2016 |
| WO | 2016118709 A1 | 7/2016 |
| WO | 2016126707 A1 | 8/2016 |
| WO | 2016148145 A1 | 9/2016 |
| WO | 2016157091 A1 | 10/2016 |
| WO | 2016160102 A1 | 10/2016 |
| WO | 2016161145 A1 | 10/2016 |
| WO | 2016210372 A2 | 12/2016 |
| WO | 2017002120 A1 | 1/2017 |
| WO | 2017015262 A1 | 1/2017 |
| WO | 2017019537 A1 | 2/2017 |
| WO | 2017029521 A1 | 2/2017 |
| WO | 2017040971 A1 | 3/2017 |
| WO | 2017055305 A1 | 4/2017 |
| WO | 2017069270 A1 | 4/2017 |
| WO | 2017090058 A1 | 6/2017 |
| WO | 2017127661 A1 | 7/2017 |
| WO | 2018039022 A1 | 3/2018 |
| WO | 2018055152 A1 | 3/2018 |
| WO | 2018071548 A1 | 4/2018 |
| WO | 2018092047 A1 | 5/2018 |
| WO | 2018138106 A1 | 8/2018 |
| WO | 2018175906 A1 | 9/2018 |
| WO | 2018226150 A1 | 12/2018 |
| WO | 2019024908 A1 | 2/2019 |
| WO | 2019027765 A1 | 2/2019 |
| WO | 2019046316 A1 | 3/2019 |
| WO | 2019108665 A1 | 6/2019 |
| WO | 2019113523 A1 | 6/2019 |
| WO | 2019164861 A1 | 8/2019 |
| WO | 2019244050 A1 | 12/2019 |
| WO | 2020009971 A1 | 1/2020 |
| WO | 2020025960 A1 | 2/2020 |
| WO | 2020035049 A1 | 2/2020 |
| WO | 2021097286 A1 | 5/2021 |
| WO | 2021113633 A1 | 6/2021 |
| WO | 2021146192 A1 | 7/2021 |
| WO | 2021151100 A1 | 7/2021 |
| WO | 2021155067 A1 | 8/2021 |
| WO | 2021163727 A1 | 8/2021 |
| WO | 2021183439 A1 | 9/2021 |
| WO | 2021247841 A1 | 12/2021 |
| WO | 2021247859 A1 | 12/2021 |
| WO | 2021247862 A1 | 12/2021 |
| WO | 2021252895 A2 | 12/2021 |
| WO | 2022012484 A1 | 1/2022 |
| WO | 2022086993 A1 | 4/2022 |
| WO | 2022094058 A1 | 5/2022 |
| WO | 2022094615 A1 | 5/2022 |
| WO | 2022235975 A2 | 11/2022 |
| WO | 2022261499 A1 | 12/2022 |

OTHER PUBLICATIONS

Baranov et al., "The PIKfyve Inhibitor Apilimod: A Double-Edged Sword against COVID-19", Cells, vol. 10, p. 30 (2021).
Blythe, Alexander David, "Investigating Tdp-43-Dependent Neuronal Trafficking Disruption in a *Drosophila* Model of ALS", The University of Arizona ProQuest Dissertations Publishing, 2022. 29208625.
Bowles et al., "ELAVL4, splicing, and glutamatergic dysfunction precede neuron loss in MAPT mutation cerebral organoids", Cell, vol. 184(17), pp. 4547-4563 (2021).
Bowles et al., "Glutamatergic dysfunction precedes neuron loss in cerebral organoids with MAPT mutation", bioRxiv, 429623 (2021).
Burke et al., "Beyond PI3Ks: targeting phosphoinositide kinases in disease", Nature Reviews Drug Discovery (2022).
Cinato et al., "Apilimod alters TGFβ signaling pathway and prevents cardiac fibrotic remodeling", Theranostics, vol. 11(13), pp. 6491-6506 (2021).
Guan et al., "Discovery of novel Jak2-Stat pathway inhibitors with extended residence time on target", Bioorganic & Medicinal Chem. Letters, vol. 23(10), pp. 3105-3110, (2013).
Guo et al., "The multifaceted role of kinases in amyotrophic lateral sclerosis: genetic, pathological and therapeutic implications", Brain, vol. 143(6), pp. 1651-1673 (2020).
Hayakawa et al., "Synthesis and biological evaluadtion of pyrido [3',2':4,6] furo [3,2-d] pyrimidine derivatives as novel PI3 kinase p110@a inhibitors", Biorganic & medicinal Chemistry Letters, Elsevier, Amsterdam, NL, (17)(9), pp. 2438-2442 (2007).
Hoemann et al., "Synthesis and optimization of furano [3,2-d]pyrimidines as selective spleen tyrosine kinase (Syk) inhibitors", Biorganic & Medicinal Chemistry Letters, vol. 26, No. 22, Oct. 11, 2016, pp. 5562-5567.
Hung et al., "PIKFYVE inhibition mitigates disease in models of diverse forms of ALS", Cell. Feb. 16, 2023;186(4):786-802.e28.
International Search Report and Written Opinion issued in International Application No. PCT/US2022/014954, dated Jun. 15, 2022, 11 pages.
International Search Report and Written Opinion, International Application No. PCT/US2021/021369, Apr. 28, 2021, 12 pages.
International Search Report issued in International Application No. PCT/US2020/063298, dated Feb. 3, 2021, 10 pages.
Jasuja et al., "Pharmacophore and docking-based virtual screening approach for the design of new dual inhibitors of Janus kinase 1 and Janus kinase 2", SAR and QSAR in Environ. Research, vol. 25(8), p. 617-636 (2014).
Kelarev et al., "Synthesis of amine derivatives of 1,3,5-triazine containing 1,3,4-thiadiazole fragments", Izvestiya Vysshikh Uchebnykh Zavedenii, Khimiya i Khimicheskaya Tekhnologiya, vol. 40(2), pp. 27-32, (1997). English Graphical Abstract Only.
Kreutzberger et al., "Synergistic Block of SARS-CoV-2 Infection by Combined Drug Inhibition of the Host Entry Factors PIKfyve Kinase and TMPRSS2 Protease", J Virol., vol. 95(21), p. e0097521 (2021).
Kueth, C., "PIKFYVE Modulation Mitigates TDP-43-Dependent Disease Phenotypes in a *Drosophila* Model of Amyotrophic Lateral Sclerosis", https://repository.arizona.edu/handle/10150/642166 (2020).
Li, PeiQi, "Elucidation of VPS13 and PIKfyve Proteins Functioning in the Regulation of Eukaryotic Lipid Homeostasis", Yale Dissertation (2021).
Ou et al. "Characterization of spike glycoprotein of SARS-CoV-2 on virus entry and its immune cross-reactivity with SARS-CoV", Nature Communications, vol. 11, No. 1, pp. 1-12 (2020).
Rangnekar et al., "Synthesis and dyeing characteristics of 3,6-bisarylazopyrazolo-[1,5-alpha]pyrimidines", Indian Journal of Fibre & Textile Research, vol. 15, pp. 23-25 (1990).
Rivero-Rios et al., "Roles of PIKfyve in multiple cellular pathways", Curr Opin Cell Biol. Jun. 2022;76:102086.
See et al., "PIKfyve inhibition blocks endolysosomal escape of alpha-synuclein fibrils and spread of a-synuclein aggregation", bioRxiv, 427704 (2021).
Sharma et al., "A family of PIKFYVE inhibitors with therapeutic potential against autophagy-dependent cancer cells disrupt multiple events in lysosome homeostasis", Autophagy, vol. 15.10, pp. 1694-1718 (2019).
Shi et al., "Haploinsufficiency leads to neurodegeneration in C9ORF72 ALS/FTD human induced motor neurons", Nat Med, vol. 24(3), pp. 313-325 (2018).
Staats et al., "Small molecule inhibition of PIKFYVE kinase rescues gain- and loss-of-function C9ORF72 ALS/FTD disease processes in vivo", https://www.biorxiv.org/content/10.1101/685800v1. abstract (2019).
Sun et al., "Rational Design and Synthesis of D-galactosyl Lysophospholipids as Selective Substrates and non-ATP-competitive Inhibitors of Phosphatidylinositol Phosphate Kinases", Chemistry. Jan. 9, 2023;29(2):e202202083.
Yu et al., "Design, Synthesis and biological evaluation of novel thienopyrimidine derivatives as PI3Ka inhibitors", Molecules, vol. 24(19), p. 3422 (2019).
Zhan et al., "Design, Synthesis and biological evaluation of Dimorpholine Substituted Thienopyrimidines as Potential Class 1 PI3K/mTOR Dual Inhibitors", Molecules, vol. 60(9), pp. 4023-4035 (2017).

(56) References Cited

OTHER PUBLICATIONS

Zhang et al., "Virus-Free and Live-Cell Visualizing SARS-CoV-2 Cell Entry for Studies of Neutraliztin Antibodies and Compound Inhibitors", Small Methods, vol. 5, No. 2, p. 2001031 (2020).

Jeffries et al., "A selective PIKfyve inhibitor blocks PtdIns(3,5)P2 production and disrupts endomembrane transport and retroviral budding" EMBO Reports, Nature Publishing Group, vol. 9, No. 2, pp. 164-170 (2008).

Baraldi et al., "Synthesis of a new series of pyrazolo[1,5-a]pyrimidines structurally related to zaleplon," Journal of Heterocyclic Chemistry 44(2), pp. 355-361 (2007).

Kosugi et al., "Correction to Mitogen-Activated Protein Kinase-Activated Protein Kinase 2 (MAPKAP-K2) as an Antiinflammatory Target: Discovery and in Vivo Activity of Selective Pyrazolo[1,5-a]pyrimidine Inhibitors Using a Focused Library and Structure-Based Optimization Approach," Journal of Medicinal Chemistry, vol. 55, Issue: 15, pp. 6700-6715 (2012).

Kosugi et al., "Mitogen-Activated Protein Kinase-Activated Protein Kinase 2 (MAPKAP-K2) as an Antiinflammatory Target: Discovery and in Vivo Activity of Selective Pyrazolo[1,5-a]pyrimidine Inhibitors Using a Focused Library and Structure-Based Optimization Approach [Erratum to document cited in CA157:372301]," Journal of Medicinal Chemistry, vol. 55, Issue: 22, pp. 10312-10313 (2012).

Liu et al., "Discovery of Pyrazolo[1,5-a]pyrimidine TTK Inhibitors: CFI-402257 is a Potent, Selective, Bioavailable Anticancer Agent," ACS Medicinal Chemistry Letters, vol. 7, Issue: 7, pp. 671-675 (2016).

Paruch et al, "Discovery of Dinaciclib (SCH 727965): A Potent and Selective Inhibitor of Cyclin-Dependent Kinases," ACS Medicinal Chemistry Letters, vol. 1, Issue: 5, pp. 204-208 (2010).

Plisson et al., "Phosphodiesterase 10A PET radioligand development program: from pig to human," Journal of Nuclear Medicine, vol. 55, Issue: 4, pp. 595-601 (2014).

Saito et al., "Pyrazolo[1,5-a]pyrimidines, triazolo[1,5-a]pyrimidines and their tricyclic derivatives as corticotropin-releasing factor 1 (CRF1) receptor antagonists," Bioorganic & Medicinal Chemistry, vol. 19, Issue: 20, pp. 5955-5966 (2011).

Wells et al., "SGC-CK2-1: the first selective chemical probe for the pleiotropic kinase CK2," Structural Genomics Consortium (SGC), UNC Eshelman School of Pharmacy, University of North Carolina at Chapel Hill (UNC-CH), pp. 1-5 (2020).

* cited by examiner

SUBSTITUTED PYRAZOLO-PYRIMIDINES AND USES THEREOF

CROSS-REFERENCE TO RELATED APPLICATIONS

This application is a national phase entry pursuant to 35 U.S.C. § 371 of International Application No. PCT/US2021/013077, filed Jan. 12, 2021, which claims priority to U.S. Provisional Application No. 62/960,412, filed on Jan. 13, 2020, and U.S. Provisional Application No. 63/074,388, filed on Sep. 3, 2020, the disclosures of each of which are hereby incorporated by reference in their entireties.

FIELD OF INVENTION

The present disclosure provides compounds that are phosphoinositide kinase inhibitors, in particular FYVE-type finger-containing phosphoinositide kinase ("PIKfyve") inhibitors and are therefore useful for the treatment of central nervous system diseases. Also provided are pharmaceutical compositions containing such compounds and processes for preparing such compounds.

BACKGROUND

Phosphoinositide kinases (PIKs) catalyze the phosphorylation of phosphatidylinositol, which is a component of eukaryotic cell membranes, and related phospholipids called phosphoinositides. Phosphoinositides are involved in the regulation of diverse cellular processes, including cellular proliferation, survival, cytoskeletal organization, vesicle trafficking, glucose transport, and platelet function. Fruman et al., "Phosphoinositide Kinases," *Ann. Review. Biochem.* 1998, 67, 481-507. Phosphorylated derivatives of phosphatidylinositol regulate cytoskeletal functions, membrane trafficking, and receptor signaling by recruiting protein complexes to cell and endosomal membranes.

FYVE-type finger-containing phosphoinositide kinase (PIKfyve; also known as phosphatidylinositol-3-phosphate 5-kinase type III or PIPKIII) is a ubiquitously expressed PIK with both lipid and protein kinase activity. In its capacity as a lipid kinase, the enzyme phosphorylates the D-5 position in endosomal phosphatidylinositol and phosphatidylinositol-3-phosphate (PI3P) to generate the corresponding 5-phosphate phospholipid analogs. Shisheva et al., *Cell Biol. Int.* 2008, 32 (6), 591. PI3P is found in cell membranes with roles in protein trafficking, protein degradation, and autophagy. Nascimbeni et al., *FEBS J.* 2017, 284, 1267-1278. PIKfyve regulates endomembrane homeostasis and plays a role in the biogenesis of endosome carrier vesicles from early endosomes. The enlarged endosome/lysosome structure was observed in cells expressing PIKfyve dominant negative or siRNA. Ikonomov et al., *J. Biol. Chem.* 2001, 276 (28), 26141-26147; Rutherford et al., *J. Cell Sci.* 2006, 119, 3944-3957. Inhibition of PIKfyve activity increases levels of PI3P, stimulating autophagy and improving motor neuron health. Phosphorylated inositides produced by PIKfyve are localized in various cellular membranes and organelles, consistent with the various PIKfyve functions of endolysosomal transport, endomembrane homeostasis, and biogenesis of endosome carrier vesicles (ECV)/multivesicular bodies (MVB) from early endosomes. Further, PIKfyve is required for endocytic-vacuolar pathway and nuclear migration. Thus, PIKfyve helps maintain proper morphology of the endosome and lysosome.

In mammalian cells, PI3P levels are regulated by the reciprocal activities of PIKfyve and the phosphatase FIG. 4 phosphoinositide 5-phosphatase (FIG. 4). Zolov et al., "In vivo, Pikfyve generates PI(3,5)P2, which serves as both a signaling lipid and the major precursor for PISP," *Proc. Natl. Acad. Sci. USA* 2012, 109 (43), 17472-17477. Normally, FIG. 4 is localized on the cytoplasmic surface of endolysosomal vesicles in a complex. Inhibition of PIKfyve would mimic overexpression of FIG. 4, thereby increasing levels of PI3P, stimulating autophagy, and improving motor neuron health. Numerous diseases are correlated with FIG. 4 deficiencies, such as deleterious FIG. 4 mutations or diminished FIG. 4 function, and are therefore suitable as target diseases for treatment with PIKfyve inhibitors, including amyotrophic lateral sclerosis (ALS), primary lateral sclerosis (PLS), Charcot-Marie-Tooth (including type 4J (CMT4J)), and Yunis-Varon syndrome.

Exemplary diseases associated with FIG. 4 deficiencies are amyotrophic lateral sclerosis (ALS), primary lateral sclerosis (PLS), Charcot-Marie-Tooth (including type 4J (CMT4J)), Yunis-Varon syndrome, polymicrogyria (including polymicrogyria with seizures), temporo-occipital polymicrogyria, Pick's disease, Parkinson's disease, Parkinson's disease with Lewy bodies, dementia with Lewy bodies, Lewy body disease, fronto-temporal dementia, diseases of neuronal nuclear inclusions of polyglutamine and intranuclear inclusion bodies, disease of Marinesco and Hirano bodies, Alzheimer's disease, neurodegeneration, spongiform neurodegeneration, autophagy, peripheral neuropathy, leukoencephalopathy, motor neuropathy, sensory neuropathy. Bharadwaj et al., *Hum. Mol. Genet.* 2016, 25 (4), 682-692.

PIKfyve inhibitors are useful in a range of neurological disorders, such as tauopathies (including but not limited to Alzheimer's disease, progressive supranuclear palsy, corticobasal syndrome, frontotemporal dementias, and chronic traumatic encephalopathy), traumatic brain injury (TBI), cerebral ischemia, ALS, fronto-temporal dementia (FTD), Guillain-Barré Syndrome, chronic inflammatory demyelinating polyneuropathy, multiple sclerosis, CMT, lysosomal storage diseases (including but not limited to Fabry's disorder, Gaucher's disorder, Niemann Pick C, Tay-Sachs, and Mucolipidosis type IV), as well as several types of neuropathies. Other therapeutic targets for intervention with PIKfyve inhibitors include Huntington's disease and psychiatric disorders (such as ADHD, schizophrenia, mood disorders including but not limited to major depressive disorder, bipolar disorder I, and bipolar disorder II). Gardiner et al., "Prevalence of carriers of intermediate and pathological polyglutamine disease-associated alleles among large population-based cohorts," *JAMA Neurol.* 2019, 76 (6), 650-656; PCT Publ. No. WO2016/210372; US Publ. No. US2018/0161335.

SUMMARY

Embodiment 1. A compound of Formula (I):

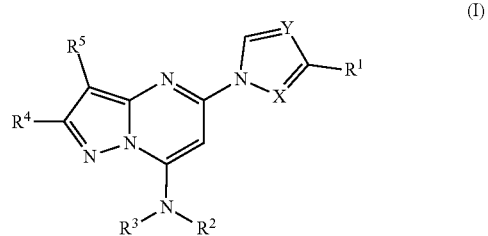

wherein:

when X is N, then Y is $CR^a$, when Y is N, then X is CH;

one of $R^a$ and $R^1$ is H, and the other is phenyl or heteroaryl, each optionally substituted with one, two, or three $R^d$ substituents;

wherein each $R^d$ substituent is independently $C_{1-4}$alkyl, $C_{1-4}$alkenyl, $C_{1-4}$alkynyl, —O—$C_{1-4}$alkyl, halo, cyano, nitro, azido, halo-$C_{1-4}$alkyl, —O—$C_{1-4}$-haloalkyl, —$NR^gR^h$, —$NR^gC(=O)R^h$, —$NR^gC(=O)NR^gR^h$, —$NR^gC(=O)OR^h$, =$NOR^g$, —$NR^gS(=O)_{1-2}R^h$, —$NR^gS(=O)_{1-2}NR^gR^h$, =$NSO_2R^g$, —$C(=O)R^g$, —$C(=O)OR^g$, —$OC(=O)OR^g$, —$OC(=O)R^g$, —$C(=O)NR^gR^h$, —$OC(=O)NR^gR^h$, —$OR^g$, —$SR^g$, —$S(=O)R^g$, —$S(=O)_2R^g$, —$OS(=O)_{1-2}R^g$, —$S(=O)_{1-2}OR^g$, —$S(=O)_{1-2}NR^gR^h$, phenyl, —$C_{1-4}$alkyl-phenyl, monocyclic cycloalkyl, —$C_{1-4}$alkyl-cycloalkyl, monocyclic heterocycloalkyl, or monocyclic heteroaryl;

wherein each phenyl, monocyclic cycloalkyl, monocyclic heterocycloalkyl, or monocyclic heteroaryl of $R^d$ is optionally substituted with one, two, or three substituents $R^e$;

wherein each $R^e$ substituent is independently $C_{1-4}$alkyl, $C_{1-4}$alkenyl, $C_{1-4}$alkynyl, halo, cyano, nitro, azido, —OH, halo-$C_{1-4}$alkyl, —O—$C_{1-4}$alkyl, or —O—$C_{1-4}$-haloalkyl; $R^g$ and $R^h$ are each independently H or $C_{1-4}$alkyl;

or $R^g$ and $R^h$ taken together with the atom to which they are attached form a monocyclic cycloalkyl or heterocycloalkyl, optionally substituted with $C_{1-4}$alkyl;

wherein each of $R^2$ and $R^3$ is H or is a $C_{1-4}$alkyl, cycloalkyl, $C_{1-4}$alkylcycloalkyl, heterocyclyl, heterocycloalkyl, or $R^2$ and $R^3$ taken together with the nitrogen to which they are attached form a heterocyclyl, optionally substituted with one, two, or three $R^j$ substituents;

wherein each $R^j$ substituent is independently $C_{1-4}$alkyl, oxo, —OH, —$NR^kR^l$, halo, halo-$C_{1-4}$alkyl, —O—$C_{1-4}$alkyl, or —O—$C_{1-4}$-haloalkyl;

where $R^k$ and $R^l$ are each independently H or $C_{1-4}$alkyl;

$R^4$ is —$C(O)NR^xR^y$, or is a phenyl or heteroaryl, each optionally substituted with one, two, or three $R^z$ substituents;

wherein $R^x$ is H or $C_{1-4}$alkyl and $R^y$ is H, $C_{1-4}$alkyl, —O—$C_{1-4}$alkyl, —$SO_2$—$C_{1-4}$alkyl, $C_{1-4}$alkyl-$SO_2$—$R^r$, monocyclic cycloalkyl, —$C_{1-4}$alkyl (monocyclic cycloalkyl), monocyclic heterocyclyl, —O-monocyclic heterocyclyl, or monocyclic heterocycloalkyl, each optionally substituted with one, two, or three $R^g$ substituents;

or $R^x$ and $R^y$ taken together with the nitrogen to which they are attached form a heterocyclyl or a monocyclic heterocycloalkyl, optionally substituted with $C_{1-4}$alkyl;

wherein each $R^x$ is $C_{1-4}$alkyl or —$NR^pR^q$; and each $R^z$ substituent is independently $C_{1-4}$alkyl, halo, —OH, or —$OC_{1-4}$alkyl, $C_{1-4}$alkyl$NR^mR^n$, $C(O)NHC_{1-4}$alkyl-$NR^mR^n$, or —$NR^mR^n$, wherein $R^m$ and $R^n$ are each independently H, $C_{1-4}$alkyl, or $C_{1-4}$alkyl$NR^pR^q$, or $R^m$ and $R^n$ taken together with the nitrogen to which they are attached form a heterocyclyl, or a monocyclic heterocycloalkyl, optionally substituted with one or two $R^o$ substituents;

wherein each $R^o$ substituent is independently $C_{1-4}$alkyl, —OH, —$OC_{1-4}$alkyl, halo, cyano, or —$NR^pR^q$;

wherein $R^p$ and $R^q$ are each independently H or $C_{1-4}$alkyl, or $R^p$ and $R^q$ taken together with the nitrogen to which they are attached form a heterocyclyl; and $R^5$ is H, $C_{1-4}$alkyl, halo, —OH, or —$OC_{1-4}$alkyl;

or a pharmaceutically acceptable salt thereof.

Embodiment 2. The compound of embodiment 1, wherein X is CH and Y is N.

Embodiment 3. The compound of embodiment 1, wherein X is N and Y is $CR^a$.

Embodiment 4. The compound of embodiment 1, wherein $R^a$ is H, methyl, ethyl, propyl, isopropyl, butyl, isobutyl, sec-butyl, or tert-butyl.

Embodiment 5. The compound of embodiment 1, wherein $R^a$ is H or methyl.

Embodiment 6. The compound of embodiment 1, wherein $R^a$ is H.

Embodiment 7. The compound of embodiment 1, wherein $R^a$ or $R^1$ is optionally substituted phenyl.

Embodiment 8. The compound of embodiment 1, wherein $R^a$ or $R^1$ is optionally substituted monocyclic heteroaryl.

Embodiment 9. The compound of embodiment 1, wherein $R^a$ or $R^1$ is optionally substituted pyrrole, imidazole, pyrazole, triazole, tetrazole, furan, oxazole, isoxazole, thiazole, isothiazole, pyridine, pyrimidine, pyrazine, or pyridazine.

Embodiment 10. The compound of embodiment 1, wherein $R^a$ or $R^1$ is optionally substituted pyridine or pyrimidine.

Embodiment 11. The compound of embodiment 1, wherein $R^a$ or $R^1$ is optionally substituted pyridine.

Embodiment 12. The compound of embodiment 1, wherein $R^a$ or $R^1$ is substituted with one $R^d$ and the $R^d$ is $C_{1-4}$alkyl or halo.

Embodiment 13. The compound of embodiment 1, wherein $R^a$ or $R^1$ is substituted with one $R^d$ and the $R^d$ is methyl, $NH_2$, fluoro, chloro, or bromo.

Embodiment 14. The compound of embodiment 1, wherein $R^a$ or $R^1$ is phenyl or pyridyl, each optionally substituted with one or two substituents selected from $C_{1-4}$alkyl, —$CF_3$, fluoro, chloro, bromo, —$OCH_3$, and —$OCF_3$.

Embodiment 15. The compound of embodiment 1, wherein $R^a$ or $R^1$ is unsubstituted phenyl or tolyl.

Embodiment 16. The compound of embodiment 1, wherein $R^a$ or $R^1$ is unsubstituted phenyl or m-tolyl.

Embodiment 17. The compound of embodiment 1, wherein $R^a$ or $R^1$ is unsubstituted pyridyl.

Embodiment 18. The compound of embodiment 1, wherein $R^a$ or $R^1$ is 4-pyridyl.

Embodiment 19. The compound of embodiment 1, wherein $R^2$ and $R^3$ taken together with the nitrogen to which they are attached form pyrrolidine, piperidine, piperazine, morpholine, thiomorpholine, thiomorpholine-1,1-dioxide or -2-oxa-6-azaspiro[3.3]heptane, each optionally substituted with one, two, or three $R^j$ substituents.

Embodiment 20. The compound of embodiment 1, wherein $R^2$ and $R^3$ taken together with the nitrogen to which they are attached form morpholine, optionally substituted with one or two $R^j$ substituents.

Embodiment 21. The compound of embodiment 1, wherein each $R^j$ substituent is independently methyl, hydroxy, —$OCH_3$, oxo, halo, —$CF_3$, or —$OCF_3$.

Embodiment 22. The compound of embodiment 1, wherein $R^k$ and $R^l$ are each independently H or methyl.

Embodiment 23. The compound of embodiment 1, wherein $R^4$ is optionally substituted phenyl.

Embodiment 24. The compound of embodiment 1, wherein $R^4$ is optionally substituted heteroaryl.

Embodiment 25. The compound of embodiment 1, wherein $R^4$ is optionally substituted pyrazole, thiazole, oxazole, pyridine or pyrimidine.

Embodiment 26. The compound of embodiment 1, wherein $R^4$ is optionally substituted pyridine.

Embodiment 27. The compound of embodiment 1, wherein $R^4$ is pyridine.

Embodiment 28. The compound of embodiment 1, wherein $R^4$ is 4-pyridyl.

Embodiment 29. The compound of embodiment 1, wherein $R^4$ is optionally substituted with one or two $R^z$ substituents.

Embodiment 30. The compound of embodiment 1, wherein $R^4$ is phenyl or pyridyl, each optionally substituted with one or two substituents selected from $C_{1-4}$alkyl, —$CF_3$, fluoro, chloro, —$OCH_3$, and —$OCF_3$.

Embodiment 31. The compound of embodiment 1, wherein $R^4$ is —$C(O)NR^xR^y$.

Embodiment 32. The compound of embodiment 1, wherein $R^x$ is H.

Embodiment 33. The compound of embodiment 1, wherein $R^x$ is methyl or ethyl, optionally substituted with one, two, or three $R^o$ substituents.

Embodiment 34. The compound of embodiment 1, wherein $R^x$ is methyl.

Embodiment 35. The compound of embodiment 1, wherein $R^y$ is H.

Embodiment 36. The compound of embodiment 1, wherein $R^y$ is $C_{1-4}$alkyl, —$C_{1-4}$alkyl(monocyclic cycloalkyl), monocyclic cycloalkyl, monocyclic heterocycloalkyl, monocyclic heterocyclyl, —O-monocyclic heterocyclyl, —O—$C_{1-4}$alkyl, —$SO_2$—$C_{1-4}$alkyl, optionally substituted with one, two, or three $R^o$ substituents.

Embodiment 37. The compound of embodiment 1, wherein $R^y$ is $C_{1-4}$alkyl, optionally substituted with one, two, or three $R^o$ substituents.

Embodiment 38. The compound of embodiment 1, wherein $R^y$ is methyl, ethyl, propyl, or isopropyl, each optionally substituted with one, two, or three $R^o$ substituents.

Embodiment 39. The compound of embodiment 1, wherein $R^y$ is methyl, ethyl, isopropyl, methoxyethyl, dimethoxypropanyl, (dimethylamino)ethyl, or (dimethylamino)butyl.

Embodiment 40. The compound of embodiment 1, wherein $R^y$ is methoxy.

Embodiment 41. The compound of embodiment 1, wherein $R^y$ is —$SO_2$-methyl.

Embodiment 42. The compound of embodiment 1, wherein $R^y$ is monocyclic cycloalkyl or —$C_{1-2}$alkyl(monocyclic cycloalkyl), each optionally substituted with one, two, or three $R^o$ substituents.

Embodiment 43. The compound of embodiment 1, wherein $R^y$ is monocyclic cycloalkyl, optionally substituted with one, two, or three $R^o$ substituents.

Embodiment 44. The compound of embodiment 1, wherein $R^y$ is cyclopropyl, cyclobutyl, cyclopentyl, or cyclohexyl, each optionally substituted with one, two, or three $R^o$ substituents.

Embodiment 45. The compound of embodiment 1, wherein $R^y$ is cyclopropyl.

Embodiment 46. The compound of embodiment 1, wherein $R^y$ is cyclopentyl.

Embodiment 47. The compound of embodiment 1, wherein $R^y$ is cyclopropyl, cyclobutyl, cyclopentyl, cyclopropylmethyl, 1-cyclopropylethyl, 2-cyclopropylethyl, cyclobutylmethyl, or cyclopentylmethyl.

Embodiment 48. The compound of embodiment 1, wherein $R^y$ is monocyclic heterocyclyl or —O-monocyclic heterocyclyl, optionally substituted with one, two, or three $R^o$ substituents.

Embodiment 49. The compound of embodiment 1, wherein $R^y$ is optionally substituted tetrahydrofuranyl, tetrahydropyranyl, oxetanyl, azetidinyl, pyrrolidinyl, piperidinyl, morpholinyl, piperazinyl, or oxetanyloxy.

Embodiment 50. The compound of embodiment 1, wherein $R^y$ is oxetanyl, or oxetanyloxy.

Embodiment 51. The compound of embodiment 1, wherein $R^y$ is monocyclic heterocycloalkyl, optionally substituted with one, two, or three $R^o$ substituents.

Embodiment 52. The compound of embodiment 1, wherein $R^y$ is optionally substituted with one or two $R^o$ substituents, and $R^o$ is methyl.

Embodiment 53. The compound of embodiment 1, wherein $R^x$ is methyl and $R^y$ is methyl, ethyl, cyclopropyl, methoxy, or cyclopentyl.

Embodiment 54. The compound of embodiment 1, wherein $R^x$ and $R^y$ taken together with the nitrogen to which they are attached form a monocyclic heterocycloalkyl, optionally substituted with $C_{1-4}$alkyl.

Embodiment 55. The compound of embodiment 1, wherein $R^x$ and $R^y$ taken together with the nitrogen to which they are attached form a monocyclic heterocyclyl, optionally substituted with $C_{1-4}$alkyl.

Embodiment 56. The compound of embodiment 1, wherein $R^x$ and $R^y$ are taken together with the nitrogen to which they are attached to form azetidinyl, pyrrolidinyl, piperidinyl, piperazinyl, morpholinyl, thiomorpholinyl, 6-oxa-1-azaspiro[3.3]heptanyl, or 2-oxa-6-azaspiro[3.3]heptanyl, each optionally substituted with methyl.

Embodiment 57. The compound of embodiment 1, wherein each $R^z$ is independently $C_{1-4}$alkyl, halo, —OH, —$OC_{1-4}$alkyl, $C_{1-4}$alkylNR'''R'' or —NR'''R''.

Embodiment 58. The compound of embodiment 1, wherein each $R^z$ is independently methyl, —OH, halo, or —$OCH_3$.

Embodiment 59. The compound of embodiment 1, wherein $R^z$ is $C_{2-3}$alkyl substituted with —NR'''R''.

Embodiment 60. The compound of embodiment 1, wherein R''' and R'' are each independently H or $C_{1-4}$alkyl.

Embodiment 61. The compound of embodiment 1, wherein R''' and R'' are each methyl.

Embodiment 62. The compound of embodiment 1, wherein R''' and R'' taken together with the nitrogen to which they are attached form a monocyclic heterocyclyl, optionally substituted with one or two $R^o$ substituents.

Embodiment 63. The compound of embodiment 1, wherein R''' and R'' taken together with the nitrogen to which they are attached form pyrrolidine, piperidine, piperazine, morpholine, thiomorpholine, or thiomorpholine-1,1-dioxide, each optionally substituted with one or two $R^o$ substituents.

Embodiment 64. The compound of embodiment 1, wherein R''' and R'' taken together with the nitrogen to which they are attached form pyrrolidine, piperidine, piperazine, or morpholine, each optionally substituted with one or two $R^o$ substituents.

Embodiment 65. The compound of embodiment 1, wherein each $R^o$ substituent is $C_{1-4}$alkyl.

Embodiment 66. The compound of embodiment 1, wherein each R° substituent is —OH.

Embodiment 67. The compound of embodiment 1, wherein each R° substituent is —NR$^p$R$^q$.

Embodiment 68. The compound of embodiment 1, wherein R$^p$ and R$^q$ are each independently H or methyl.

Embodiment 69. The compound of embodiment 1, wherein R$^p$ and R$^q$ taken together with the nitrogen to which they are attached form a heterocyclyl.

Embodiment 70. The compound of embodiment 1, wherein R$^p$ and R$^q$ taken together with the nitrogen to which they are attached form azetidinyl, pyrrolidinyl, piperidinyl, piperazinyl, morpholinyl, thiomorpholinyl 6-oxa-1-azaspiro[3.3]heptanyl, or 2-oxa-6-azaspiro[3.3]heptanyl. Embodiment 71. The compound of embodiment 1, wherein R$^5$ is H, methyl, ethyl, chloro, bromo, fluoro, —OH, or —OCH$_3$.

Embodiment 72. The compound of embodiment 1, wherein R$^5$ is H.

Embodiment 73. A compound of Formula (II):

(II)

wherein
R$^{1a}$ is phenyl or pyridyl, each optionally substituted with one or two substituents selected from C$_{1-4}$alkyl, CO$_2$R$^p$, —C(O)NR$^p$R$^q$, fluoro, chloro, bromo, NH$_2$, and —OCH$_3$; and R$^{4a}$ is —C(O)NR$^x$R$^y$, or is a phenyl or pyridyl, each optionally substituted with one or two substituents selected from C$_{1-4}$alkyl, —CF$_3$, fluoro, chloro, —OCH$_3$, and —OCF$_3$;
wherein R$^x$ is H or C$_{1-4}$alkyl and R$^y$ is H, C$_{1-4}$alkyl, —O—C$_{1-4}$alkyl, —SO$_2$—C$_{1-4}$alkyl, C$_{1-4}$alkyl-SO$_2$—R$^r$, monocyclic cycloalkyl, —C$_{1-4}$alkyl(monocyclic cycloalkyl), monocyclic heterocyclyl, —O— monocyclic heterocyclyl, or monocyclic heterocycloalkyl, each optionally substituted with one or two substituents selected from C$_{1-4}$alkyl, —OH, —OC$_{1-4}$alkyl, halo, or cyano or —NR$^p$R$^q$;
wherein each R$^r$ is C$_{1-4}$alkyl or —NR$^p$R$^q$;
wherein R$^p$ and R$^q$ are each independently H or C$_{1-4}$alkyl.
or R$^x$ and R$^y$ taken together with the nitrogen to which they are attached form a heterocyclyl, optionally substituted with C$_{1-4}$alkyl;
or a pharmaceutically acceptable salt thereof.

Embodiment 74. A compound selected from:
7-morpholino-2-(pyridin-4-yl)-N-(3-(p-tolyl)-1H-pyrazol-5-yl)pyrazolo[1,5-a]pyrimidin-5-amine;
7-morpholino-N-(5-phenyl-1H-pyrazol-3-yl)-2-(4-pyridyl)pyrazolo[1,5-a]pyrimidin-5-amine;
7-morpholino-N-[5-(o-tolyl)-1H-pyrazol-3-yl]-2-(4-pyridyl)pyrazolo[1,5-a]pyrimidin-5-amine;
7-morpholino-N-[3-(m-tolyl)-1H-pyrazol-5-yl]-2-(4-pyridyl)pyrazolo[1,5-a]pyrimidin-5-amine;
N-(5-methyl-1H-pyrazol-3-yl)-7-morpholino-2-(4-pyridyl)pyrazolo[1,5-a]pyrimidin-5-amine;
7-morpholino-2-(4-pyridyl)-N-[5-(4-pyridyl)-1H-pyrazol-3-yl]pyrazolo[1,5-a]pyrimidin-5-amine;
1-(7-morpholino-2-(pyridin-4-yl)pyrazolo[1,5-a]pyrimidin-5-yl)-3-phenyl-1H-pyrazol-5-amine;
1-(7-morpholino-2-(pyridin-4-yl)pyrazolo[1,5-a]pyrimidin-5-yl)-3-(o-tolyl)-1H-pyrazol-5-amine;
4-[5-(4-phenylpyrazol-1-yl)-2-(4-pyridyl)pyrazolo[1,5-a]pyrimidin-7-yl]morpholine;
4-[5-[4-(m-tolyl)pyrazol-1-yl]-2-(4-pyridyl)pyrazolo[1,5-a]pyrimidin-7-yl]morpholine;
4-[2-(4-pyridyl)-5-[4-(4-pyridyl)pyrazol-1-yl]pyrazolo[1,5-a]pyrimidin-7-yl]morpholine;
4-[5-(4-methylpyrazol-1-yl)-2-(4-pyridyl)pyrazolo[1,5-a]pyrimidin-7-yl]morpholine;
4-[5-(3-phenylpyrazol-1-yl)-2-(4-pyridyl)pyrazolo[1,5-a]pyrimidin-7-yl]morpholine;
4-[5-[3-(m-tolyl)pyrazol-1-yl]-2-(4-pyridyl)pyrazolo[1,5-a]pyrimidin-7-yl]morpholine;
4-[2-(4-pyridyl)-5-[3-(4-pyridyl)pyrazol-1-yl]pyrazolo[1,5-a]pyrimidin-7-yl]morpholine;
4-[5-(3-methylpyrazol-1-yl)-2-(4-pyridyl)pyrazolo[1,5-a]pyrimidin-7-yl]morpholine;
4-(2-(pyridin-3-yl)-5-(3-(m-tolyl)-1H-pyrazol-1-yl)pyrazolo[1,5-a]pyrimidin-7-yl)morpholine;
4-(2-(pyridin-2-yl)-5-(3-(m-tolyl)-1H-pyrazol-1-yl)pyrazolo[1,5-a]pyrimidin-7-yl)morpholine;
N-ethyl-7-morpholino-5-(3-(m-tolyl)-1H-pyrazol-1-yl)pyrazolo[1,5-a]pyrimidine-2-carboxamide;
N-cyclopropyl-7-morpholino-5-(3-(m-tolyl)-1H-pyrazol-1-yl)pyrazolo[1,5-a]pyrimidine-2-carboxamide;
(R)—N-(1-cyclopropylethyl)-7-morpholino-5-(3-(m-tolyl)-1H-pyrazol-1-yl)pyrazolo[1,5-a]pyrimidine-2-carboxamide;
(S)—N-(1-cyclopropylethyl)-7-morpholino-5-(3-(m-tolyl)-1H-pyrazol-1-yl)pyrazolo[1,5-a]pyrimidine-2-carboxamide;
N-(2-methoxyethyl)-7-morpholino-5-(3-(m-tolyl)-1H-pyrazol-1-yl)pyrazolo[1,5-a]pyrimidine-2-carboxamide;
N,N-dimethyl-7-morpholino-5-(3-(m-tolyl)-1H-pyrazol-1-yl)pyrazolo[1,5-a]pyrimidine-2-carboxamide;
N-ethyl-N-methyl-7-morpholino-5-(3-(m-tolyl)-1H-pyrazol-1-yl)pyrazolo[1,5-a]pyrimidine-2-carboxamide;
N-cyclopropyl-N-methyl-7-morpholino-5-(3-(m-tolyl)-1H-pyrazol-1-yl)pyrazolo[1,5-a]pyrimidine-2-carboxamide;
N-(cyclopropylmethyl)-7-morpholino-5-(3-(m-tolyl)-1H-pyrazol-1-yl)pyrazolo[1,5-a]pyrimidine-2-carboxamide;
azetidin-1-yl(7-morpholino-5-(3-(m-tolyl)-1H-pyrazol-1-yl)pyrazolo[1,5-a]pyrimidin-2-yl)methanone;
(7-morpholino-5-(3-(m-tolyl)-1H-pyrazol-1-yl)pyrazolo[1,5-a]pyrimidin-2-yl) (pyrrolidin-1-yl)methanone;
(7-morpholino-5-(3-(m-tolyl)-1H-pyrazol-1-yl)pyrazolo[1,5-a]pyrimidin-2-yl) (piperidin-1-yl)methanone;
morpholino (7-morpholino-5-(3-(m-tolyl)-1H-pyrazol-1-yl)pyrazolo[1,5-a]pyrimidin-2-yl)methanone;
(4-methylpiperazin-1-yl) (7-morpholino-5-(3-(m-tolyl)-1H-pyrazol-1-yl)pyrazolo[1,5-a]pyrimidin-2-yl)methanone;
N-methoxy-N-methyl-7-morpholino-5-(3-(m-tolyl)-1H-pyrazol-1-yl)pyrazolo[1,5-a]pyrimidine-2-carboxamide;
N-methoxy-7-morpholino-5-(3-(m-tolyl)-1H-pyrazol-1-yl)pyrazolo[1,5-a]pyrimidine-2-carboxamide;
N-(methylsulfonyl)-7-morpholino-5-(3-(m-tolyl)-1H-pyrazol-1-yl)pyrazolo[1,5-a]pyrimidine-2-carboxamide;
N-cyclopentyl-7-morpholino-5-(3-(m-tolyl)-1H-pyrazol-1-yl)pyrazolo[1,5-a]pyrimidine-2-carboxamide;

N-cyclopentyl-N-methyl-7-morpholino-5-(3-(m-tolyl)-1H-pyrazol-1-yl)pyrazolo[1,5-a]pyrimidine-2-carboxamide;
N-isopropyl-7-morpholino-5-(3-(m-tolyl)-1H-pyrazol-1-yl)pyrazolo[1,5-a]pyrimidine-2-carboxamide;
N-(1,3-dimethoxypropan-2-yl)-7-morpholino-5-(3-(m-tolyl)-1H-pyrazol-1-yl)pyrazolo[1,5-a]pyrimidine-2-carboxamide;
N-(2-(dimethylamino)ethyl)-7-morpholino-5-(3-(m-tolyl)-1H-pyrazol-1-yl)pyrazolo[1,5-a]pyrimidine-2-carboxamide;
N-(4-(dimethylamino)butyl)-7-morpholino-5-(3-(m-tolyl)-1H-pyrazol-1-yl)pyrazolo[1,5-a]pyrimidine-2-carboxamide;
7-morpholino-N-(oxetan-3-yl)-5-(3-(m-tolyl)-1H-pyrazol-1-yl)pyrazolo[1,5-a]pyrimidine-2-carboxamide;
7-morpholino-N-(oxetan-3-ylmethyl)-5-(3-(m-tolyl)-1H-pyrazol-1-yl)pyrazolo[1,5-a]pyrimidine-2-carboxamide;
N-((3-(hydroxymethyl) oxetan-3-yl)methyl)-7-morpholino-5-(3-(m-tolyl)-1H-pyrazol-1-yl)pyrazolo[1,5-a]pyrimidine-2-carboxamide;
(7-morpholino-5-(3-(m-tolyl)-1H-pyrazol-1-yl)pyrazolo[1,5-a]pyrimidin-2-yl) (2-oxa-6-azaspiro[3.3]heptan-6-yl)methanone;
(7-morpholino-5-(3-(m-tolyl)-1H-pyrazol-1-yl)pyrazolo[1,5-a]pyrimidin-2-yl) (6-oxa-1-azaspiro[3.3]heptan-1-yl)methanone;
7-morpholino-N-(oxetan-3-yloxy)-5-(3-(m-tolyl)-1H-pyrazol-1-yl)pyrazolo[1,5-a]pyrimidine-2-carboxamide;
N-[(3S)-1-methylpyrrolidin-3-yl]-7-morpholino-5-[3-(m-tolyl)pyrazol-1-yl]pyrazolo[1,5-a]pyrimidine-2-carboxamide;
N-[(3R)-1-methylpyrrolidin-3-yl]-7-morpholino-5-[3-(m-tolyl)pyrazol-1-yl]pyrazolo[1,5-a]pyrimidine-2-carboxamide;
7-morpholino-5-[3-(m-tolyl)pyrazol-1-yl]-N-[(3S)-tetrahydrofuran-3-yl]pyrazolo[1,5-a]pyrimidine-2-carboxamide;
7-morpholino-5-[3-(m-tolyl)pyrazol-1-yl]-N-[(3R)-tetrahydrofuran-3-yl]pyrazolo[1,5-a]pyrimidine-2-carboxamide;
N-[(3R)-1-methyl-3-piperidyl]-7-morpholino-5-[3-(m-tolyl)pyrazol-1-yl]pyrazolo[1,5-a]pyrimidine-2-carboxamide;
N-[(3S)-1-methyl-3-piperidyl]-7-morpholino-5-[3-(m-tolyl)pyrazol-1-yl]pyrazolo[1,5-a]pyrimidine-2-carboxamide;
N-(1-methyl-4-piperidyl)-7-morpholino-5-[3-(m-tolyl)pyrazol-1-yl]pyrazolo[1,5-a]pyrimidine-2-carboxamide;
N-(1-methyl-4-piperidyl)-7-morpholino-5-[4-(m-tolyl)pyrazol-1-yl]pyrazolo[1,5-a]pyrimidine-2-carboxamide;
7-morpholino-5-[4-(m-tolyl)pyrazol-1-yl]-N-tetrahydropyran-4-yl-pyrazolo[1,5-a]pyrimidine-2-carboxamide;
4-[5-[4-(m-tolyl)pyrazol-1-yl]-2-pyrimidin-4-yl-pyrazolo[1,5-a]pyrimidin-7-yl]morpholine;
4-[5-[4-(m-tolyl)pyrazol-1-yl]-2-pyrimidin-5-yl-pyrazolo[1,5-a]pyrimidin-7-yl]morpholine;
3-[7-morpholino-5-[4-(m-tolyl)pyrazol-1-yl]pyrazolo[1,5-a]pyrimidin-2-yl]pyridin-2-amine;
5-[7-morpholino-5-[4-(m-tolyl)pyrazol-1-yl]pyrazolo[1,5-a]pyrimidin-2-yl]pyrimidin-2-amine;
4-[2-(1-methylpyrazol-3-yl)-5-[3-(m-tolyl)pyrazol-1-yl]pyrazolo[1,5-a]pyrimidin-7-yl]morpholine;
4-[5-[3-(m-tolyl)pyrazol-1-yl]-2-(1H-pyrazol-3-yl)pyrazolo[1,5-a]pyrimidin-7-yl]morpholine;
4-[5-(3-phenylpyrazol-1-yl)-2-pyrimidin-2-yl-pyrazolo[1,5-a]pyrimidin-7-yl]morpholine;
4-[5-(3-phenylpyrazol-1-yl)-2-(3-pyridyl)pyrazolo[1,5-a]pyrimidin-7-yl]morpholine;
4-[2-(5-methyl-1H-pyrazol-3-yl)-5-[3-(m-tolyl)pyrazol-1-yl]pyrazolo[1,5-a]pyrimidin-7-yl]morpholine;
4-[2-(1-methylpyrazol-3-yl)-5-(3-phenylpyrazol-1-yl)pyrazolo[1,5-a]pyrimidin-7-yl]morpholine;
4-[5-(3-phenylpyrazol-1-yl)-2-(1H-pyrazol-3-yl)pyrazolo[1,5-a]pyrimidin-7-yl]morpholine;
4-[5-(3-phenylpyrazol-1-yl)-2-pyrimidin-4-yl-pyrazolo[1,5-a]pyrimidin-7-yl]morpholine;
4-[5-(3-phenylpyrazol-1-yl)-2-pyrimidin-5-yl-pyrazolo[1,5-a]pyrimidin-7-yl]morpholine;
3-[7-morpholino-5-(3-phenylpyrazol-1-yl)pyrazolo[1,5-a]pyrimidin-2-yl]pyridin-2-amine;
5-[7-morpholino-5-(3-phenylpyrazol-1-yl)pyrazolo[1,5-a]pyrimidin-2-yl]pyrimidin-2-amine;
4-[5-(3-phenylpyrazol-1-yl)-2-(2-pyridyl)pyrazolo[1,5-a]pyrimidin-7-yl]morpholine;
N-isopropyl-7-morpholino-5-(3-phenylpyrazol-1-yl)pyrazolo[1,5-a]pyrimidine-2-carboxamide;
N-[(1R)-1-cyclopropylethyl]-7-morpholino-5-(3-phenylpyrazol-1-yl)pyrazolo[1,5-a]pyrimidine-2-carboxamide;
N-[(1S)-1-cyclopropylethyl]-7-morpholino-5-(3-phenylpyrazol-1-yl)pyrazolo[1,5-a]pyrimidine-2-carboxamide;
7-morpholino-N-(oxetan-3-ylmethyl)-5-(3-phenylpyrazol-1-yl)pyrazolo[1,5-a]pyrimidine-2-carboxamide;
N-cyclopentyl-7-morpholino-5-(3-phenylpyrazol-1-yl)pyrazolo[1,5-a]pyrimidine-2-carboxamide;
4-[5-(4-phenylpyrazol-1-yl)-2-(2-pyridyl)pyrazolo[1,5-a]pyrimidin-7-yl]morpholine;
4-[5-(4-phenylpyrazol-1-yl)-2-(3-pyridyl)pyrazolo[1,5-a]pyrimidin-7-yl]morpholine;
N-isopropyl-7-morpholino-5-(4-phenylpyrazol-1-yl)pyrazolo[1,5-a]pyrimidine-2-carboxamide;
4-[2-(5-methyl-1H-pyrazol-3-yl)-5-(3-phenylpyrazol-1-yl)pyrazolo[1,5-a]pyrimidin-7-yl]morpholine;
4-[5-(3-phenylpyrazol-1-yl)-2-pyrazin-2-yl-pyrazolo[1,5-a]pyrimidin-7-yl]morpholine;
N,N-dimethyl-2-[3-methyl-5-[7-morpholino-5-[3-(m-tolyl)pyrazol-1-yl]pyrazolo[1,5-a]pyrimidin-2-yl]pyrazol-1-yl]ethanamine;
4-[2-(2,5-dimethylpyrazol-3-yl)-5-[3-(m-tolyl)pyrazol-1-yl]pyrazolo[1,5-a]pyrimidin-7-yl]morpholine;
4-[2-(2,5-dimethylpyrazol-3-yl)-5-(3-phenylpyrazol-1-yl)pyrazolo[1,5-a]pyrimidin-7-yl]morpholine;
4-[2-(1,5-dimethylpyrazol-3-yl)-5-(3-phenylpyrazol-1-yl)pyrazolo[1,5-a]pyrimidin-7-yl]morpholine;
4-[2-(1,5-dimethylpyrazol-3-yl)-5-[3-(m-tolyl)pyrazol-1-yl]pyrazolo[1,5-a]pyrimidin-7-yl]morpholine;
4-[5-(3-phenylpyrazol-1-yl)-2-pyridazin-3-yl-pyrazolo[1,5-a]pyrimidin-7-yl]morpholine;
methyl N-[[7-morpholino-5-(3-phenylpyrazol-1-yl)pyrazolo[1,5-a]pyrimidin-2-yl]methyl]carbamate;
N-[[7-morpholino-5-(3-phenylpyrazol-1-yl)pyrazolo[1,5-a]pyrimidin-2-yl]methyl]propanamide;
N,N-dimethyl-2-[5-methyl-3-[7-morpholino-5-[3-(m-tolyl)pyrazol-1-yl]pyrazolo[1,5-a]pyrimidin-2-yl]pyrazol-1-yl]ethanamine;
N,N-dimethyl-2-[5-methyl-3-[7-morpholino-5-[3-(2-pyridyl)pyrazol-1-yl]pyrazolo[1,5-a]pyrimidin-2-yl]pyrazol-1-yl]ethanamine;
N,N-dimethyl-2-[5-methyl-3-[7-morpholino-5-[3-(4-pyridyl)pyrazol-1-yl]pyrazolo[1,5-a]pyrimidin-2-yl]pyrazol-1-yl]ethanamine;
N,N-dimethyl-2-[5-methyl-3-[5-[3-(6-methyl-2-pyridyl)pyrazol-1-yl]-7-morpholino-pyrazolo[1,5-a]pyrimidin-2-yl]pyrazol-1-yl]ethanamine;

N,N-dimethyl-2-[5-methyl-3-[5-[3-(4-methyl-2-pyridyl) pyrazol-1-yl]-7-morpholino-pyrazolo[1,5-a]pyrimidin-2-yl]pyrazol-1-yl]ethanamine;
N,N-dimethyl-2-[5-methyl-3-[5-[3-(2-methyl-4-pyridyl) pyrazol-1-yl]-7-morpholino-pyrazolo[1,5-a]pyrimidin-2-yl]pyrazol-1-yl]ethanamine;
2-[3-[5-[3-(3-chlorophenyl)pyrazol-1-yl]-7-morpholino-pyrazolo[1,5-a]pyrimidin-2-yl]-5-methyl-pyrazol-1-yl]-N,N-dimethyl-ethanamine;
5-[7-morpholino-5-(3-phenylpyrazol-1-yl)pyrazolo[1,5-a]pyrimidin-2-yl]pyridin-2-amine;
N,N-dimethyl-2-[5-methyl-3-[7-morpholino-5-(3-phenylpyrazol-1-yl)pyrazolo[1,5-a]pyrimidin-2-yl]pyrazol-1-yl]ethanamine;
2-[3-[5-[3-(3-methoxyphenyl)pyrazol-1-yl]-7-morpholino-pyrazolo[1,5-a]pyrimidin-2-yl]-5-methyl-pyrazol-1-yl]-N,N-dimethyl-ethanamine;
4-[5-[3-(3-chlorophenyl)pyrazol-1-yl]-2-(1-methylpyrazol-3-yl)pyrazolo[1,5-a]pyrimidin-7-yl]morpholine;
4-[5-[3-(5-methyl-3-pyridyl)pyrazol-1-yl]-2-(3-pyridyl) pyrazolo[1,5-a]pyrimidin-7-yl]morpholine;
4-[5-[3-(2-methyl-4-pyridyl)pyrazol-1-yl]-2-(3-pyridyl) pyrazolo[1,5-a]pyrimidin-7-yl]morpholine;
4-[7-morpholino-5-(3-phenylpyrazol-1-yl)pyrazolo[1,5-a] pyrimidin-2-yl]pyrimidin-2-amine;
4-[5-[3-(3-chlorophenyl)pyrazol-1-yl]-2-(3-pyridyl)pyrazolo[1,5-a]pyrimidin-7-yl]morpholine;
4-[5-[3-(3-bromophenyl)pyrazol-1-yl]-2-(3-pyridyl)pyrazolo[1,5-a]pyrimidin-7-yl]morpholine;
4-[5-[3-(3-methoxyphenyl)pyrazol-1-yl]-2-(3-pyridyl)pyrazolo[1,5-a]pyrimidin-7-yl]morpholine;
4-[5-[3-(6-methyl-2-pyridyl)pyrazol-1-yl]-2-(3-pyridyl) pyrazolo[1,5-a]pyrimidin-7-yl]morpholine;
6-[7-morpholino-5-(3-phenylpyrazol-1-yl)pyrazolo[1,5-a] pyrimidin-2-yl]pyridin-2-amine;
4-[2-(3-methylisoxazol-5-yl)-5-[3-(m-tolyl)pyrazol-1-yl] pyrazolo[1,5-a]pyrimidin-7-yl]morpholine;
4-[5-[3-(m-tolyl)pyrazol-1-yl]-2-thiazol-2-yl-pyrazolo[1,5-a]pyrimidin-7-yl]morpholine;
4-[2-(1-methylpyrazol-4-yl)-5-[3-(m-tolyl)pyrazol-1-yl] pyrazolo[1,5-a]pyrimidin-7-yl]morpholine;
4-[5-[3-(m-tolyl)pyrazol-1-yl]-2-(1H-pyrazol-4-yl)pyrazolo [1,5-a]pyrimidin-7-yl]morpholine;
4-[5-(3-phenylpyrazol-1-yl)-2-thiazol-2-yl-pyrazolo[1,5-a] pyrimidin-7-yl]morpholine;
4-[2-(1-methylpyrazol-4-yl)-5-(3-phenylpyrazol-1-yl)pyrazolo[1,5-a]pyrimidin-7-yl]morpholine;
4-[5-(3-phenylpyrazol-1-yl)-2-(1H-pyrazol-4-yl)pyrazolo [1,5-a]pyrimidin-7-yl]morpholine;
methyl 3-[1-[7-morpholino-2-(3-pyridyl)pyrazolo[1,5-a]pyrimidin-5-yl]pyrazol-3-yl]benzoate;
3-[1-[7-morpholino-2-(3-pyridyl)pyrazolo[1,5-a]pyrimidin-5-yl]pyrazol-3-yl]benzamide;
3-[1-[7-morpholino-2-(3-pyridyl)pyrazolo[1,5-a]pyrimidin-5-yl]pyrazol-3-yl]benzonitrile;
4-[5-[3-(m-tolyl)pyrazol-1-yl]-2-oxazol-2-yl-pyrazolo[1,5-a]pyrimidin-7-yl]morpholine;
4-[2-(3-methylisoxazol-5-yl)-5-(3-phenylpyrazol-1-yl)pyrazolo[1,5-a]pyrimidin-7-yl]morpholine;
3-[1-[7-morpholino-2-(3-pyridyl)pyrazolo[1,5-a]pyrimidin-5-yl]pyrazol-3-yl]benzoic acid; and
4-[2-(1-methylpyrazol-3-yl)-5-[3-[3-(trideuteriomethyl) phenyl]pyrazol-1-yl]pyrazolo[1,5-a]pyrimidin-7-yl]morpholine;
and pharmaceutically acceptable salts thereof.

Embodiment 75. A pharmaceutical composition comprising a compound and/or a pharmaceutically acceptable salt of any one of embodiments 1 to 74 or 87 and a pharmaceutically acceptable excipient.

Embodiment 76. A method of inhibiting PIKfyve kinase in a subject in need thereof comprising administering to the subject an effective amount of a compound of any one of embodiments 1 to 74 or 87, or a pharmaceutical composition of embodiment 75.

Embodiment 77. A method of treating a neurological disease associated with PIKfyve activity in a subject in need thereof comprising administering to the subject an effective amount of a compound of any one of embodiments 1 to 74 or 87, or a pharmaceutical composition of embodiment 75.

Embodiment 78. The method of embodiment 77, wherein the neurological disease is amyotrophic lateral sclerosis (ALS), primary lateral sclerosis (PLS), Charcot-Marie-Tooth (CMT; including type 4J (CMT4J)), and Yunis-Varon syndrome, autophagy, polymicrogyria (including polymicrogyria with seizures), temporo-occipital polymicrogyria, Pick's disease, Parkinson's disease, Parkinson's disease with Lewy bodies, dementia with Lewy bodies, Lewy body disease, fronto-temporal dementia, diseases of neuronal nuclear inclusions of polyglutamine and intranuclear inclusion bodies, disease of Marinesco and Hirano bodies, tauopathy, Alzheimer's disease, neurodegeneration, spongiform neurodegeneration, peripheral neuropathy, leukoencephalopathy, inclusion body disease, progressive supranuclear palsy, corticobasal syndrome, chronic traumatic encephalopathy, traumatic brain injury (TBI), cerebral ischemia, Guillain-Barré Syndrome, chronic inflammatory demyelinating polyneuropathy, multiple sclerosis, a lysosomal storage disease, Fabry's disorder, Gaucher's disorder, Niemann Pick C disease, Tay-Sachs disease, and Mucolipidosis type IV, neuropathy, Huntington's disease, a psychiatric disorder, ADHD, schizophrenia, a mood disorder, major depressive disorder, depression, bipolar disorder I, or bipolar disorder II.

Embodiment 79. The method of embodiment 78, wherein the disease is ALS, FTD, Alzheimer's disease, Parkinson's disease, Huntington's disease, or CMT.

Embodiment 80. The method of embodiment 79, wherein the disease is ALS.

Embodiment 81. The method of embodiment 78, wherein the disease is a tauopathy such as Alzheimer's disease, progressive supranuclear palsy, corticobasal syndrome, frontotemporal dementia, or chronic traumatic encephalopathy.

Embodiment 82. The method of embodiment 78, wherein the disease is a lysosomal storage disease such as Fabry's disorder, Gaucher's disorder, Niemann Pick C disease, Tay-Sachs disease, or Mucolipidosis type IV.

Embodiment 83. The method of embodiment 78, wherein the disease is a psychiatric disorder such as ADHD, schizophrenia, or mood disorders such as major depressive disorder, depression, bipolar disorder I, or bipolar disorder II.

Embodiment 84. A compound of any one of embodiments 1 to 74 or 87 for use as a medicament.

Embodiment 85. The compound of embodiment 84, wherein the compound is for use in treating a treating a neurological disease treatable by inhibition of PIKfyve kinase.

Embodiment 86. Use of a compound of any one of embodiments 1 to 74 or 87 in the manufacture of a medicament for treating a neurological disease in a subject in which PIKfyve contributes to the pathology and/or symptoms of the disease.

Embodiment 87. A compound and/or a pharmaceutically acceptable salt of any one of embodiments 1 to 74, wherein one or more hydrogen atoms attached to carbon atoms of the compound are replaced by deuterium atoms.

DETAILED DESCRIPTION

Unless otherwise stated, the following terms used in the specification and claims are defined for the purposes of this disclosure and have the following meanings.

"Alkyl" means a linear saturated monovalent hydrocarbon radical of one to six carbon atoms or a branched saturated monovalent hydrocarbon radical of three to six carbon atoms, e.g., methyl, ethyl, propyl, 2-propyl, butyl (including all isomeric forms), pentyl (including all isomeric forms), and the like.

"Alkylene" means a linear saturated divalent hydrocarbon radical of one to six carbon atoms or a branched saturated divalent hydrocarbon radical of three to six carbon atoms unless otherwise stated e.g., methylene, ethylene, propylene, 1-methylpropylene, 2-methylpropylene, butylene, pentylene, and the like.

"Alkylsulfonyl" means a —SO$_2$R radical where R is alkyl as defined above, e.g., methylsulfonyl, ethyl sulfonyl, and the like.

"Amino" means a —NH$_2$.

"Alkoxy" means a —OR radical where R is alkyl as defined above, e.g., methoxy, ethoxy, propoxy, or 2-propoxy, n-, iso-, or tert-butoxy, and the like.

"Alkoxyalkyl" means a linear monovalent hydrocarbon radical of one to six carbon atoms or a branched monovalent hydrocarbon radical of three to six carbons substituted with an alkoxy group, (in one embodiment one or two alkoxy groups), as defined above, e.g., 2-methoxyethyl, 1-, 2-, or 3-methoxypropyl, 2-ethoxyethyl, and the like.

"Alkoxycarbonyl" means a —C(O)OR radical where R is alkyl as defined above, e.g., methoxycarbonyl, ethoxycarbonyl, and the like.

"Acyl" means a —COR radical where R is alkyl, haloalkyl, or cycloalkyl, e.g., acetyl, propionyl, cyclopropylcarbonyl, and the like. When R is alkyl, the radical is also referred to herein as alkylcarbonyl.

"Cycloalkyl" means a cyclic saturated monovalent hydrocarbon radical of three to ten carbon atoms wherein one or two carbon atoms may be replaced by an oxo group, e.g., cyclopropyl, cyclobutyl, cyclopentyl, or cyclohexyl, and the like.

"Carboxy" means —COOH.

"Halo" means fluoro, chloro, bromo, or iodo; in one embodiment fluoro or chloro.

"Haloalkyl" means alkyl radical as defined above, which is substituted with one or one to five halogen atoms (in one embodiment fluorine or chlorine,) including those substituted with different halogens, e.g., —CH$_2$Cl, —CF$_3$, —CHF$_2$, —CH$_2$CF$_3$, —CF$_2$CF$_3$, —CF(CH$_3$)$_2$, and the like. When the alkyl is substituted with only fluoro, it can be referred to in this disclosure as fluoroalkyl.

"Haloalkoxy" means a —OR radical where R is haloalkyl as defined above e.g., —OCF$_3$, —OCHF$_2$, and the like. When R is haloalkyl where the alkyl is substituted with only fluoro, it can be referred to in this disclosure as fluoroalkoxy.

"Hydroxyalkyl" means a linear monovalent hydrocarbon radical of one to six carbon atoms or a branched monovalent hydrocarbon radical of three to six carbons substituted with one or two hydroxy groups, provided that if two hydroxy groups are present they are not both on the same carbon atom. Representative examples include, but are not limited to, hydroxymethyl, 2-hydroxyethyl, 2-hydroxypropyl, 3-hydroxypropyl, 1-(hydroxymethyl)-2-methylpropyl, 2-hydroxybutyl, 3-hydroxybutyl, 4-hydroxybutyl, 2,3-dihydroxypropyl, 1-(hydroxymethyl)-2-hydroxyethyl, 2,3-dihydroxybutyl, 3,4-dihydroxybutyl and 2-(hydroxymethyl)-3-hydroxypropyl. Further examples include, but are not limited to, 2-hydroxyethyl, 2,3-dihydroxypropyl, and 1-(hydroxymethyl)-2-hydroxyethyl.

"Heterocyclyl" means a saturated or unsaturated monovalent monocyclic or bi-cyclic group (fused bi-cyclic or bridged bi-cyclic or spiro compounds) of 4 to 10 ring atoms in which one or two ring atoms are heteroatom selected from N, O, and S(O)$_n$, where n is an integer from 0 to 2, the remaining ring atoms being C. Additionally, one or two ring carbon atoms in the heterocyclyl ring can optionally be replaced by a —CO— group. More specifically the term heterocyclyl includes, but is not limited to, oxetanyl, pyrrolidino, piperidino, homopiperidino, 2-oxopyrrolidinyl, 2-oxopiperidinyl, morpholino, piperazino, tetrahydropyranyl, thiomorpholino, hexahydropyrrolo[1,2-a]pyrazin-6 (2H)-one-yl, tetrahydro-1H-oxazolo[3,4-a]pyrazin-3 (5H)-one-yl, 5,6,7,8-tetrahydro-[1,2,4]triazolo[4,3-a]pyrazine-yl, 3-oxa-8-azabicyclo[3.2.1]octane-yl, 6-oxa-1-azaspiro[3.3]heptanyl, 2-oxa-6-azaspiro[3.3]heptanyl, and the like. When the heterocyclyl ring is unsaturated it can contain one or two ring double bonds provided that the ring is not aromatic.

"Heterocyclylalkyl" or "heterocycloalkyl" means a -(alkylene)-R radical where R is heterocyclyl ring as defined above e.g., tetraydrofuranylmethyl, piperazinylmethyl, morpholinylethyl, and the like.

"Heterocycloamino" means a saturated or unsaturated monovalent monocyclic group of 4 to 8 ring atoms in which one or two ring atoms are heteroatom selected from N, O, or S(O)$_n$, where n is an integer from 0 to 2, the remaining ring atoms being C provided that at least one of the ring atoms is N. Additionally, one or two ring carbon atoms in the heterocycloamino ring can optionally be replaced by a —CO— group. When the heterocycloamino ring is unsaturated it can contain one or two ring double bonds provided that the ring is not aromatic.

"Heterocycloaminoalkyl" means a -(alkylene)-R radical where R is heterocycloamino as described above.

"Heteroaryl" means a monovalent monocyclic or bicyclic aromatic radical of 5 to 10 ring atoms where one or more, (in one embodiment one, two, or three), ring atoms are heteroatom selected from N, O, and S, the remaining ring atoms being carbon. Representative examples include, but are not limited to, pyrrolyl, thienyl, thiazolyl, imidazolyl, furanyl, indolyl, isoindolyl, oxazolyl, isoxazolyl, benzothiazolyl, benzoxazolyl, quinolinyl, isoquinolinyl, pyridinyl, pyrimidinyl, pyrazinyl, pyridazinyl, triazolyl, tetrazolyl, and the like.

"Mammal" as used herein means domesticated animals (such as dogs, cats, and horses), and humans. In one embodiment, mammal is a human.

The term "salt" or "pharmaceutically acceptable salt" refers to salts derived from a variety of organic and inorganic counter ions well known in the art. Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Pharmaceutically acceptable base addition salts can be formed with inorganic and organic bases. Inorganic bases from which salts can be derived include, for example, sodium, potassium, lithium, ammonium, calcium, magnesium, iron, zinc, copper, manganese, aluminum, and the like. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. In some embodiments, the pharmaceutically acceptable base addition salt is chosen from ammonium, potassium, sodium, calcium, and magnesium salts. It is understood that the pharmaceutically acceptable salts are non-toxic. Additional information on suitable pharmaceutically acceptable salts can be found in *Remington's Pharmaceutical Sciences,* 17th ed., Mack Publishing Company, Easton, PA, 1985, which is incorporated herein by reference.

"Oxo" means an =(O) group and "carbonyl" means a >C(O) group.

"Optional" or "optionally" means that the subsequently described event or circumstance may but need not occur, and that the description includes instances where the event or circumstance occurs and instances in which it does not. For example, "heterocyclyl group optionally substituted with an alkyl group" means that the alkyl may but need not be present, and the description includes situations where the heterocyclyl group is substituted with an alkyl group and situations where the heterocyclyl group is not substituted with alkyl.

The phrases "parenteral administration" and "administered parenterally" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal and intrasternal injection and infusion.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

The phrase "pharmaceutically acceptable excipient" or "pharmaceutically acceptable carrier" as used herein means a pharmaceutically acceptable material, composition, or vehicle, such as a liquid or solid filler, diluent, excipient, solvent or encapsulating material. Each carrier must be "acceptable" in the sense of being compatible with the other ingredients of the formulation and not injurious to the patient. Some examples of materials which can serve as pharmaceutically acceptable carriers include: (1) sugars, such as lactose, glucose and sucrose; (2) starches, such as corn starch and potato starch; (3) cellulose, and its derivatives, such as sodium carboxymethyl cellulose, ethyl cellulose and cellulose acetate; (4) powdered tragacanth; (5) malt; (6) gelatin; (7) talc; (8) excipients, such as cocoa butter and suppository waxes; (9) oils, such as peanut oil, cottonseed oil, safflower oil, sesame oil, olive oil, corn oil and soybean oil; (10) glycols, such as propylene glycol; (11) polyols, such as glycerin, sorbitol, mannitol and polyethylene glycol; (12) esters, such as ethyl oleate and ethyl laurate; (13) agar; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations.

"Treating" or "treatment" of a disease includes:
(1) preventing the disease, e.g., causing the clinical symptoms of the disease not to develop in a mammal that may be exposed to or predisposed to the disease but does not yet experience or display symptoms of the disease;
(2) inhibiting the disease, e.g., arresting or reducing the development of the disease or its clinical symptoms; or
(3) relieving the disease, e.g., causing regression of the disease or its clinical symptoms.

A "therapeutically effective amount" means the amount of a compound of Formula (I) (or any of the embodiments thereof described herein), that, when administered to a mammal for treating a disease, is sufficient to treat the disease. The "therapeutically effective amount" will vary depending on the compound, the disease and its severity and the age, weight, etc., of the mammal to be treated.

The compounds described herein may in some cases exist as diastereomers, enantiomers, or other stereoisomeric forms. All chiral, diastereomeric, racemic forms, as individual forms and mixtures thereof, are within the scope of this disclosure, unless the specific stereochemistry or isomeric form is specifically indicated. Compounds of the present disclosure containing an asymmetrically substituted atom may be isolated in optically active, optically enriched, optically pure, or racemic forms. It is well known in the art how to prepare optically active forms, such as by resolution of materials. Separation of stereoisomers may be performed by chromatography or by forming diastereomers and separating by recrystallization, or chromatography, or any combination thereof. (Jean Jacques, Andre Collet, Samuel H. Wilen, "Enantiomers, Racemates and Resolutions", John Wiley and Sons, Inc., 1981, herein incorporated by reference for this disclosure). Stereoisomers may also be obtained by stereoselective synthesis.

Certain compounds of Formula (I) (or any of the embodiments thereof described herein) and/or a pharmaceutically acceptable salt thereof may exist as tautomers and/or geometric isomers. All possible tautomers and cis and trans isomers, as individual forms and mixtures thereof, are within the scope of this disclosure. For example, pyrazole tautomers as shown below are equivalent structures. The depiction of one such structure is intended to encompass both structures.

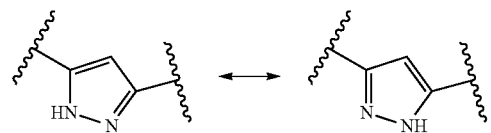 [SMILES: *c1cc(*)[nH]n1 ; *c1cc(*)[nH]n1]

Additionally, as used herein the term alkyl includes all the possible isomeric forms of said alkyl group albeit only a few examples are set forth. Furthermore, when the cyclic groups such as heteroaryl, heterocyclyl are substituted, they include all the positional isomers.

Pharmaceutically acceptable salts of the compounds of Formula (I) (or any of the embodiments thereof described herein) are within the scope of this disclosure. In addition, the compounds described herein include hydrates and solvates of the compounds or pharmaceutically acceptable salts thereof.

The present disclosure also includes the prodrugs of compounds of Formula (I) (or any of the embodiments thereof described herein) and/or a pharmaceutically acceptable salt thereof. The term prodrug is intended to represent covalently bonded carriers, which are capable of releasing the active ingredient of Formula (I) (or any of the embodiments thereof described herein) when the prodrug is administered to a mammalian subject. Release of the active ingredient occurs in vivo. Prodrugs can be prepared by techniques known to one skilled in the art. These techniques generally modify appropriate functional groups in a given compound. These modified functional groups however regenerate original functional groups in vivo or by routine manipulation. Prodrugs of compounds of Formula (I) (or any of the embodiments thereof described herein) include compounds wherein a hydroxy, amino, carboxylic, or a similar group is modified. Examples of prodrugs include, but are not limited to esters (e.g., acetate, formate, and benzoate derivatives), carbamates (e.g., N,N-dimethylaminocarbonyl) of hydroxy or amino functional groups in compounds of Formula (I)), amides (e.g., trifluoroacetylamino, acetylamino, and the like), and the like. Prodrugs of compounds of Formula (I) (or any of the embodiments thereof described herein) and/or a pharmaceutically acceptable salt thereof are also within the scope of this disclosure.

The present disclosure also includes polymorphic forms (amorphous as well as crystalline) and deuterated forms of compounds of Formula (I) (or any of the embodiments thereof described herein) and/or a pharmaceutically acceptable salt thereof.

The compounds disclosed herein, in some embodiments, are used in different enriched isotopic forms, e.g., enriched in the content of $^2$H, $^3$H, $^{11}$C, $^{13}$C and/or $^{14}$C. In one particular embodiment, the compound is deuterated in at least one position. Such deuterated forms can be made by the procedure described in U.S. Pat. Nos. 5,846,514 and 6,334,997. As described in U.S. Pat. Nos. 5,846,514 and 6,334,997, deuteration can improve the metabolic stability and or efficacy, thus increasing the duration of action of drugs.

Unless otherwise stated, structures depicted herein are intended to include compounds which differ only in the presence of one or more isotopically enriched atoms. For example, compounds having the present structures except for the replacement of a hydrogen by a deuterium or tritium, or the replacement of a carbon by $^{13}$C- or $^{14}$C-enriched carbon are within the scope of the present disclosure.

The compounds of the present disclosure optionally contain unnatural proportions of atomic isotopes at one or more atoms that constitute such compounds. For example, the compounds may be labeled with isotopes, such as for example, deuterium ($^2$H), tritium ($^3$H), iodine-125 ($^{125}$I) or carbon-14 ($^{14}$C). Isotopic substitution with $^2$H, $^{11}$C, $^{13}$C, $^{14}$C, $^{15}$C, $^{12}$N, $^{13}$N, $^{15}$N, $^{16}$N, $^{16}$O, $^{17}$O, $^{14}$F, $^{15}$F, $^{16}$F, $^{17}$F, $^{18}$F, $^{33}$S, $^{34}$S, $^{35}$S, $^{36}$S, $^{35}$Cl, $^{37}$Cl, $^{79}$Br, $^{81}$Br, and $^{125}$I are all contemplated. All isotopic variations of the compounds of the present invention, whether radioactive or not, are encompassed within the scope of the present invention.

In certain embodiments, the compounds disclosed herein have some or all of the $^1$H atoms replaced with 2H atoms. The methods of synthesis for deuterium-containing compounds are known in the art and include, by way of non-limiting example only, the following synthetic methods.

Deuterium substituted compounds are synthesized using various methods such as described in: Dean, Dennis C.; Editor. Recent Advances in the Synthesis and Applications of Radiolabeled Compounds for Drug Discovery and Development. [In: Curr., Pharm. Des., 2000; 6 (10)] 2000, 110 pp; George W.; Varma, Rajender S. The Synthesis of Radiolabeled Compounds via Organometallic Intermediates, Tetrahedron, 1989, 45 (21), 6601-21; and Evans, E. Anthony. Synthesis of radiolabeled compounds, J. Radioanal. Chem., 1981, 64 (1-2), 9-32.

Deuterated starting materials are readily available and are subjected to the synthetic methods described herein to provide for the synthesis of deuterium-containing compounds. Large numbers of deuterium-containing reagents and building blocks are available commercially from chemical vendors, such as Aldrich Chemical Co.

In one aspect is a compound of Formula (I):

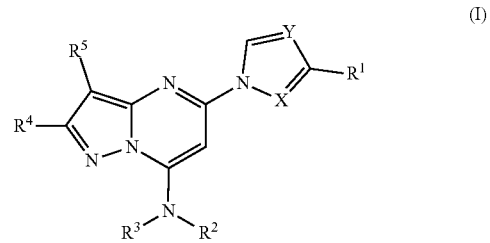

(I)

wherein:
X is N or CH, Y is N or CR$^a$ provided that when X is N, then Y is CR$^a$, when Y is N, then X is CH;
one of R$^a$ and R$^1$ is H, and the other is phenyl or heteroaryl, each optionally substituted with one, two, or three R$^d$ substituents;
  wherein each R$^d$ substituent is independently C$_{1-4}$alkyl, C$_{1-4}$alkenyl, C$_{1-4}$alkynyl, —O—C$_{1-4}$alkyl, halo, cyano, nitro, azido, halo-C$_{1-4}$alkyl, —O—C$_{1-4}$-haloalkyl, —NR$^g$R$^h$,
    —NR$^g$C(=O)R$^h$, —NR$^g$C(=O)NR$^g$R$^h$, —NR$^g$C(=O)OR$^h$, =NOR$^g$, —NR$^g$S(=O)$_{1-2}$R$^h$, —NR$^g$S(=O)$_{1-2}$NR$^g$R$^h$, =NSO$_2$R$^g$, —C(=O)R$^g$, —C(=O)OR$^g$, —OC(=O)OR$^g$, —OC(=O)R$^g$, —C(=O)NR$^g$R$^i$, —OC(=O)NR$^g$R$^h$, —OR$^g$, —SR$^g$, —S(=O)R$^g$, —S(=O)$_2$R$^g$, —OS(=O)$_{1-2}$ R$^g$, —S(=O)$_{1-2}$OR$^g$, —S(=O)$_{1-2}$NR$^g$R$^h$, phenyl, —C$_{1-4}$alkyl-phenyl, monocyclic cycloalkyl, —C$_{1-4}$alkyl-cycloalkyl, monocyclic heterocycloalkyl, or monocyclic heteroaryl;
  wherein each phenyl, monocyclic cycloalkyl, monocyclic heterocycloalkyl, or monocyclic heteroaryl of R$^d$ is optionally substituted with one, two, or three substituents R$^e$;
    wherein each R$^e$ substituent is independently C$_{1-4}$alkyl, C$_{1-4}$alkenyl, C$_{1-4}$alkynyl, halo, cyano, nitro, azido, —OH, halo-C$_{1-4}$alkyl, —O—C$_{1-4}$alkyl, or —O—C$_{1-4}$-haloalkyl; R$^g$ and R$^h$ are each independently H or C$_{1-4}$alkyl;
    or R$^g$ and R$^h$ taken together with the atom to which they are attached form a monocyclic cycloalkyl or heterocycloalkyl, optionally substituted with C$_{1-4}$alkyl;
wherein each of R$^2$ and R$^3$ is H or is a C$_{1-4}$alkyl, cycloalkyl, C$_{1-4}$alkylcycloalkyl, heterocyclyl, heterocycloalkyl, or R$^2$ and R$^3$ taken together with the nitrogen to which they are attached form a monocyclic heterocyclyl, optionally substituted with one, two, or three R$^j$ substituents;

wherein each $R^j$ substituent is independently $C_{1-4}$alkyl, oxo, —OH, —NR$^k$R$^l$, halo, halo-$C_{1-4}$alkyl, —O—$C_{1-4}$alkyl, or —O—$C_{1-4}$-haloalkyl;
where $R^k$ and $R^l$ are each independently H or $C_{1-4}$alkyl;
$R^4$ is —C(O)NR$^x$R$^y$, or is a phenyl or heteroaryl, each optionally substituted with one, two, or three $R^z$ substituents;
wherein $R^x$ is H or $C_{1-4}$alkyl and $R^y$ is H, $C_{1-4}$alkyl, —O—$C_{1-4}$alkyl, —SO$_2$—$C_{1-4}$alkyl, $C_{1-4}$alkyl-SO$_2$—R$^r$, monocyclic cycloalkyl, —$C_{1-4}$alkyl (monocyclic cycloalkyl), monocyclic heterocyclyl, —O-monocyclic heterocyclyl, or monocyclic heterocycloalkyl, each optionally substituted with one, two, or three $R^o$ substituents;
or $R^x$ and $R^y$ taken together with the nitrogen to which they are attached form a heterocyclyl or a monocyclic heterocycloalkyl, optionally substituted with $C_{1-4}$alkyl;
wherein each $R^r$ is $C_{1-4}$alkyl or —NR$^p$R$^q$; and
each $R^z$ substituent is independently $C_{1-4}$alkyl, halo, —OH, or —OC$_{1-4}$alkyl, $C_{1-4}$alkylNR$^m$R$^n$, C(O)NHC$_{1-4}$alkyl-NR$^m$R$^n$, or —NR$^m$R$^n$,
wherein $R^m$ and $R^n$ are each independently H, $C_{1-4}$alkyl, or $C_{1-4}$alkylNR$^p$R$^q$, or $R^m$ and $R^n$ taken together with the nitrogen to which they are attached form a heterocyclyl, or a monocyclic heterocycloalkyl, optionally substituted with one or two $R^o$ substituents;
wherein each $R^o$ substituent is independently $C_{1-4}$alkyl, —OH, —OC$_{1-4}$alkyl, halo, cyano, or —NR$^p$R$^q$;
wherein $R^p$ and $R^q$ are each independently H or $C_{1-4}$alkyl, or $R^p$ and $R^q$ taken together with the nitrogen to which they are attached form a heterocyclyl; and
$R^5$ is H, $C_{1-4}$alkyl, halo, —OH, or —OC$_{1-4}$alkyl;
or a pharmaceutically acceptable salt thereof.

In some embodiments, X is CH and Y is N. In some embodiments, X is N and Y is CR$^a$. In some embodiments, $R^a$ is H, methyl, ethyl, propyl, isopropyl, butyl, isobutyl, sec-butyl, or tert-butyl. In some embodiments, $R^a$ is H or methyl. In some embodiments, $R^a$ is H.

In some embodiments, $R^a$ or $R^l$ is optionally substituted phenyl. In some embodiments, $R^a$ or $R^l$ is tolyl. In some embodiments, $R^a$ or $R^l$ is m-tolyl. In some embodiments, $R^a$ or $R^l$ is optionally substituted monocyclic heteroaryl. In some embodiments, $R^a$ or $R^l$ is optionally substituted pyrrole, imidazole, pyrazole, triazole, tetrazole, furan, oxazole, isoxazole, thiazole, isothiazole, pyridine, pyrimidine, pyrazine, or pyridazine. In some embodiments, $R^a$ or $R^l$ is optionally substituted pyridine or pyrimidine. In some embodiments, $R^a$ or $R^l$ is optionally substituted pyridine. In some embodiments, $R^a$ or $R^l$ is methylpyridine. In some embodiments, $R^a$ or $R^l$ is optionally substituted with one or two $R^d$ substituents.

In some embodiments, each $R^d$ substituent is independently $C_{1-4}$alkyl, $C_{1-4}$alkenyl, $C_{1-4}$alkynyl, —O—$C_{1-4}$alkyl, halo, cyano, nitro, azido, halo-$C_{1-4}$alkyl, —O—$C_{1-4}$-haloalkyl, —NR$^g$R$^h$, —NR$^g$C(=O)R$^h$, —NR$^g$C(=O)NR$^g$R$^i$, —NR$^g$C(=O)OR$^h$, =NOR$^g$, —NR$^g$S(=O)$_{1-2}$R$^h$, —NR$^g$S(=O)$_{1-2}$NR$^g$R$^h$, =NSO$_2$R$^g$, —C(=O)R$^g$, —C(=O)OR$^g$, —OC(=O)OR$^g$, —OC(=O)R$^g$, —C(=O)NR$^g$R$^h$, —OC(=O)NR$^g$R$^h$, —OR$^g$, —SR$^g$, —S(=O)R$^g$, —S(=O)$_2$R$^g$, —OS(=O)$_{1-2}$R$^g$, —S(=O)$_{1-2}$OR$^g$, —S(=O)$_{1-2}$NR$^g$R$^h$, phenyl, —$C_{1-4}$alkyl-phenyl, monocyclic cycloalkyl, —$C_{1-4}$alkyl-cycloalkyl, monocyclic heterocycloalkyl, or monocyclic heteroaryl, wherein the phenyl, monocyclic cycloalkyl, monocyclic heterocycloalkyl, and monocyclic heteroaryl of $R^d$ are each optionally substituted with one or two substituents $R^e$. In some embodiments, each $R^d$ substituent is independently $C_{1-4}$alkyl, halo-$C_{1-4}$alkyl, phenyl, —$C_{1-4}$alkyl-phenyl, pyridyl, thiophenyl, cycloalkyl, or —$C_{1-4}$alkyl-cycloalkyl, wherein the phenyl, pyridyl, and thiophenyl are each optionally substituted with one or two substituents $R^e$. In some embodiments, each $R^d$ substituent is independently methyl, ethyl isopropyl, —CF$_3$, —OCH$_3$, —OCF$_3$, phenyl, pyridyl, thiophenyl, benzyl, cyclopropyl, cyclobutyl, cyclopentyl, cyclopropylmethyl, cyclobutylmethyl, or cyclopentylmethyl, wherein the phenyl, cycloalkyl, and heteroaryl of $R^d$ are each optionally substituted with one or two substituents $R^e$. In some embodiments, each $R^d$ is independently selected from $C_{1-4}$alkyl, —CF$_3$, fluoro, chloro, —OCH$_3$, and —OCF$_3$. In some embodiments, $R^a$ or $R^l$ is substituted with one $R^d$ and the $R^d$ is $C_{1-4}$alkyl. In some embodiments, $R^a$ or $R^l$ is substituted with one $R^d$ and the $R^d$ is methyl. In some embodiments, $R^a$ or $R^l$ is phenyl or pyridyl, each optionally substituted with one or two substituents selected from $C_{1-4}$alkyl, —CF$_3$, fluoro, chloro, —OCH$_3$, and —OCF$_3$. In some embodiments, $R^a$ or $R^l$ is unsubstituted phenyl or tolyl. In some embodiments, $R^a$ or $R^l$ is unsubstituted phenyl or m-tolyl. In some embodiments, $R^a$ or $R^l$ is unsubstituted pyridyl. In some embodiments, $R^a$ or $R^l$ is 4-pyridyl.

In some embodiments, each $R^e$ substituent is independently $C_{1-4}$alkyl, halo, halo-$C_{1-4}$alkyl, —O—$C_{1-4}$alkyl, or —O—$C_{1-4}$-haloalkyl. In some embodiments, each $R^e$ substituent is independently methyl, —CF$_3$, fluoro, chloro, —OCH$_3$, or —OCF$_3$. In some embodiments, each $R^d$ substituent is independently methyl, ethyl isopropyl, —CF$_3$, phenyl, pyridyl, thiophenyl, benzyl, cyclopropyl, cyclobutyl, cyclopentyl, cyclopropylmethyl, cyclobutylmethyl, or cyclopentylmethyl, wherein each $R^e$ is independently methyl, —CF$_3$, fluoro, chloro, —OCH$_3$, or —OCF$_3$.

In some embodiments, $R^g$ and $R^h$ are each independently H or methyl.

In some embodiments, $R^2$ and $R^3$ taken together with the nitrogen to which they are attached form pyrrolidine, piperidine, piperazine, morpholine, thiomorpholine, or thiomorpholine-1,1-dioxide, each optionally substituted with one, two, or three $R^j$ substituents. In some embodiments, $R^2$ and $R^3$ taken together with the nitrogen to which they are attached form morpholine, optionally substituted with one or two $R^j$ substituents.

In some embodiments, each $R^j$ substituent is independently methyl, hydroxy, —OCH$_3$, halo, —CF$_3$, or —OCF$_3$.

In some embodiments, $R^k$ and $R^l$ are each independently H or methyl.

In some embodiments, $R^4$ is optionally substituted phenyl. In some embodiments, $R^4$ is optionally substituted heteroaryl. In some embodiments, $R^4$ is optionally substituted monocyclic heteroaryl. In some embodiments, $R^4$ is optionally substituted pyrrole, imidazole, pyrazole, triazole, tetrazole, furan, oxazole, isoxazole, thiazole, isothiazole, pyridine, pyrimidine, pyrazine, or pyridazine. In some embodiments, $R^4$ is optionally substituted pyrazole, pyridine or pyrimidine. In some embodiments, $R^4$ is optionally substituted pyridine. In some embodiments, $R^4$ is pyridine. In some embodiments, $R^4$ is 4-pyridyl. In some embodiments, $R^4$ is optionally substituted with one or two $R^z$ substituents. In some embodiments, $R^4$ is phenyl or pyridyl, each optionally substituted with one or two substituents selected from $C_{1-4}$alkyl, —CF$_3$, fluoro, chloro, —OCH$_3$, and —OCF$_3$.

In some embodiments, $R^4$ is —C(O)NR$^x$R$^y$. In some embodiments, R$^x$ is H. In some embodiments, R$^x$ is methyl or ethyl, optionally substituted with one, two, or three R$^o$ substituents. In some embodiments, R$^x$ is methyl. In some embodiments, R$^y$ is H. In some embodiments, R$^y$ is $C_{1-4}$alkyl, —$C_{1-4}$alkyl(monocyclic cycloalkyl), monocyclic cycloalkyl, monocyclic heterocycloalkyl, monocyclic heterocyclyl, —O-monocyclic heterocyclyl, —O—$C_{1-4}$alkyl, —SO$_2$—$C_{1-4}$alkyl, optionally substituted with one, two, or three R$^o$ substituents. In some embodiments, R$^y$ is $C_{1-4}$alkyl, optionally substituted with one, two, or three R$^o$ substituents. In some embodiments, R$^y$ is methyl, ethyl, propyl, or isopropyl, each optionally substituted with one, two, or three R$^o$ substituents. In some embodiments, R$^y$ is methyl, ethyl, isopropyl, methoxyethyl, dimethoxypropanyl, (dimethylamino)ethyl, or (dimethylamino)butyl. In some embodiments, R$^y$ is methoxy. In some embodiments, R$^y$ is —SO$_2$-methyl.

In some embodiments, R$^y$ is monocyclic cycloalkyl or —$C_{1-2}$alkyl(monocyclic cycloalkyl), each optionally substituted with one, two, or three R$^o$ substituents. In some embodiments, R$^y$ is monocyclic cycloalkyl, optionally substituted with one, two, or three R$^o$ substituents. In some embodiments, R$^y$ is cyclopropyl, cyclobutyl, cyclopentyl, or cyclohexyl, each optionally substituted with one, two, or three R$^o$ substituents. In some embodiments, R$^y$ is cyclopropyl. In some embodiments, R$^y$ is cyclopentyl. In some embodiments, R$^y$ is cyclopropyl, cyclobutyl, cyclopentyl, cyclopropylmethyl, 1-cyclopropylethyl, 2-cyclopropylethyl, cyclobutylmethyl, or cyclopentylmethyl. In some embodiments, R$^y$ is monocyclic heterocyclyl or —O-monocyclic heterocyclyl, optionally substituted with one, two, or three R$^o$ substituents. In some embodiments, R$^y$ is optionally substituted tetrahydrofuranyl, tetrahydropyranyl, oxetanyl, azetidinyl, pyrrolidinyl, piperidinyl, morpholinyl, piperazinyl, or oxetanyloxy.

In some embodiments, R$^y$ is oxetanyl, or oxetanyloxy. In some embodiments, R$^y$ is monocyclic heterocycloalkyl, optionally substituted with one, two, or three R$^o$ substituents. In some embodiments, wherein R$^y$ is optionally substituted oxetanylmethyl, or (3-(hydroxymethyl) oxetan-3-yl) methyl. In some embodiments, R$^x$ is methyl and R$^y$ is methyl, ethyl, cyclopropyl, methoxy, or cyclopentyl.

In some embodiments, R$^x$ and R$^y$ taken together with the nitrogen to which they are attached form a monocyclic heterocycloalkyl, optionally substituted with $C_{1-4}$alkyl. In some embodiments, R$^x$ and R$^y$ taken together with the nitrogen to which they are attached form a monocyclic heterocyclyl, optionally substituted with $C_{1-4}$alkyl. In some embodiments, R$^x$ and R$^y$ are taken together with the nitrogen to which they are attached to form azetidinyl, pyrrolidinyl, piperidinyl, piperazinyl, morpholinyl, thiomorpholinyl 6-oxa-1-azaspiro[3.3]heptanyl, or 2-oxa-6-azaspiro[3.3]heptanyl, each optionally substituted with methyl.

In some embodiments, each R$^z$ is independently $C_{1-4}$alkyl, halo, —OH, —O$C_{1-4}$alkyl, $C_{1-4}$alkylNR$^m$R$^n$ or —NR$^m$R$^n$, wherein each alkyl is optionally substituted with —NR$^m$R$^n$. In some embodiments, each R$^z$ is independently methyl, —OH, halo, or —OCH$_3$. In some embodiments, R$^z$ is $C_{2-3}$alkyl substituted with —NR$^m$R$^n$.

In some embodiments, R$^m$ and R$^n$ are each independently H or $C_{1-4}$alkyl. In some embodiments, R$^m$ and R$^n$ are each methyl. In some embodiments, R$^m$ and R$^n$ taken together with the nitrogen to which they are attached form a monocyclic heterocycloalkyl, optionally substituted with one or two R$^o$ substituents. In some embodiments, R$^m$ and R$^n$ taken together with the nitrogen to which they are attached form pyrrolidine, piperidine, piperazine, morpholine, thiomorpholine, or thiomorpholine-1,1-dioxide, each optionally substituted with one or two R$^o$ substituents. In some embodiments, R$^m$ and R$^n$ taken together with the nitrogen to which they are attached form pyrrolidine, piperidine, piperazine, or morpholine, each optionally substituted with one or two R$^o$ substituents.

In some embodiments, each R$^o$ substituent is $C_{1-4}$alkyl. In some embodiments, each R$^o$ substituent is methyl. In some embodiments, each R$^o$ substituent is —OH. In some embodiments, each R$^o$ substituent is —NR$^p$R$^q$. In some embodiments, R$^p$ and R$^q$ are each independently H or methyl.

In some embodiments, R$^p$ and R$^q$ taken together with the nitrogen to which they are attached form a heterocyclyl. In some embodiments, R$^p$ and R$^q$ taken together with the nitrogen to which they are attached form azetidinyl, pyrrolidinyl, piperidinyl, piperazinyl, morpholinyl, thiomorpholinyl 6-oxa-1-azaspiro[3.3]heptanyl, or 2-oxa-6-azaspiro[3.3] heptanyl.

In some embodiments, $R^5$ is H, methyl, ethyl, chloro, bromo, fluoro, —OH, or —OCH$_3$. In some embodiments, $R^5$ is H.

In some embodiments, the compound of Formula (I) or the pharmaceutically acceptable salt thereof is a compound of Formula (II):

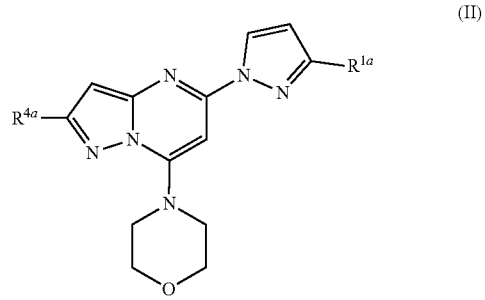

(II)

wherein
$R^{1a}$ is phenyl or pyridyl, each optionally substituted with one or two substituents selected from $C_{1-4}$alkyl, CO$_2$R$^p$, —C(O)NR$^p$R$^q$, fluoro, chloro, bromo, NH$_2$, and —OCH$_3$; and $R^{4a}$ is —C(O)NR$^x$R$^y$, or is a phenyl or pyridyl, each optionally substituted with one or two substituents selected from $C_{1-4}$alkyl, —CF$_3$, fluoro, chloro, —OCH$_3$, and —OCF$_3$;
wherein R$^x$ is H or $C_{1-4}$alkyl and R$^y$ is H, $C_{1-4}$alkyl, —O—$C_{1-4}$alkyl, —SO$_2$—$C_{1-4}$alkyl, $C_{1-4}$alkyl-SO$_2$—R$^r$, monocyclic cycloalkyl, —$C_{1-4}$alkyl (monocyclic cycloalkyl), monocyclic heterocyclyl, —O-monocyclic heterocyclyl, or monocyclic heterocycloalkyl, each optionally substituted with one or two substituents selected from $C_{1-4}$alkyl, —OH, —O$C_{1-4}$alkyl, halo, or cyano or —NR$^p$R$^q$; wherein each R$^r$ is $C_{1-4}$alkyl or —NR$^p$R$^q$;
wherein R$^p$ and R$^q$ are each independently H or $C_{1-4}$alkyl
or R$^x$ and R$^y$ taken together with the nitrogen to which they are attached form a monocyclic heterocyclyl, optionally substituted with $C_{1-4}$alkyl;
or a pharmaceutically acceptable salt thereof.

In some embodiments, $R^{1a}$ is phenyl or pyridyl, each optionally substituted with methyl or —CF$_3$. In some embodiments, $R^{1a}$ is phenyl or m-tolyl. In some embodiments, $R^{1a}$ is pyridyl. In some embodiments, $R^{1a}$ is 4-pyridyl. In some embodiments, $R^{4a}$ is phenyl or pyridyl, each optionally substituted with methyl or —CF$_3$. In some embodiments, $R^{4a}$ is phenyl or m-tolyl. In some embodiments, $R^{4a}$ is pyridyl. In some embodiments, $R^{4a}$ is 4-pyridyl.

In some embodiments, in the compound of Formula (I):

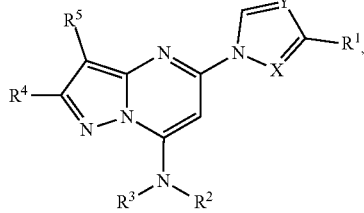

wherein $R^1$, $R^2$, $R^3$, $R^4$, $R^5$, X and Y are as described herein, or
in the compound of Formula (II):

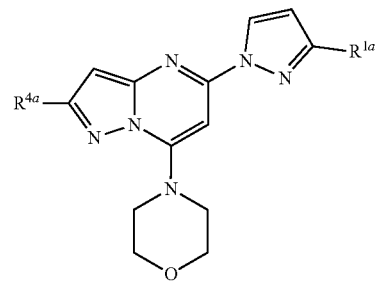

wherein $R^{1a}$ and $R^{4a}$ are as described herein; and
wherein one or more hydrogen atoms attached to carbon atoms of the compound are replaced by deuterium atoms.

In some embodiments, one or more hydrogen atoms attached to carbon atoms of $R^1$, $R^2$, $R^3$, $R^4$, $R^5$, $R^{1a}$ or $R^{4a}$ are replaced by deuterium atoms.

In some embodiments, one or more hydrogen atoms attached to carbon atoms of $R^d$, $R^e$ $R^g$, $R^h$, $R^i$, $R^k$, $R^l$, $R^m$, $R^n$, $R^o$, $R^p$, $R^q$, $R^r$, $R^x$, $R^y$, or $R^z$ are replaced by deuterium atoms. In some embodiments, one or more $R^d$, $R^e$ $R^g$, $R^h$, $R^i$, $R^k$, $R^l$, $R^m$, $R^n$, $R^o$, $R^p$, $R^q$, $R^r$, $R^x$, $R^y$, or $R^z$ group is a $C_{1-4}$alkyl group wherein one or more hydrogen atoms attached to carbon atoms are replaced by deuterium atoms. In some embodiments, one or more $R^d$, $R^e$ $R^g$, $R^h$, $R^i$, $R^k$, $R^l$, $R^m$, $R^n$, $R^g$, $R^p$, $R^q$, $R^r$, $R^x$, $R^y$, or $R^z$ group is a methyl group wherein one or more hydrogen atoms attached to the carbon atom are replaced by deuterium atoms. In some embodiments, one or more $R^d$, $R^e$ $R^g$, $R^h$, $R^j$, $R^k$, $R^l$, $R^m$, $R^n$, $R^o$, $R^p$, $R^q$, $R^r$, $R^x$, $R^y$, or $R^z$ group is —CD$_3$.

In some embodiments, the compound of Formula (I) or Formula (II) comprises a —D in place of at least one —H, or a —CD$_3$ substituent in place of at least one CH$_3$.

For example, in 4-[2-(1-methylpyrazol-3-yl)-5-[3-[3-(trideuteriomethyl)phenyl]pyrazol-1-yl]pyrazolo[1,5-a]pyrimidin-7-yl]morpholine (Compound 123) the methyl group on the phenyl ring of the "(m-tolyl)pyrazol-1-yl" group in 4-[2-(1-methylpyrazol-3-yl)-5-[3-(m-tolyl)pyrazol-1-yl]pyrazolo[1,5-a]pyrimidin-7-yl]morpholine (Compound 61) is replaced with a —CD$_3$ group.

In some embodiments is a compound selected from:

| Compound # | Chemical Name | Structure |
|---|---|---|
| 1 | 7-morpholino-2-(pyridin-4-yl)-N-(3-(p-tolyl)-1H-pyrazol-5-yl)pyrazolo[1,5-a]pyrimidin-5-amine, hydrogen chloride salt | |
| 2 | 7-morpholino-N-(5-phenyl-1H-pyrazol-3-yl)-2-(4-pyridyl)pyrazolo[1,5-a]pyrimidin-5-amine | |

-continued

| Compound # | Chemical Name | Structure |
|---|---|---|
| 3 | 7-morpholino-N-[5-(o-tolyl)-1H-pyrazol-3-yl]-2-(4-pyridyl)pyrazolo[1,5-a]pyrimidin-5-amine | |
| 4 | 7-morpholino-N-[3-(m-tolyl)-1H-pyrazol-5-yl]-2-(4-pyridyl)pyrazolo[1,5-a]pyrimidin-5-amine, hydrogen chloride salt | |
| 5 | N-(5-methyl-1H-pyrazol-3-yl)-7-morpholino-2-(4-pyridyl)pyrazolo[1,5-a]pyrimidin-5-amine | |
| 6 | 7-morpholino-2-(4-pyridyl)-N-[5-(4-pyridyl)-1H-pyrazol-3-yl]pyrazolo[1,5-a]pyrimidin-5-amine | |
| 7 | 1-(7-morpholino-2-(pyridin-4-yl)pyrazolo[1,5-a]pyrimidin-5-yl)-3-phenyl-1H-pyrazol-5-amine | |

| Compound # | Chemical Name | Structure |
|---|---|---|
| 8 | 1-(7-morpholino-2-(pyridin-4-yl)pyrazolo[1,5-a]pyrimidin-5-yl)-3-(o-tolyl)-1H-pyrazol-5-amine | |
| 9 | 4-[5-(4-phenylpyrazol-1-yl)-2-(4-pyridyl)pyrazolo[1,5-a]pyrimidin-7-yl]morpholine | |
| 10 | 4-[5-[4-(m-tolyl)pyrazol-1-yl]-2-(4-pyridyl)pyrazolo[1,5-a]pyrimidin-7-yl]morpholine | |
| 11 | 4-[2-(4-pyridyl)-5-[4-(4-pyridyl)pyrazol-1-yl]pyrazolo[1,5-a]pyrimidin-7-yl]morpholine | |
| 12 | 4-[5-(4-methylpyrazol-1-yl)-2-(4-pyridyl)pyrazolo[1,5-a]pyrimidin-7-yl]morpholine | |

-continued

| Compound # | Chemical Name | Structure |
|---|---|---|
| 13 | 4-[5-(3-phenylpyrazol-1-yl)-2-(4-pyridyl)pyrazolo[1,5-a]pyrimidin-7-yl]morpholine | |
| 14 | 4-[5-[3-(m-tolyl)pyrazol-1-yl]-2-(4-pyridyl)pyrazolo[1,5-a]pyrimidin-7-yl]morpholine | |
| 15 | 4-[2-(4-pyridyl)-5-[3-(4-pyridyl)pyrazol-1-yl]pyrazolo[1,5-a]pyrimidin-7-yl]morpholine | |
| 16 | 4-[5-(3-methylpyrazol-1-yl)-2-(4-pyridyl)pyrazolo[1,5-a]pyrimidin-7-yl]morpholine | |
| 17 | 4-(2-(pyridin-3-yl)-5-(3-(m-tolyl)-1H-pyrazol-1-yl)pyrazolo[1,5-a]pyrimidin-7-yl)morpholine | |

-continued

| Compound # | Chemical Name | Structure |
|---|---|---|
| 18 | 4-(2-(pyridin-2-yl)-5-(3-(m-tolyl)-1H-pyrazol-1-yl)pyrazolo[1,5-a]pyrimidin-7-yl)morpholine | |
| 19 | N-ethyl-7-morpholino-5-(3-(m-tolyl)-1H-pyrazol-1-yl)pyrazolo[1,5-a]pyrimidine-2-carboxamide | |
| 20 | N-cyclopropyl-7-morpholino-5-(3-(m-tolyl)-1H-pyrazol-1-yl)pyrazolo[1,5-a]pyrimidine-2-carboxamide | |
| 21 | (R)-N-(1-cyclopropylethyl)-7-morpholino-5-(3-(m-tolyl)-1H-pyrazol-1-yl)pyrazolo[1,5-a]pyrimidine-2-carboxamide | |
| 22 | (S)-N-(1-cyclopropylethyl)-7-morpholino-5-(3-(m-tolyl)-1H-pyrazol-1-yl)pyrazolo[1,5-a]pyrimidine-2-carboxamide | |

| Compound # | Chemical Name | Structure |
|---|---|---|
| 23 | N-(2-methoxyethyl)-7-morpholino-5-(3-(m-tolyl)-1H-pyrazol-1-yl)pyrazolo[1,5-a]pyrimidine-2-carboxamide | |
| 24 | N,N-dimethyl-7-morpholino-5-(3-(m-tolyl)-1H-pyrazol-1-yl)pyrazolo[1,5-a]pyrimidine-2-carboxamide | |
| 25 | N-ethyl-N-methyl-7-morpholino-5-(3-(m-tolyl)-1H-pyrazol-1-yl)pyrazolo[1,5-a]pyrimidine-2-carboxamide | |
| 26 | N-cyclopropyl-N-methyl-7-morpholino-5-(3-(m-tolyl)-1H-pyrazol-1-yl)pyrazolo[1,5-a]pyrimidine-2-carboxamide | |
| 27 | N-(cyclopropylmethyl)-7-morpholino-5-(3-(m-tolyl)-1H-pyrazol-1-yl)pyrazolo[1,5-a]pyrimidine-2-carboxamide | |

| Compound # | Chemical Name | Structure |
|---|---|---|
| 28 | azetidin-1-yl(7-morpholino-5-(3-(m-tolyl)-1H-pyrazol-1-yl)pyrazolo[1,5-a]pyrimidin-2-yl)methanone | |
| 29 | (7-morpholino-5-(3-(m-tolyl)-1H-pyrazol-1-yl)pyrazolo[1,5-a]pyrimidin-2-yl)(pyrrolidin-1-yl)methanone | |
| 30 | (7-morpholino-5-(3-(m-tolyl)-1H-pyrazol-1-yl)pyrazolo[1,5-a]pyrimidin-2-yl)(piperidin-1-yl)methanone | |
| 31 | morpholino(7-morpholino-5-(3-(m-tolyl)-1H-pyrazol-1-yl)pyrazolo[1,5-a]pyrimidin-2-yl)methanone | |
| 32 | (4-methylpiperazin-1-yl)(7-morpholino-5-(3-(m-tolyl)-1H-pyrazol-1-yl)pyrazolo[1,5-a]pyrimidin-2-yl)methanone | |

-continued

| Compound # | Chemical Name |
|---|---|
| 33 | N-methoxy-N-methyl-7-morpholino-5-(3-(m-tolyl)-1H-pyrazol-1-yl)pyrazolo[1,5-a]pyrimidine-2-carboxamide |
| 34 | N-methoxy-7-morpholino-5-(3-(m-tolyl)-1H-pyrazol-1-yl)pyrazolo[1,5-a]pyrimidine-2-carboxamide |
| 35 | N-(methylsulfonyl)-7-morpholino-5-(3-(m-tolyl)-1H-pyrazol-1-yl)pyrazolo[1,5-a]pyrimidine-2-carboxamide |
| 36 | N-cyclopentyl-7-morpholino-5-(3-(m-tolyl)-1H-pyrazol-1-yl)pyrazolo[1,5-a]pyrimidine-2-carboxamide |
| 37 | N-cyclopentyl-N-methyl-7-morpholino-5-(3-(m-tolyl)-1H-pyrazol-1-yl)pyrazolo[1,5-a]pyrimidine-2-carboxamide |

-continued

| Compound # | Chemical Name | Structure |
|---|---|---|
| 38 | N-isopropyl-7-morpholino-5-(3-(m-tolyl)-1H-pyrazol-1-yl)pyrazolo[1,5-a]pyrimidine-2-carboxamide | |
| 39 | N-(1,3-dimethoxypropan-2-yl)-7-morpholino-5-(3-(m-tolyl)-1H-pyrazol-1-yl)pyrazolo[1,5-a]pyrimidine-2-carboxamide | |
| 40 | N-(2-(dimethylamino)ethyl)-7-morpholino-5-(3-(m-tolyl)-1H-pyrazol-1-yl)pyrazolo[1,5-a]pyrimidine-2-carboxamide | |
| 41 | N-(4-(dimethylamino)butyl)-7-morpholino-5-(3-(m-tolyl)-1H-pyrazol-1-yl)pyrazolo[1,5-a]pyrimidine-2-carboxamide | |

-continued

| Compound # | Chemical Name | Structure |
|---|---|---|
| 42 | 7-morpholino-N-(oxetan-3-yl)-5-(3-(m-tolyl)-1H-pyrazol-1-yl)pyrazolo[1,5-a]pyrimidine-2-carboxamide | |
| 43 | 7-morpholino-N-(oxetan-3-ylmethyl)-5-(3-(m-tolyl)-1H-pyrazol-1-yl)pyrazolo[1,5-a]pyrimidine-2-carboxamide | |
| 44 | N-((3-(hydroxymethyl)oxetan-3-yl)methyl)-7-morpholino-5-(3-(m-tolyl)-1H-pyrazol-1-yl)pyrazolo[1,5-a]pyrimidine-2-carboxamide | |
| 45 | (7-morpholino-5-(3-(m-tolyl)-1H-pyrazol-1-yl)pyrazolo[1,5-a]pyrimidin-2-yl)(2-oxa-6-azaspiro[3.3]heptan-6-yl)methanone | |

| Compound # | Chemical Name | Structure |
|---|---|---|
| 46 | (7-morpholino-5-(3-(m-tolyl)-1H-pyrazol-1-yl)pyrazolo[1,5-a]pyrimidin-2-yl)(6-oxa-1-azaspiro[3.3]heptan-1-yl)methanone | |
| 47 | 7-morpholino-N-(oxetan-3-yloxy)-5-(3-(m-tolyl)-1H-pyrazol-1-yl)pyrazolo[1,5-a]pyrimidine-2-carboxamide | |
| 48 | N-[(3S)-1-methylpyrrolidin-3-yl]-7-morpholino-5-[3-(m-tolyl)pyrazol-1-yl]pyrazolo[1,5-a]pyrimidine-2-carboxamide | |
| 49 | N-[(3R)-1-methylpyrrolidin-3-yl]-7-morpholino-5-[3-(m-tolyl)pyrazol-1-yl]pyrazolo[1,5-a]pyrimidine-2-carboxamide | |
| 50 | 7-morpholino-5-[3-(m-tolyl)pyrazol-1-yl]-N-[(3S)-tetrahydrofuran-3-yl]pyrazolo[1,5-a]pyrimidine-2-carboxamide | |

| Compound # | Chemical Name | Structure |
|---|---|---|
| 51 | 7-morpholino-5-[3-(m-tolyl)pyrazol-1-yl]-N-[(3R)-tetrahydrofuran-3-yl]pyrazolo[1,5-a]pyrimidine-2-carboxamide | |
| 52 | N-[(3R)-1-methyl-3-piperidyl]-7-morpholino-5-[3-(m-tolyl)pyrazol-1-yl]pyrazolo[1,5-a]pyrimidine-2-carboxamide | |
| 53 | N-[(3S)-1-methyl-3-piperidyl]-7-morpholino-5-[3-(m-tolyl)pyrazol-1-yl]pyrazolo[1,5-a]pyrimidine-2-carboxamide | |
| 54 | N-(1-methyl-4-piperidyl)-7-morpholino-5-[3-(m-tolyl)pyrazol-1-yl]pyrazolo[1,5-a]pyrimidine-2-carboxamide | |
| 55 | N-(1-methyl-4-piperidyl)-7-morpholino-5-[4-(m-tolyl)pyrazol-1-yl]pyrazolo[1,5-a]pyrimidine-2-carboxamide | |

-continued

| Compound # | Chemical Name | Structure |
|---|---|---|
| 56 | 7-morpholino-5-[4-(m-tolyl)pyrazol-1-yl]-N-tetrahydropyran-4-yl-pyrazolo[1,5-a]pyrimidine-2-carboxamide | |
| 57 | 4-[5-[4-(m-tolyl)pyrazol-1-yl]-2-pyrimidin-4-yl-pyrazolo[1,5-a]pyrimidin-7-yl]morpholine | |
| 58 | 4-[5-[4-(m-tolyl)pyrazol-1-yl]-2-pyrimidin-5-yl-pyrazolo[1,5-a]pyrimidin-7-yl]morpholine | |
| 59 | 3-[7-morpholino-5-[4-(m-tolyl)pyrazol-1-yl]pyrazolo[1,5-a]pyrimidin-2-yl]pyridin-2-amine | |
| 60 | 5-[7-morpholino-5-[4-(m-tolyl)pyrazol-1-yl]pyrazolo[1,5-a]pyrimidin-2-yl]pyrimidin-2-amine | |

-continued

| Compound # | Chemical Name |
|---|---|
| 61 | 4-[2-(1-methylpyrazol-3-yl)-5-[3-(m-tolyl)pyrazol-1-yl]pyrazolo[1,5-a]pyrimidin-7-yl]morpholine |
| 62 | 4-[5-[3-(m-tolyl)pyrazol-1-yl]-2-(1H-pyrazol-3-yl)pyrazolo[1,5-a]pyrimidin-7-yl]morpholine |
| 63 | 4-[5-(3-phenylpyrazol-1-yl)-2-pyrimidin-2-yl-pyrazolo[1,5-a]pyrimidin-7-yl]morpholine |
| 64 | 4-[5-(3-phenylpyrazol-1-yl)-2-(3-pyridyl)pyrazolo[1,5-a]pyrimidin-7-yl]morpholine |
| 65 | 4-[2-(5-methyl-1H-pyrazol-3-yl)-5-[3-(m-tolyl)pyrazol-1-yl]pyrazolo[1,5-a]pyrimidin-7-yl]morpholine |

| Compound # | Chemical Name | Structure |
|---|---|---|
| 66 | 4-[2-(1-methylpyrazol-3-yl)-5-(3-phenylpyrazol-1-yl)pyrazolo[1,5-a]pyrimidin-7-yl]morpholine | |
| 67 | 4-[5-(3-phenylpyrazol-1-yl)-2-(1H-pyrazol-3-yl)pyrazolo[1,5-a]pyrimidin-7-yl]morpholine | |
| 68 | 4-[5-(3-phenylpyrazol-1-yl)-2-pyrimidin-4-yl-pyrazolo[1,5-a]pyrimidin-7-yl]morpholine | |
| 69 | 4-[5-(3-phenylpyrazol-1-yl)-2-pyrimidin-5-yl-pyrazolo[1,5-a]pyrimidin-7-yl]morpholine | |
| 70 | 3-[7-morpholino-5-(3-phenylpyrazol-1-yl)pyrazolo[1,5-a]pyrimidin-2-yl]pyridin-2-amine | |

-continued

| Compound # | Chemical Name | Structure |
|---|---|---|
| 71 | 5-[7-morpholino-5-(3-phenylpyrazol-1-yl)pyrazolo[1,5-a]pyrimidin-2-yl]pyrimidin-2-amine | |
| 72 | 4-[5-(3-phenylpyrazol-1-yl)-2-(2-pyridyl)pyrazolo[1,5-a]pyrimidin-7-yl]morpholine | |
| 73 | N-isopropyl-7-morpholino-5-(3-phenylpyrazol-1-yl)pyrazolo[1,5-a]pyrimidine-2-carboxamide | |
| 74 | N-[(1R)-1-cyclopropylethyl]-7-morpholino-5-(3-phenylpyrazol-1-yl)pyrazolo[1,5-a]pyrimidine-2-carboxamide | |
| 75 | N-[(1S)-1-cyclopropylethyl]-7-morpholino-5-(3-phenylpyrazol-1-yl)pyrazolo[1,5-a]pyrimidine-2-carboxamide | |

| Compound # | Chemical Name | Structure |
|---|---|---|
| 76 | 7-morpholino-N-(oxetan-3-ylmethyl)-5-(3-phenylpyrazol-1-yl)pyrazolo[1,5-a]pyrimidine-2-carboxamide | |
| 77 | N-cyclopentyl-7-morpholino-5-(3-phenylpyrazol-1-yl)pyrazolo[1,5-a]pyrimidine-2-carboxamide | |
| 78 | 4-[5-(4-phenylpyrazol-1-yl)-2-(2-pyridyl)pyrazolo[1,5-a]pyrimidin-7-yl]morpholine | |
| 79 | 4-[5-(4-phenylpyrazol-1-yl)-2-(3-pyridyl)pyrazolo[1,5-a]pyrimidin-7-yl]morpholine | |
| 80 | N-isopropyl-7-morpholino-5-(4-phenylpyrazol-1-yl)pyrazolo[1,5-a]pyrimidine-2-carboxamide | |

-continued

| Compound # | Chemical Name | Structure |
|---|---|---|
| 81 | 4-[2-(5-methyl-1H-pyrazol-3-yl)-5-(3-phenylpyrazol-1-yl)pyrazolo[1,5-a]pyrimidin-7-yl]morpholine | |
| 82 | 4-[5-(3-phenylpyrazol-1-yl)-2-pyrazin-2-yl-pyrazolo[1,5-a]pyrimidin-7-yl]morpholine | |
| 83 | N,N-dimethyl-2-[3-methyl-5-[7-morpholino-5-[3-(m-tolyl)pyrazol-1-yl]pyrazolo[1,5-a]pyrimidin-2-yl]pyrazol-1-yl]ethanamine | |
| 84 | 4-[2-(2,5-dimethylpyrazol-3-yl)-5-[3-(m-tolyl)pyrazol-1-yl]pyrazolo[1,5-a]pyrimidin-7-yl]morpholine | |
| 85 | 4-[2-(2,5-dimethylpyrazol-3-yl)-5-(3-phenylpyrazol-1-yl)pyrazolo[1,5-a]pyrimidin-7-yl]morpholine | |

-continued

| Compound # | Chemical Name |
|---|---|
| 86 | 4-[2-(1,5-dimethylpyrazol-3-yl)-5-(3-phenylpyrazol-1-yl)pyrazolo[1,5-a]pyrimidin-7-yl]morpholine |
| 87 | 4-[2-(1,5-dimethylpyrazol-3-yl)-5-[3-(m-tolyl)pyrazol-1-yl]pyrazolo[1,5-a]pyrimidin-7-yl]morpholine |
| 88 | 4-[5-(3-phenylpyrazol-1-yl)-2-pyridazin-3-yl-pyrazolo[1,5-a]pyrimidin-7-yl]morpholine |
| 89 | methyl N-[[7-morpholino-5-(3-phenylpyrazol-1-yl)pyrazolo[1,5-a]pyrimidin-2-yl]methyl]carbamate |
| 90 | N-[[7-morpholino-5-(3-phenylpyrazol-1-yl)pyrazolo[1,5-a]pyrimidin-2-yl]methyl]propanamide |

| Compound # | Chemical Name | Structure |
|---|---|---|
| 91 | N,N-dimethyl-2-[5-methyl-3-[7-morpholino-5-[3-(m-tolyl)pyrazol-1-yl]pyrazolo[1,5-a]pyrimidin-2-yl]pyrazol-1-yl]ethanamine | 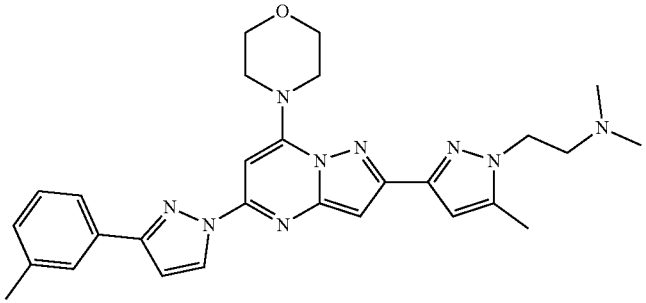 |
| 92 | N,N-dimethyl-2-[5-methyl-3-[7-morpholino-5-[3-(2-pyridyl)pyrazol-1-yl]pyrazolo[1,5-a]pyrimidin-2-yl]pyrazol-1-yl]ethanamine | 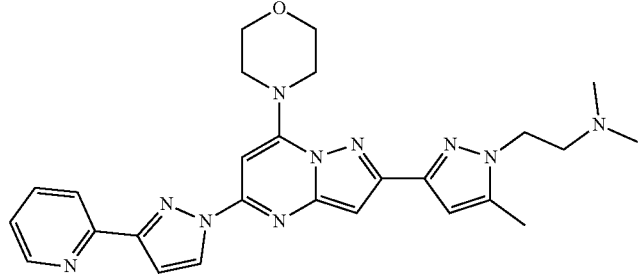 [SMILES: Cc1cc(-c2cc3nc(-n4ccc(-c5ccccn5)n4)cc(N4CCOCC4)n3n2)nn1CCN(C)C] |
| 93 | N,N-dimethyl-2-[5-methyl-3-[7-morpholino-5-[3-(4-pyridyl)pyrazol-1-yl]pyrazolo[1,5-a]pyrimidin-2-yl]pyrazol-1-yl]ethanamine | 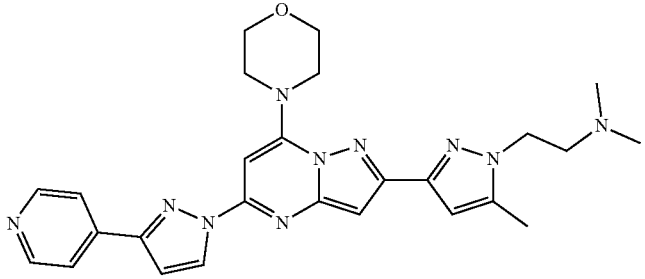 [SMILES: Cc1cc(-c2cc3nc(-n4ccc(-c5ccncc5)n4)cc(N4CCOCC4)n3n2)nn1CCN(C)C] |
| 94 | N,N-dimethyl-2-[5-methyl-3-[5-[3-(6-methyl-2-pyridyl)pyrazol-1-yl]-7-morpholino-pyrazolo[1,5-a]pyrimidin-2-yl]pyrazol-1-yl]ethanamine | 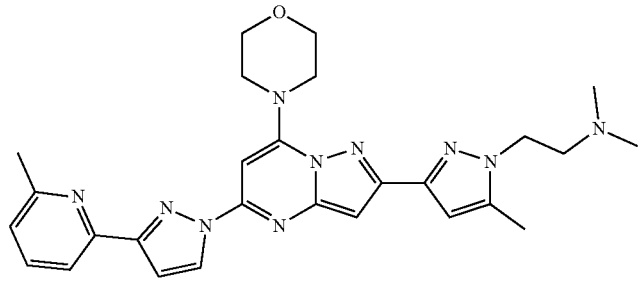 [SMILES: Cc1cccc(-c2ccn(-c3cc(N4CCOCC4)n4nc(-c5cc(C)n(CCN(C)C)n5)cc4n3)n2)n1] |
| 95 | N,N-dimethyl-2-[5-methyl-3-[5-[3-(4-methyl-2-pyridyl)pyrazol-1-yl]-7-morpholino-pyrazolo[1,5-a]pyrimidin-2-yl]pyrazol-1-yl]ethanamine | 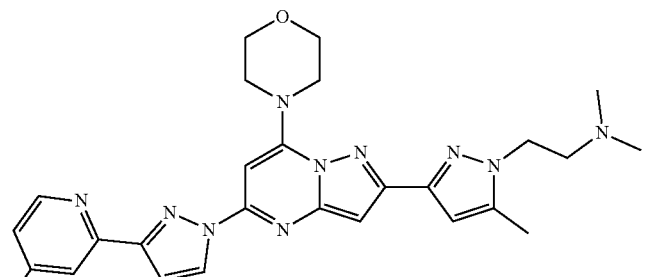 |

-continued

| Compound # | Chemical Name | Structure |
|---|---|---|
| 96 | N,N-dimethyl-2-[5-methyl-3-[5-[3-(2-methyl-4-pyridyl)pyrazol-1-yl]-7-morpholino-pyrazolo[1,5-a]pyrimidin-2-yl]pyrazol-1-yl]ethanamine | |
| 97 | 2-[3-[5-[3-(3-chlorophenyl)pyrazol-1-yl]-7-morpholino-pyrazolo[1,5-a]pyrimidin-2-yl]-5-methyl-pyrazol-1-yl]-N,N-dimethyl-ethanamine | |
| 98 | 5-[7-morpholino-5-(3-phenylpyrazol-1-yl)pyrazolo[1,5-a]pyrimidin-2-yl]pyridin-2-amine | |
| 99 | N,N-dimethyl-2-[5-methyl-3-[7-morpholino-5-(3-phenylpyrazol-1-yl)pyrazolo[1,5-a]pyrimidin-2-yl]pyrazol-1-yl]ethanamine | |
| 100 | 2-[3-[5-[3-(3-methoxyphenyl)pyrazol-1-yl]-7-morpholino-pyrazolo[1,5-a]pyrimidin-2-yl]-5-methyl-pyrazol-1-yl]-N,N-dimethyl-ethanamine | |

| Compound # | Chemical Name | Structure |
|---|---|---|
| 101 | 4-[5-[3-(3-chlorophenyl)pyrazol-1-yl]-2-(1-methylpyrazol-3-yl)pyrazolo[1,5-a]pyrimidin-7-yl]morpholine | |
| 102 | 4-[5-[3-(5-methyl-3-pyridyl)pyrazol-1-yl]-2-(3-pyridyl)pyrazolo[1,5-a]pyrimidin-7-yl]morpholine | |
| 103 | 4-[5-[3-(2-methyl-4-pyridyl)pyrazol-1-yl]-2-(3-pyridyl)pyrazolo[1,5-a]pyrimidin-7-yl]morpholine | |
| 104 | 4-[7-morpholino-5-(3-phenylpyrazol-1-yl)pyrazolo[1,5-a]pyrimidin-2-yl]pyrimidin-2-amine | |
| 105 | 4-[5-[3-(3-chlorophenyl)pyrazol-1-yl]-2-(3-pyridyl)pyrazolo[1,5-a]pyrimidin-7-yl]morpholine | |

| Compound # | Chemical Name | Structure |
|---|---|---|
| 106 | 4-[5-[3-(3-bromophenyl)pyrazol-1-yl]-2-(3-pyridyl)pyrazolo[1,5-a]pyrimidin-7-yl]morpholine | |
| 107 | 4-[5-[3-(3-methoxyphenyl)pyrazol-1-yl]-2-(3-pyridyl)pyrazolo[1,5-a]pyrimidin-7-yl]morpholine | |
| 108 | 4-[5-[3-(6-methyl-2-pyridyl)pyrazol-1-yl]-2-(3-pyridyl)pyrazolo[1,5-a]pyrimidin-7-yl]morpholine | |
| 109 | 6-[7-morpholino-5-(3-phenylpyrazol-1-yl)pyrazolo[1,5-a]pyrimidin-2-yl]pyridin-2-amine | |
| 110 | 4-[2-(3-methylisoxazol-5-yl)-5-[3-(m-tolyl)pyrazol-1-yl]pyrazolo[1,5-a]pyrimidin-7-yl]morpholine | |

-continued

| Compound # | Chemical Name | Structure |
|---|---|---|
| 111 | 4-[5-[3-(m-tolyl)pyrazol-1-yl]-2-thiazol-2-yl-pyrazolo[1,5-a]pyrimidin-7-yl]morpholine | |
| 112 | 4-[2-(1-methylpyrazol-4-yl)-5-[3-(m-tolyl)pyrazol-1-yl]pyrazolo[1,5-a]pyrimidin-7-yl]morpholine | |
| 113 | 4-[5-[3-(m-tolyl)pyrazol-1-yl]-2-(1H-pyrazol-4-yl)pyrazolo[1,5-a]pyrimidin-7-yl]morpholine | |
| 114 | 4-[5-(3-phenylpyrazol-1-yl)-2-thiazol-2-yl-pyrazolo[1,5-a]pyrimidin-7-yl]morpholine | |
| 115 | 4-[2-(1-methylpyrazol-4-yl)-5-(3-phenylpyrazol-1-yl)pyrazolo[1,5-a]pyrimidin-7-yl]morpholine | |

| Compound # | Chemical Name | Structure |
|---|---|---|
| 116 | 4-[5-(3-phenylpyrazol-1-yl)-2-(1H-pyrazol-4-yl)pyrazolo[1,5-a]pyrimidin-7-yl]morpholine | |
| 117 | methyl 3-[1-[7-morpholino-2-(3-pyridyl)pyrazolo[1,5-a]pyrimidin-5-yl]pyrazol-3-yl]benzoate | |
| 118 | 3-[1-[7-morpholino-2-(3-pyridyl)pyrazolo[1,5-a]pyrimidin-5-yl]pyrazol-3-yl]benzamide | |
| 119 | 3-[1-[7-morpholino-2-(3-pyridyl)pyrazolo[1,5-a]pyrimidin-5-yl]pyrazol-3-yl]benzonitrile | |
| 120 | 4-[5-[3-(m-tolyl)pyrazol-1-yl]-2-oxazol-2-yl-pyrazolo[1,5-a]pyrimidin-7-yl]morpholine | |

| Compound # | Chemical Name | Structure |
|---|---|---|
| 121 | 4-[2-(3-methylisoxazol-5-yl)-5-(3-phenylpyrazol-1-yl)pyrazolo[1,5-a]pyrimidin-7-yl]morpholine | |
| 122 | 3-[1-[7-morpholino-2-(3-pyridyl)pyrazolo[1,5-a]pyrimidin-5-yl]pyrazol-3-yl]benzoic acid | |
| 123 | 4-[2-(1-methylpyrazol-3-yl)-5-[3-[3-(trideuteriomethyl)phenyl]pyrazol-1-yl]pyrazolo[1,5-a]pyrimidin-7-yl]morpholine | | and pharmaceutically acceptable salts thereof.

Methods of Treating, Administration, and Pharmaceutical Compositions

In general, the compounds of this disclosure will be administered in a therapeutically effective amount by any of the accepted modes of administration for agents that serve similar utilities. Therapeutically effective amounts of compounds of Formula (I) may range from about 0.01 to about 500 mg per kg patient body weight per day, which can be administered in single or multiple doses. In one embodiment, the dosage level will be about 0.1 to about 250 mg/kg per day. In another embodiment the dosage level will be about 0.5 to about 100 mg/kg per day. A suitable dosage level may be about 0.01 to about 250 mg/kg per day, about 0.05 to about 100 mg/kg per day, or about 0.1 to about 50 mg/kg per day. Within this range the dosage can be about 0.05 to about 0.5, about 0.5 to about 5 or about 5 to about 50 mg/kg per day. For oral administration, the compositions may be provided in the form of tablets containing about 1.0 to about 1000 milligrams of the active ingredient, particularly about 1.0, 5.0, 10, 15, 20, 25, 50, 75, 100, 150, 200, 250, 300, 400, 500, 600, 750, 800, 900, and 1000 milligrams of the active ingredient. The actual amount of the compound of this disclosure, i.e., the active ingredient, will depend upon numerous factors such as the severity of the disease to be treated, the age and relative health of the subject, the potency of the compound being utilized, the route and form of administration, and other factors.

In general, compounds of this disclosure will be administered as pharmaceutical compositions by any one of the following routes: oral, systemic (e.g., transdermal, intranasal or by suppository), or parenteral (e.g., intramuscular, intravenous, or subcutaneous) administration. The preferred manner of administration is oral using a convenient daily dosage regimen, which can be adjusted according to the degree of affliction. Compositions can take the form of tablets, pills, capsules, semisolids, powders, sustained release formulations, solutions, suspensions, elixirs, aerosols, or any other appropriate compositions.

Pharmaceutical compositions can be formulated using one or more pharmaceutically acceptable carriers comprising excipients and auxiliaries. The formulation can be modified depending upon the route of administration chosen. The pharmaceutical compositions can also include the compounds described herein in a free base form or a pharmaceutically acceptable salt form.

Methods for formulation of the pharmaceutical compositions can include formulating any of the compounds described herein with one or more inert, pharmaceutically acceptable excipients or carriers to form a solid, semi-solid, or liquid composition. Solid compositions can include, for example, powders, tablets, dispersible granules and capsules, and in some aspects, the solid compositions further contain nontoxic, auxiliary substances, for example wetting or emulsifying agents, pH buffering agents, and other pharmaceutically acceptable additives. Alternatively, the compositions described herein can be lyophilized or in powder form for re-constitution with a suitable vehicle, e.g., sterile pyrogen-free water, before use. The active ingredients can be entrapped in microcapsules prepared, for example, by coacervation techniques or by interfacial polymerization (e.g., hydroxymethylcellulose or gelatin microcapsules and poly-(methylmethacylate) microcapsules, respectively), in colloidal drug-delivery systems (e.g., liposomes, albumin microspheres, microemulsions, nano-particles and nanocapsules) or in macroemulsions.

The pharmaceutical compositions and formulations can be sterilized. Sterilization can be accomplished by filtration through sterile filtration.

The pharmaceutical compositions described herein can be formulated for administration as an injection. Non-limiting examples of formulations for injection can include a sterile suspension, solution, or emulsion in oily or aqueous vehicles. Suitable oily vehicles can include, but are not limited to, lipophilic solvents or vehicles such as fatty oils, synthetic fatty acid esters, or liposomes. Aqueous injection suspensions can contain substances which increase the viscosity of the suspension. The suspension can also contain suitable stabilizers. Injections can be formulated for bolus injection or continuous infusion.

For parenteral administration, the compounds can be formulated in a unit dosage injectable form (e.g., solution, suspension, emulsion) in association with a pharmaceutically acceptable parenteral vehicle. Such vehicles can be inherently nontoxic, and non-therapeutic. A vehicle can be water, saline, Ringer's solution, dextrose solution, and 5% human serum albumin. Nonaqueous vehicles such as fixed oils and ethyl oleate can also be used. Liposomes can be used as carriers. The vehicle can contain minor amounts of additives such as substances that enhance isotonicity and chemical stability (e.g., buffers and preservatives).

Sustained-release preparations can also be prepared. Examples of sustained-release matrices can include polyesters, hydrogels (e.g., poly(2-hydroxyethyl-methacrylate), or poly(vinylalcohol)), polylactides, copolymers of L-glutamic acid and γ ethyl-L-glutamate, non-degradable ethylene-vinyl acetate, degradable lactic acid-glycolic acid copolymers such as the LUPRON DEPO™ (i.e., injectable microspheres composed of lactic acid-glycolic acid copolymer and leuprolide acetate), and poly-D-(−)-3-hydroxybutyric acid.

Pharmaceutical formulations of the compositions described herein can be prepared for storage by mixing a compound with a pharmaceutically acceptable carrier, excipient, and/or a stabilizer. This formulation can be a lyophilized formulation or an aqueous solution. Acceptable carriers, excipients, and/or stabilizers can be nontoxic to recipients at the dosages and concentrations used. Acceptable carriers, excipients, and/or stabilizers can include buffers such as phosphate, citrate, and other organic acids; antioxidants including ascorbic acid and methionine; preservatives, polypeptides; proteins, such as serum albumin or gelatin; hydrophilic polymers; amino acids; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes; and/or non-ionic surfactants or polyethylene glycol.

Compounds of the present disclosure may be used in methods of treating in combination with one or more other combination agents (e.g., one, two, or three other drugs) that are used in the prevention, treatment, control, amelioration, or reduction of risk of the diseases or conditions for which compounds of the present disclosure are useful. In some embodiments, the combination of the drugs together are safer or more effective than either drug alone. In some embodiments the compound disclosed herein and the one or more combination agents have complementary activities that do not adversely affect each other. Such molecules can be present in combination in amounts that are effective for the purpose intended. Such other drug(s) may be administered, by a route and in an amount commonly used therefore, contemporaneously or sequentially with a compound of the present disclosure. When a compound of the present disclosure is used contemporaneously with one or more other drugs, in some embodiments, the agents are administered together in a single pharmaceutical composition in unit dosage form. Accordingly, the pharmaceutical compositions of the present disclosure also include those that contain one or more other active ingredients, in addition to a compound of the present disclosure. The weight ratio of the compound of the present disclosure to the second active agent may be varied and will depend upon the effective dose of each ingredient. Generally, an effective dose of each will be used. In some embodiments, combination therapy includes therapies in which the compound of the present disclosure and one or more other drugs are administered separately, and in some cases, the two or more agents are administered on different, overlapping schedules. It is also contemplated that when used in combination with one or more other active ingredients, the compounds of the present disclosure and the other active ingredients may be used in lower doses than when each is used singly. In some embodiments, the combination agent is a drug for reduction of symptoms of ALS. In some embodiments, the combination agent is selected from an NAD supplement (such as nicotinamide riboside, offered under the trade names Basis® or Tru Niagen®), vitamin B12 (oral or injection), glycopyrrolate, atropine, scopolamine, baclofen, tizanidine, mexiletine, an SSRI, a benzodiazepine, Neudexta, riluzole, and edaravone, and combinations thereof.

The compounds, pharmaceutical compositions, and methods of the present disclosure can be useful for treating a subject such as, but not limited to, a mammal, a human, a non-human mammal, a domesticated animal (e.g., laboratory animals, household pets, or livestock), a non-domesticated animal (e.g., wildlife), a dog, a cat, a rodent, a mouse, a hamster, a cow, a bird, a chicken, a fish, a pig, a horse, a goat, a sheep, or a rabbit. In preferred embodiments, compounds, pharmaceutical compositions, and methods of the present disclosure are used for treating a human.

The compounds, pharmaceutical compositions, and methods described herein can be useful as a therapeutic, for example a treatment that can be administered to a subject in need thereof. A therapeutic effect can be obtained in a subject by reduction, suppression, remission, or eradication of a disease state, including, but not limited to, a symptom thereof. A therapeutic effect in a subject having a disease or condition, or pre-disposed to have or is beginning to have the disease or condition, can be obtained by a reduction, a suppression, a prevention, a remission, or an eradication of the condition or disease, or pre-condition or pre-disease state.

In practicing the methods described herein, therapeutically effective amounts of the compounds or pharmaceutical compositions described herein can be administered to a subject in need thereof, often for treating and/or preventing a condition or progression thereof. A pharmaceutical composition can affect the physiology of the subject, such as the immune system, inflammatory response, or other physiologic affect. A therapeutically effective amount can vary widely depending on the severity of the disease, the age and relative health of the subject, the potency of the compounds used, and other factors.

Treat and/or treating can refer to any indicia of success in the treatment or amelioration of the disease or condition. Treating can include, for example, reducing, delaying or alleviating the severity of one or more symptoms of the disease or condition, or it can include reducing the frequency with which symptoms of a disease, defect, disorder, or adverse condition, and the like, are experienced by a patient. Treat can be used herein to refer to a method that results in some level of treatment or amelioration of the disease or condition and can contemplate a range of results directed to that end, including but not restricted to prevention of the condition entirely.

Prevent, preventing, and the like can refer to the prevention of the disease or condition in the patient. For example, if an individual at risk of contracting a disease is treated with the methods of the present disclosure and does not later contract the disease, then the disease has been prevented, at least over a period of time, in that individual.

A therapeutically effective amount can be the amount of a compound or pharmaceutical composition or an active component thereof sufficient to provide a beneficial effect or to otherwise reduce a detrimental non-beneficial event to the individual to whom the composition is administered. A therapeutically effective dose can be a dose that produces one or more desired or desirable (e.g., beneficial) effects for which it is administered, such administration occurring one or more times over a given period of time. An exact dose can depend on the purpose of the treatment and can be ascertainable by one skilled in the art using known techniques.

The compounds or pharmaceutical compositions described herein that can be used in therapy can be formulated and dosages established in a fashion consistent with good medical practice taking into account the disorder to be treated, the condition of the individual patient, the site of delivery of the compound or pharmaceutical composition, the method of administration and other factors known to practitioners. The compounds or pharmaceutical compositions can be prepared according to the description of preparation described herein.

One of ordinary skill in the art would understand that the amount, duration, and frequency of administration of a pharmaceutical composition or compound described herein to a subject in need thereof depends on several factors including, for example but not limited to, the health of the subject, the specific disease or condition of the patient, the grade or level of a specific disease or condition of the patient, the additional therapeutics the subject is being or has been administered, and the like.

The methods, compounds, and pharmaceutical compositions described herein can be for administration to a subject in need thereof. Often, administration of the compounds or pharmaceutical compositions can include routes of administration, non-limiting examples of administration routes include intravenous, intraarterial, subcutaneous, subdural, intramuscular, intracranial, intrasternal, intratumoral, or intraperitoneally. Additionally, a pharmaceutical composition or compound can be administered to a subject by additional routes of administration, for example, by inhalation, oral, dermal, intranasal, or intrathecal administration.

Pharmaceutical compositions or compounds of the present disclosure can be administered to a subject in need thereof in a first administration, and in one or more additional administrations. The one or more additional administrations can be administered to the subject in need thereof minutes, hours, days, weeks, or months following the first administration. Any one of the additional administrations can be administered to the subject in need thereof less than 21 days, or less than 14 days, less than 10 days, less than 7 days, less than 4 days or less than 1 day after the first administration. The one or more administrations can occur more than once per day, more than once per week, or more than once per month. The compounds or pharmaceutical compositions can be administered to the subject in need thereof in cycles of 21 days, 14 days, 10 days, 7 days, 4 days, or daily over a period of one to seven days.

The compounds, pharmaceutical compositions, and methods provided herein can be useful for the treatment of a plurality of diseases or conditions or preventing a disease or a condition in a subject, or other therapeutic applications for subjects in need thereof. In one aspect, the disclosure relates to a method for treating a neurological disease mediated by PIKfyve activity in a subject in need thereof, comprising administering an effective amount of a compound or a pharmaceutical composition as described herein to the subject. In some embodiments, the disease is associated with a FIG. 4 deficiency.

In some embodiments, the neurological disease is amyotrophic lateral sclerosis (ALS), primary lateral sclerosis (PLS), Charcot-Marie-Tooth (CMT; including type 4J (CMT4J)), and Yunis-Varon syndrome, autophagy, polymicrogyria (including polymicrogyria with seizures), temporo-occipital polymicrogyria, Pick's disease, Parkinson's disease, Parkinson's disease with Lewy bodies, dementia with Lewy bodies, Lewy body disease, fronto-temporal dementia, diseases of neuronal nuclear inclusions of polyglutamine and intranuclear inclusion bodies, disease of Marinesco and Hirano bodies, tauopathy, Alzheimer's disease, neurodegeneration, spongiform neurodegeneration, peripheral neuropathy, leukoencephalopathy, motor neuropathy, sensory neuropathy, inclusion body disease, progressive supranuclear palsy, corticobasal syndrome, chronic traumatic encephalopathy, traumatic brain injury (TBI), cerebral ischemia, Guillain-Barré Syndrome, chronic inflammatory demyelinating polyneuropathy, multiple sclerosis, a lysosomal storage disease, Fabry's disorder, Gaucher's disorder, Niemann Pick C disease, Tay-Sachs disease, and Mucolipidosis type IV, neuropathy, Huntington's disease, a psychiatric disorder, ADHD, schizophrenia, a mood disorder, major depressive disorder, depression, bipolar disorder I, or bipolar disorder II.

In some embodiments, the neurological disease is ALS, FTD, Alzheimer's disease, Parkinson's disease, Huntington's disease, or CMT. In some embodiments, the neurological disease is ALS.

In some embodiments, the neurological disease is a tauopathy such as Alzheimer's disease, progressive supranuclear palsy, corticobasal syndrome, frontotemporal dementia, or chronic traumatic encephalopathy.

In some embodiments, the neurological disease is a lysosomal storage disease such as Fabry's disorder, Gaucher's disorder, Niemann Pick C disease, Tay-Sachs disease, or Mucolipidosis type IV.

In some embodiments, the neurological disease is a psychiatric disorder such as ADHD, schizophrenia, or mood disorders such as major depressive disorder, depression, bipolar disorder I, or bipolar disorder II.

The disclosure further provides any compounds disclosed herein for use in a method of treatment of the human or animal body by therapy. Therapy may be by any mechanism disclosed herein, such as inhibiting, reducing, or reducing progression of the diseases disclosed herein. The disclosure further provides any compound disclosed herein for prevention or treatment of any condition disclosed herein. The disclosure also provides any compound or pharmaceutical composition thereof disclosed herein for obtaining any clinical outcome disclosed herein for any condition disclosed herein. The disclosure also provides use of any compound disclosed herein in the manufacture of a medicament for preventing or treating any disease or condition disclosed herein.

EXAMPLES

The following preparations of compounds of Formula (I) and intermediates are given to enable those skilled in the art to more clearly understand and to practice the present disclosure. They should not be considered as limiting the scope of the disclosure, but merely as being illustrative and representative thereof.

The starting materials and reagents used in preparing these compounds are either available from commercial suppliers such as Aldrich Chemical Co., (Milwaukee, Wis.), Bachem (Torrance, Calif.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), March's Advanced Organic Chemistry, (John Wiley and Sons, 4th Edition) and Larock's Comprehensive Organic Transformations (VCH Publishers Inc., 1989). These schemes are merely illustrative of some methods by which the compounds of this disclosure can be synthesized, and various modifications to these schemes can be made and will be suggested to one skilled in the art having referred to this disclosure. The starting materials and the intermediates, and the final products of the reaction may be isolated and purified if desired using conventional techniques, including but not limited to filtration, distillation, crystallization, chromatography and the like. Such materials may be characterized using conventional means, including physical constants and spectral data.

Unless specified to the contrary, the reactions described herein take place at atmospheric pressure over a temperature range from about −78° C. to about 150° C., or from about 0° C. to about 125° C. or at about room (or ambient) temperature, e.g., about 20° C.

Compounds of Formula (I) and subformulae and species described herein, including those where the substituent groups as defined herein, can be prepared as illustrated and described below.

Unless otherwise noted, all reagents were used without further purification. $^1$H NMR spectra were obtained in CDCl$_3$, DMSO-d$_6$, or CD$_3$OD at room temperature on a Bruker 300 MHz instrument. When more than one conformer was detected, the chemical shifts for the most abundant one is reported. Chemical shifts of $^1$H NMR spectra were recorded in parts per million (ppm) on the δ scale from an internal standard of residual solvent. Splitting patterns are designed as s, singlet; d, doublet; t, triplet; q, quartet; m, multiplet; br, broad. LC-MS conditions are described below:

LCMS Column: Agilent Zorbax XDB C18 4.6×50 mm, 3.5 μm
 a. Mobile phase, Solvent A: Water (with 0.1% formic acid); Solvent B: MeOH
 b. Flow rate: 1.0 mL/minute
 c. Run time: 2 minute gradient (20%-90% B), then 3 minute at 90% B,
 d. Temperature: 30° C.
HPLC Column: Agilent SB-C18 4.6×150 mm, 3.5 μm
 a. Mobile phase, Solvent A: water (with 0.02% TFA); Solvent B: MeOH
 b. Flow rate: 1.0 mL/minute
 c. Run time: 0.5 minute at 10% B, 9.5 minutes gradient (10%-90% B), then 10 minutes at 90% B,
 d. Temperature: 30° C.
Preparative LC Column: Phenomenex Luna 5u 100A, 21.2×250 mm, 5 μm
 a. Mobile phase, Solvent A: Water; Solvent B: MeOH
 b. Flow rate: 10 mL/minute
 c. Run time: 1 minute at 20% B, 30 minute gradient (20%-80% B), then 10 minutes at 90% B
 d. Temperature: Ambient The following abbreviations are used in the text: PE=petroleum ether, EA or EtOAc=ethyl acetate, DMSO=dimethyl sulfoxide, DMF=N, N-dimethylacetamide, MeOH=methanol, EtOH=ethanol, Et$_2$O=diethyl ether, EDCI=N-(3-dimethylaminopropyl)-N'-ethylcarbodiimide hydrochloride, MTBE=methyl tert-butyl ether, DCM=dichloromethane, TEA=triethylamine, DIPEA=diisopropylethylamine, TFA=trifluoroacetic acid, TLC=thin layer chromatography, (BPin)$_2$=bis(pinacolato) diboron, HFIP=1,1,1,3,3,3-hexafluoropropan-2-ol, DIBAL-H=diisobutylaluminum hydride, MeI=iodomethane, hex=hexane, n-Hex=n-hexane, DCE=1,2-dichloroethane, TBSCl=tert-butyldimethylsilyl chloride, Tf$_2$O= trifluoromethanesulfonic anhydride, n-BuLi=n-butyllithium, DMAP=4-dimethylaminopyridine, KOAc=Potassium acetate, NaOAc=Sodium acetate, TFAA=trifluoroacetic anhydride, m-CPBA=meta-chloroperoxybenzoic acid, DME=1,2-dimethoxyethane, PS-TPP=polymer supported triphenylphosphine, MSA=methanesulfonic acid, SEMCl=2-(trimethylsilyl) ethoxymethyl chloride, dba=dibenzylideneacetone, dppf=1,1'-bis(diphenylphosphino) ferrocene, Pd/C=palladium on carbon, rt=room temperature, h=hour, hrs=hours.

Intermediate A: 4-(5-chloro-2-(pyridin-4-yl)pyrazolo[1,5-a]pyrimidin-7-yl)morpholine

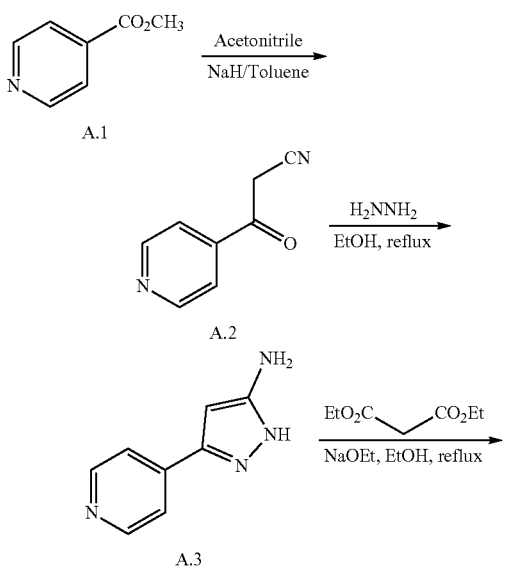

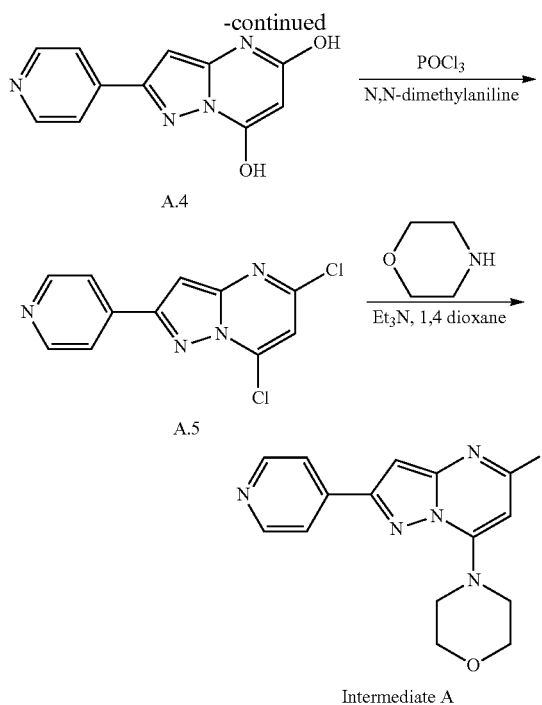

Preparation of A.2: To a solution of A.1 (200.0 g, 1.46 mol, 172.4 mL, 1.0 eq) in toluene (1800 mL) was added NaH (116.6 g, 2.92 mol, 60% purity, 2.0 eq) at 25° C. The mixture was heated to 90° C., and then MeCN (280.1 g, 6.83 mol, 359.2 mL, 4.68 eq) was added dropwise. This mixture was stirred at 90° C. for 8 hrs after which assay by TLC (Petroleum ether/Ethyl acetate=5/1) indicated that most of starting material was consumed. The reaction mixture was filtered to give a yellow solid, then the yellow solid filter cake was partitioned between water (1000 mL) and DCM (800 mL). The pH of the mixture was adjusted to pH=5-6 with 1 M HCl solution, then the organic layer was separated, and aqueous phase was extracted with DCM (3×600 mL). The combined organic layers were concentrated to give A.2 (160.0 g, crude) as a yellow solid.

Preparation of A.3: To a solution of A.2 (150.0 g, 1.03 mol, 1.0 eq) in EtOH (800 mL) was added $NH_2NH_2$—$H_2O$ (78.6 g, 1.54 mol, 76.3 mL, 98% purity, 1.5 eq). The mixture was stirred at 90° C. TLC (Dichloromethane/Methanol=10/1, $R_f$=0.3) showed that most of starting material was consumed after 2 hrs. The reaction mixture was concentrated to give the crude product, then this product was crystallized from ethyl alcohol (200 mL) to give a yellow solid. Following isolation of the yellow solid it was maintained under reduced pressure to remove the last traces of solvent. Purified A.3 was obtained as a yellow solid (85.0 g, 530.6 mmol, 51.7% yield).

Preparation of A.4: To a solution of A.3 (80.0 g, 499.4 mmol, 1.0 eq) and diethylmalonate (80.0 g, 499.4 mmol, 75.4 mL, 1.0 eq) in EtOH (480 mL) was added sodium ethoxide (84.9 g, 1.25 mol, 2.5 eq) to the mixture at 25° C. The mixture was stirred at 90° C. for 8 hrs, whereupon assay by TLC (Dichloromethane/Methanol=10/1, $R_f$=0.3) showed the starting material was consumed. This mixture was filtered to give A.4 (80.0 g, crude) as a yellow solid; LC-MS (ESI+): m/z 229 (MH+).

Preparation of A.5: To a solution of A.4 (20.0 g, 87.6 mmol, 1.0 eq) in $POCl_3$ (322.5 g, 2.10 mol, 195.4 mL, 24.0 eq) at 25° C. was added N,N-dimethylaniline (13.8 g, 113.9 mmol, 14.4 mL, 1.3 eq). This mixture was heated with stirring at 110° C. TLC (Dichloromethane/Methanol=10/1, $R_f$=0.8) showed that the starting material was consumed after 12 hours. The mixture was concentrated in vacuo to give a yellow solid. This solid was poured into ice water (200 mL) and filtered to give A.5 (14.0 g) as a yellow solid; LC-MS (ESI+): m/z 265/267 (MH+). $^1$H NMR (300 MHz, DMSO-$d_6$) δ: 8.74 (d, J=5.4 Hz, 2H), 8.03 (d, J=5.7 Hz, 2H), 7.77 (s, 1H) and 7.62 (s, 1H) ppm.

Intermediate A: To a solution of A.5 (2.0 g, 7.54 mmol, 1.0 eq) in $Et_3N$ (1.53 g, 15.0 mmol, 2.10 mL, 2.0 eq) and 1,4-dioxane (12 mL) at 25° C. was added morpholine (1.31 g, 15.0 mmol, 1.33 mL, 2.0 eq). This mixture was stirred at 25° C.; after 3 hours TLC (Petroleum ether/Ethyl acetate=1/1, $R_f$=0.5) showed the starting material was consumed. The reaction mixture was filtered to isolate the solid product, then it was purified by recrystallization from MeOH (30 mL) to give Intermediate A, 4-(5-chloro-2-(pyridin-4-yl)pyrazolo[1,5-a]pyrimidin-7-yl)morpholine (1.80 g, 5.70 mmol, 75.5% yield) as a yellow solid; LC-MS (ESI+): m/z 316/318 (MH+). $^1$H NMR (300 MHz, $CDCl_3$) δ: 8.70 (d, J=3.9 Hz, 2H), 7.99 (d, J=4.8 Hz, 2H), 7.25 (s, 1H), 6.53 (s, 1H) and 3.92-3.85 (m, 8H) ppm.

Intermediate B: 5-amino-N,N-dimethyl-3-(4-methylphenyl)-1H-pyrazole-1-sulfonamide

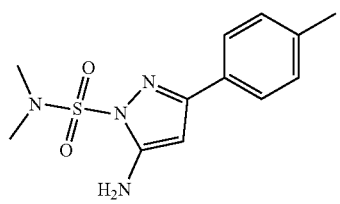

Intermediate B

To a solution of 3-(4-methylphenyl)-1H-pyrazolo-5-amine (250 mg, 1.57 mmol) in THF (5 mL) at 0° C. was added NaH (94 mg, 2.35 mmol). After stirring at 0° C. for 1 h, dimethylsulfamoyl chloride (270 mg, 1.88 mmol) was added to the solution. The reaction was monitored by TLC. When it was complete, the reaction mixture was quenched with a saturated $NH_4Cl$ solution. The aqueous solution was extracted with ethyl acetate (3×50 mL). The combined organic phases were dried over anhydrous $Na_2SO_4$, filtrated and concentrated under reduce pressure. The resulting residue was purified by silica gel column chromatography by gradient elution with 20% EtOAc/PE to 33% EtOAc/PE to provide 5-amino-N,N-dimethyl-3-phenyl-1H-pyrazole-1-sulfonamide (Intermediate B, 212 mg, 0.79 mmol); LC-MS: m/z 281 (MH+). $^1$H NMR (300 MHz, DMSO-$d_6$) δ: 7.67 (d, J=8.1 Hz, 2H), 7.20 (d, J=8.1 Hz, 2H), 5.7 (s, 1H), 4.82 (s, 2H), 3.02 (s, 6H) and 2.37 (s, 3H) ppm.

Example 1: 7-morpholino-2-(pyridin-4-yl)-N-(3-(p-tolyl)-1H-pyrazol-5-yl)pyrazolo[1,5-a]pyrimidin-5-amine, hydrogen chloride salt Step 1: Preparation of 3-(4-fluorophenyl)-N,N-dimethyl-5-((7-morpholino-2-(pyridin-4-yl)pyrazolo[1,5-a]pyrimidin-5-yl)amino)-1H-pyrazole-1-sulfonamide

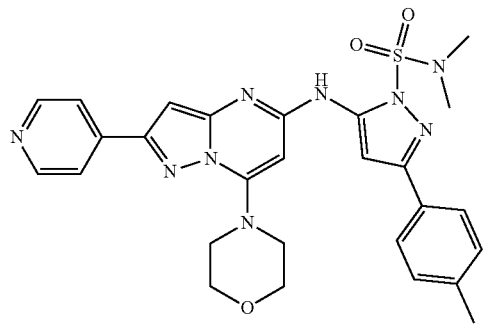 [SMILES: Cc1ccc(-c2cc(Nc3cc(N4CCOCC4)n4nc(-c5ccncc5)cc4n3)n(S(=O)(=O)N(C)C)n2)cc1]

A solution of 4-(5-chloro-2-(pyridin-4-yl)pyrazolo[1,5-a]pyrimidin-7-yl)morpholine (Intermediate A, 60 mg, 0.19 mmol), 5-amino-3-(4-fluorophenyl)-N,N-dimethyl-1H-pyrazole-1-sulfonamide (Intermediate B, 76 mg, 0.28 mmol), $Cs_2CO_3$ (142 mg, 0.44 mmol), $Pd(OAc)_2$ (4.2 mg, 0.019 mmol) and Xantphos (10.2 mg, 0.019 mmol) in DMF/1,4-dioxane (7:1, 5 mL) was heated to 90° C. for 30 min under microwave conditions. The reaction mixture was concentrated directly and the resulting residue was purified by silica gel column chromatography with a gradient elution of 2% MeOH/DCM to 3% MeOH/DCM to provide (50 mg, 0.09 mmol) of impure 3-(4-fluorophenyl)-N,N-dimethyl-5-((7-morpholino-2-(pyridin-4-yl)pyrazolo[1,5-a]pyrimidin-5-yl)amino)-1H-pyrazole-1-sulfonamide as a yellow solid; LC-MS (ESI+): m/z 560 (MH+).

Step 2: Preparation of 7-morpholino-2-(pyridin-4-yl)-N-(3-(p-tolyl)-1H-pyrazol-5-yl)pyrazolo[1,5-a]pyrimidin-5-amine, Hydrogen Chloride Salt

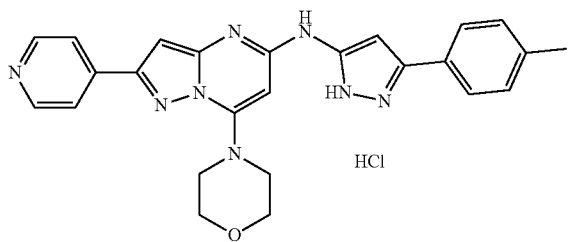 [SMILES: Cc1ccc(-c2cc(Nc3cc(N4CCOCC4)n4nc(-c5ccncc5)cc4n3)[nH]n2)cc1 ; Cl]

To a solution of N,N-dimethyl-5-((7-morpholino-2-(pyridin-4-yl)pyrazolo[1,5-a]pyrimidin-5-yl)amino)-3-phenyl-1H-pyrazole-1-sulfonamide (50 mg, 0.09 mmol) in DCM was added $HCl/Et_2O$ (1 mL). The reaction was stirred at ambient temperature for 2 h. A large amount of solid precipitated. After concentration, the residue was triturated in $MeOH/Et_2O$ (1/20, 2 mL); 7-morpholino-2-(pyridin-4-yl)-N-(3-(p-tolyl)-1H-pyrazol-5-yl)pyrazolo[1,5-a]pyrimidin-5-amine, hydrogen chloride salt (Example 1, 18.6 mg, 0.04 mmol) was obtained as white solid; LC-MS (ESI+): m/z 453 (MH+). $^1$H NMR (300 MHz, DMSO-$d_6$) δ: 10.06 (s, 1H), 8.95 (d, J=6.6 Hz, 2H), 8.50 (d, J=6.3 Hz, 2H), 7.66 (d, J=7.8 Hz, 2H), 7.30 (d, J=8.1 Hz, 2H), 7.16 (s, 1H), 6.97 (s, 1H), 6.32 (s, 1H), 3.94-3.86 (m, 4H), 3.69-3.63 (m, 4H) and 2.39 (s, 3H) ppm.

Example 2: 7-morpholino-N-(5-phenyl-1H-pyrazol-3-yl)-2-(4-pyridyl)pyrazolo[1,5-a]pyrimidin-5-amine

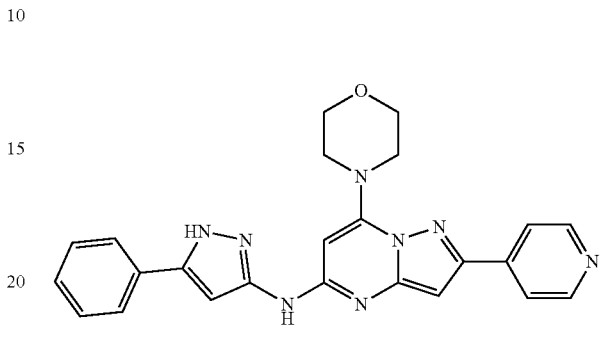

Compound 2 was prepared from Intermediate A and a protected pyrazole according to the same two-step procedure used for Example 1. The protected pyrazole was prepared from 3-phenyl-1H-pyrazol-5-amine according to the procedure used to prepare Intermediate B. Compound 2, 7-morpholino-N-(5-phenyl-1H-pyrazol-3-yl)-2-(4-pyridyl)pyrazolo[1,5-a]pyrimidin-5-amine, gave the following data: LC-MS (ESI+): m/z 439 (MH+). $^1$H NMR (300 MHZ, DMSO-$d_6$) δ: 12.84 (s, 1H), 9.89 (s, 1H), 8.70 (d, J=5.7 Hz, 2H), 7.99 (d, J=5.7 Hz, 2H), 7.77 (d, J=7.5 Hz, 2H), 7.50 (t, J=7.2 Hz, 2H), 7.38-7.33 (m, 1H), 7.09 (s, 1H), 6.92 (s, 1H), 6.27 (s, 1H), 3.89-3.78 (m, 4H) and 3.63-3.57 (m, 4H) ppm.

Example 3: 7-morpholino-N-[5-(o-tolyl)-1H-pyrazol-3-yl]-2-(4-pyridyl)pyrazolo[1,5-a]pyrimidin-5-amine

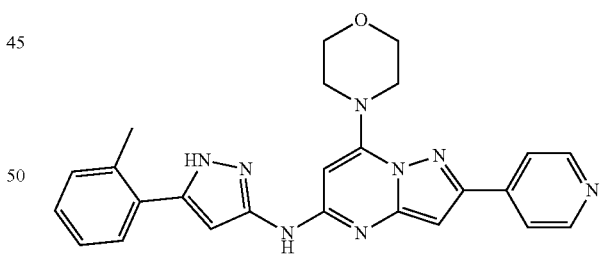

Compound 3 was prepared from Intermediate A and a protected pyrazole according to the same two-step procedure used for Example 1. The protected pyrazole was prepared from 3-(2-methylphenyl)-1H-pyrazol-5-amine according to the procedure used to prepare Intermediate B. Compound 3, 7-morpholino-N-[5-(o-tolyl)-1H-pyrazol-3-yl]-2-(4-pyridyl)pyrazolo[1,5-a]pyrimidin-5-amine, was obtained; LC-MS (ESI+): m/z 453 (MH+). $^1$H NMR (300 MHz, $CD_3OD$) δ: 8.62 (d, J=6.3 Hz, 2H), 8.03 (d, J=6.3 Hz, 2H), 7.46 (d, J=6.6 Hz, 1H), 7.32-7.24 (m, 3H), 6.81 (s, 1H), 6.54 (s, 1H), 6.06 (s, 1H), 4.04-3.97 (m, 4H), 3.75-3.65 (m, 4H) and 2.45 (s, 3H) ppm.

Example 4: 7-morpholino-N-[3-(m-tolyl)-1H-pyrazol-5-yl]-2-(4-pyridyl)pyrazolo[1,5-a]pyrimidin-5-amine, Hydrogen Chloride Salt

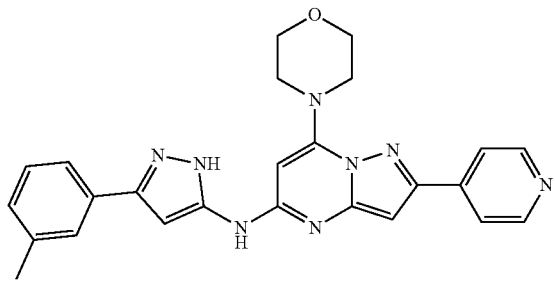 [SMILES: Cc1cccc(-c2cc(Nc3cc(N4CCOCC4)n4nc(-c5ccncc5)cc4n3)[nH]n2)c1]

Compound 4 was prepared from Intermediate A and a protected pyrazole according to the same two-step procedure used for Example 1. The protected pyrazole was prepared from 3-(3-methylphenyl)-1H-pyrazol-5-amine according to the procedure used to prepare Intermediate B. Compound 4, 7-morpholino-N-[3-(m-tolyl)-1H-pyrazol-5-yl]-2-(4-pyridyl)pyrazolo[1,5-a]pyrimidin-5-amine, hydrogen chloride salt, was obtained; LC-MS (ESI+): m/z 453 (MH+). $^1$H NMR (300 MHz, DMSO-d$_6$) δ: 10.03 (s, 1H), 8.94 (d, J=6.0 Hz, 2H), 8.47 (d, J=5.1 Hz, 2H), 7.59-7.54 (m, 2H), 7.47-7.32 (m, 1H), 7.19-7.15 (m, 2H), 6.98 (s, 1H), 6.30 (s, 1H), 3.95-3.86 (m, 4H), 3.71-3.63 (m, 4H) and 2.38 (s, 3H) ppm.

Example 5: N-(5-methyl-1H-pyrazol-3-yl)-7-morpholino-2-(4-pyridyl)pyrazolo[1,5-a]pyrimidin-5-amine

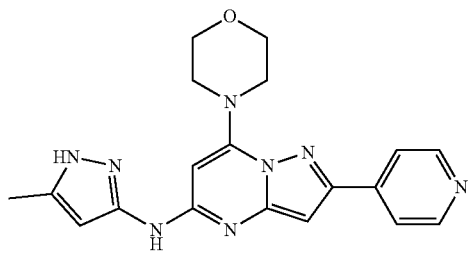 [SMILES: Cc1cc(Nc2cc(N3CCOCC3)n3nc(-c4ccncc4)cc3n2)n[nH]1]

Compound 5 was prepared from Intermediate A and a protected pyrazole according to the same two-step procedure used for Example 1. The protected pyrazole was prepared from 3-(3-methyl)-1H-pyrazol-5-amine according to the procedure used to prepare Intermediate B. Compound 5, N-(5-methyl-1H-pyrazol-3-yl)-7-morpholino-2-(4-pyridyl)pyrazolo[1,5-a]pyrimidin-5-amine, was obtained; LC-MS (ESI+): m/z 377 (MH+). $^1$H NMR (300 MHz, CD$_3$OD) δ: 8.60 (dd, J=3.6, 1.2 Hz, 2H), 7.99 (dd, J=3.6, 1.2 Hz, 2H), 6.69 (s, 1H), 6.21 (s, 1H), 6.02 (s, 1H), 3.97-3.95 (m, 4H), 3.49-3.47 (m, 4H) and 2.29 (s, 3H) ppm.

Example 6: 7-morpholino-2-(4-pyridyl)-N-[5-(4-pyridyl)-1H-pyrazol-3-yl]pyrazolo[1,5-a]pyrimidin-5-amine

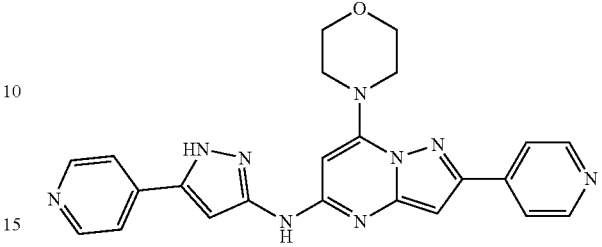

Compound 6 was prepared from Intermediate A and a protected pyrazole according to the same two-step procedure used for Example 1. The protected pyrazole was prepared from 3-(pyrid-4-yl)-1H-pyrazol-5-amine according to the procedure used to prepare Intermediate B. Compound 6, 7-morpholino-2-(4-pyridyl)-N-[5-(4-pyridyl)-1H-pyrazol-3-yl]pyrazolo[1,5-a]pyrimidin-5-amine, was obtained: LC-MS (ESI+): m/z 440 (MH+). $^1$H NMR (300 MHz, CD$_3$OD) δ: 8.89 (d, J=5.1 Hz, 2H), 8.34 (d, J=5.4 Hz, 2H), 8.63 (d, J=5.1 Hz, 2H), 8.48 (d, J=5.1 Hz, 2H), 7.22 (s, 1H), 6.91 (s, 1H), 6.02 (s, 1H), 4.05-3.95 (m, 4H) and 3.82-3.80 (m, 4H) ppm.

Example 7: 1-(7-morpholino-2-(pyridin-4-yl)pyrazolo[1,5-a]pyrimidin-5-yl)-3-phenyl-1H-pyrazol-5-amine A solution of 4-(5-chloro-2-(pyridin-4-yl)pyrazolo[1,5-a]pyrimidin-7-yl)morpholine (Intermediate A, 30 mg, 0.095 mmol), 3-phenyl-1H-pyrazol-5-amine (22.5 mg, 0.143 mmol), sodium t-butoxide (18.3 mg, 0.191 mmol), Pd$_2$(dba)$_3$ (4.2 mg, 0.005 mmol) and Xantphos (2.1 mg, 0.005 mmol) in DMF (3 mL) was heated to 110° C. for 30 minutes under microwave conditions. The reaction mixture was concentrated directly and purified by silica gel column chromatography by eluting with a gradient of 2% MeOH/DCM to 3% MeOH/DCM to provide 1-(7-morpholino-2-(pyridin-4-yl)pyrazolo[1,5-a]pyrimidin-5-yl)-3-phenyl-1H-pyrazol-5-amine (Compound 7, 14.2 mg, 0.03 mmol) as a white solid; LC-MS (ESI+): m/z 439 (MH+). $^1$H NMR (300 MHZ, DMSO-d$_6$) δ: 8.72 (d, J=5.7 Hz, 2H), 7.98 (d, J=5.7 Hz, 2H), 7.89 (d, J=7.2 Hz, 2H), 7.45-7.40 (m, 3H), 7.19 (s, 1H), 7.12 (s, 2H), 7.03 (s, 1H), 5.92 (s, 1H) and 3.94-3.83 (m, 8H) ppm.

Example 8: 1-(7-morpholino-2-(pyridin-4-yl)pyrazolo[1,5-a]pyrimidin-5-yl)-3-(o-tolyl)-1H-pyrazol-5-amine

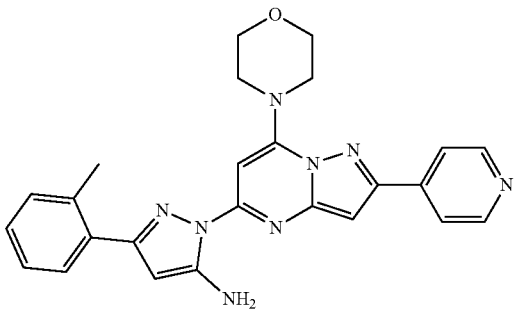 [SMILES: Cc1ccccc1-c1cc(N)n(-c2cc(N3CCOCC3)n3nc(-c4ccncc4)cc3n2)n1]

Compound 8 was prepared from Intermediate A and 3-(2-methylphenyl)-1H-pyrazol-5-amine according to the procedure used for Example 7; LC-MS (ESI+): m/z 453 (MH+). ¹H NMR (300 MHz, CDCl₃) δ: 8.73 (d, J=3.9 Hz, 2H), 7.85 (d, J=4.8 Hz, 2H), 7.60 (d, J=4.5 Hz, 1H), 7.31-7.26 (m, 3H), 7.09 (s, 1H), 6.82 (s, 1H), 6.08 (s, 2H), 5.74 (s, 1H), 4.03-3.98 (m, 4H), 3.87-3.82 (m, 4H) and 2.56 (s, 3H) ppm.

Example 9: 4-[5-(4-phenylpyrazol-1-yl)-2-(4-pyridyl)pyrazolo[1,5-a]pyrimidin-7-yl]morpholine

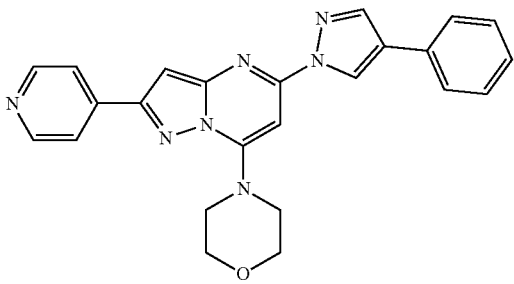 [SMILES: c1ccc(-c2cnn(-c3cc(N4CCOCC4)n4nc(-c5ccncc5)cc4n3)c2)cc1]

To a solution of 4-phenyl-1H-pyrazole (29.4 mg, 0.20 mmol) in DMF (5 mL) at 0° C. was added NaH (14 mg, 0.34 mmol). The mixture was stirred for 30 minutes. Then to the mixture was added 4-(5-chloro-2-(pyridin-4-yl)pyrazolo[1,5-a]pyrimidin-7-yl)morpholine (Intermediate A, 62 mg, 0.19 mmol). The reaction mixture was heated to 80° C. and stirred overnight. The progress of the reaction was monitored by TLC. The reaction mixture was quenched with water (10 mL). The aqueous solution was extracted with ethyl acetate (3×10 mL). The combined organic phase was dried over anhydrous Na₂SO₄, filtrated and concentrated under reduce pressure. The resulting residue was purified by silica gel column chromatography by eluting with a gradient of 2% MeOH/DCM to 3% MeOH/DCM to provide 4-[5-(4-phenylpyrazol-1-yl)-2-(4-pyridyl)pyrazolo[1,5-a]pyrimidin-7-yl]morpholine (Compound 9, 17.5 mg, 0.04 mmol) as an off-white solid; LC-MS (ESI+): m/z 424 (MH+). ¹H NMR (300 MHZ, CDCl₃) δ 8.87 (s, 1H), 8.73 (d, J=6.0 Hz, 2H), 8.05 (s, 1H), 7.85 (d, J=5.4 Hz, 2H), 7.62 (d, J=7.8 Hz, 2H), 7.43 (t, J=7.5 Hz, 2H), 7.33-7.28 (m, 1H), 7.03 (s, 1H), 6.88 (s, 1H), 4.06-4.03 (m, 4H) and 3.95-3.92 (m, 4H) ppm.

Intermediate C

Step 1: Synthesis of tert-butyl 4-(3-methylphenyl)-1H-pyrazole-1-carboxylate

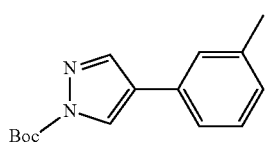 [SMILES: Cc1cccc(-c2cnn(C(=O)OC(C)(C)C)c2)c1]

A solution of tert-butyl 4-(4,4,5,5-tetramethyl-1,3,2-dioxaborolan-2-yl)-1H-pyrazole-1-carboxylate (1 g, 3.4 mmol), 1-bromo-3-methylbenzene (581 mg, 3.4 mmol), CsF (775 mg, 5.1 mmol), Pd₂(PPh₃)₂Cl₂ (392 mg, 0.34 mmol) in 1,4-dioxane/H₂O (30 mL, 2/1) was heated to 80° C. overnight. The completion of the reaction was confirmed by TLC. The reaction mixture was quenched with water (50 mL). The aqueous solution was extracted with ethyl acetate (3×20 mL). The combined organic phases were dried over anhydrous Na₂SO₄, filtrated and concentrated under reduce pressure. The resulting residue was purified by silica gel column chromatography with a gradient elution of 15% EtOAc/PE to 33% EtOAc/PE. There was obtained tert-butyl 4-(3-methylphenyl)-1H-pyrazole-1-carboxylate (117 mg, 0.45 mmol); LC-MS (ESI+): m/z 259 (MH+). ¹H NMR (300 MHz, CDCl₃) δ: 8.29 (s, 1H), 7.99 (s, 1H), 7.34-7.28 (m, 3H), 7.13-7.10 (m, 1H), 2.39 (s, 3H) and 1.68 (s, 9H) ppm.

Step 2: Synthesis of 4-(3-methylphenyl)-1H-pyrazole hydrochloride, Intermediate C

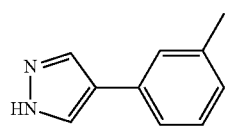

To a solution of tert-butyl 4-(3-methylphenyl)-1H-pyrazole-1-carboxylate (117 mg, 0.45 mmol) in DCM was added HCl/Et₂O (1 mL). The reaction was stirred at ambient temperature overnight. A large amount of solid was precipitated. After concentration, the residue was triturated in MeOH/Et₂O (1/20, 2 mL); 4-(3-methylphenyl)-1H-pyrazole hydrochloride (Intermediate C, 90 mg, 0.46 mmol) was obtained as white solid; LC-MS (ESI+): m/z 159 (MH+). ¹H NMR (300 MHZ, CDCl₃) δ: 8.13 (s, 2H), 7.38-7.20 (m, 4H) and 2.42 (s, 3H) ppm.

Example 10: 4-[5-[4-(m-tolyl)pyrazol-1-yl]-2-(4-pyridyl)pyrazolo[1,5-a]pyrimidin-7-yl]morpholine

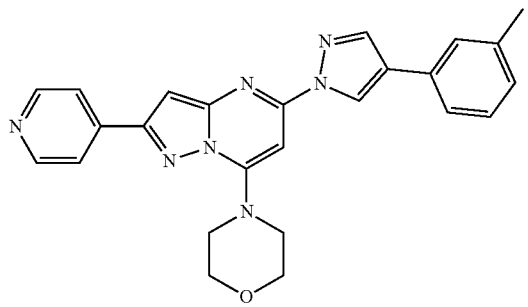 [SMILES: Cc1cccc(-c2cnn(-c3cc(N4CCOCC4)n4nc(-c5ccncc5)cc4n3)c2)c1]

To a solution of 4-(3-methylphenyl)-1H-pyrazole hydrochloride (Intermediate C, 40 mg, 0.21 mmol) in DMF (5 mL) at 0° C. was added NaH (16.8 mg, 0.42 mmol). The mixture was stirred for 30 min. To this mixture was added 4-(5-chloro-2-(pyridin-4-yl)pyrazolo[1,5-a]pyrimidin-7-yl)morpholine (Intermediate A, 65 mg, 0.20 mmol). The resulting reaction mixture was heated to 80° C. overnight. The reaction was confirmed complete by TLC. The reaction mixture was quenched with water (10 mL) and the aqueous solution was extracted with ethyl acetate (3×10 mL). The combined organic phase was dried over anhydrous $Na_2SO_4$, filtrated and concentrated under reduce pressure. The resulting residue was purified by silica gel column chromatography with a gradient elution of 30% EtOAc/PE to EtOAc to provide 4-[5-[4-(m-tolyl)pyrazol-1-yl]-2-(4-pyridyl)pyrazolo[1,5-a]pyrimidin-7-yl]morpholine (Compound 10, 15.5 mg, 0.035 mmol) as an off-white solid; LC-MS (ESI+): m/z 438 (MH+). $^1$H NMR (300 MHZ, $CDCl_3$) δ: 8.86 (s, 1H), 8.72 (d, J=6.0 Hz, 2H), 8.04 (s, 1H), 7.85 (d, J=6.0 Hz, 2H), 7.44-7.41 (m, 2H), 7.35-7.32 (m, 1H), 7.15-7.09 (m, 1H), 7.02 (s, 1H), 6.88 (s, 1H), 4.06-4.03 (m, 4H), 3.95-3.92 (m, 4H) and 2.42 (s, 3H) ppm.

Example 11: 4-[2-(4-pyridyl)-5-[4-(4-pyridyl)pyrazol-1-yl]pyrazolo[1,5-a]pyrimidin-7-yl]morpholine

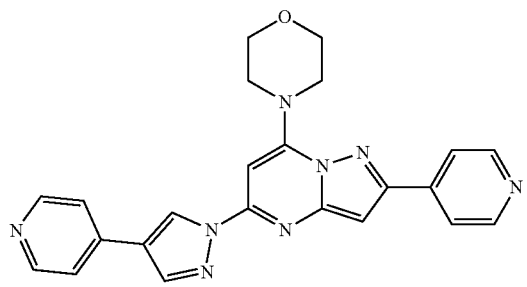 [SMILES: c1cc(-c2cnn(-c3cc(N4CCOCC4)n4nc(-c5ccncc5)cc4n3)c2)ccn1]

Compound 11 was prepared by reaction of Intermediate A with 4-(4-pyridyl)-1H-pyrazole according to the conditions used for Examples 9 and 10. Compound 11, 4-[2-(4-pyridyl)-5-[4-(4-pyridyl)pyrazol-1-yl]pyrazolo[1,5-a]pyrimidin-7-yl]morpholine, was obtained; LC-MS (ESI+): m/z 425 (MH+). $^1$H NMR (300 MHz, $CDCl_3$) δ: 9.01 (s, 1H), 8.73 (d, J=6.0 Hz, 2H), 8.64 (d, J=6.0 Hz, 2H), 8.11 (s, 1H), 7.85 (d, J=6.0 Hz, 2H), 7.50 (d, J=6.0 Hz, 2H), 7.02 (s, 1H), 6.90 (s, 1H), 4.06-4.03 (m, 4H) and 3.98-3.96 (m, 4H) ppm.

Example 12: 4-[5-(4-methylpyrazol-1-yl)-2-(4-pyridyl)pyrazolo[1,5-a]pyrimidin-7-yl]morpholine

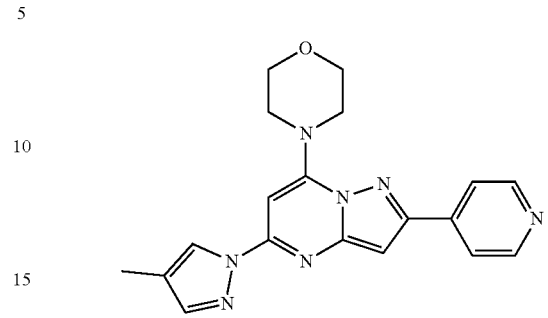

Compound 12 was prepared by reaction of Intermediate A with 4-methylpyrazole according to the conditions used for Examples 9 and 10. Compound 12, 4-[5-(4-methylpyrazol-1-yl)-2-(4-pyridyl)pyrazolo[1,5-a]pyrimidin-7-yl]morpholine, was obtained; LC-MS (ESI+): m/z 362 (MH+). $^1$H NMR (300 MHZ, DMSO-$d_6$) δ: 8.70 (d, J=5.7 Hz, 2H), 8.45 (s, 1H), 7.98 (d, J=6.0 Hz, 2H), 7.72 (s, 1H), 7.17 (s, 1H), 6.91 (s, 1H), 3.89 (s, 8H), and 2.13 (s, 3H) ppm.

Example 13: 4-[5-(3-phenylpyrazol-1-yl)-2-(4-pyridyl)pyrazolo[1,5-a]pyrimidin-7-yl]morpholine

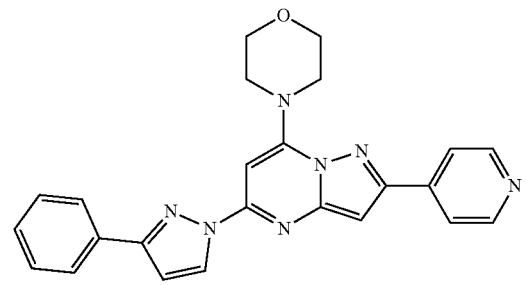

To a solution of 3-phenylpyrazole (29.4 mg, 0.20 mmol) in DMF (5 mL) at 0° C. was added NaH (14 mg, 0.34 mmol). The mixture was stirred for 30 minutes. To the mixture was added 4-(5-chloro-2-(pyridin-4-yl)pyrazolo[1,5-a]pyrimidin-7-yl)morpholine (Intermediate A, 62 mg, 0.19 mmol). The reaction mixture was heated to 80° C. and stirred overnight. The progress of the reaction was monitored by TLC. The reaction mixture was quenched with water (10 mL). The aqueous solution was extracted with ethyl acetate (3×10 mL). The combined organic phase was dried over anhydrous $Na_2SO_4$, filtrated and concentrated under reduce pressure. The resulting residue was purified by silica gel column chromatography by eluting with a gradient of 2% MeOH/DCM to 3% MeOH/DCM to provide 4-[5-(3-phenylpyrazol-1-yl)-2-(4-pyridyl)pyrazolo[1,5-a]pyrimidin-7-yl]morpholine (Compound 13, 17.5 mg, 0.04 mmol) as an off-white solid; LC-MS (ESI+): m/z 424 (MH+). $^1$H NMR (300 MHz, $CDCl_3$) δ: 8.72 (d, J=6.0 Hz, 2H), 8.65 (d, J=2.7 Hz, 1H), 7.95 (d, J=8.4 Hz, 2H), 7.85 (dd, J=4.8, 1.5 Hz, 2H), 7.50-7.39 (m, 3H), 7.12 (s, 1H), 6.87-6.84 (m, 2H), 4.08-4.05 (m, 4H) and 3.96-3.93 (m, 4H) ppm.

Example 14: 4-[5-[3-(m-tolyl)pyrazol-1-yl]-2-(4-pyridyl)pyrazolo[1,5-a]pyrimidin-7-yl]morpholine 4-[5-[3-(3-methylphenyl)pyrazol-1-yl]-2-(4-pyridyl)pyrazolo[1,5-a]pyrimidin-7-yl]morpholine

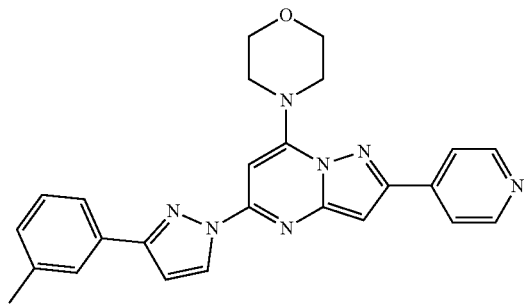 [SMILES: Cc1cccc(-c2ccn(-c3cc(N4CCOCC4)n4nc(-c5ccncc5)cc4n3)n2)c1]

Compound 14 was prepared by reaction of Intermediate A with 3-(3-methylphenyl)pyrazole according to the conditions used for Example 13. Compound 14, 4-[5-[3-(m-tolyl)pyrazol-1-yl]-2-(4-pyridyl)pyrazolo[1,5-a]pyrimidin-7-yl]morpholine, was obtained; LC-MS (ESI+): m/z 438 (MH+). ¹H NMR (300 MHz, CDCl₃) δ: 8.72 (d, J=6.0 Hz, 2H), 7.64 (d, J=2.4 Hz, 1H), 7.84 (d, J=5.7 Hz, 2H), 7.77-7.71 (m, 2H), 7.36 (t, J=7.8 Hz, 1H), 7.26-7.23 (m, 1H), 7.12 (s, 1H), 6.86-6.83 (m, 2H), 4.08-4.05 (m, 4H), 3.96-3.93 (m, 4H), and 2.45 (s, 3H) ppm.

Example 15: 4-[2-(4-pyridyl)-5-[3-(4-pyridyl)pyrazol-1-yl]pyrazolo[1,5-a]pyrimidin-7-yl]morpholine

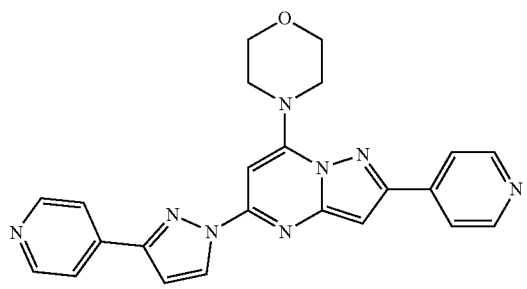 [SMILES: c1cc(-c2ccn(-c3cc(N4CCOCC4)n4nc(-c5ccncc5)cc4n3)n2)ccn1]

Compound 15 was prepared by reaction of Intermediate A with 3-(4-pyridyl)pyrazole according to the conditions used for Example 13. Compound 15, 4-[2-(4-pyridyl)-5-[3-(4-pyridyl)pyrazol-1-yl]pyrazolo[1,5-a]pyrimidin-7-yl]morpholine, was obtained; LC-MS (ESI+): m/z 425 (MH+). ¹H NMR (300 MHz, CDCl₃) δ: 8.74-8.70 (m, 5H), 7.86-7.81 (m, 4H), 7.09 (s, 1H), 6.93-6.89 (m, 2H), 4.09-4.06 (m, 4H) and 3.98-3.96 (m, 4H) ppm.

Example 16: 4-[5-(3-methylpyrazol-1-yl)-2-(4-pyridyl)pyrazolo[1,5-a]pyrimidin-7-yl]morpholine

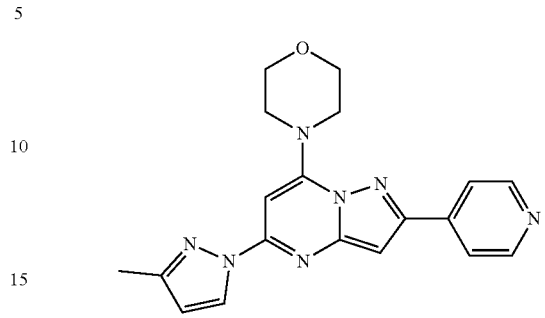

Compound 16 was prepared by reaction of Intermediate A with 3-(4-pyridyl)pyrazole according to the conditions used for Examples 13. Compound 16, 4-[5-(3-methylpyrazol-1-yl)-2-(4-pyridyl)pyrazolo[1,5-a]pyrimidin-7-yl]morpholine, was obtained; LC-MS (ESI+): m/z 362 (MH+). ¹H NMR (300 MHz, CDCl₃) δ: 8.70 (dd, J=4.5, 1.5 Hz, 2H), 8.49 (d, J=2.4 Hz, 1H), 7.83 (dd, J=4.5, 1.5 Hz, 2H), 6.97 (s, 1H), 6.83 (s, 1H), 6.31 (d, J=2.7 Hz, 1H), 4.05-4.02 (m, 4H), 3.92-3.89 (m, 4H) and 2.39 (s, 3H) ppm.

Intermediate D: 4-(5-chloro-2-(pyridin-2-yl)pyrazolo[1,5-a]pyrimidin-7-yl)morpholine

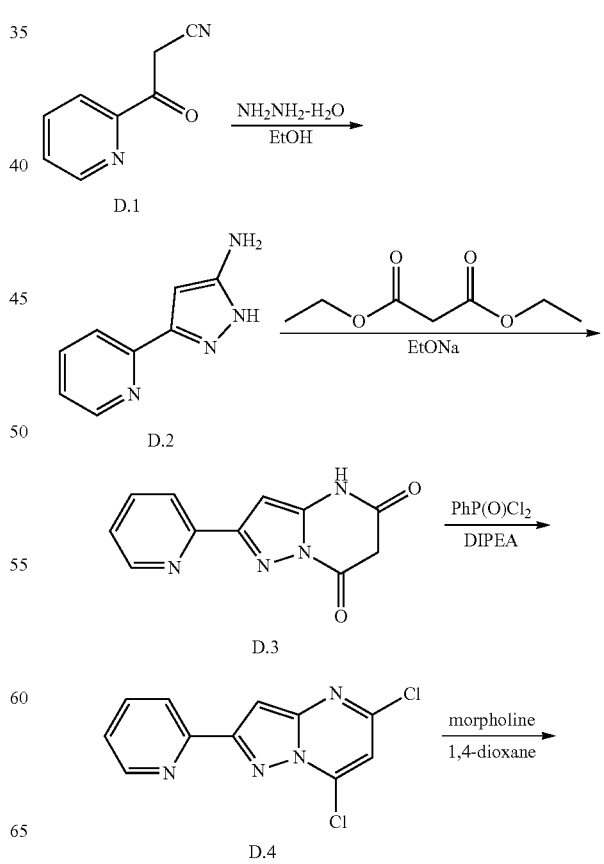

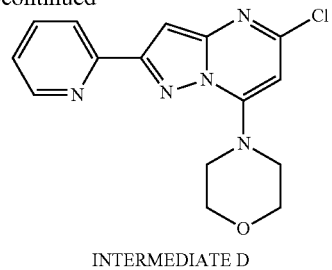

INTERMEDIATE D

D.2: Synthesis of 3-(pyridin-2-yl)-1H-pyrazol-5-amine

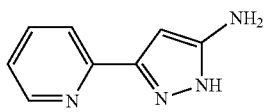

To a solution of 3-oxo-3-(pyridin-2-yl) propanenitrile (2.5 g, 17.1 mmol) in EtOH (75 mL) was added NH$_2$NH$_2$·H$_2$O (1.71 g, 34.2 mmol). The reaction mixture was heated to reflux overnight. Upon the completion of the reaction as indicated by TLC analysis, the reaction mixture was concentrated directly and purified by silica gel column chromatography with a gradient elution of 1% MeOH/DCM to 3% MeOH/DCM to provide 3-(pyridin-2-yl)-1H-pyrazol-5-amine (1.34 g, 8.37 mmol) as a brown solid. LC-MS (ESI+): m/z 161 (MH$^+$). $^1$H NMR (300 MHZ, CDCl$_3$): 8.58 (d, J=4.2 Hz, 1H), 7.75-7.69 (m, 1H), 7.52 (d, J=8.1 Hz, 1H), 7.24-7.20 (m, 1H), 6.09 (s, 1H).

D.3: Synthesis of 2-(pyridin-2-yl)pyrazolo[1,5-a]pyrimidine-5,7(4H,6H)-dione

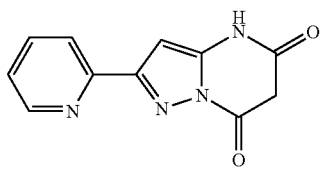 [SMILES: O=C1CC(=O)n2nc(-c3ccccn3)cc2N1]

To a solution of anhydrous EtOH (10 mL) was added small pieces of sodium (580 mg, 25.2 mmol) at ambient temperature carefully. After all of the sodium was dissolved, the solution was concentrated to provide fresh NaOEt as a white solid. The freshly prepared NaOEt was added to a mixture of diethyl malonate (40 mL) and 3-(pyridin-2-yl)-1H-pyrazol-5-amine (1.34 g, 8.37 mmol). The mixture was heated to 110° C. and stirred at that temperature overnight. After the reaction mixture was cooled to ambient temperature, a large amount of solid was precipitated. After filtration, the filter cake was washed with diethyl ether twice to provide crude 2-(pyridin-2-yl)pyrazolo[1,5-a]pyrimidine-5,7(4H,6H)-dione (3.89 g, 17.1 mg) as a yellow solid. The crude product was used directly for the next step without further purification. LC-MS (ESI+): 229 (MH$^+$).

D.4: Synthesis of 5,7-dichloro-2-(pyridin-2-yl)pyrazolo[1,5-a]pyrimidine

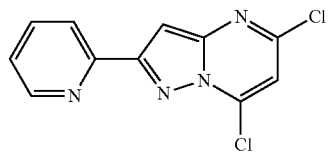 [SMILES: Clc1cc(Cl)n2nc(-c3ccccn3)cc2n1]

A solution of crude 2-(pyridin-2-yl)pyrazolo[1,5-a]pyrimidine-5,7(4H,6H)-dione (3.89 g, 17.1 mmol) in phenylphosphonic dichloride (20 mL) was heated to 110° C. overnight. The reaction mixture was quenched with saturated NaHCO$_3$ solution and made basic to pH 8. The aqueous solution was extracted with DCM/MeOH (15:1, 6×50 mL). The combined organic phase was dried over anhydrous Na$_2$SO$_4$, filtered and concentrated under reduce pressure. The crude product was used directly for the next step without further purification. LC-MS (ESI+): m/z 265/267 (MH$^+$).

Intermediate D: Synthesis of 4-(5-chloro-2-(pyridin-2-yl)pyrazolo[1,5-a]pyrimidin-7-yl)morpholine To a solution of crude 5,7-dichloro-2-(pyridin-2-yl)pyrazolo[1,5-a]pyrimidine (0.78 g, 2.83 mmol) in 1,4-dioxane (50 mL) was added morpholine (0.49 g, 5.65 mmol). The reaction was stirred at ambient temperature for 1 h. The reaction mixture was concentrated directly and purified by silica gel column chromatography with a gradient elution of 2% MeOH/DCM to 3% MeOH/DCM to provide 4-(5-chloro-2-(pyridin-2-yl)pyrazolo[1,5-a]pyrimidin-7-yl)morpholine (400 mg, 1.27 mmol) as a yellow solid. LC-MS (ESI+): m/z 316/318 (MH$^+$). $^1$H NMR (300 MHZ, CDCl$_3$) δ 8.71 (d, J=4.5 Hz, 1H), 8.12 (d, J=7.8 Hz, 1H), 7.82-7.77 (m, 1H), 7.33-7.26 (m, 1H), 7.17 (s, 1H), 6.12 (s, 1H), 4.03-3.99 (m, 4H), 3.88-3.85 (m, 4H).

Intermediate E: 4-(5-chloro-2-(pyridin-3-yl)pyrazolo[1,5-a]pyrimidin-7-yl)morpholine

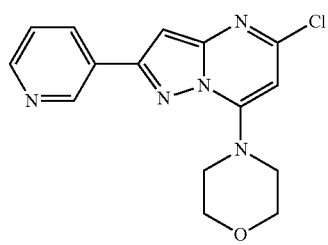 [SMILES: Clc1cc(N2CCOCC2)n2nc(-c3cccnc3)cc2n1]

Intermediate E

Intermediate E was prepared by the same method used for the preparation of Intermediate D except that the starting material used in the first step is 3-oxo-3-(pyridin-3-yl) propanenitrile, not 3-oxo-3-(pyridin-2-yl) propanenitrile.

Example 17: 4-(2-(pyridin-3-yl)-5-(3-(m-tolyl)-1H-pyrazol-1-yl)pyrazolo[1,5-a]pyrimidin-7-yl)morpholine

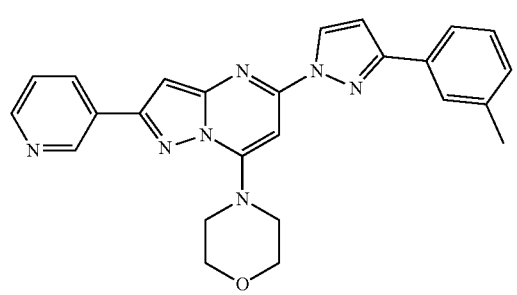 [SMILES: Cc1cccc(-c2ccn(-c3cc(N4CCOCC4)n4nc(-c5cccnc5)cc4n3)n2)c1]

Compound 17 was prepared by reaction of Intermediate E with 3-(m-tolyl)-1H-pyrazole according to the conditions used for Example 18. LC-MS (ESI+): m/z 438 (MH+). $^1$H NMR (300 MHz, CDCl$_3$) δ 9.23 (s, 1H), 8.65 (d, J=2.7 Hz, 2H), 8.24 (d, J=8.1 Hz, 1H), 7.77-7.72 (m, 2H), 7.43-7.33 (m, 2H), 7.26-7.20 (m, 1H), 7.10 (s, 1H), 6.84-6.82 (m, 2H), 4.06-4.04 (m, 4H), 3.96-3.94 (m, 4H), 2.45 (s, 3H).

Example 18: 4-(2-(pyridin-2-yl)-5-(3-(m-tolyl)-1H-pyrazol-1-yl)pyrazolo[1,5-a]pyrimidin-7-yl)morpholine

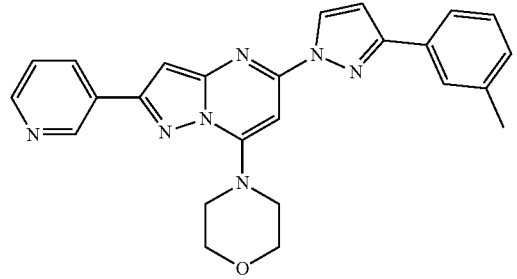 [SMILES: Cc1cccc(-c2ccn(-c3cc(N4CCOCC4)n4nc(-c5cccnc5)cc4n3)n2)c1]

A suspension of 4-(5-chloro-2-(pyridin-2-yl)pyrazolo[1,5-a]pyrimidin-7-yl)morpholine (Intermediate D, 150 mg, 0.48 mmol), 3-(m-tolyl)-1H-pyrazole (82.7 mg, 0.52 mmol), Cs$_2$CO$_3$ (312 mg, 0.96 mmol) and CuI (18 mg, 0.014 mmol) in DMF (10 mL) was heated to 120° C. overnight. Upon the completion of the reaction as indicated by TLC analysis, the reaction mixture was quenched with water (20 mL) and extracted with DCM/MeOH (15:1, 3×20 mL). The combined organic phase was dried over anhydrous Na$_2$SO$_4$, filtrated and concentrated under reduce pressure. The residue was purified by silica gel column chromatography with a gradient elution of 1% MeOH/DCM to 5% MeOH/DCM to provide 4-(2-(pyridin-2-yl)-5-(3-(m-tolyl)-1H-pyrazol-1-yl)pyrazolo[1,5-a]pyrimidin-7-yl)morpholine (Compound 18, 40.6 mg, 0.093 mmol) as a white solid. LC-MS (ESI+): m/z 438 (MH+). $^1$H NMR (300 MHz, CDCl$_3$) δ 8.72 (d, J=4.8 Hz, 1H), 8.68 (d, J=2.4 Hz, 1H), 8.16 (d, J=8.1 Hz, 1H), 7.80-7.72 (m, 3H), 7.38-7.26 (m, 2H), 7.22-7.20 (m, 1H), 7.14 (s, 1H), 7.11 (s, 1H), 6.83 (d, J=2.7 Hz, 1H), 4.07-4.06 (m, 4H), 3.96-3.94 (m, 4H), 2.45 (s, 3H).

Intermediate F: 7-Morpholino-5-(3-(m-tolyl)-1H-pyrazol-1-yl)pyrazolo[1,5-a]pyrimidine-2-carboxylic Acid

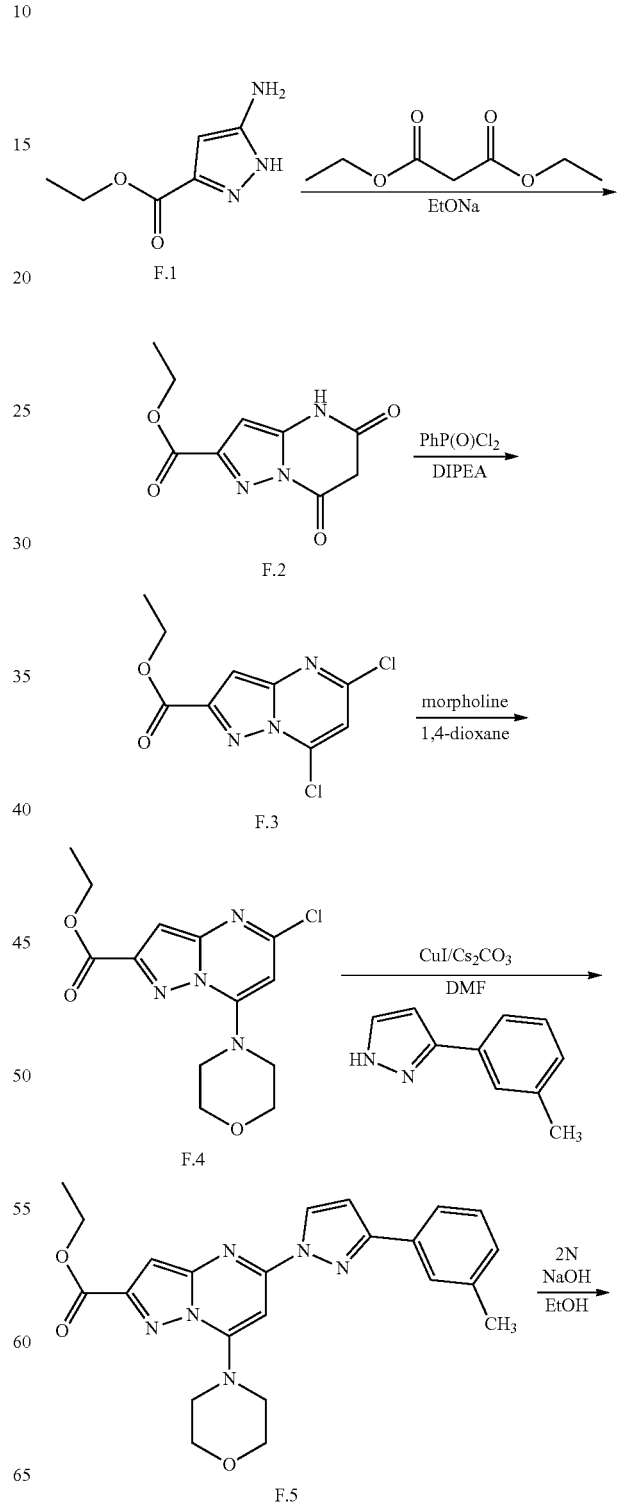

-continued

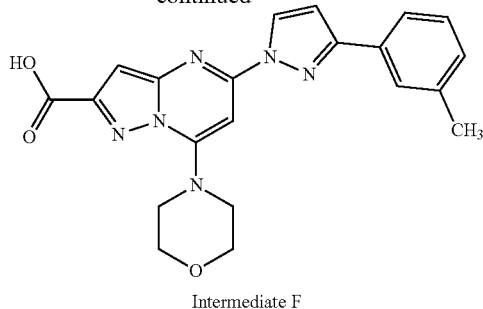

Intermediate F

F.2: Ethyl 5,7-dioxo-4,5,6,7-tetrahydropyrazolo[1,5-a]pyrimidine-2-carboxylate

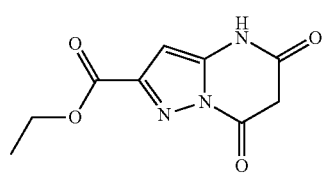 [SMILES: CCOC(=O)c1cc2n(n1)C(=O)CC(=O)N2]

To a solution of anhydrous EtOH (10 mL) was added small pieces of sodium (890 mg, 38.7 mmol) at ambient temperature carefully. After all of the sodium was dissolved, the solution was concentrated to provide fresh NaOEt as a white solid. The freshly prepared NaOEt was added to a mixture of diethyl malonate (40 mL) and ethyl 5-amino-1H-pyrazole-3-carboxylate (2 g, 12.9 mmol). The mixture was heated to 120° C. and stirred at that temperature overnight. After the reaction mixture was cooled to room temperature, a large amount of solid was precipitated. After filtration, the filter cake was washed with ether twice to provide ethyl 5,7-dioxo-4,5,6,7-tetrahydropyrazolo[1,5-a]pyrimidine-2-carboxylate (5.92 g, 26.5 mmol) as a yellow solid. The crude product was used directly for the next step without further purification. LC-MS (ESI+): m/z 224 (MH$^+$).

F.3 Synthesis of ethyl 5,7-dichloropyrazolo[1,5-a]pyrimidine-2-carboxylate

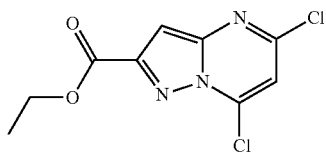 [SMILES: CCOC(=O)c1cc2nc(Cl)cc(Cl)n2n1]

A solution of crude ethyl 5,7-dioxo-4,5,6,7-tetrahydropyrazolo[1,5-a]pyrimidine-2-carboxylate (5.92 g, 26.5 mmol) in phenylphosphonic dichloride (15 mL) was heated to 120° C. overnight. The reaction mixture was quenched with saturated NaHCO$_3$ solution until it was basic (pH 8). The aqueous solution was extracted with DCM/MeOH (15:1, 6×40 mL). The combined organic phase was dried over anhydrous Na$_2$SO$_4$, filtrated and concentrated under reduce pressure. The crude product was used directly for the next step without further purification. LC-MS (ESI+): m/z 260/262 (MH+).

F.4) Synthesis of ethyl 5-chloro-7-morpholinopyrazolo[1,5-a]pyrimidine-2-carboxylate

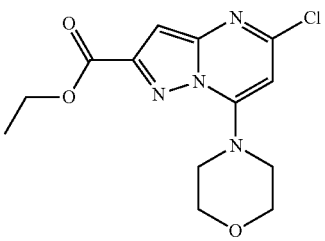 [SMILES: CCOC(=O)c1cc2nc(Cl)cc(N3CCOCC3)n2n1]

To a solution of crude ethyl 5,7-dichloropyrazolo[1,5-a]pyrimidine-2-carboxylate (4.83 g, 18.6 mmol) in 1,4-dioxane (60 mL) was added morpholine (3.2 g, 37.3 mmol). The reaction was stirred at ambient temperature for 1 h. The reaction mixture was concentrated directly and purified by silica gel column chromatography with a gradient elution of 2% MeOH/DCM to 3% MeOH/DCM to provide ethyl 5-chloro-7-morpholinopyrazolo[1,5-a]pyrimidine-2-carboxylate (3.3 g, 10.6 mmol) as a yellow solid. LC-MS (ESI+): m/z 311/313 (MH+). $^1$H NMR (300 MHz, CDCl$_3$) δ 6.98 (s, 1H), 6.18 (s, 1H), 4.49-4.41 (m, 2H), 3.98-3.96 (m, 4H), 3.92-3.82 (m, 4H), 1.33 (t, J=8.4 Hz, 3H).

F.5: ethyl 7-morpholino-5-(3-(m-tolyl)-1H-pyrazol-1-yl)pyrazolo[1,5-a]pyrimidine-2-carboxylate

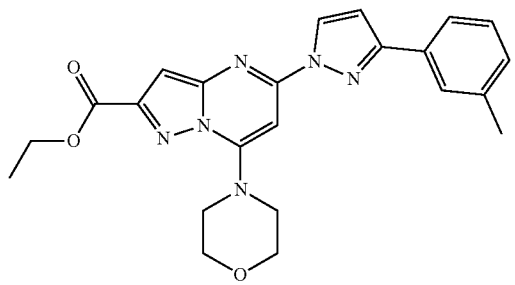 [SMILES: CCOC(=O)c1cc2nc(-n3ccc(-c4cccc(C)c4)n3)cc(N3CCOCC3)n2n1]

A suspension of ethyl 5-chloro-7-morpholinopyrazolo[1,5-a]pyrimidine-2-carboxylate (3.2 g, 10.6 mmol), 3-(m-tolyl)-1H-pyrazole (2.0 g, 12.8 mmol), Cs$_2$CO$_3$ (6.9 g, 21.3 mmol) and CuI (400 mg, 2.1 mmol) in DMF (120 mL) was heated to 110° C. overnight. Upon the completion of the reaction as indicated by TLC analysis, the reaction mixture was quenched with water (20 mL) and extracted with DCM/MeOH (15:1, 3×30 mL). The combined organic phase was dried over anhydrous Na$_2$SO$_4$, filtered and concentrated under reduce pressure. The residue was purified by silica gel column chromatography with a gradient elution of 1% MeOH/DCM to 5% MeOH/DCM to provide ethyl 7-morpholino-5-(3-(m-tolyl)-1H-pyrazol-1-yl)pyrazolo[1,5-a]pyrimidine-2-carboxylate (3.8 g, 8.8 mmol) as a white solid. LC-MS (ESI+): m/z 433 (MH$^+$). $^1$H NMR (300 MHZ, CDCl$_3$) δ 8.63 (d, J=2.7 Hz, 1H), 7.75-7.71 (m, 2H), 7.38-7.33 (m, 1H), 7.22-7.20 (m, 1H), 7.16 (s, 1H), 6.97 (s, 1H), 6.82 (d, J=2.7 Hz, 1H), 4.50-4.43 (m, 2H), 4.03-4.01 (m, 4H), 3.93-3.91 (m, 4H), 2.45 (s, 3H), 1.44 (t, J=7.2 Hz, 3H).

Intermediate F: 7-morpholino-5-(3-(m-tolyl)-1H-pyrazol-1-yl)pyrazolo[1,5-a]pyrimidine-2-carboxylic Acid

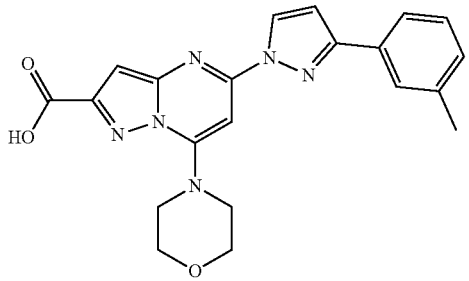 [SMILES: Cc1cccc(-c2ccn(-c3cc(N4CCOCC4)n4nc(C(=O)O)cc4n3)n2)c1]

To a solution of ethyl 7-morpholino-5-(3-(m-tolyl)-1H-pyrazol-1-yl)pyrazolo[1,5-a]pyrimidine-2-carboxylate (3.8 g, 8.8 mmol) in THF (160 mL) was added 2 N aqueous NaOH solution (30 mL). The reaction was heated to 40° C. for 3 h. Upon the completion of the reaction as indicated by TLC analysis, to the reaction mixture was added 1 M aqueous HCl solution until pH 4. The resulting solution was extracted with EtOAc (3×10 mL). The combined organic phase was dried over anhydrous $Na_2SO_4$, filtrated and concentrated under reduce pressure to provide ethyl 7-morpholino-5-(3-(m-tolyl)-1H-pyrazol-1-yl)pyrazolo[1,5-a]pyrimidine-2-carboxylic acid (Intermediate F, 3.5 g, 8.7 mmol) as a white solid. LC-MS (ESI+): m/z 405 (MH+). $^1$H NMR (300 MHz, DMSO-$d_6$) δ 8.73 (s, 1H), 7.83-7.80 (m, 2H), 7.38 (t, J=7.5 Hz, 1H), 7.24 (d, J=7.2 Hz, 1H), 7.15 (s, 1H), 7.10 (s, 1H), 6.90 (s, 1H), 3.89 (s, 8H), 2.40 (s, 3H).

Example 19: N-ethyl-7-morpholino-5-(3-(m-tolyl)-1H-pyrazol-1-yl)pyrazolo[1,5-a]pyrimidine-2-carboxamide

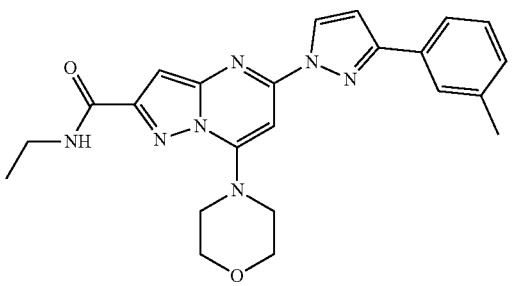 [SMILES: CCNC(=O)c1cc2nc(-n3ccc(-c4cccc(C)c4)n3)cc(N3CCOCC3)n2n1]

A solution of 7-morpholino-5-(3-(m-tolyl)-1H-pyrazol-1-yl)pyrazolo[1,5-a]pyrimidine-2-carboxylic acid (Intermediate F, 100 mg, 0.25 mmol), ethanamine hydrochloride (22.3 mg, 0.27 mmol), EDCI (118.8 mg, 0.62 mmol) and DMAP (76 mg, 0.62 mmol) in DCM was stirred at ambient temperature overnight. Upon the completion of the reaction as indicated by TLC analysis, the reaction mixture was concentrated directly and purified by silica gel column chromatography with a gradient elution of 2% MeOH/DCM to 3% MeOH/DCM to provide ethyl N-ethyl-7-morpholino-5-(3-(m-tolyl)-1H-pyrazol-1-yl)pyrazolo[1,5-a]pyrimidine-2-carboxamide (Compound 19, 58 mg, 0.13 mmol) as a yellow solid. LC-MS (ESI+): m/z 432 (MH+). $^1$H NMR (300 MHZ, CDCl$_3$) δ 8.64 (d, J=2.7 Hz, 1H), 7.75-7.71 (m, 2H), 7.35 (t, J=7.5 Hz, 1H), 7.22-7.20 (m, 1H), 7.18 (s, 1H), 7.02 (s, 1H), 6.94-6.83 (m, 1H), 6.82 (d, J=2.7 Hz, 1H), 4.05-4.02 (m, 4H), 3.92-3.83 (m, 4H), 3.60-3.49 (m, 2H), 2.45 (s, 3H), 1.29 (t, J=7.2 Hz, 3H).

Example 20: N-cyclopropyl-7-morpholino-5-(3-(m-tolyl)-1H-pyrazol-1-yl)pyrazolo[1,5-a]pyrimidine-2-carboxamide

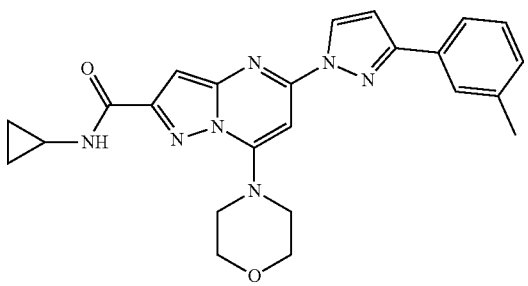 [SMILES: Cc1cccc(-c2ccn(-c3cc(N4CCOCC4)n4nc(C(=O)NC5CC5)cc4n3)n2)c1]

Compound 20 was prepared from Intermediate F and aminocyclopropane according to the method used for Example 19. LC-MS (ESI+): m/z 444 (MH+). $^1$H NMR (300 MHZ, CDCl$_3$) δ 8.64 (d, J=2.4 Hz, 1H), 7.75-7.71 (m, 2H), 7.35 (t, J=7.5 Hz, 1H), 7.22-7.20 (m, 1H), 7.18 (s, 1H), 7.02 (s, 2H), 6.83 (d, J=2.7 Hz, 1H), 4.03-4.01 (m, 4H), 3.84-3.82 (m, 4H), 2.94-2.90 (m, 1H), 2.45 (s, 3H), 0.94-0.88 (m, 2H), 0.72-0.69 (m, 2H).

Example 21: (R)—N-(1-cyclopropylethyl)-7-morpholino-5-(3-(m-tolyl)-1H-pyrazol-1-yl)pyrazolo[1,5-a]pyrimidine-2-carboxamide

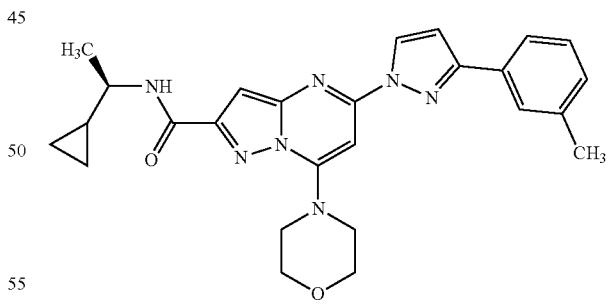

Compound 21 was prepared from Intermediate F and (R)-1-cyclopropylethylamine according to the procedure used for Example 19. LC-MS (ESI+): m/z 472 (MH+). $^1$H NMR (300 MHz, CDCl$_3$) δ 8.64 (d, J=2.4 Hz, 1H), 7.76-7.71 (m, 2H), 7.36 (t, J=7.5 Hz, 1H), 7.22-7.20 (m, 1H), 7.18 (s, 1H), 7.01 (s, 1H), 6.92 (d, J=7.8 Hz, 1H), 6.83 (d, J=2.7 Hz, 1H), 4.05-4.03 (m, 4H), 3.87-3.85 (m, 4H), 3.65-3.63 (m, 1H), 2.45 (s, 3H), 1.35 (d, J=6.6 Hz, 3H), 0.98-0.96 (m, 1H), 0.59-0.49 (m, 3H), 0.49-0.46 (m, 1H).

Example 22: (S)—N-(1-cyclopropylethyl)-7-morpholino-5-(3-(m-tolyl)-1H-pyrazol-1-yl)pyrazolo[1,5-a]pyrimidine-2-carboxamide

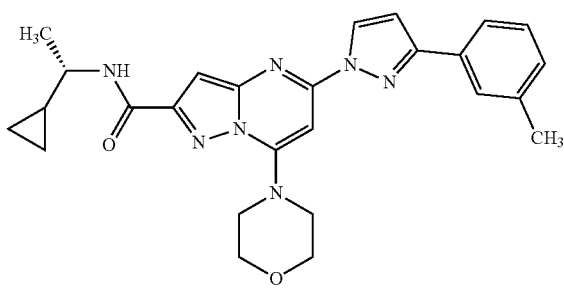 [SMILES: Cc1cccc(-c2ccn(-c3cc(N4CCOCC4)n4nc(C(=O)N[C@@H](C)C5CC5)cc4n3)n2)c1]

Compound 22 was prepared from Intermediate F and (S)-1-cyclopropylethylamine according to the procedure used for Example 19. LC-MS (ESI+): m/z 472 (MH+). ¹H NMR (300 MHz, CDCl$_3$) δ 8.64 (d, J=2.4 Hz, 1H), 7.76-7.71 (m, 2H), 7.36 (t, J=7.5 Hz, 1H), 7.22-7.20 (m, 1H), 7.18 (s, 1H), 7.01 (s, 1H), 6.92 (d, J=7.8 Hz, 1H), 6.83 (d, J=2.7 Hz, 1H), 4.05-4.03 (m, 4H), 3.87-3.85 (m, 4H), 3.65-3.63 (m, 1H), 2.45 (s, 3H), 1.35 (d, J=6.6 Hz, 3H), 0.98-0.96 (m, 1H), 0.59-0.49 (m, 3H), 0.49-0.46 (m, 1H).

Example 23: N-(2-methoxyethyl)-7-morpholino-5-(3-(m-tolyl)-1H-pyrazol-1-yl)pyrazolo[1,5-a]pyrimidine-2-carboxamide

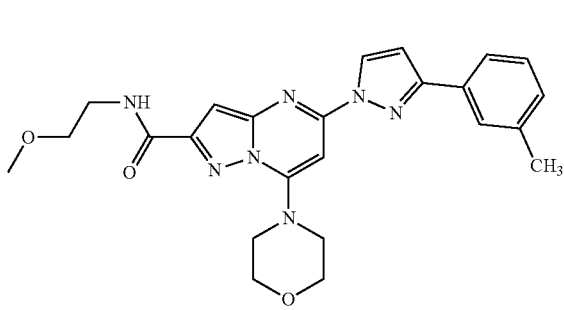 [SMILES: COCCNC(=O)c1cc2nc(-n3ccc(-c4cccc(C)c4)n3)cc(N3CCOCC3)n2n1]

Compound 23 was prepared from Intermediate F and 3-(methoxy)ethylamine according to the procedure used for Example 19. LC-MS (ESI+): m/z 462 (MH+). ¹H NMR (300 MHz, CDCl$_3$) δ 8.64 (d, J=2.7 Hz, 1H), 7.76-7.71 (m, 2H), 7.35 (t, J=7.5 HZ, 2H), 7.22-7.20 (m, 1H), 7.17 (s, 1H), 7.01 (s, 1H), 6.83 (d, J=2.7 Hz, 1H), 4.05-4.02 (m, 4H), 3.87-3.84 (m, 4H), 3.72-3.67 (m, 2H), 3.62-3.58 (m, 2H), 3.42 (s, 3H), 2.45 (s, 3H).

Example 24: N,N-dimethyl-7-morpholino-5-(3-(m-tolyl)-1H-pyrazol-1-yl)pyrazolo[1,5-a]pyrimidine-2-carboxamide

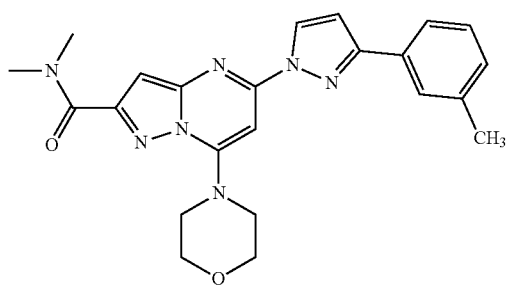 [SMILES: Cc1cccc(-c2ccn(-c3cc(N4CCOCC4)n4nc(C(=O)N(C)C)cc4n3)n2)c1]

Compound 24 was prepared from Intermediate F and dimethylamine according to the procedure used for Example 19. LC-MS (ESI+): m/z 432 (MH+). ¹H NMR (300 MHz, CDCl$_3$) δ 8.63 (d, J=2.4 Hz, 1H), 7.76-7.71 (m, 2H), 7.35 (t, J=7.5 HZ, 1H), 7.22-7.20 (m, 1H), 7.11 (s, 1H), 6.82 (d, J=2.7 Hz, 1H), 6.77 (s, 1H), 4.00-3.98 (m, 4H), 3.89-3.88 (m, 4H), 3.31 (s, 3H), 3.18 (s, 3H), 2.45 (s, 3H).

Example 25: N-ethyl-N-methyl-7-morpholino-5-(3-(m-tolyl)-1H-pyrazol-1-yl)pyrazolo[1,5-a]pyrimidine-2-carboxamide

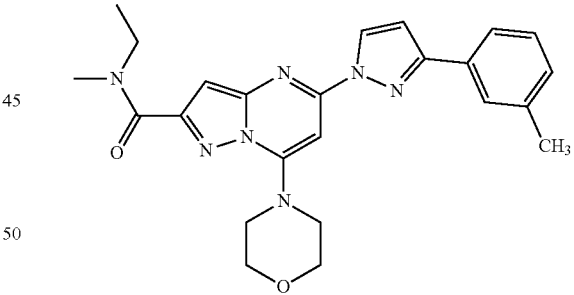

Compound 25 was prepared by N-methylation of Compound 19 according to the procedure used for Example 37. LC-MS (ESI+): m/z 446 (MH+). ¹H NMR (300 MHZ, CDCl$_3$) δ 8.63 (d, J=2.7 Hz, 1H), 7.76-7.71 (m, 2H), 7.35 (t, J=7.5 HZ, 1H), 7.22-7.20 (m, 1H), 7.11 (s, 1H), 6.82 (d, J=2.7 Hz, 1H), 6.78 (s, 1H), 4.02-3.98 (m, 4H), 3.92-3.88 (m, 4H), 3.69-3.64 (m, 2H), 3.28 (s, 1H), 3.14 (s, 2H), 2.45 (s, 3H), 1.32-1.28 (m, 3H).

Example 26: N-cyclopropyl-N-methyl-7-morpholino-5-(3-(m-tolyl)-1H-pyrazol-1-yl)pyrazolo[1,5-a]pyrimidine-2-carboxamide

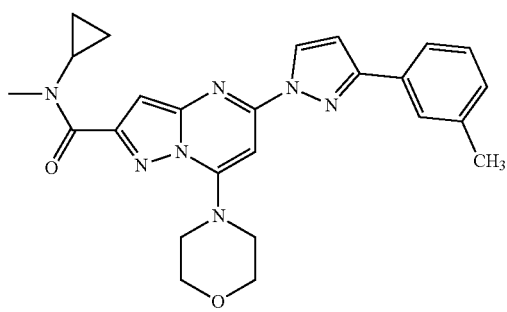 [SMILES: Cc1cccc(-c2ccn(-c3cc(N4CCOCC4)n4nc(C(=O)N(C)C5CC5)cc4n3)n2)c1]

Compound 26 was prepared from Intermediate F and N-methyl(cyclopropyl)amine according to the method used for Example 19. LC-MS (ESI+): m/z 458 (MH+). $^1$H NMR (300 MHZ, CDCl$_3$) δ 8.63 (d, J=2.7 Hz, 1H), 7.76-7.71 (m, 2H), 7.35 (t, J=7.5 HZ, 1H), 7.21 (d, J=7.2 HZ, 1H), 7.10 (s, 1H), 6.82 (d, J=2.4 HZ, 1H), 6.74 (s, 1H), 3.99-3.98 (m, 4H), 3.89-3.88 (m, 4H), 3.17 (s, 3H), 3.03-2.96 (m, 1H), 2.45 (s, 3H), 0.88-0.82 (m, 1H), 0.80-0.59 (m, 3H).

Example 27: N-(cyclopropylmethyl)-7-morpholino-5-(3-(m-tolyl)-1H-pyrazol-1-yl)pyrazolo[1,5-a]pyrimidine-2-carboxamide

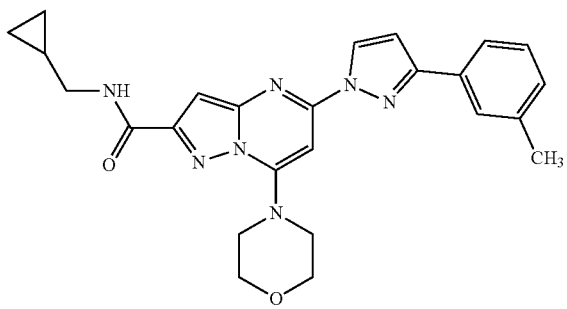 [SMILES: Cc1cccc(-c2ccn(-c3cc(N4CCOCC4)n4nc(C(=O)NCC5CC5)cc4n3)n2)c1]

Compound 27 was prepared by reaction of Intermediate F with N-(cyclopropylmethyl)amine according to the coupling procedure used for Example 19. LC-MS (ESI+): m/z 458 (MH+). $^1$H NMR (300 MHz, CDCl$_3$) δ 8.64 (d, J=2.7 Hz, 1H), 7.76-7.71 (m, 2H), 7.36 (t, J=7.5 HZ, 1H), 7.22-7.20 (m, 1H), 7.18 (s, 1H), 7.08-7.06 (m, 1H), 7.02 (s, 1H), 6.83 (d, J=2.7 Hz, 1H), 4.05-4.03 (m, 4H), 3.88-3.85 (m, 4H), 3.37 (t, J=6.6 HZ, 1H), 2.45 (s, 3H), 1.11-1.09 (m, 1H), 0.59-0.57 (m, 2H), 0.33-0.31 (m, 2H).

Example 28: azetidin-1-yl(7-morpholino-5-(3-(m-tolyl)-1H-pyrazol-1-yl)pyrazolo[1,5-a]pyrimidin-2-yl)methanone Compound 28 was prepared from azetidine and Intermediate F according to the coupling procedure used for Example 19. LC-MS (ESI+): m/z 444 (MH+). $^1$H NMR (300 MHZ, CDCl$_3$) δ 8.64 (d, J=2.7 Hz, 1H), 7.83-7.66 (m, 2H), 7.35 (t, J=7.5 HZ, 1H), 7.22-7.20 (m, 1H), 7.13 (s, 1H), 6.98 (s, 1H), 6.82 (d, J=2.4 Hz, 1H), 4.65 (t, J=7.5 HZ, 2H), 4.28 (t, J=7.5 HZ, 1H), 4.01-3.98 (m, 4H), 3.88-3.85 (m, 4H), 2.45-2.37 (m, 5H).

Example 29: (7-morpholino-5-(3-(m-tolyl)-1H-pyrazol-1-yl)pyrazolo[1,5-a]pyrimidin-2-yl) (pyrrolidin-1-yl)methanone

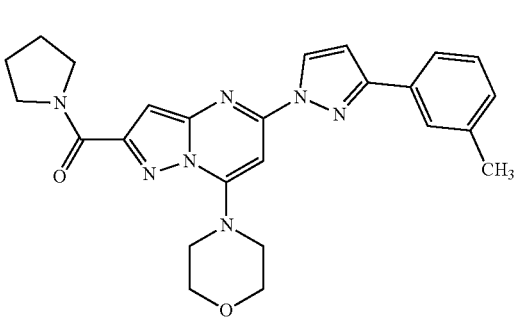 [SMILES: Cc1cccc(-c2ccn(-c3cc(N4CCOCC4)n4nc(C(=O)N5CCCC5)cc4n3)n2)c1]

Compound 29 was prepared by the same procedure used for Example 19 by reaction of Intermediate F with pyrrolidine. LC-MS (ESI+): m/z 458 (MH+). $^1$H NMR (300 MHZ, CDCl$_3$) δ 8.64 (d, J=2.7 Hz, 1H), 7.76-7.71 (m, 2H), 7.35 (t, J=7.5 HZ, 1H), 7.22-7.20 (m, 1H), 7.12 (s, 1H), 6.94 (s, 1H), 6.82 (d, J=2.4 Hz, 1H), 4.00-3.88 (m, 10H), 3.76-3.71 (m, 2H), 2.45 (s, 3H), 1.98-1.94 (m, 4H).

Example 30: (7-morpholino-5-(3-(m-tolyl)-1H-pyrazol-1-yl)pyrazolo[1,5-a]pyrimidin-2-yl)(piperidin-1-yl)methanone

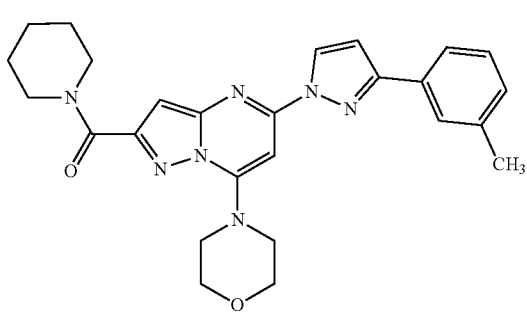 [SMILES: Cc1cccc(-c2ccn(-c3cc(N4CCOCC4)n4nc(C(=O)N5CCCCC5)cc4n3)n2)c1]

Compound 30 was prepared by the same procedure used for Example 19 by reaction of Intermediate F with piperidine. LC-MS (ESI+): m/z 472 (MH+). $^1$H NMR (300 MHz, CDCl$_3$) δ 8.63 (d, J=2.7 Hz, 1H), 7.76-7.71 (m, 2H), 7.35 (t, J=7.5 HZ, 1H), 7.21 (t, J=7.5 HZ, 1H), 7.10 (s, 1H), 6.82 (d, J=2.4 Hz, 1H), 6.71 (s, 1H), 4.00-3.98 (m, 4H), 3.90-3.88 (m, 4H), 3.80-3.76 (m, 4H), 2.45 (s, 3H), 1.80-1.60 (m, 6H).

Example 31: morpholino (7-morpholino-5-(3-(m-tolyl)-1H-pyrazol-1-yl)pyrazolo[1,5-a]pyrimidin-2-yl)methanone

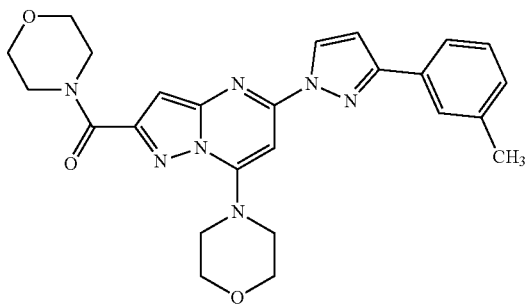 [SMILES: Cc1cccc(-c2ccn(-c3cc(N4CCOCC4)n4nc(C(=O)N5CCOCC5)cc4n3)n2)c1]

Compound 31 was prepared by the same procedure used for Example 19 by reaction of Intermediate F with morpholine. LC-MS (ESI+): m/z 474 (MH+). $^1$H NMR (300 MHz, CDCl$_3$) δ 8.63 (d, J=2.4 Hz, 1H), 7.76-7.71 (m, 2H), 7.36 (t, J=7.5 HZ, 1H), 7.23-7.20 (m, 1H), 7.13 (s, 1H), 6.83 (d, J=2.4 Hz, 1H), 6.77 (s, 1H), 4.00-3.97 (m, 6H), 3.90-3.86 (m, 8H), 3.80-3.76 (m, 2H), 2.45 (s, 3H).

Example 32: (4-methylpiperazin-1-yl) (7-morpholino-5-(3-(m-tolyl)-1H-pyrazol-1-yl)pyrazolo[1,5-a]pyrimidin-2-yl)methanone

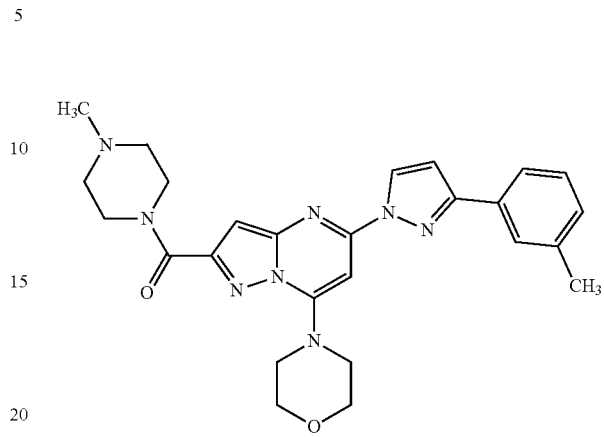

Compound 32 was prepared by the same procedure used for Example 19 by reaction of Intermediate F with N-(methyl) piperidine. LC-MS (ESI+): m/z 487 (MH+). $^1$H NMR (300 MHZ, CDCl$_3$) δ 8.63 (d, J=2.7 Hz, 1H), 7.76-7.71 (m, 2H), 7.35 (t, J=7.5 HZ, 1H), 7.21 (t, J=7.5 HZ, 1H), 7.11 (s, 1H), 6.83 (d, J=2.4 Hz, 1H), 6.75 (s, 1H), 3.99-3.96 (m, 4H), 3.92-3.87 (m, 8H), 2.60-2.54 (m, 2H), 2.50-2.45 (m, 5H), 2.35 (s, 3H).

Example 33: N-methoxy-N-methyl-7-morpholino-5-(3-(m-tolyl)-1H-pyrazol-1-yl)pyrazolo[1,5-a]pyrimidine-2-carboxamide

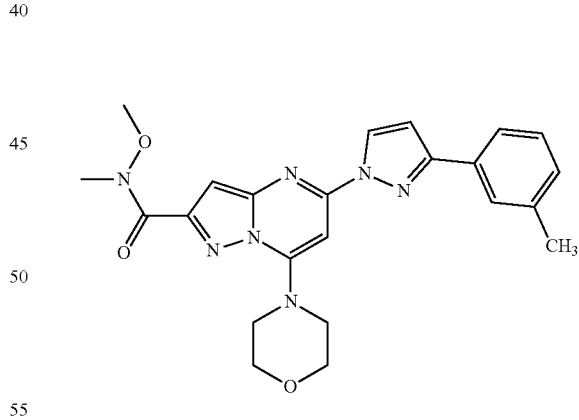

Compound 33 was prepared by the same procedure used for Example 19 by reaction of Intermediate F with N-methoxy-N-methylamine. LC-MS (ESI+): m/z 448 (MH+). $^1$H NMR (300 MHz, CDCl$_3$) δ 8.63 (d, J=2.7 Hz, 1H), 7.76-7.71 (m, 2H), 7.36 (t, J=7.5 HZ, 1H), 7.21 (t, J=7.2 HZ, 1H), 7.14 (s, 1H), 6.92 (s, 1H), 6.82 (d, J=2.7 Hz, 1H), 4.13-4.11 (m, 4H), 4.00-3.99 (m, 4H), 3.82 (s, 3H), 3.48 (s, 3H), 2.45 (s, 3H).

Example 34: N-methoxy-7-morpholino-5-(3-(m-tolyl)-1H-pyrazol-1-yl)pyrazolo[1,5-a]pyrimidine-2-carboxamide

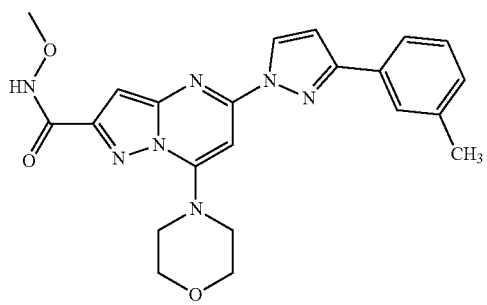 [SMILES: CONC(=O)c1cc2nc(-n3ccc(-c4cccc(C)c4)n3)cc(N3CCOCC3)n2n1]

Compound 34 was prepared by the same procedure used for Example 19 by reaction of Intermediate F with N-methoxylamine. LC-MS (ESI+): m/z 434 (MH+). $^1$H NMR (300 MHZ, CDCl$_3$) δ 9.39 (s, 1H), 8.64 (d, J=2.7 Hz, 1H), 7.76-7.71 (m, 2H), 7.36 (t, J=7.5 HZ, 1H), 7.23-7.19 (m, 2H), 7.04 (s, 1H), 6.83 (d, J=2.4 Hz, 1H), 4.05-4.02 (m, 4H), 3.96 (s, 3H), 3.84-3.83 (m, 4H), 2.45 (s, 3H).

Example 35: N-(methylsulfonyl)-7-morpholino-5-(3-(m-tolyl)-1H-pyrazol-1-yl)pyrazolo[1,5-a]pyrimidine-2-carboxamide

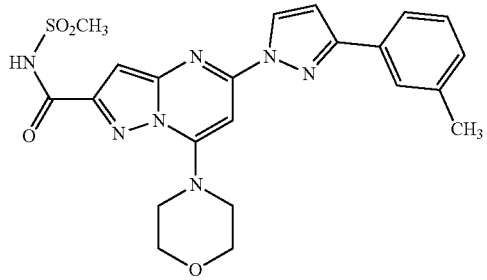 [SMILES: Cc1cccc(-c2ccn(-c3cc(N4CCOCC4)n4nc(C(=O)NS(C)(=O)=O)cc4n3)n2)c1]

Compound 35 was prepared by the same procedure used for Example 19 by reaction of Intermediate F with methylsulfonamide. LC-MS (ESI+): m/z 482 (MH+). $^1$H NMR (300 MHZ, CDCl$_3$) δ 9.09 (s, 1H), 8.62 (d, J=2.7 Hz, 1H), 7.75-7.71 (m, 2H), 7.36 (t, J=7.5 HZ, 1H), 7.25-7.21 (m, 2H), 7.09 (s, 1H), 6.84 (d, J=2.7 Hz, 1H), 4.05-4.02 (m, 4H), 3.83-3.82 (m, 4H), 3.47 (s, 3H), 2.45 (s, 3H).

Example 36: N-cyclopentyl-7-morpholino-5-(3-(m-tolyl)-1H-pyrazol-1-yl)pyrazolo[1,5-a]pyrimidine-2-carboxamide

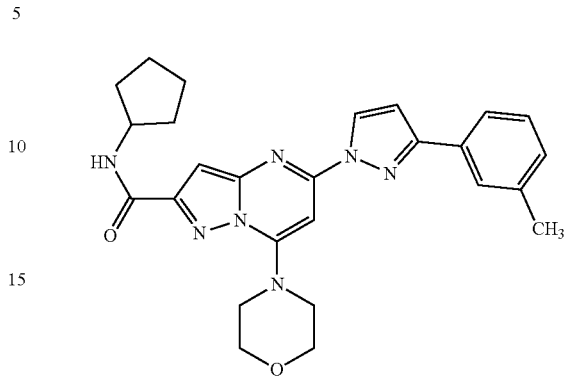

Compound 36 was prepared by the same procedure used for Example 19 by reaction of Intermediate F with cyclopentylamine. LC-MS (ESI+): m/z 472 (MH+). $^1$H NMR (300 MHZ, CDCl$_3$) δ 8.64 (d, J=2.7 Hz, 1H), 7.76-7.71 (m, 2H), 7.35 (t, J=7.5 Hz, 1H), 7.22-7.20 (m, 1H), 7.17 (s, 1H), 7.00 (s, 1H), 6.89 (d, J=7.5 Hz, 1H), 6.83 (d, J=2.4 Hz, 1H), 4.45-4.43 (m, 1H), 4.03-4.02 (m, 4H), 3.85-3.84 (m, 4H), 2.45 (s, 3H), 2.14-2.09 (m, 2H), 1.76-1.71 (m, 4H), 1.60-1.56 (m, 2H).

Example 37: N-cyclopentyl-N-methyl-7-morpholino-5-(3-(m-tolyl)-1H-pyrazol-1-yl)pyrazolo[1,5-a]pyrimidine-2-carboxamide

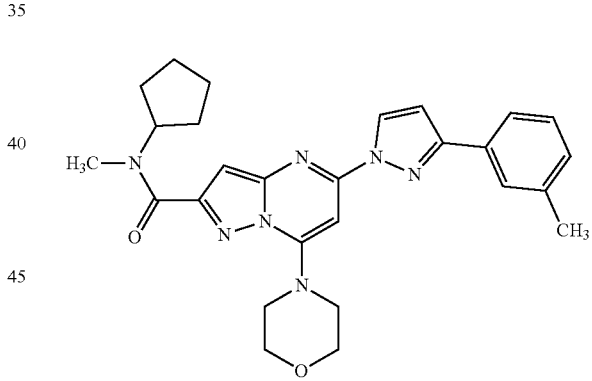

To a solution of N-cyclopentyl-7-morpholino-5-(3-(m-tolyl)-1H-pyrazol-1-yl)pyrazolo[1,5-a]pyrimidine-2-carboxamide (Compound 36, 55 mg, 0.11 mmol) in DMF (5 mL) at 0° C. was added NaH (10 mg, 0.24 mmol). After stirring at that temperature for 0.5 h, iodomethane (25 mg, 0.17 mmol) was added to the above solution. Upon the completion of the reaction as indicated by TLC analysis, the reaction mixture was quenched with water (20 mL) and extracted with DCM/MeOH (15:1, 3×10 mL). The combined organic phase was dried over anhydrous Na$_2$SO$_4$, filtrated and concentrated under reduce pressure. The residue was purified by silica gel column chromatography with a gradient elution of 1% MeOH/DCM to 5% MeOH/DCM to provide N-cyclopentyl-N-methyl-7-morpholino-5-(3-(m-tolyl)-1H-pyrazol-1-yl)pyrazolo[1,5-a]pyrimidine-2-carboxamide (Compound 37, 30 mg, 0.062 mmol) as a white solid. LC-MS (ESI+): m/z 486 (MH+). $^1$H NMR (300 MHz, CDCl$_3$) δ 8.63 (d, J=2.7 Hz, 1H), 7.76-7.71 (m, 2H), 7.35 (t, J=7.5 Hz, 1H), 7.21 (d, J=7.5 Hz, 1H), 7.10 (s, 1H), 6.82 (d, J=2.7 Hz, 1H), 6.71 (s, 1H), 4.76-7.71 (m, 1H), 4.03-4.02 (m, 4H), 3.89-3.87 (m, 4H), 3.11 (s, 1H), 3.03 (s, 2H), 2.45 (s, 3H), 2.02-1.52 (m, 8H).

Example 38: N-isopropyl-7-morpholino-5-(3-(m-tolyl)-1H-pyrazol-1-yl)pyrazolo[1,5-a]pyrimidine-2-carboxamide

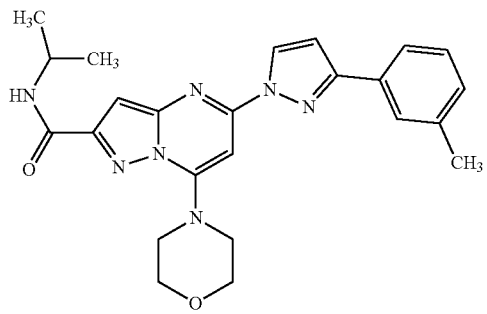 [SMILES: Cc1cccc(-c2ccn(-c3cc(N4CCOCC4)n4nc(C(=O)NC(C)C)cc4n3)n2)c1]

Compound 38 was prepared by the same procedure used for Example 19 by reaction of Intermediate F with isopropylamine. LC-MS (ESI+): m/z 446 (MH$^+$). $^1$H NMR (300 MHz, CDCl$_3$) δ 8.64 (d, J=2.7 Hz, 1H), 7.76-7.71 (m, 2H), 7.35 (t, J=7.5 Hz, 1H), 7.22-7.20 (m, 1H), 7.17 (s, 1H), 7.01 (s, 1H), 6.83 (d, J=2.7 Hz, 1H), 6.75 (d, J=8.1 Hz, 1H), 4.36-4.27 (m, 1H), 4.04-4.03 (m, 4H), 3.86-3.84 (m, 4H), 2.45 (s, 3H), 1.31 (d, J=6.6 Hz, 6H).

Example 39: N-(1,3-dimethoxypropan-2-yl)-7-morpholino-5-(3-(m-tolyl)-1H-pyrazol-1-yl)pyrazolo[1,5-a]pyrimidine-2-carboxamide

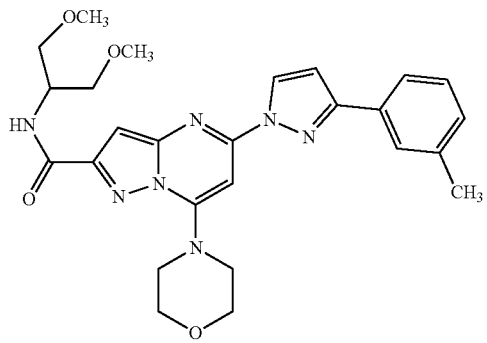 [SMILES: COCC(COC)NC(=O)c1cc2nc(-n3ccc(-c4cccc(C)c4)n3)cc(N3CCOCC3)n2n1]

Compound 39 was prepared by the same procedure used for Example 19 by reaction of Intermediate F with N-(1,3-dimethoxypropan-2-yl)amine. LC-MS (ESI+): m/z 506 (MH$^+$). $^1$H NMR (300 MHz, CDCl$_3$) δ 8.64 (d, J=2.7 Hz, 1H), 7.76-7.71 (m, 2H), 7.44 (d, J=8.4 Hz, 1H), 7.35 (t, J=7.5 Hz, 1H), 7.22-7.20 (m, 1H), 7.17 (s, 1H), 7.00 (s, 1H), 6.83 (d, J=2.4 Hz, 1H), 4.42-4.40 (m, 1H), 4.04-4.02 (m, 4H), 3.87-3.85 (m, 4H), 3.69-3.64 (m, 2H), 3.57-3.52 (m, 2H), 3.43 (s, 6H), 2.45 (s, 3H).

Example 40: N-(2-(dimethylamino)ethyl)-7-morpholino-5-(3-(m-tolyl)-1H-pyrazol-1-yl)pyrazolo[1,5-a]pyrimidine-2-carboxamide

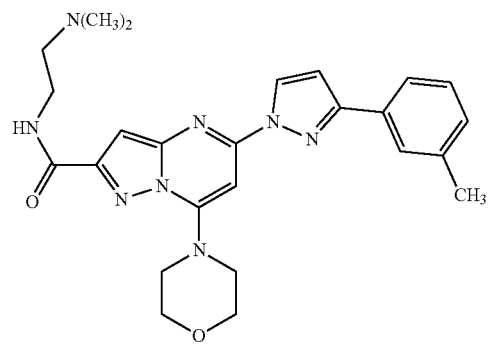 [SMILES: Cc1cccc(-c2ccn(-c3cc(N4CCOCC4)n4nc(C(=O)NCCN(C)C)cc4n3)n2)c1]

Compound 40 was prepared by the same procedure used for Example 19 by reaction of Intermediate F with N-(2-(dimethylamino)ethyl)amine. LC-MS (ESI+): m/z 475 (MH$^+$). $^1$H NMR (300 MHz, CD$_3$OD) δ 8.66 (d, J=2.7 Hz, 1H), 7.79 (s, 1H), 7.40 (d, J=7.5 Hz, 1H), 7.34 (t, J=7.5 Hz, 1H), 7.23-7.20 (m, 2H), 6.97 (d, J=2.7 Hz, 1H), 6.92 (s, 1H), 3.98-3.95 (m, 8H), 3.83-3.79 (m, 2H), 3.37-3.35 (m, 2H), 2.95 (s, 6H), 2.43 (s, 3H).

Example 41: N-(4-(dimethylamino)butyl)-7-morpholino-5-(3-(m-tolyl)-1H-pyrazol-1-yl)pyrazolo[1,5-a]pyrimidine-2-carboxamide

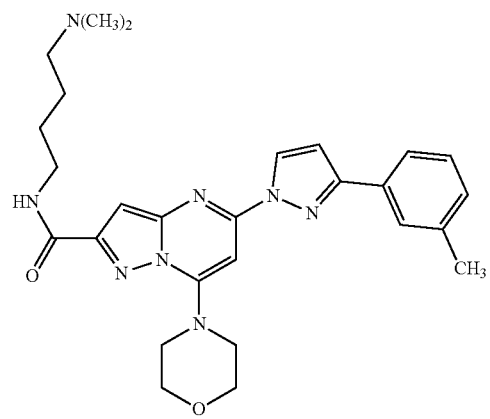 [SMILES: Cc1cccc(-c2ccn(-c3cc(N4CCOCC4)n4nc(C(=O)NCCCCN(C)C)cc4n3)n2)c1]

Compound 41 was prepared by the same procedure used for Example 19 by reaction of Intermediate F with N-(4-(dimethylamino)butyl)amine. LC-MS (ESI+): m/z 503 (MH$^+$). $^1$H NMR (300 MHz, CDCl$_3$) δ 8.63 (d, J=2.7 Hz, 1H), 7.76-7.71 (m, 2H), 7.41-7.33 (m, 2H), 7.22-7.20 (m, 1H), 7.17 (s, 1H), 7.00 (s, 1H), 6.83 (d, J=2.7 Hz, 1H), 4.05-4.03 (m, 4H), 3.88-3.86 (m, 4H), 3.58-3.52 (m, 2H), 2.82-2.80 (m, 2H), 2.60 (s, 6H), 2.43 (s, 3H), 1.81-1.79 (m, 4H).

Example 42: 7-morpholino-N-(oxetan-3-yl)-5-(3-(m-tolyl)-1H-pyrazol-1-yl)pyrazolo[1,5-a]pyrimidine-2-carboxamide

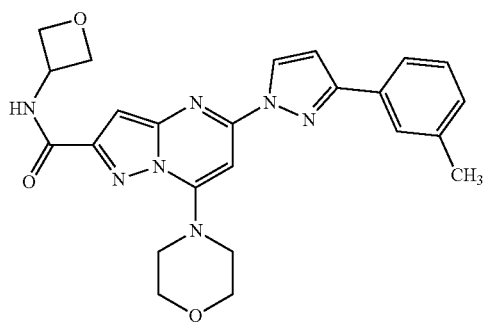 [SMILES: Cc1cccc(-c2ccn(-c3cc(N4CCOCC4)n4nc(C(=O)NC5COC5)cc4n3)n2)c1]

Compound 42 was prepared by the same procedure used for Example 19 by reaction of Intermediate F with N-(oxetan-3-yl)amine. LC-MS (ESI+): m/z 460 (MH+). $^1$H NMR (300 MHZ, CDCl$_3$) δ 8.63 (d, J=2.7 Hz, 1H), 7.76-7.71 (m, 2H), 7.42-7.33 (m, 2H), 7.22-7.20 (m, 2H), 7.01 (s, 1H), 6.83 (d, J=2.4 Hz, 1H), 5.36-5.26 (m, 1H), 5.06 (t, J=7.2 Hz, 2H), 4.68 (t, J=6.6 Hz, 2H), 4.07-4.04 (m, 4H), 3.86-3.85 (m, 4H), 2.45 (s, 3H).

Example 43: 7-morpholino-N-(oxetan-3-ylmethyl)-5-(3-(m-tolyl)-1H-pyrazol-1-yl)pyrazolo[1,5-a]pyrimidine-2-carboxamide

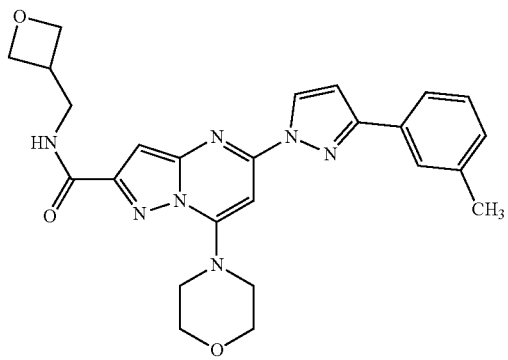 [SMILES: Cc1cccc(-c2ccn(-c3cc(N4CCOCC4)n4nc(C(=O)NCC5COC5)cc4n3)n2)c1]

Compound 43 was prepared by the same procedure used for Example 19 by reaction of Intermediate F with N-(oxetan-3-ylmethyl)amine. LC-MS (ESI+): m/z 474 (MH+). $^1$H NMR (300 MHz, CDCl$_3$) δ 8.64 (d, J=2.7 Hz, 1H), 7.76-7.71 (m, 2H), 7.35 (t, J=7.5 Hz, 1H), 7.22-7.20 (m, 3H), 7.01 (s, 1H), 6.83 (d, J=2.4 Hz, 1H), 4.87 (t, J=7.5 Hz, 2H), 4.52 (t, J=6.0 Hz, 2H), 4.03-4.01 (m, 4H), 3.85-3.78 (m, 6H), 3.40-3.30 (m, 1H), 2.45 (s, 3H).

Example 44: N-((3-(hydroxymethyl) oxetan-3-yl) methyl)-7-morpholino-5-(3-(m-tolyl)-1H-pyrazol-1-yl)pyrazolo[1,5-a]pyrimidine-2-carboxamide

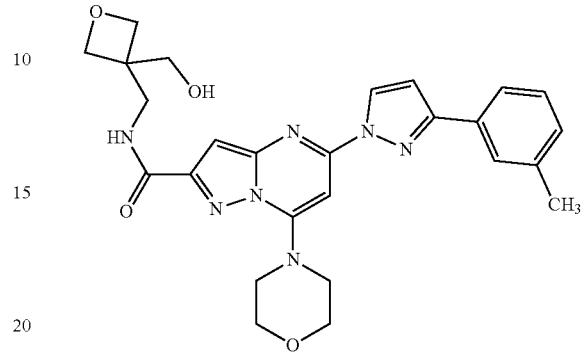

Compound 44 was prepared by the same procedure used for Example 19 by reaction of Intermediate F with N-((3-(hydroxymethyl) oxetan-3-yl)methyl)amine. LC-MS (ESI+): m/z 504 (MH+). $^1$H NMR (300 MHz, DMSO-d$_6$) δ 8.73 (d, J=2.7 Hz, 1H), 8.67-8.64 (m, 1H), 7.83-7.80 (m, 2H), 7.38 (t, J=7.5 Hz, 1H), 7.23 (d, J=7.8 Hz, 1H), 7.15 (d, J=2.7 Hz, 1H), 7.08 (s, 1H), 6.84 (s, 1H), 5.12 (t, J=7.8 HZ, 1H), 4.42 (d, J=5.7 Hz, 2H), 4.30 (d, J=6.0 Hz, 2H), 3.89 (s, 8H), 3.68 (d, J=5.1 Hz, 2H), 3.60 (d, J=5.4 Hz, 2H), 2.40 (s, 3H).

Example 45: (7-morpholino-5-(3-(m-tolyl)-1H-pyrazol-1-yl)pyrazolo[1,5-a]pyrimidin-2-yl) (2-oxa-6-azaspiro[3.3]heptan-6-yl)methanone

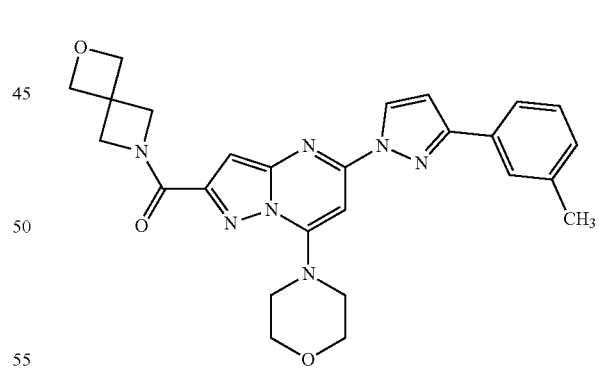

Compound 45 was prepared by the same procedure used for Example 19 by reaction of Intermediate F with 2-oxa-6-azaspiro[3.3]heptane. LC-MS (ESI+): m/z 486 (MH+). $^1$H NMR (300 MHz, CDCl$_3$) δ 8.64 (d, J=2.7 Hz, 1H), 7.76-7.71 (m, 2H), 7.35 (t, J=7.5 Hz, 1H), 7.22-7.20 (m, 1H), 7.15 (s, 1H), 6.97 (s, 1H), 6.83 (d, J=2.4 Hz, 1H), 4.91-4.83 (m, 4H), 4.78 (s, 2H), 4.39 (s, 2H), 4.04-4.02 (m, 4H), 3.88-3.87 (m, 4H), 2.45 (s, 3H).

Example 46: (7-morpholino-5-(3-(m-tolyl)-1H-pyrazol-1-yl)pyrazolo[1,5-a]pyrimidin-2-yl) (6-oxa-1-azaspiro[3.3]heptan-1-yl)methanone

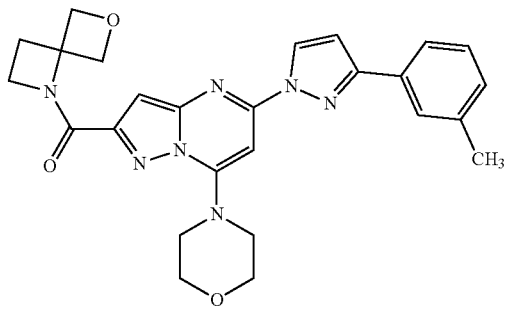 [SMILES: Cc1cccc(-c2ccn(-c3cc(N4CCOCC4)n4nc(C(=O)N5CCC56COC6)cc4n3)n2)c1]

Compound 46 was prepared by the same procedure used for Example 19 by reaction of Intermediate F with 6-oxa-1-azaspiro[3.3]heptane. LC-MS (ESI+): m/z 486 (MH+). $^1$H NMR (300 MHz, CDCl$_3$) δ 8.64 (d, J=2.7 Hz, 1H), 7.76-7.71 (m, 2H), 7.35 (t, J=7.5 Hz, 1H), 7.22-7.20 (m, 1H), 7.15 (s, 1H), 7.02 (s, 1H), 6.83 (d, J=2.7 Hz, 1H), 5.69 (d, J=6.6 Hz, 2H), 4.69 (d, J=6.6 Hz, 2H), 4.50 (t, J=7.5 Hz, 2H), 3.99-3.97 (m, 4H), 3.88-3.84 (m, 4H), 2.69 (t, J=7.2 Hz, 2H), 2.45 (s, 3H).

Example 47: 7-morpholino-N-(oxetan-3-yloxy)-5-(3-(m-tolyl)-1H-pyrazol-1-yl)pyrazolo[1,5-a]pyrimidine-2-carboxamide

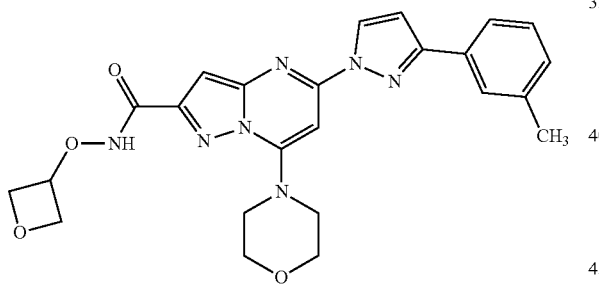

Synthesis of 2-(oxetan-3-yloxy) isoindoline-1,3-dione

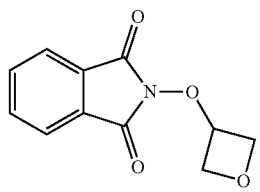 [SMILES: O=C1c2ccccc2C(=O)N1OC1COC1]

To a solution of 2-hydroxyisoindoline-1,3-dione (4.84 g, 27 mmol) in THF (120 mL) at 0° C. was added PPh$_3$ (8.5 g, 32.4 mmol), DEAD (6.56 g, 32.4 mmol) and oxetan-3-ol (2 g, 29.7 mmol). The reaction was heated to 30° C. overnight. Upon the completion of the reaction as indicated by TLC analysis, the reaction mixture was quenched with NH$_4$Cl aqueous solution and extracted with EtOAc (3×30 mL). The combined organic phase was dried over anhydrous Na$_2$SO$_4$, filtrated and concentrated under reduce pressure. The residue was purified by silica gel column chromatography with a gradient elution of 25% EtOAc/PE to 33% EtOAc/PE to provide impure 2-(oxetan-3-yloxy) isoindoline-1,3-dione (2.3 g, 10.5 mmol) as a white solid. The purity was about 10%. LC-MS (ESI+): m/z 220 (MH+).

Synthesis of O-(oxetan-3-yl)hydroxylamine

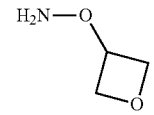

To a solution of impure 2-(oxetan-3-yloxy) isoindoline-1,3-dione (1 g, 0.5 mmol) in MeOH (75 mL) was added NH$_2$NH$_2$·H$_2$O (229 mg, 4.58 mmol). The reaction mixture was heated to 65° C. and stirred at that temperature for 1.5 h. The reaction mixture was concentrated directly. To the residue was added EtOAc (10 mL) and a large amount of solid was precipitated. After filtration, the filtrate was concentrated to provide crude O-(oxetan-3-yl)hydroxylamine (400 mg, 4.49 mmol). The crude product was used directly for the next step without further purification.

Synthesis of 7-morpholino-N-(oxetan-3-yloxy)-5-(3-(m-tolyl)-1H-pyrazol-1-yl)pyrazolo[1,5-a]pyrimidine-2-carboxamide

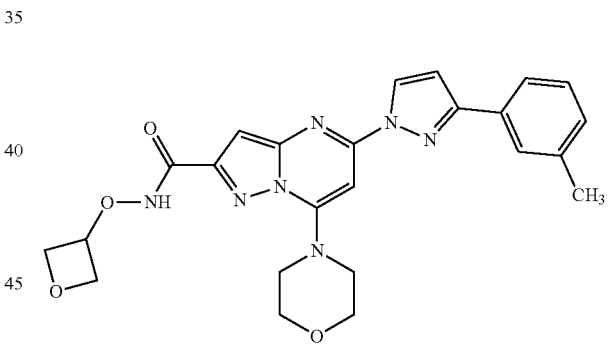

A solution of ethyl 7-morpholino-5-(3-(m-tolyl)-1H-pyrazol-1-yl)pyrazolo[1,5-a]pyrimidine-2-carboxylic acid (100 mg, 0.25 mmol), crude O-(oxetan-3-yl)hydroxylamine (400 mg, 4.49 mmol), EDCl (154 mg, 0.80 mmol) and DMAP (98 mg, 0.80 mmol) in DCM was stirred at room temperature overnight. Upon the completion of the reaction as indicated by TLC analysis, the reaction mixture was concentrated directly and purified by silica gel column chromatography with a gradient elution of 2% MeOH/DCM to 3% MeOH/DCM to provide 7-morpholino-N-(oxetan-3-yloxy)-5-(3-(m-tolyl)-1H-pyrazol-1-yl)pyrazolo[1,5-a]pyrimidine-2-carboxamide (Compound 47, 19 mg, 0.04 mmol). LC-MS (ESI+): m/z 476 (MH+). $^1$H NMR (300 MHz, DMSO-d$_6$) δ 12.08 (s, 1H), 8.72 (d, J=2.7 Hz, 1H), 7.82-7.80 (m, 2H), 7.38 (t, J=6.9 Hz, 1H), 7.23 (d, J=7.8 Hz, 1H), 7.15 (d, J=2.7 Hz, 1H), 7.08 (s, 1H), 6.85 (s, 1H), 5.11-5.08 (m, 1H), 4.78-4.74 (m, 2H), 4.69-4.65 (m, 2H), 3.89 (s, 8H), 2.40 (s, 3H).

General Procedure 1

Compound 48: N-[(3S)-1-methylpyrrolidin-3-yl]-7-morpholino-5-[3-(m-tolyl)pyrazol-1-yl]pyrazolo[1,5-a]pyrimidine-2-carboxamide

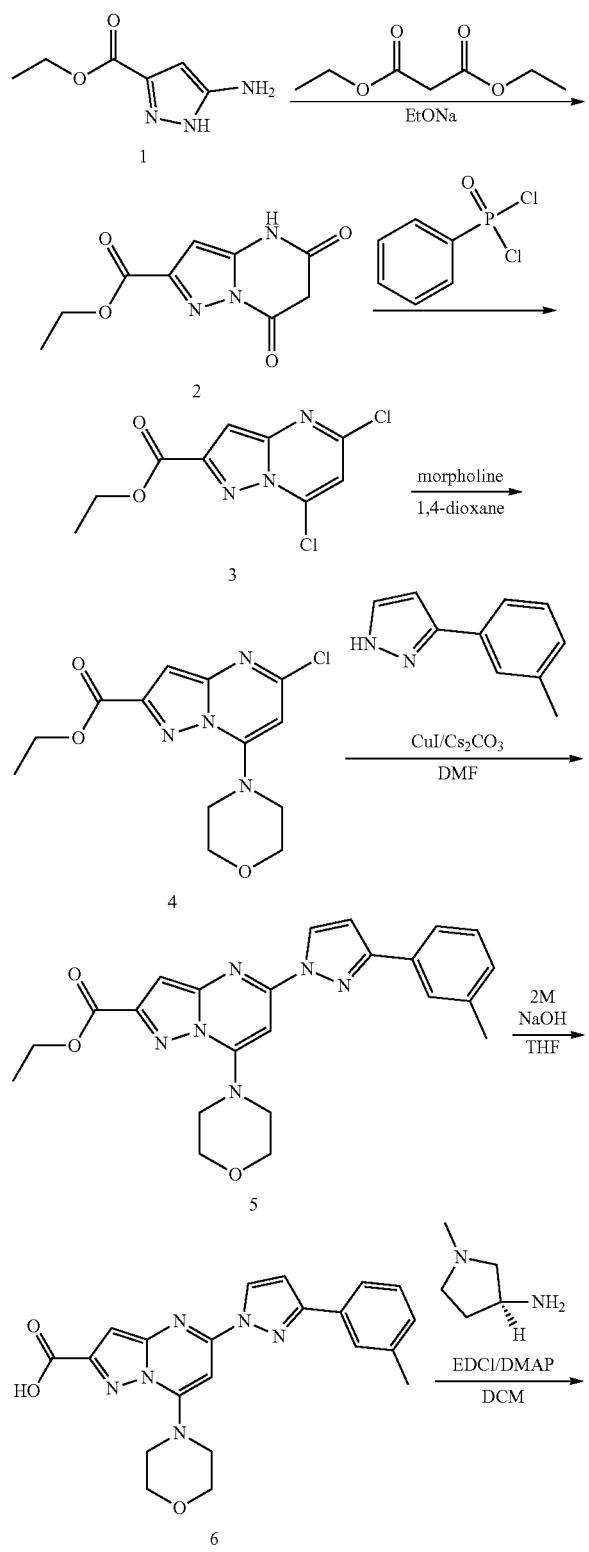

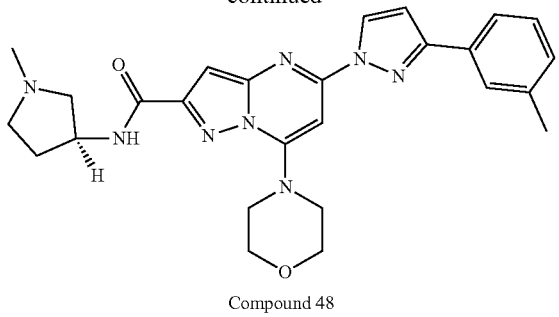

Compound 48

Synthesis of ethyl 5,7-dioxo-4,5,6,7-tetrahydropyrazolo[1,5-a]pyrimidine-2-carboxylate

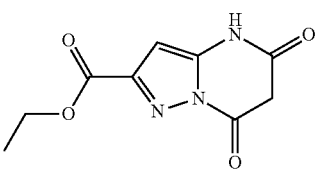 [SMILES: CCOC(=O)c1cc2n(n1)C(=O)CC(=O)N2]

To a solution of anhydrous EtOH (10 mL) was added small pieces of sodium (890 mg, 38.7 mmol) at rt carefully. After all the sodium was dissolved, the solution was concentrated to provide fresh NaOEt as white solid. The fresh prepared NaOEt was added to a mixture of diethyl malonate (40 mL) and ethyl 5-amino-1H-pyrazole-3-carboxylate (2 g, 12.9 mmol). The mixture was heated to 120° C. and stirred at that temperature overnight. After the reaction mixture was cooled to rt, a large amount of solid was precipitated. After filtration, the filter cake was washed with ether twice to provide ethyl 5,7-dioxo-4,5,6,7-tetrahydropyrazolo[1,5-a]pyrimidine-2-carboxylate (5.92 g, 26.5 mmol) as a yellow solid. The crude product was used directly for the next step without further purification. LC-MS (ESI+): m/z 224 (MH$^+$).

Synthesis of ethyl 5,7-dichloropyrazolo[1,5-a]pyrimidine-2-carboxylate

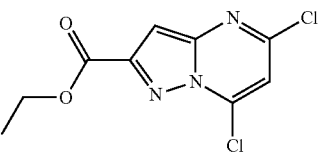 [SMILES: CCOC(=O)c1cc2nc(Cl)cc(Cl)n2n1]

A solution of crude ethyl 5,7-dioxo-4,5,6,7-tetrahydropyrazolo[1,5-a]pyrimidine-2-carboxylate (5.92 g, 26.5 mmol) in phenylphosphonic dichloride (15 mL) was heated to 120° C. overnight. The reaction mixture was quenched with saturated NaHCO$_3$ solution until the pH=8. The aqueous solution was extracted with DCM/MeOH (15:1, 6×40 mL). The combined organic phase was dried over anhydrous Na$_2$SO$_4$, filtrated and concentrated under reduce pressure. The crude product was used directly for the next step without further purification. LC-MS (ESI+): m/z 260/262 (MH$^+$).

Synthesis of ethyl 5-chloro-7-morpholinopyrazolo[1,5-a]pyrimidine-2-carboxylate

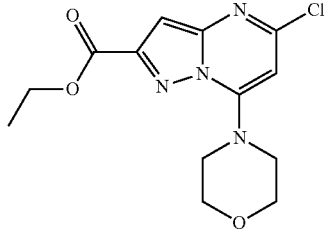 [SMILES: CCOC(=O)c1cc2nc(Cl)cc(N3CCOCC3)n2n1]

To a solution of crude ethyl 5,7-dichloropyrazolo[1,5-a]pyrimidine-2-carboxylate (4.83 g, 18.6 mmol) in 1,4-dioxane (60 mL) was added morpholine (3.2 g, 37.3 mmol). The reaction was stirred at rt for 1 h. The reaction mixture was concentrated directly and purified by silica gel column chromatography with a gradient elution of 2% MeOH/DCM to 3% MeOH/DCM to provide ethyl 5-chloro-7-morpholinopyrazolo[1,5-a]pyrimidine-2-carboxylate (3.3 g, 10.6 mmol) as a yellow solid. LC-MS (ESI+): m/z 311/313 (MH+). $^1$H NMR (300 MHz, CDCl$_3$) δ 6.98 (s, 1H), 6.18 (s, 1H), 4.49-4.41 (m, 2H), 3.98-3.96 (m, 4H), 3.92-3.82 (m, 4H), 1.33 (t, J=8.4 Hz, 3H).

Synthesis of ethyl 7-morpholino-5-(3-(m-tolyl)-1H-pyrazol-1-yl)pyrazolo[1,5-a]pyrimidine-2-carboxylate

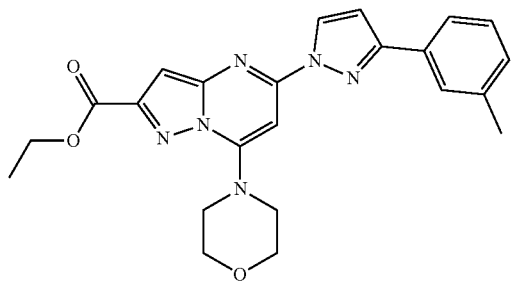 [SMILES: CCOC(=O)c1cc2nc(-n3ccc(-c4cccc(C)c4)n3)cc(N3CCOCC3)n2n1]

A suspension of ethyl 5-chloro-7-morpholinopyrazolo[1,5-a]pyrimidine-2-carboxylate (3.2 g, 10.6 mmol), 3-(m-tolyl)-1H-pyrazole (2.0 g, 12.8 mmol), Cs$_2$CO$_3$ (6.9 g, 21.3 mmol) and CuI (400 mg, 2.1 mmol) in DMF (120 mL) was heated to 110° C. overnight. The completion of the reaction was monitored by TLC. The reaction mixture was quenched with water (20 mL) and extracted with DCM/MeOH (15:1, 3×30 mL). The combined organic phase was dried over anhydrous Na$_2$SO$_4$, filtrated and concentrated under reduce pressure. The residue was purified by silica gel column chromatography with a gradient elution of 1% MeOH/DCM to 5% MeOH/DCM to provide ethyl 7-morpholino-5-(3-(m-tolyl)-1H-pyrazol-1-yl)pyrazolo[1,5-a]pyrimidine-2-carboxylate (3.8 g, 8.8 mmol) as a white solid. LC-MS (ESI+): m/z 433 (MH+). $^1$H NMR (300 MHZ, CDCl$_3$) δ 8.63 (d, J=2.7 Hz, 1H), 7.75-7.71 (m, 2H), 7.38-7.33 (m, 1H), 7.22-7.20 (m, 1H), 7.16 (s, 1H), 6.97 (s, 1H), 6.82 (d, J=2.7 Hz, 1H), 4.50-4.43 (m, 2H), 4.03-4.01 (m, 4H), 3.93-3.91 (m, 4H), 2.45 (s, 3H), 1.44 (t, J=7.2 Hz, 3H).

Synthesis of 7-morpholino-5-(3-(m-tolyl)-1H-pyrazol-1-yl)pyrazolo[1,5-a]pyrimidine-2-carboxylic Acid

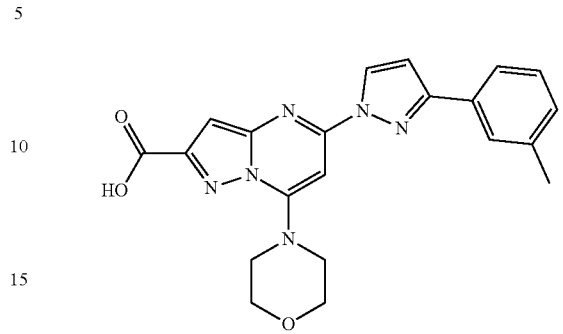

To a solution of ethyl 7-morpholino-5-(3-(m-tolyl)-1H-pyrazol-1-yl)pyrazolo[1,5-a]pyrimidine-2-carboxylate (3.8 g, 8.8 mmol) in THF (160 mL) was added 2 M aqueous NaOH solution (30 mL). The reaction was heated to 40 for 3 h. The completion of the reaction was monitored by TLC. To the reaction mixture was added 1 M aqueous HCl solution until pH=4. The resulting solution was extracted with EtOAc (3×10 mL). The combined organic phase was dried over anhydrous Na$_2$SO$_4$, filtrated and concentrated under reduce pressure to provide 7-morpholino-5-(3-(m-tolyl)-1H-pyrazol-1-yl)pyrazolo[1,5-a]pyrimidine-2-carboxylic acid (3.5 g, 8.7 mmol) as a white solid. LC-MS (ESI+): m/z 405 (MH+). $^1$H NMR (300 MHZ, DMSO-d$_6$) δ 8.73 (s, 1H), 7.83-7.80 (m, 2H), 7.38 (t, J=7.5 Hz, 1H), 7.24 (d, J=7.2 Hz, 1H), 7.15 (s, 1H), 7.10 (s, 1H), 6.90 (s, 1H), 3.89 (s, 8H), 2.40 (s, 3H).

Synthesis of (S)—N-(1-methylpyrrolidin-3-yl)-7-morpholino-5-(3-(m-tolyl)-1H-pyrazol-1-yl)pyrazolo[1,5-a]pyrimidine-2-carboxamide

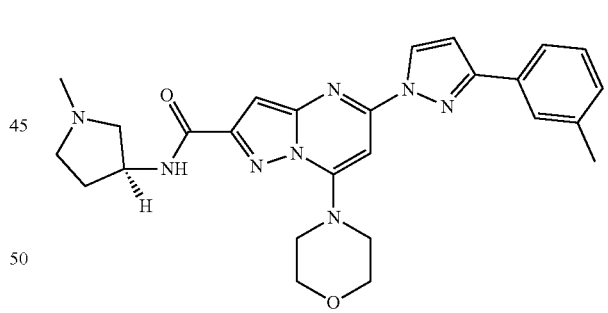

A solution of 7-morpholino-5-(3-(m-tolyl)-1H-pyrazol-1-yl)pyrazolo[1,5-a]pyrimidine-2-carboxylic acid (60 mg, 0.15 mmol), (S)-1-methylpyrrolidin-3-amine (16 mg, 0.16 mmol), EDCl (70.8 mg, 0.37 mmol) and DMAP (46 mg, 0.37 mmol) in DCM was stirred at rt overnight. The completion of the reaction was monitored by TLC. The reaction mixture was concentrated directly and purified by silica gel column chromatography with a gradient elution of 1% MeOH/DCM to 3% MeOH/DCM to provide (S)—N-(1-methylpyrrolidin-3-yl)-7-morpholino-5-(3-(m-tolyl)-1H-pyrazol-1-yl)pyrazolo[1,5-a]pyrimidine-2-carboxamide (Compound 48 32 mg, 0.07 mmol) as a white solid. LC-MS (ESI+): m/z 487 (MH+). $^1$H NMR (300 MHz, DMSO-d$_6$) δ8.72 (d, J=2.4 Hz, 1H), 8.35 (d, J=7.5 Hz, 1H), 7.82-7.79

(m, 2H), 7.38 (t, J=7.5 Hz, 1H), 7.23 (d, J=7.5 Hz, 1H), 7.13 (J=2.4 Hz, 1H), 7.07 (s, 1H), 6.85 (s, 1H), 4.50-4.40 (m, 1H), 3.90 (s, 8H), 2.82-2.72 (m, 2H), 2.50-2.45 (m, 1H), 2.40 (s, 3H), 2.31 (s, 3H), 2.27-2.19 (m, 1H), 1.87-1.82 (m, 2H).
General Procedure 2
Compound 91: N,N-dimethyl-2-[5-methyl-3-[7-morpholino-5-[3-(m-tolyl)pyrazol-1-yl]pyrazolo[1,5-a]pyrimidin-2-yl]pyrazol-1-yl]ethanamine
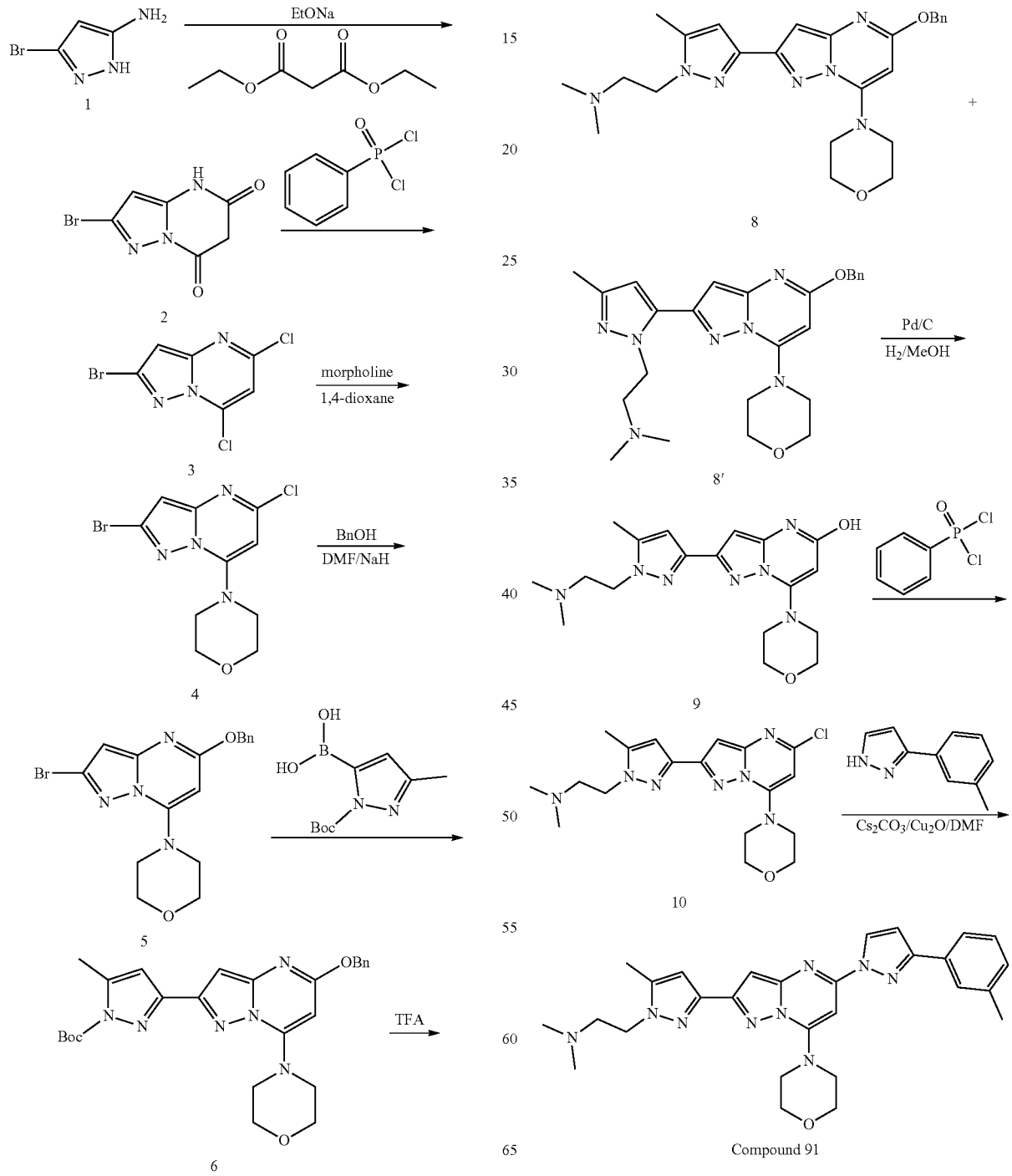

Synthesis of 2-bromopyrazolo[1,5-a]pyrimidine-5,7 (4H,6H)-dione

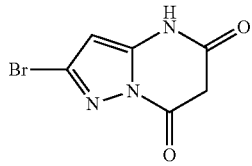 [SMILES: O=C1CC(=O)n2nc(Br)cc2N1]

To a solution of diethyl malonate (50 mL) and 3-bromo-1H-pyrazol-5-amine (5 g, 30.86 mmol) was added NaOEt (20% in anhydrous EtOH, 26 g). The mixture was heated to 120° C. to remove the EtOH by Dean-Stark trap. Then the reaction mixture was stirred at that temperature overnight. After the reaction mixture was cooled to rt, a large amount of solid was precipitated. After filtration, the filter cake was washed with ether twice to provide crude 2-bromopyrazolo[1,5-a]pyrimidine-5,7(4H,6H)-dione (13.5 g, 59.2 mmol) as a yellow solid. The crude product was used directly for the next step without further purification. LC-MS (ESI+): m/z 230/232 (MH$^+$).

Synthesis of 2-bromo-5,7-dichloropyrazolo[1,5-a]pyrimidine

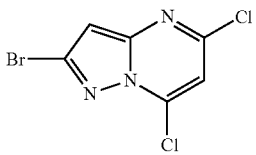 [SMILES: Clc1cc(Cl)n2nc(Br)cc2n1]

A solution of crude 2-bromopyrazolo[1,5-a]pyrimidine-5,7(4H,6H)-dione (13.8 g, 56.7 mmol) in phenylphosphonic dichloride (100 mL) was heated to 120° C. overnight. The reaction mixture was quenched with saturated NaHCO$_3$ solution until the pH=8 in the ice bath. The aqueous solution was extracted with DCM/MeOH (15:1, 6×40 mL). The combined organic phase was dried over anhydrous Na$_2$SO$_4$, filtrated and concentrated under reduce pressure to provide crude 2-bromo-5,7-dichloropyrazolo[1,5-a]pyrimidine (10 g, 37.8 mmol). The crude product was used directly for the next step without further purification. LC-MS (ESI+): m/z 266/268 (MH$^+$).

Synthesis of 4-(2-bromo-5-chloropyrazolo[1,5-a]pyrimidin-7-yl)morpholine

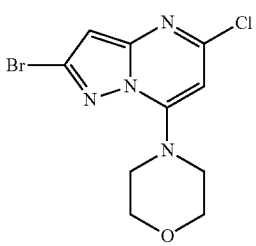 [SMILES: Clc1cc(N2CCOCC2)n2nc(Br)cc2n1]

To a solution of crude 2-bromo-5,7-dichloropyrazolo[1,5-a]pyrimidine (10 g, 37.8 mmol) in 1,4-dioxane (120 mL) was added morpholine (6.58 g, 75.6 mmol). The reaction was stirred at rt for 1 h. The reaction mixture was concentrated directly and purified by silica gel column chromatography with a gradient elution of 2% MeOH/DCM to 3% MeOH/DCM to provide 4-(2-bromo-5-chloropyrazolo[1,5-a]pyrimidin-7-yl)morpholine (8.6 g, 27.2 mmol) as a yellow solid. LC-MS (ESI+): m/z 317/319 (MH$^+$). $^1$H NMR (300 MHz, CDCl$_3$) δ 6.52 (s, 1H), 6.08 (s, 1H), 3.98-3.93 (m, 4H), 3.82-3.76 (m, 4H).

Synthesis of 4-(5-(benzyloxy)-2-bromopyrazolo[1,5-a]pyrimidin-7-yl)morpholine

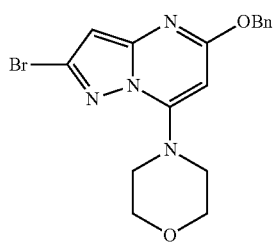 [SMILES: Brc1cc2nc(OCc3ccccc3)cc(N3CCOCC3)n2n1]

To a solution of phenylmethanol (1.71 g, 15.8 mmol) in DMF (60 mL) was added NaH (1.27 g, 31.6 mmol). The mixture was stirred at 0° C. for 30 min. To the reaction was added a solution of 4-(2-bromo-5-chloropyrazolo[1,5-a]pyrimidin-7-yl)morpholine (5 g, 15.8 mmol) in DMF (20 mL). The reaction mixture was stirred at 0° C. for 2 h. The completion of the reaction was monitored by TLC. Water (200 mL) was added to the above solution and a large amount of solid was precipitated. After filtration, the filter cake was washed with ether twice to provide 4-(5-(benzyloxy)-2-bromopyrazolo[1,5-a]pyrimidin-7-yl)morpholine (7.5 g, 19.3 mmol) as white solid. LC-MS (ESI+): m/z 389/391 (MH$^+$). $^1$H NMR (300 MHz, CDCl$_3$) δ 7.61-7.32 (m, 5H), 6.34 (s, 1H), 5.66 (s, 1H), 5.34 (s, 2H), 3.98-3.92 (m, 4H), 3.66-3.59 (m, 4H).

Synthesis of tert-butyl 3-(5-(benzyloxy)-7-morpholinopyrazolo[1,5-a]pyrimidin-2-yl)-5-methyl-1H-pyrazole-1-carboxylate

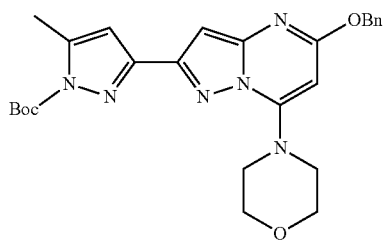 [SMILES: Cc1cc(-c2cc3nc(OCc4ccccc4)cc(N4CCOCC4)n3n2)nn1C(=O)OC(C)(C)C]

A suspension of 4-(5-(benzyloxy)-2-bromopyrazolo[1,5-a]pyrimidin-7-yl)morpholine (7.5 g, 19.3 mmol), (1-(tert-butoxycarbonyl)-5-methyl-1H-pyrazol-3-yl) boronic acid (4.78 g, 21.2 mmol), Pd(PPh$_3$)$_2$Cl$_2$ (1.35 g, 1.92 mmol) and CsF (8.77 g, 57.7 mmol) in 1,4-dioxane/H$_2$O (330 mL, 10:1) was heated to 95° C. overnight. The completion of the reaction was monitored by TLC. The reaction mixture was concentrated directly and purified by silica gel column chromatography with a gradient elution of 25% EtOAc/Hex to 33% EtOAc/Hex to provide tert-butyl 3-(5-(benzyloxy)-7-morpholinopyrazolo[1,5-a]pyrimidin-2-yl)-5-methyl-1H-pyrazole-1-carboxylate (4.2 g, 8.57 mmol) as a light yellow oil. LC-MS (ESI+): m/z 491 (MH+). $^1$H NMR (300 MHz, CDCl$_3$) δ 7.48-7.42 (m, 2H), 7.39-7.32 (m, 3H), 6.50 (s, 1H), 6.44 (s, 1H), 5.70 (s, 1H), 5.42 (s, 2H), 3.94-3.88 (m, 4H), 3.68-3.63 (m, 4H), 2.36 (s, 3H), 1.49 (s, 9H).

Synthesis of 4-(5-(benzyloxy)-2-(5-methyl-1H-pyrazol-3-yl)pyrazolo[1,5-a]pyrimidin-7-yl)morpholine

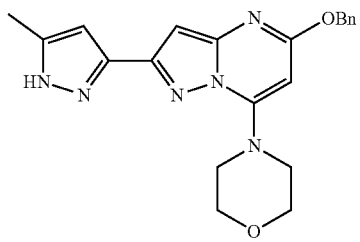 [SMILES: Cc1cc(-c2cc3nc(OCc4ccccc4)cc(N4CCOCC4)n3n2)n[nH]1]

A solution of tert-butyl 3-(5-(benzyloxy)-7-morpholinopyrazolo[1,5-a]pyrimidin-2-yl)-5-methyl-1H-pyrazole-1-carboxylate (4.2 g, 8.57 mmol) in DCM (40 mL) was added TFA (5 mL). The mixture was stirred at rt for 2 h. The completion of the reaction was monitored by TLC. The reaction mixture was quenched with saturated NaHCO$_3$ solution until the pH=8. A large amount of solid was precipitated. After filtration, the filter cake was washed with ether twice to provide crude 4-(5-(benzyloxy)-2-(5-methyl-1H-pyrazol-3-yl)pyrazolo[1,5-a]pyrimidin-7-yl)morpholine (4.5 g, 11.5 mmol) as a white solid. The crude product was used directly for the next step without further purification. LC-MS (ESI+): m/z 391 (MH+). $^1$H NMR (300 MHz, CDCl$_3$) δ 7.48-7.42 (m, 2H), 7.39-7.32 (m, 3H), 6.58 (s, 1H), 6.51 (s, 1H), 5.70 (s, 1H), 5.42 (s, 2H), 3.98-3.92 (m, 4H), 3.68-3.61 (m, 4H), 2.38 (s, 3H).

Synthesis of 2-(3-(5-(benzyloxy)-7-morpholinopyrazolo[1,5-a]pyrimidin-2-yl)-5-methyl-1H-pyrazol-1-yl)-N,N-dimethylethanamine and 2-(5-(5-(benzyloxy)-7-morpholinopyrazolo[1,5-a]pyrimidin-2-yl)-3-methyl-1H-pyrazol-1-yl)-N,N-dimethylethanamine

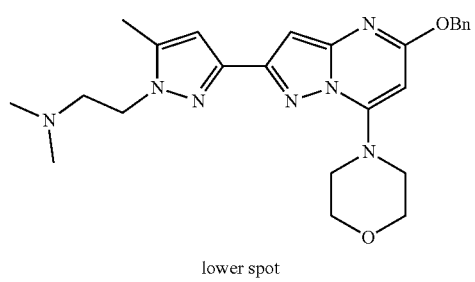

lower spot

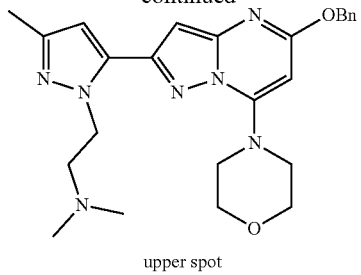

upper spot

To a solution of crude 4-(5-(benzyloxy)-2-(5-methyl-1H-pyrazol-3-yl)pyrazolo[1,5-a]pyrimidin-7-yl)morpholine (4.5 g, 11.5 mmol) in DMF was added Cs$_2$CO$_3$ (11.28 g, 34.62 mmol) and 2-chloro-N,N-dimethylethanamine hydrochloride (2 g, 13.85 mmol). The mixture was stirred at 80° C. overnight. TLC showed two new spots. LC-MS showed the desired product. After cooled to rt, the reaction mixture was diluted with water (50 mL) and extracted with DCM (3×70 mL). The combined organic phase was dried over anhydrous Na$_2$SO$_4$, filtrated and concentrated under reduce pressure. The residue was purified by silica gel column chromatography with a gradient elution of 5% MeOH/DCM to 10% MeOH/DCM to provide 2-(5-(5-(benzyloxy)-7-morpholinopyrazolo[1,5-a]pyrimidin-2-yl)-3-methyl-1H-pyrazol-1-yl)-N,N-dimethylethanamine (upper spot, 2.1 g, 4.5 mmol) and 2-(3-(5-(benzyloxy)-7-morpholinopyrazolo[1,5-a]pyrimidin-2-yl)-5-methyl-1H-pyrazol-1-yl)-N,N-dimethylethanamine (lower spot, 0.6 g, 1.3 mmol) as white solid.

2-(5-(5-(benzyloxy)-7-morpholinopyrazolo[1,5-a]pyrimidin-2-yl)-3-methyl-1H-pyrazol-1-yl)-N,N-dimethylethanamine (upper spot). LC-MS (ESI+): m/z 462 (MH+). $^1$H NMR (300 MHZ, CDCl$_3$) δ 7.48-7.42 (m, 2H), 7.39-7.32 (m, 3H), 6.48 (s, 1H), 6.38 (s, 1H), 5.70 (s, 1H), 5.42 (s, 2H), 4.66 (t, J=7.5 Hz, 2H), 3.98-3.92 (m, 4H), 3.70-3.64 (m, 4H), 2.76 (t, J=7.5 Hz, 2H), 2.35 (s, 3H), 2.26 (s, 6H). 2-(3-(5-(benzyloxy)-7-morpholinopyrazolo[1,5-a]pyrimidin-2-yl)-5-methyl-1H-pyrazol-1-yl)-N,N-dimethylethanamine (lower spot). LC-MS (ESI+): m/z 462 (MH+). $^1$H NMR (300 MHz, CDCl$_3$) δ 7.48-7.42 (m, 2H), 7.39-7.32 (m, 3H), 6.64 (s, 1H), 6.50 (s, 1H), 5.65 (s, 1H), 5.42 (s, 2H), 4.33 (t, J=6.9 Hz, 2H), 3.98-3.93 (m, 4H), 3.68-3.63 (m, 4H), 3.08 (t, J=6.9 Hz, 2H), 2.46 (s, 6H), 2.36 (s, 3H).

Synthesis of 2-(1-(2-(dimethylamino)ethyl)-5-methyl-1H-pyrazol-3-yl)-7-morpholinopyrazolo[1,5-a]pyrimidin-5-ol

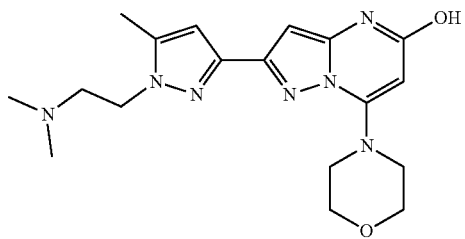 [SMILES: Cc1cc(-c2cc3nc(O)cc(N4CCOCC4)n3n2)nn1CCN(C)C]

To a solution of 2-(3-(5-(benzyloxy)-7-morpholinopyrazolo[1,5-a]pyrimidin-2-yl)-5-methyl-1H-pyrazol-1-yl)-N,N-dimethylethanamine (0.6 g, 1.3 mmol) in MeOH was added Pd/C under H$_2$ balloon at rt for 4 h. The completion of the reaction was monitored by TLC. After filtration, the filtrate was concentrated directly to provide crude 2-(1-(2-(dimethylamino)ethyl)-5-methyl-1H-pyrazol-3-yl)-7-morpholinopyrazolo[1,5-a]pyrimidin-5-ol (0.4 g, 1.01 mmol) as white solid. LC-MS (ESI+): m/z 372 (H⁺).

Synthesis of 2-(3-(5-chloro-7-morpholinopyrazolo[1,5-a]pyrimidin-2-yl)-5-methyl-1H-pyrazol-1-yl)-N,N-dimethylethanamine

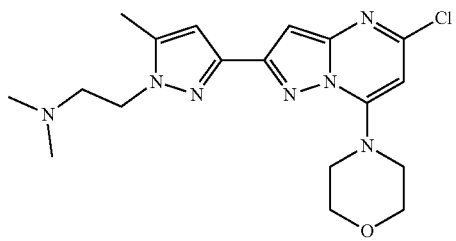 [SMILES: Cc1cc(-c2cc3nc(Cl)cc(N4CCOCC4)n3n2)nn1CCN(C)C]

A solution of 2-(1-(2-(dimethylamino)ethyl)-5-methyl-1H-pyrazol-3-yl)-7-morpholinopyrazolo[1,5-a]pyrimidin-5-ol (0.4 g, 1.01 mmol) in phenylphosphonic dichloride (15 mL) was heated to 110° C. for 4 h. The reaction mixture was quenched with saturated NaHCO₃ solution until the pH=8. The aqueous solution was extracted with DCM/MeOH (15:1, 2×30 mL). The combined organic phase was dried over anhydrous Na₂SO₄, filtered and concentrated under reduce pressure. The crude product was purified by preparative TLC to provide 2-(3-(5-chloro-7-morpholinopyrazolo[1,5-a]pyrimidin-2-yl)-5-methyl-1H-pyrazol-1-yl)-N,N-dimethylethanamine (250 mg, 0.64 mmol) as white solid. LC-MS (ESI+): m/z 390/392 (MH⁺).

Synthesis of N,N-dimethyl-2-(5-methyl-3-(7-morpholino-5-(3-(m-tolyl)-1H-pyrazol-1-yl)pyrazolo[1,5-a]pyrimidin-2-yl)-1H-pyrazol-1-yl)ethanamine

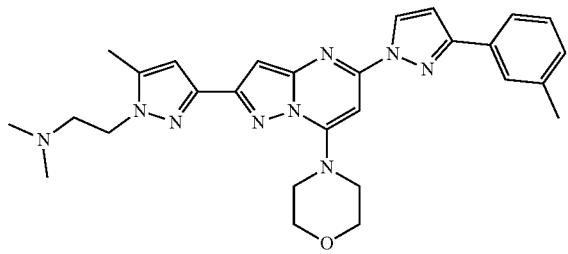 [SMILES: Cc1cccc(-c2ccn(-c3cc(N4CCOCC4)n4nc(-c5cc(C)n(CCN(C)C)n5)cc4n3)n2)c1]

A suspension of 2-(3-(5-chloro-7-morpholinopyrazolo[1,5-a]pyrimidin-2-yl)-5-methyl-1H-pyrazol-1-yl)-N,N-dimethylethanamine (39 mg, 0.10 mmol), 4-(m-tolyl)-1H-pyrazole (17 mg, 0.11 mmol), Cs₂CO₃ (65 mg, 0.20 mmol) and Cu₂O (2.8 mg, 0.02 mmol) in DMF (5 mL) was heated to 110° C. overnight. The completion of the reaction was monitored by TLC. The reaction mixture was concentrated directly and purified by silica gel column chromatography with a gradient elution of 5% MeOH/DCM to 10% MeOH/DCM to provide N,N-dimethyl-2-(5-methyl-3-(7-morpholino-5-(3-(m-tolyl)-1H-pyrazol-1-yl)pyrazolo[1,5-a]pyrimidin-2-yl)-1H-pyrazol-1-yl)ethanamine (Compound 91 9 mg, 0.018 mmol) as a white solid. LC-MS (ESI+): m/z 512 (MH⁺). ¹H NMR (300 MHz, CDCl₃) δ 8.65 (d, J=2.4 Hz, 1H), 7.76-7.61 (m, 2H), 7.35 (t, J=7.5 Hz, 1H), 7.19 (d, J=7.5 Hz, 1H), 7.03 (s, 1H), 6.81-6.75 (m, 2H), 6.53 (s, 1H), 4.35-4.25 (m, 2H), 4.10-4.00 (m, 4H), 3.95-3.85 (m, 4H), 3.00-2.85 (m, 2H), 2.45 (s, 3H), 2.39 (s, 9H).

General procedure 3

Compound 97: 2-[3-[5-[3-(3-chlorophenyl)pyrazol-1-yl]-7-morpholino-pyrazolo[1,5-a]pyrimidin-2-yl]-5-methyl-pyrazol-1-yl]-N,N-dimethyl-ethanamine

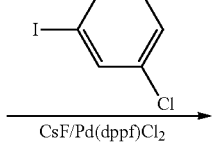

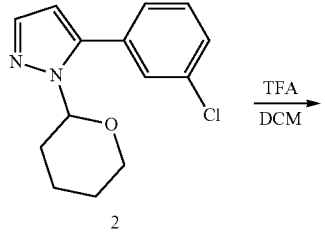

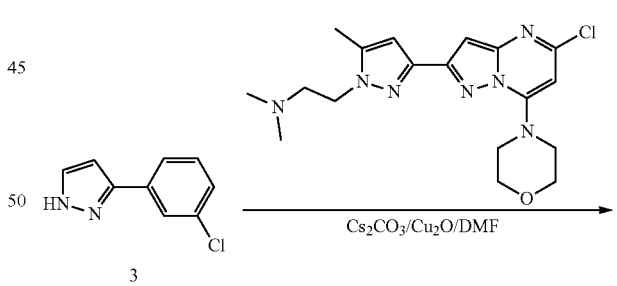

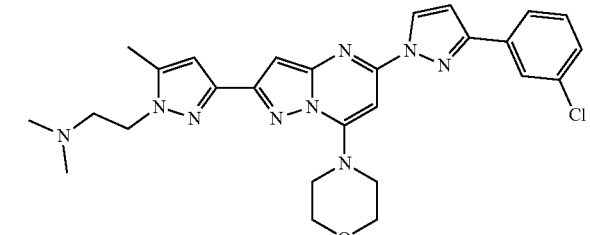

Compound 97

Synthesis of 5-(3-chlorophenyl)-1-(tetrahydro-2H-pyran-2-yl)-1H-pyrazole

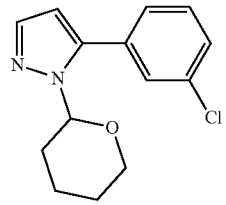 [SMILES: Clc1cccc(-c2ccnn2C2CCCCO2)c1]

A suspension of 1-(tetrahydro-2H-pyran-2-yl)-5-(4,4,5,5-tetramethyl-1,3,2-dioxaborolan-2-yl)-1H-pyrazole (500 mg, 1.18 mmol), 1-chloro-3-iodobenzene (280 mg, 1.18 mmol), CsF (488 mg, 3.21 mmol) and Pd(dppf)Cl$_2$ (225 mg, 0.30 mmol) in 1,4-dioxane/H$_2$O (44 mL, 10:1) was heated to 60° C. overnight. The reaction mixture was concentrated directly and purified by silica gel column chromatography with a gradient elution of 10% EtOAc/Hex to 20% EtOAc/Hex to provide impure 5-(3-chlorophenyl)-1-(tetrahydro-2H-pyran-2-yl)-1H-pyrazole (377 mg, 1.44 mmol) as yellow oil. LC-MS (ESI+): m/z 263/265 (MH$^+$).

Synthesis of 3-(3-chlorophenyl)-1H-pyrazole

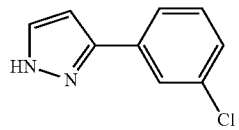 [SMILES: Clc1cccc(-c2cc[nH]n2)c1]

To a solution of impure 5-(3-chlorophenyl)-1-(tetrahydro-2H-pyran-2-yl)-1H-pyrazole (377 mg, 1.44 mmol) in DCM was added TFA (3 mL). The reaction was stirred at rt for 2 h. The completion of the reaction was monitored by TLC. The reaction mixture was quenched with saturated NaHCO$_3$ solution until the pH=8. The aqueous solution was extracted with DCM/MeOH (15:1, 3×20 mL). The combined organic phase was dried over anhydrous Na$_2$SO$_4$, filtrated and concentrated under reduce pressure. The crude product was used directly for the next step without further purification. LC-MS (ESI+): m/z 179/181 (MH$^+$).

Synthesis of 2-(3-(5-(3-(3-chlorophenyl)-1H-pyrazol-1-yl)-7-morpholinopyrazolo[1,5-a]pyrimidin-2-yl)-5-methyl-1H-pyrazol-1-yl)-N,N-dimethylethanamine

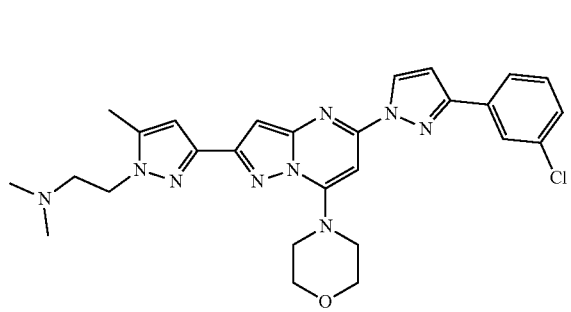 [SMILES: Cc1cc(-c2cc3nc(-n4ccc(-c5cccc(Cl)c5)n4)cc(N4CCOCC4)n3n2)nn1CCN(C)C]

A suspension of 3-(3-chlorophenyl)-1H-pyrazole (22 mg, 0.12 mmol), 2-(3-(5-chloro-7-morpholinopyrazolo[1,5-a]pyrimidin-2-yl)-5-methyl-1H-pyrazol-1-yl)-N,N-dimethylethanamine (40 mg, 0.10 mmol), Cs$_2$CO$_3$ (68 mg, 0.20 mmol) and Cu$_2$O (3 mg, 0.02 mmol) in DMF (10 mL) was heated to 110° C. overnight. The completion of the reaction was monitored by TLC. The reaction mixture was concentrated directly and purified by silica gel column chromatography with a gradient elution of 2% MeOH/DCM to 3% MeOH/DCM to provide 2-(3-(5-(3-(3-chlorophenyl)-1H-pyrazol-1-yl)-7-morpholinopyrazolo[1,5-a]pyrimidin-2-yl)-5-methyl-1H-pyrazol-1-yl)-N,N-dimethylethanamine (Compound 97 15.2 mg, 0.03 mmol) as a white solid. LC-MS (ESI+): m/z 532/534 (MH$^+$). $^1$H NMR (300 MHz, CDCl$_3$) δ 8.67 (d, J=2.7 Hz, 1H), 7.96 (s, 1H), 7.78 (d, J=7.2 Hz, 1H), 7.46-7.33 (m, 2H), 7.00 (s, 1H), 6.81-6.78 (m, 2H), 6.53 (s, 1H), 4.26-4.22 (m, 2H), 4.06-4.00 (m, 4H), 3.95-3.89 (m, 4H), 2.84-2.80 (m, 2H), 2.38 (s, 3H), 2.33 (s, 6H).

General Procedure 4

Compound 96: N,N-dimethyl-2-[5-methyl-3-[5-[3-(2-methyl-4-pyridyl)pyrazol-1-yl]-7-morpholino-pyrazolo[1,5-a]pyrimidin-2-yl]pyrazol-1-yl]ethanamine

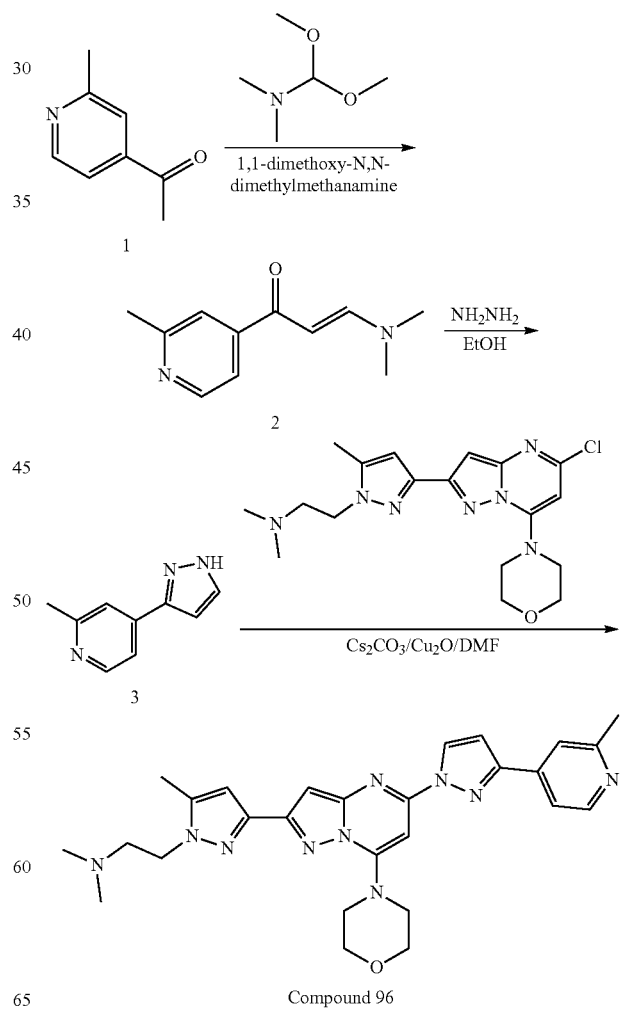

Compound 96

Synthesis of (E)-3-(dimethylamino)-1-(2-methylpyridin-4-yl) prop-2-en-1-one

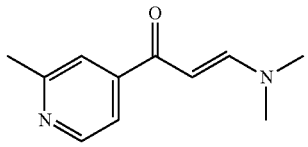

A solution of 1-(2-methylpyridin-4-yl) ethanone (100 mg, 0.75 mmol) in 1,1-dimethoxy-N,N-dimethylmethanamine was heated to reflux for 3 h. The completion of the reaction was monitored by TLC. The reaction mixture was concentrated directly and purified by silica gel column chromatography with a gradient elution of 2% MeOH/DCM to 3% MeOH/DCM to provide (E)-3-(dimethylamino)-1-(2-methylpyridin-4-yl) prop-2-en-1-one (135 mg, 0.71 mmol) as yellow oil. LC-MS (ESI+): m/z 191 (MH+). $^1$H NMR (300 MHz, CDCl$_3$) δ 8.68 (d, J=5.1 Hz, 1H), 7.83 (d, J=12.3 Hz, 1H), 7.59 (s, 1H), 7.47 (d, J=5.1 Hz, 1H), 5.63 (d, J=12.3 Hz, 1H), 3.18 (s, 3H), 2.96 (s, 3H), 2.41 (s, 3H).

Synthesis of 2-methyl-4-(1H-pyrazol-3-yl)pyridine

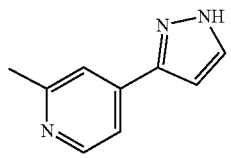

To a solution of (E)-3-(dimethylamino)-1-(2-methylpyridin-4-yl) prop-2-en-1-one (135 mg, 0.71 mmol) in ethanol (2 mL) was added hydrazine (0.3 mL). The reaction mixture was heated to 60° C. for 30 min. The completion of the reaction was monitored by TLC. The reaction mixture was quenched with water (10 mL) and extracted with DCM (3×20 mL). The combined organic phase was dried over anhydrous Na$_2$SO$_4$, filtrated and concentrated under reduce pressure to provide 2-methyl-4-(1H-pyrazol-3-yl)pyridine (109 mg, 0.68 mmol) as yellow solid. LC-MS (ESI+): m/z 160 (MH+). $^1$H NMR (300 MHZ, CDCl$_3$) δ 8.53 (d, J=3.9 Hz, 1H), 7.67 (d, J=2.4 Hz, 1H), 7.60 (d, J=3.6 Hz, 1H), 7.51-7.49 (m, 1H), 6.73 (d, J=2.4 Hz, 1H), 2.64 (s, 3H).

Synthesis of N,N-dimethyl-2-(5-methyl-3-(5-(3-(2-methylpyridin-4-yl)-1H-pyrazol-1-yl)-7-morpholinopyrazolo[1,5-a]pyrimidin-2-yl)-1H-pyrazol-1-yl) ethanamine

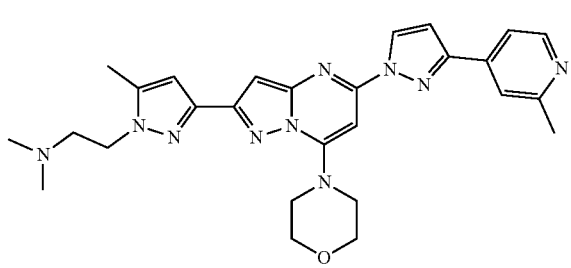 [SMILES: Cc1cc(-c2ccn(-c3cc(N4CCOCC4)n4nc(-c5cc(C)n(CCN(C)C)n5)cc4n3)n2)ccn1]

A suspension of 2-methyl-4-(1H-pyrazol-3-yl)pyridine (20 mg, 0.12 mmol), 2-(3-(5-chloro-7-morpholinopyrazolo[1,5-a]pyrimidin-2-yl)-5-methyl-1H-pyrazol-1-yl)-N,N-dimethylethanamine (40 mg, 0.10 mmol), Cs$_2$CO$_3$ (68 mg, 0.20 mmol) and Cu$_2$O (2 mg, 0.01 mmol) in DMF (4 mL) was heated to 110° C. overnight. The completion of the reaction was monitored by TLC. The reaction mixture was concentrated directly and purified by silica gel column chromatography with a gradient elution of 2% MeOH/DCM to 3% MeOH/DCM to provide N,N-dimethyl-2-(5-methyl-3-(5-(3-(2-methylpyridin-4-yl)-1H-pyrazol-1-yl)-7-morpholinopyrazolo[1,5-a]pyrimidin-2-yl)-1H-pyrazol-1-yl) ethanamine (Compound 96 15.6 mg, 0.03 mmol) as a white solid. LC-MS (ESI+): m/z 513 (MH+). $^1$H NMR (300 MHz, CDCl$_3$) δ 8.70 (d, J=2.7 Hz, 1H), 8.57 (d, J=5.4 Hz, 1H), 7.68 (s, 1H), 7.62-7.60 (m, 1H), 7.00 (s, 1H), 6.87 (d, J=2.7 Hz, 1H), 6.82 (s, 1H), 6.53 (s, 1H), 4.27-4.22 (m, 2H), 4.05-4.00 (m, 4H), 3.95-3.91 (m, 4H), 2.85-2.81 (m, 2H), 2.65 (s, 3H), 2.38 (s, 3H), 2.34 (s, 6H).

General procedure 5

Compound 84: 4-[2-(2,5-dimethylpyrazol-3-yl)-5-[3-(m-tolyl)pyrazol-1-yl]pyrazolo[1,5-a]pyrimidin-7-yl]morpholine and Compound 87: 4-[2-(1,5-dimethylpyrazol-3-yl)-5-[3-(m-tolyl)pyrazol-1-yl]pyrazolo[1,5-a]pyrimidin-7-yl]morpholine

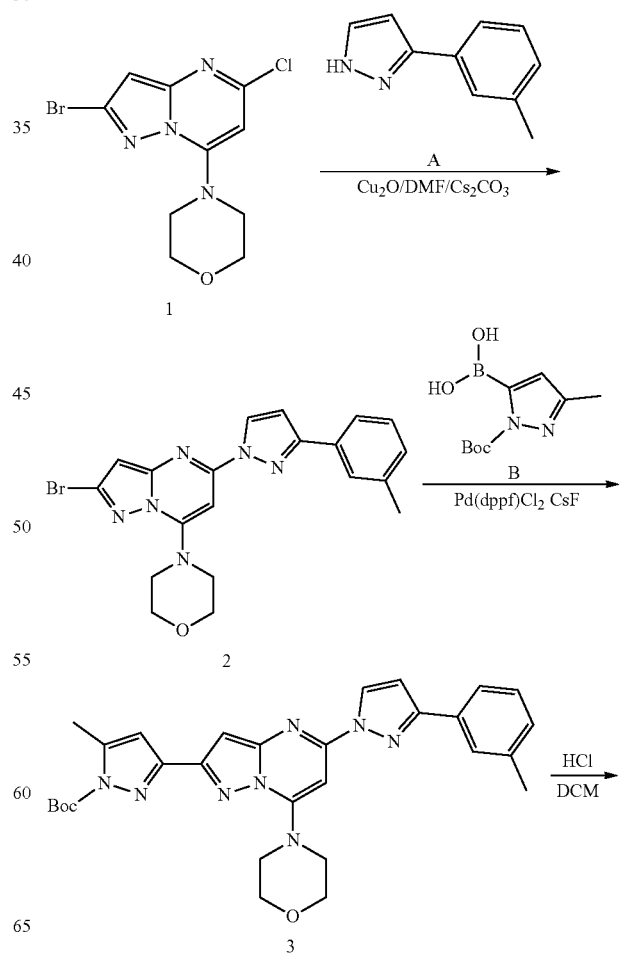

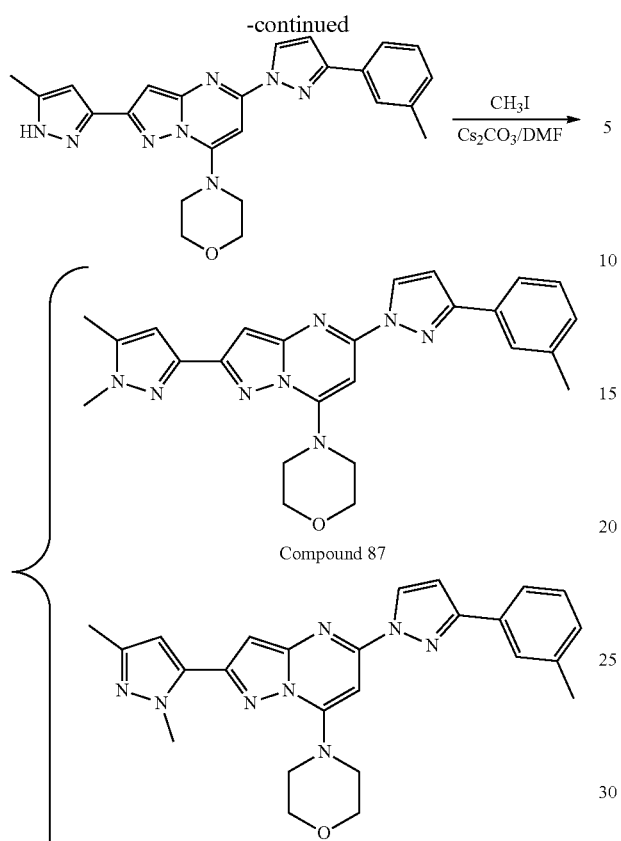

Compound 87

Compound 84

Synthesis of 4-(2-bromo-5-(3-(m-tolyl)-1H-pyrazol-1-yl)pyrazolo[1,5-a]pyrimidin-7-yl)morpholine

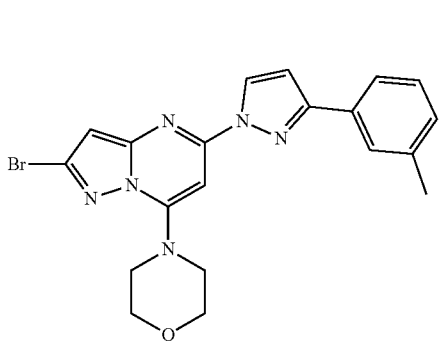 [SMILES: Cc1cccc(-c2ccn(-c3cc(N4CCOCC4)n4nc(Br)cc4n3)n2)c1]

A suspension of 4-(2-bromo-5-chloropyrazolo[1,5-a]pyrimidin-7-yl)morpholine (5 g, 15.8 mmol), 3-phenyl-1H-pyrazole (2.75 g, 17.4 mmol), $Cs_2CO_3$ (10.3 g, 31.6 mmol) and $Cu_2O$ (453 mg, 3.2 mmol) in DMF (80 mL) was heated to 110° C. overnight. The completion of the reaction was monitored by TLC. The reaction mixture was concentrated directly and purified by silica gel column chromatography with a gradient elution of 20% EtOAc/HeX to 33% EtOAc/HeX to provide 4-(2-bromo-5-(3-(m-tolyl)-1H-pyrazol-1-yl)pyrazolo[1,5-a]pyrimidin-7-yl)morpholine (5.0 g, 11.4 mmol) as a yellow solid. LC-MS (ESI+): m/z 439/441 (MH+). $^1$H NMR (300 MHZ, $CDCl_3$) δ 8.59 (d, J=2.7 Hz, 1H), 7.80-7.62 (m, 2H), 7.35 (t, J=7.5 Hz, 1H), 7.19-7.10 (m, 1H), 6.91 (s, 1H), 6.82 (d, J=2.7 Hz, 1H), 6.48 (s, 1H), 4.05-3.95 (m, 4H), 3.85-3.80 (m, 4H), 2.44 (s, 3H).

Synthesis of tert-butyl 5-methyl-3-(7-morpholino-5-(3-(m-tolyl)-1H-pyrazol-1-yl)pyrazolo[1,5-a]pyrimidin-2-yl)-1H-pyrazole-1-carboxylate

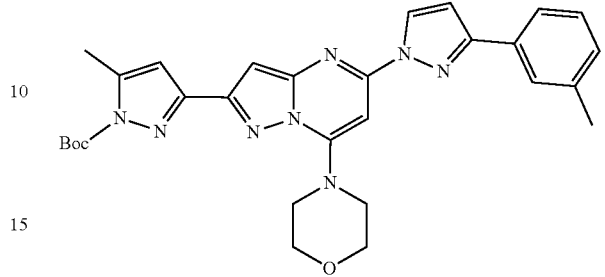

A suspension of 4-(2-bromo-5-(3-(m-tolyl)-1H-pyrazol-1-yl)pyrazolo[1,5-a]pyrimidin-7-yl)morpholine (200 mg, 0.46 mmol), (1-(tert-butoxycarbonyl)-3-methyl-1H-pyrazol-5-yl) boronic acid (114 mg, 0.50 mmol), CsF (208 mg, 1.37 mmol) and $Pd(dppf)Cl_2$ (32 mg, 0.05 mmol) in 1,4-dioxane/$H_2O$ (22 mL, 10:1) was heated to 100° C. for 1 h. The reaction mixture was concentrated directly and purified by silica gel column chromatography with a gradient elution of 20% EtOAc/Hex to 33% EtOAc/Hex to provide 5-methyl-3-(7-morpholino-5-(3-(m-tolyl)-1H-pyrazol-1-yl)pyrazolo[1,5-a]pyrimidin-2-yl)-1H-pyrazole-1-carboxylate (220 mg, 0.41 mmol) as colorless oil. LC-MS (ESI+): m/z 541 (MH+).

Synthesis of 4-(2-(5-methyl-1H-pyrazol-3-yl)-5-(3-(m-tolyl)-1H-pyrazol-1-yl)pyrazolo[1,5-a]pyrimidin-7-yl)morpholine

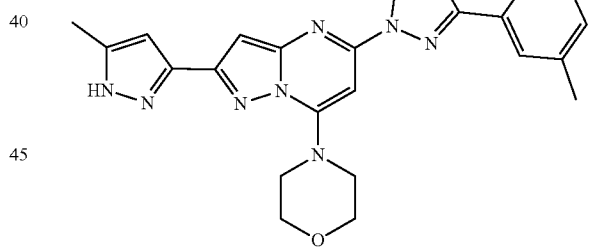

To a solution of 4-(2-(5-methyl-1H-pyrazol-3-yl)-5-(3-(m-tolyl)-1H-pyrazol-1-yl)pyrazolo[1,5-a]pyrimidin-7-yl)morpholine (220 mg, 0.41 mmol) in DCM (5 mL) was added HCl/$Et_2O$ solution (2 mL). The completion of the reaction was monitored by TLC. The reaction mixture was quenched with saturated $NaHCO_3$ solution until the pH=8. The aqueous solution was extracted with DCM/MeOH (15:1, 2×20 mL). The combined organic phase was dried over anhydrous $Na_2SO_4$, filtrated and concentrated under reduce pressure to provide 4-(2-(5-methyl-1H-pyrazol-3-yl)-5-(3-(m-tolyl)-1H-pyrazol-1-yl)pyrazolo[1,5-a]pyrimidin-7-yl)morpholine (138 mg, 0.31 mmol) as light yellow solid. LC-MS (ESI+): m/z 441 (MH+). $^1$H NMR (300 MHZ, $CDCl_3$) δ 8.63 (d, J=2.7 Hz, 1H), 7.76-7.61 (m, 2H), 7.38-7.32 (m, 2H), 7.22-7.15 (m, 1H), 7.06 (s, 1H), 6.81 (d, J=2.7 Hz, 1H), 6.73 (s, 1H), 6.56 (brs, 1H), 4.05-4.00 (m, 4H), 3.95-3.85 (m, 4H), 2.45 (s, 3H), 2.40 (s, 3H).

Synthesis of 4-(2-(1,5-dimethyl-1H-pyrazol-3-yl)-5-(3-(m-tolyl)-1H-pyrazol-1-yl)pyrazolo[1,5-a]pyrimidin-7-yl)morpholine and 4-(2-(1,3-dimethyl-1H-pyrazol-5-yl)-5-(3-(m-tolyl)-1H-pyrazol-1-yl)pyrazolo[1,5-a]pyrimidin-7-yl)morpholine

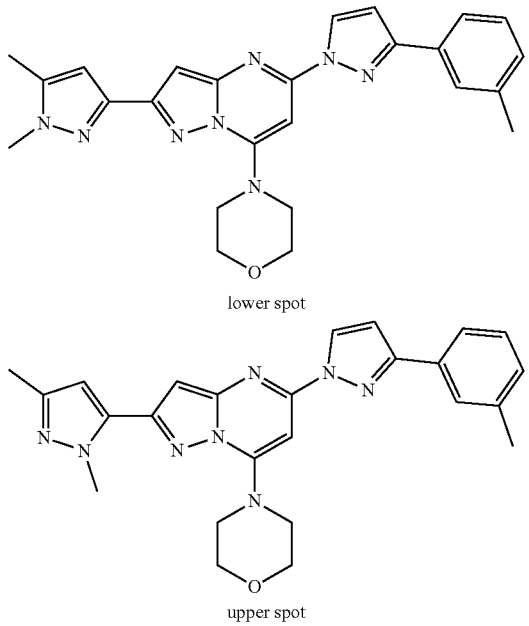

lower spot upper spot

To a suspension of 4-(2-(5-methyl-1H-pyrazol-3-yl)-5-(3-(m-tolyl)-1H-pyrazol-1-yl)pyrazolo[1,5-a]pyrimidin-7-yl)morpholine (100 mg, 0.23 mmol) and Cs$_2$CO$_3$ (222 mg, 0.68 mmol) in DMF (5 mL) at rt was added CH$_3$I (48 mg, 0.34 mmol). The completion of the reaction was monitored by TLC. The reaction was quenched with water (50 ml) and the solution was extracted with DCM (3×20 mL). The combined organic phase was dried over anhydrous Na$_2$SO$_4$, filtrated and concentrated under reduce pressure. The residue was purified by silica gel column chromatography with a gradient elution of 5% MeOH/DCM to 8% MeOH/DCM to provide 4-(2-(1,5-dimethyl-1H-pyrazol-3-yl)-5-(3-(m-tolyl)-1H-pyrazol-1-yl)pyrazolo[1,5-a]pyrimidin-7-yl)morpholine (Compound 87, lower spot, 21 mg, 0.046 mmol) and 4-(2-(1,3-dimethyl-1H-pyrazol-5-yl)-5-(3-(m-tolyl)-1H-pyrazol-1-yl)pyrazolo[1,5-a]pyrimidin-7-yl)morpholine (Compound 84, upper spot, 42 mg, 0.092 mmol).

4-(2-(1,5-dimethyl-1H-pyrazol-3-yl)-5-(3-(m-tolyl)-1H-pyrazol-1-yl)pyrazolo[1,5-a]pyrimidin-7-yl)morpholine (Compound 87, lower spot). LC-MS (ESI+): m/z 455 (MH$^+$). $^1$H NMR (300 MHz, CDCl$_3$) δ 8.67 (d, J=2.7 Hz, 1H), 7.79-7.73 (m, 2H), 7.36 (t, J=7.8 Hz, 1H), 7.22 (d, J=7.5 Hz, 1H), 7.05 (s, 1H), 6.83-6.82 (m, 2H), 6.56 (s, 1H), 4.07-4.02 (m, 4H), 3.95-3.90 (m, 4H), 3.89 (s, 3H), 2.47 (s, 3H), 2.36 (s, 3H).

4-(2-(1,3-dimethyl-1H-pyrazol-5-yl)-5-(3-(m-tolyl)-1H-pyrazol-1-yl)pyrazolo[1,5-a]pyrimidin-7-yl)morpholine (Compound 84, upper spot). LC-MS (ESI+): m/z 455 (MH$^+$). $^1$H NMR (300 MHz, CDCl$_3$) δ 8.60 (d, J=2.7 Hz, 1H), 7.75-7.70 (m, 2H), 7.33 (t, J=7.5 Hz, 1H), 7.20 (d, J=7.5 Hz, 1H), 7.04 (s, 1H), 6.79 (d, J=2.7 Hz, 1H), 6.59 (s, 1H), 6.44 (s, 1H), 4.17 (s, 3H), 4.02-3.90 (m, 4H), 3.88-3.85 (m, 4H), 2.43 (s, 3H), 2.32 (s, 3H).

General Procedure 6

Compound 57: 4-[5-[4-(m-tolyl)pyrazol-1-yl]-2-pyrimidin-4-yl-pyrazolo[1,5-a]pyrimidin-7-yl]morpholine

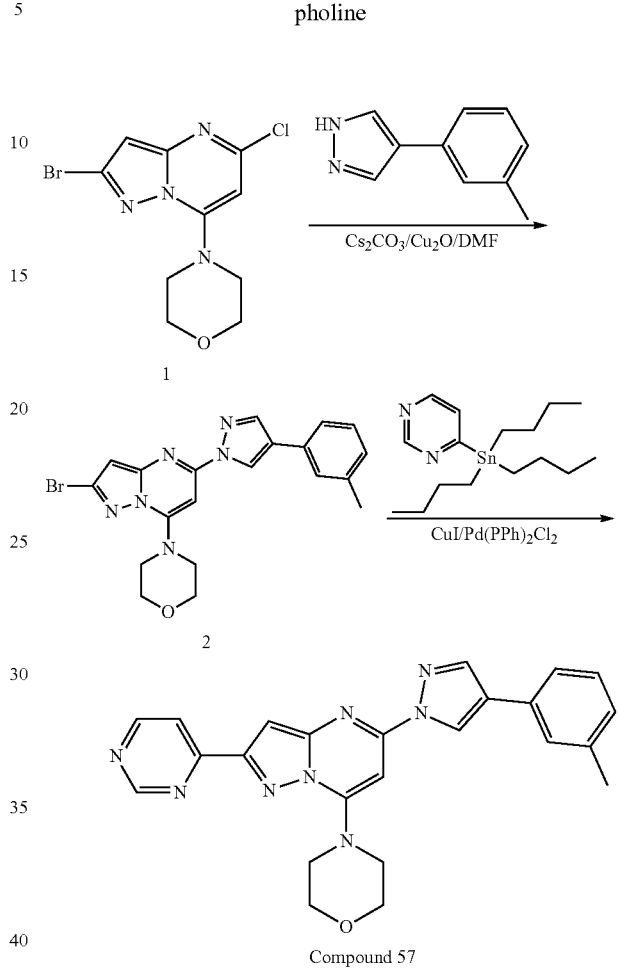

Compound 57

Synthesis of 4-(2-bromo-5-(4-(m-tolyl)-1H-pyrazol-1-yl)pyrazolo[1,5-a]pyrimidin-7-yl)morpholine

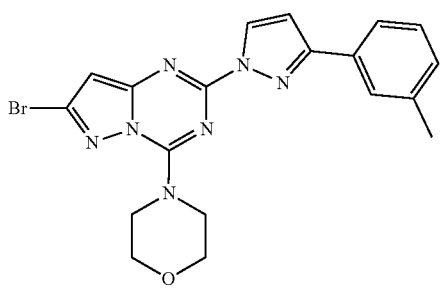 [SMILES: Cc1cccc(-c2ccn(-c3nc(N4CCOCC4)n4nc(Br)cc4n3)n2)c1]

A suspension of 4-(2-bromo-5-chloropyrazolo[1,5-a]pyrimidin-7-yl)morpholine (3 g, 9.45 mmol), 4-(m-tolyl)-1H-pyrazole (1.5 g, 9.45 mmol), Cs$_2$CO$_3$ (6.16 g, 18.9 mmol) and Cu$_2$O (135 mg, 0.945 mmol) in DMF (150 mL) was heated to 110° C. overnight. The completion of the reaction was monitored by TLC. The reaction mixture was concentrated directly and purified by silica gel column chromatography with a gradient elution of 2% MeOH/DCM to 3% MeOH/DCM to provide 4-(2-bromo-5-(4-(m-tolyl)-1H-pyrazol-1-yl)pyrazolo[1,5-a]pyrimidin-7-yl)morpholine (4.5 g, 10.27 mmol) as a light-yellow solid. LC-MS (ESI+): m/z 439/441 (MH+). $^1$H NMR (300 MHZ, CDCl$_3$) δ 8.81 (s, 1H), 8.02 (s, 1H), 7.47-7.33 (m, 2H), 7.30-7.26 (m, 1H), 7.13-7.11 (m, 1H), 6.94 (s, 1H), 6.50 (s, 1H), 3.98-3.92 (m, 4H), 3.85-3.78 (m, 4H), 2.41 (s, 3H).

Synthesis of 4-(2-(pyrimidin-4-yl)-5-(4-(m-tolyl)-1H-pyrazol-1-yl)pyrazolo[1,5-a]pyrimidin-7-yl)morpholine

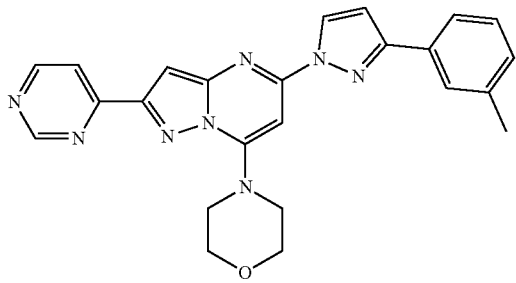 [SMILES: Cc1cccc(-c2ccn(-c3cc(N4CCOCC4)n4nc(-c5ccncn5)cc4n3)n2)c1]

A suspension of 4-(2-bromo-5-(4-(m-tolyl)-1H-pyrazol-1-yl)pyrazolo[1,5-a]pyrimidin-7-yl)morpholine (100 mg, 0.23 mmol), 4-(tributylstannyl)pyrimidine (168 mg, 0.45 mmol), CuI (13 mg, 0.068 mmol) and Pd(PPh$_3$)$_2$Cl$_2$ in DMF (3 mL) was heated to 100° C. under N$_2$ for 3 h. The completion of the reaction was monitored by TLC. The reaction mixture was concentrated directly and purified by silica gel column chromatography with a gradient elution of 2% MeOH/DCM to 3% MeOH/DCM to provide 4-(2-(pyrimidin-4-yl)-5-(4-(m-tolyl)-1H-pyrazol-1-yl)pyrazolo[1,5-a]pyrimidin-7-yl)morpholine (Compound 57, 24 mg, 0.055 mmol) as a light-yellow solid. LC-MS (ESI+): m/z 439 (MH+). $^1$H NMR (300 MHZ, CDCl$_3$) δ 9.33 (s, 1H), 8.89 (s, 1H), 8.86 (s, 1H), 8.09 (s, 1H), 8.05 (s, 1H), 7.53-7.42 (m, 2H), 7.34-7.29 (m, 2H), 7.14-7.12 (m, 1H), 7.06 (s, 1H), 4.10-4.00 (m, 4H), 3.92-3.81 (m, 4H), 2.42 (s, 3H).

General Procedure 7

Compound 58: 4-[5-[4-(m-tolyl)pyrazol-1-yl]-2-pyrimidin-5-yl-pyrazolo[1,5-a]pyrimidin-7-yl]morpholine

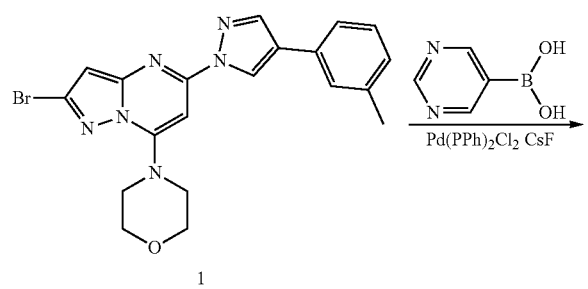

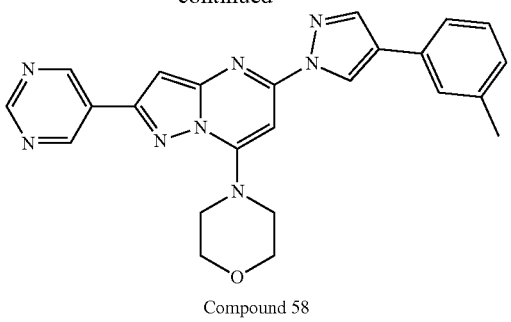

Compound 58

Synthesis of 4-(2-(pyrimidin-5-yl)-5-(4-(m-tolyl)-1H-pyrazol-1-yl)pyrazolo[1,5-a]pyrimidin-7-yl)morpholine

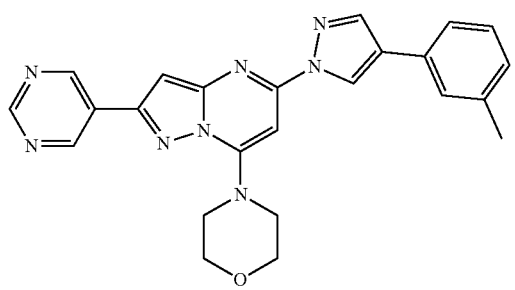 [SMILES: Cc1cccc(-c2cnn(-c3cc(N4CCOCC4)n4nc(-c5cncnc5)cc4n3)c2)c1]

A suspension of 4-(2-bromo-5-(4-(m-tolyl)-1H-pyrazol-1-yl)pyrazolo[1,5-a]pyrimidin-7-yl)morpholine (100 mg, 0.23 mmol), pyrimidin-5-ylboronic acid (34 mg, 0.28 mmol), CsF (52 mg, 0.34 mmol) and Pd(dppf)Cl$_2$ (16 mg, 0.023 mmol) in 1,4-dioxane/H$_2$O (7.5 mL, 2:1) was heated to 80° C. overnight. The reaction mixture was concentrated directly and purified by silica gel column chromatography with a gradient elution of 1% MeOH/DCM to 2% MeOH/DCM to provide 4-(2-(pyrimidin-5-yl)-5-(4-(m-tolyl)-1H-pyrazol-1-yl)pyrazolo[1,5-a]pyrimidin-7-yl)morpholine (Compound 58, 21 mg, 0.048 mmol) as yellow solid. LC-MS (ESI+): m/z 439 (MH+). $^1$H NMR (300 MHz, CDCl$_3$) δ 9.38-9.25 (m, 2H), 8.85 (s, 1H), 8.04 (s, 1H), 7.55-7.41 (m, 2H), 7.34-7.29 (m, 2H), 7.13 (d, J=6.9 Hz, 1H), 7.06 (s, 1H), 6.85 (s, 1H), 4.10-4.00 (m, 4H), 3.95-3.86 (m, 4H), 2.42 (s, 3H).

General Procedure 8

Compound 89: Methyl N-[[7-morpholino-5-(3-phenylpyrazol-1-yl)pyrazolo[1,5-a]pyrimidin-2-yl]methyl]carbamate

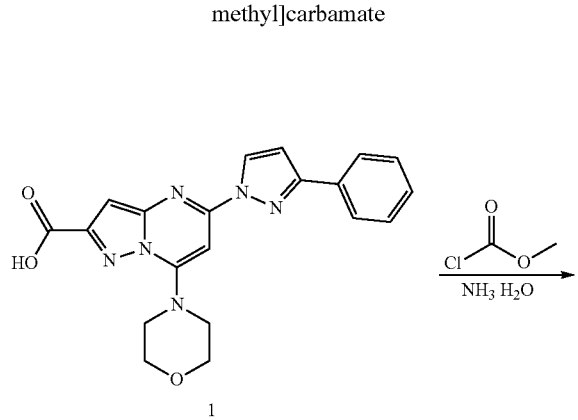

Synthesis of 7-morpholino-5-(3-phenyl-1H-pyrazol-1-yl)pyrazolo[1,5-a]pyrimidine-2-carboxamide

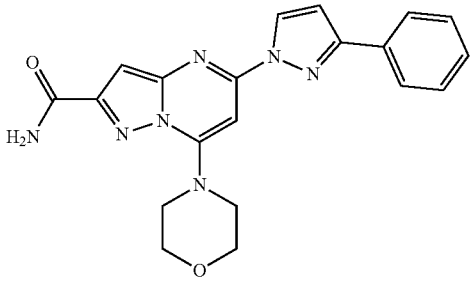 [SMILES: NC(=O)c1cc2nc(-n3ccc(-c4ccccc4)n3)cc(N3CCOCC3)n2n1]

To a solution of 7-morpholino-5-(3-phenyl-1H-pyrazol-1-yl)pyrazolo[1,5-a]pyrimidine-2-carboxylic acid (370 mg, 0.94 mmol) in DCM (50 mL) was added methyl carbonochloridate (107 mg, 1.12 mmol). The mixture was stirred at rt for 10 min and then to the mixture was added ammonium hydroxide (143 mg, 1.44 mmol). The completion of the reaction was monitored by TLC. The reaction mixture was concentrated directly and purified by silica gel column chromatography with a gradient elution of 2% MeOH/DCM to 10% MeOH/DCM to provide 7-morpholino-5-(3-phenyl-1H-pyrazol-1-yl)pyrazolo[1,5-a]pyrimidine-2-carboxamide (326 mg, 0.84 mmol) as a white solid. LC-MS (ESI+): m/z 390 (MH+). $^1$H NMR (300 MHz, DMSO-$d_6$) δ 8.73 (d, J=2.7 Hz, 1H), 8.10-8.00 (m, 3H), 7.63 (s, 1H), 7.53-7.30 (m, 3H), 7.16 (d, J=2.7 Hz, 1H), 7.04 (s, 1H), 6.83 (s, 1H), 3.95-3.85 (m, 8H).

Synthesis of (7-morpholino-5-(3-phenyl-1H-pyrazol-1-yl)pyrazolo[1,5-a]pyrimidin-2-yl)methanamine

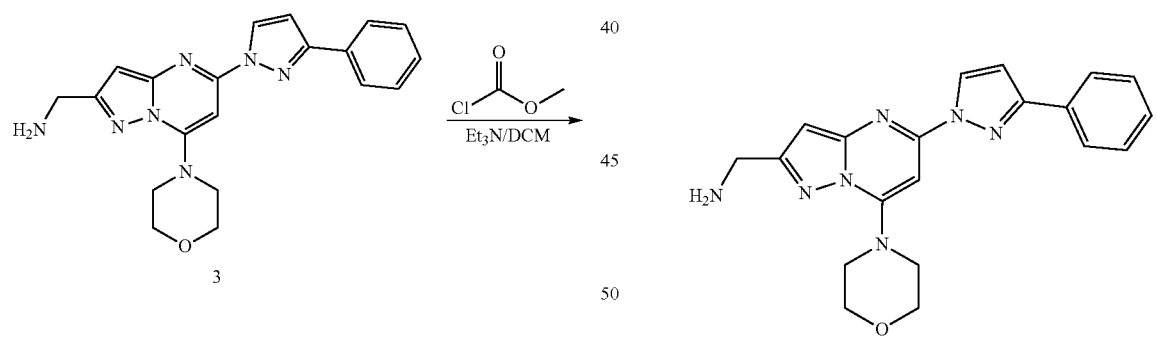

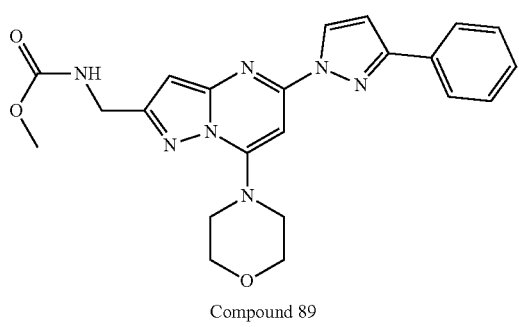

Compound 89

To a solution of 7-morpholino-5-(3-phenyl-1H-pyrazol-1-yl)pyrazolo[1,5-a]pyrimidine-2-carboxamide (200 mg, 0.26 mmol) in THF (50 mL) was added borane-tetrahydrofuran complex (2 mL, 1.02 mmol). The mixture was stirred at 60° C. overnight. The completion of the reaction was monitored by TLC. The reaction mixture was quenched with 1 M aqueous HCl solution and then adjusted the PH to 8 using NaHCO$_3$ solution. The aqueous solution was extracted with DCM/MeOH (10:1, 3×20 mL). The combined organic phase was dried over anhydrous Na$_2$SO$_4$, filtrated and concentrated under reduce pressure. The crude product was purified by silica gel column chromatography with a gradient elution of 2% MeOH/DCM to 5% MeOH/DCM to provide (7-morpholino-5-(3-phenyl-1H-pyrazol-1-yl)pyrazolo[1,5-a]pyrimidin-2-yl) methanamine (110 mg, 0.29 mmol) as white solid. LC-MS (ESI+): m/z 376 (MH⁺).

Synthesis of methyl((7-morpholino-5-(3-phenyl-1H-pyrazol-1-yl)pyrazolo[1,5-a]pyrimidin-2-yl)methyl)carbamate

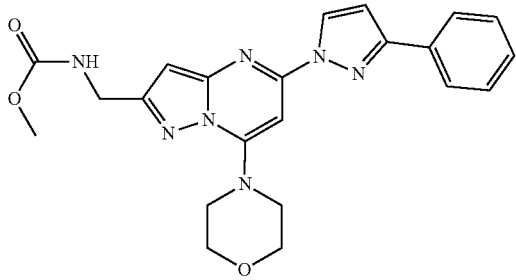 [SMILES: COC(=O)NCc1cc2nc(-n3ccc(-c4ccccc4)n3)cc(N3CCOCC3)n2n1]

To a solution of (7-morpholino-5-(3-phenyl-1H-pyrazol-1-yl)pyrazolo[1,5-a]pyrimidin-2-yl) methanamine (55 mg, 0.013 mmol) in DCM (50 mL) was added methyl carbonochloridate (13.8 mg, 0.016 mmol). The mixture was stirred at rt for 10 min and then to the mixture was added Et₃N (22 mg, 0.026 mmol). The completion of the reaction was monitored by TLC. The reaction mixture was concentrated directly and purified by silica gel column chromatography with a gradient elution of 2% MeOH/DCM to 10% MeOH/DCM to provide methyl((7-morpholino-5-(3-phenyl-1H-pyrazol-1-yl)pyrazolo[1,5-a]pyrimidin-2-yl)methyl)carbamate (Compound 89, 16 mg, 0.037 mmol) as a white solid. LC-MS (ESI+): m/z 434 (MH⁺). ¹H NMR (300 MHZ, CDCl₃) δ 8.64 (d, J=2.7 Hz, 1H), 7.93 (d, J=6.9 Hz, 2H), 7.49-7.36 (m, 3H), 7.05 (s, 1H), 6.82 (d, J=2.4 Hz, 1H), 6.42 (s, 1H), 5.24 (brs, 1H), 4.59 (d, J=6.0 Hz, 2H), 4.13-4.02 (m, 4H), 3.86-3.80 (m, 4H), 3.74 (s, 3H).

Example 48: N-[(3S)-1-methylpyrrolidin-3-yl]-7-morpholino-5-[3-(m-tolyl)pyrazol-1-yl]pyrazolo[1,5-a]pyrimidine-2-carboxamide

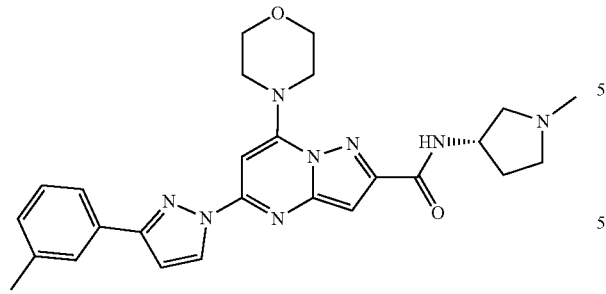

Compound 48 was prepared by General Procedure 1. LC-MS (ESI+): m/z 487 (MH⁺). ¹H NMR (300 MHz, DMSO-d₆) δ8.72 (d, J=2.4 Hz, 1H), 8.35 (d, J=7.5 Hz, 1H), 7.82-7.79 (m, 2H), 7.38 (t, J=7.5 Hz, 1H), 7.23 (d, J=7.5 Hz, 1H), 7.13 (J=2.4 Hz, 1H), 7.07 (s, 1H), 6.85 (s, 1H), 4.50-4.40 (m, 1H), 3.90 (s, 8H), 2.82-2.72 (m, 2H), 2.50-2.45 (m, 1H), 2.40 (s, 3H), 2.31 (s, 3H), 2.27-2.19 (m, 1H), 1.87-1.82 (m, 2H).

Example 49: N-[(3R)-1-methylpyrrolidin-3-yl]-7-morpholino-5-[3-(m-tolyl)pyrazol-1-yl]pyrazolo[1,5-a]pyrimidine-2-carboxamide

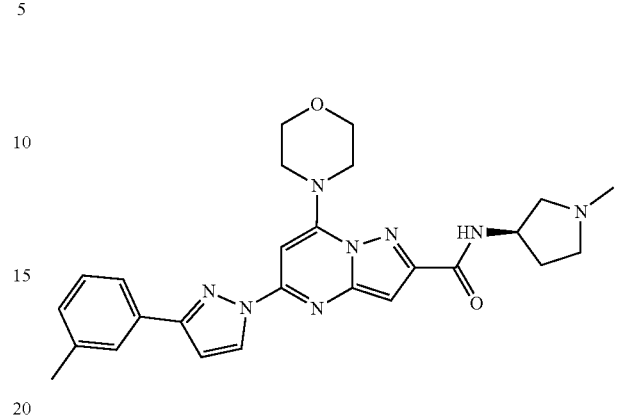

Compound 49 was prepared by General Procedure 1. LC-MS (ESI+): m/z 487 (MH⁺). ¹H NMR (300 MHz, DMSO-d₆) δ8.72 (d, J=2.7 Hz, 1H), 8.40 (d, J=7.5 Hz, 1H), 7.83-7.80 (m, 2H), 7.38 (t, J=7.5 Hz, 1H), 7.23 (d, J=7.8 Hz, 1H), 7.13 (d, J=2.4 Hz, 1H), 7.07 (s, 1H), 6.85 (s, 1H), 4.46-4.42 (m, 1H), 3.90 (s, 8H), 2.83-2.73 (m, 2H), 2.69-2.63 (m, 1H), 2.50 (s, 3H), 2.40 (s, 3H), 2.28-2.23 (m, 1H), 1.98-1.85 (m, 2H).

Example 50: 7-morpholino-5-[3-(m-tolyl)pyrazol-1-yl]-N-[(3S)-tetrahydrofuran-3-yl]pyrazolo[1,5-a]pyrimidine-2-carboxamide

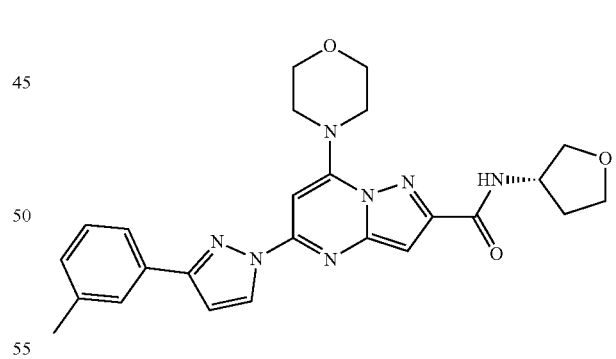

Compound 50 was prepared by General Procedure 1. LC-MS (ESI+): m/z 474 (MH*). ¹H NMR (300 MHz, CDCl₃) δ 8.72 (d, J=2.4 Hz, 1H), 7.75-7.71 (m, 2H), 7.35 (t, J=7.5 Hz, 1H), 7.22-7.19 (m, 2H), 7.07 (d, J=7.8 Hz, 1H), 7.00 (s, 1H), 6.82 (d, J=2.4 Hz, 1H), 4.78-4.70 (m, 1H), 4.07-3.94 (m, 6H), 3.90-3.78 (m, 6H), 2.45 (s, 3H), 2.41-2.39 (m, 1H), 1.98-1.85 (m, 1H).

Example 51: 7-morpholino-5-[3-(m-tolyl)pyrazol-1-yl]-N-[(3R)-tetrahydrofuran-3-yl]pyrazolo[1,5-a]pyrimidine-2-carboxamide

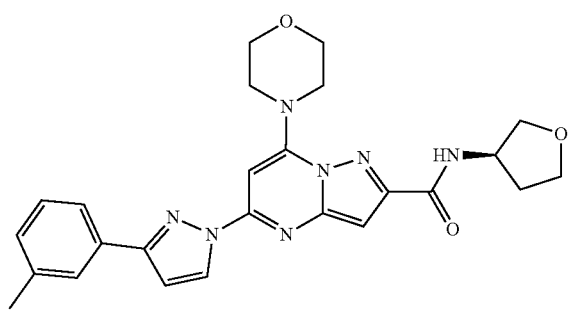 [SMILES: Cc1cccc(-c2ccn(-c3cc(N4CCOCC4)n4nc(C(=O)N[C@@H]5CCOC5)cc4n3)n2)c1]

Compound 51 was prepared by General Procedure 1. LC-MS (ESI+): m/z 474 (MH+). ¹H NMR (300 MHz, CDCl₃) δ 8.63 (d, J=2.4 Hz, 1H), 7.75-7.71 (m, 2H), 7.35 (t, J=7.5 Hz, 1H), 7.22-7.18 (m, 2H), 7.07 (d, J=7.5 Hz, 1H), 7.00 (s, 1H), 6.82 (d, J=2.4 Hz, 1H), 4.78-4.70 (m, 1H), 4.04-3.94 (m, 6H), 3.90-3.78 (m, 6H), 2.45 (s, 3H), 2.41-2.34 (m, 1H), 1.98-1.85 (m, 1H).

Example 52: N-[(3R)-1-methyl-3-piperidyl]-7-morpholino-5-[3-(m-tolyl)pyrazol-1-yl]pyrazolo[1,5-a]pyrimidine-2-carboxamide

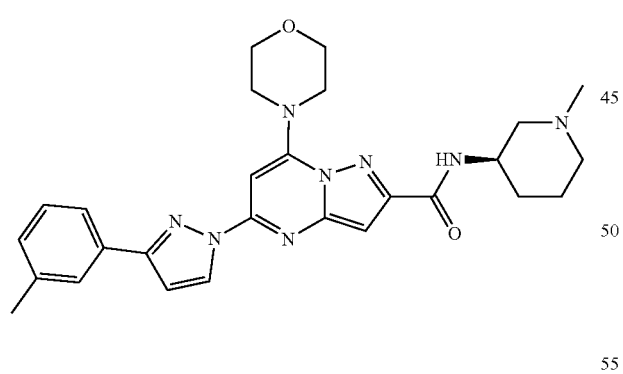

Compound 52 was prepared by General Procedure 1. LC-MS (ESI+): m/z 501 (MH+). ¹H NMR (300 MHz, DMSO-d6) δ8.72 (d, J=2.7 Hz, 1H), 8.05 (d, J=8.1 Hz, 1H), 7.82-7.79 (m, 2H), 7.38 (t, J=7.5 Hz, 1H), 7.23 (d, J=7.2 Hz, 1H), 7.13 (d, J=2.7 Hz, 1H), 7.07 (s, 1H), 6.83 (s, 1H), 4.02-3.95 (m, 1H), 3.90 (s, 8H), 2.70-2.61 (m, 1H), 2.50-2.40 (m, 4H), 2.21 (s, 3H), 2.11-2.07 (m, 2H), 1.80-1.60 (m, 2H), 1.58-1.40 (m, 2H).

Example 53: N-[(3S)-1-methyl-3-piperidyl]-7-morpholino-5-[3-(m-tolyl)pyrazol-1-yl]pyrazolo[1,5-a]pyrimidine-2-carboxamide

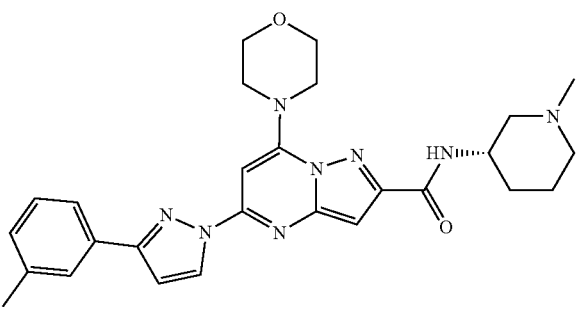

Compound 53 was prepared by General Procedure 1. LC-MS (ESI+): m/z 501 (MH+). ¹H NMR (300 MHZ, DMSO-d₆) δ 8.72 (d, J=2.4 Hz, 1H), 8.06 (d, J=8.7 Hz, 1H), 7.83-7.80 (m, 2H), 7.38 (t, J=7.5 Hz, 1H), 7.24 (d, J=7.5 Hz, 1H), 7.14 (d, J=2.4 Hz, 1H), 7.08 (s, 1H), 6.84 (s, 1H), 4.09-3.99 (m, 1H), 3.90 (s, 8H), 2.70-2.61 (m, 1H), 2.50-2.40 (m, 4H), 2.21 (s, 3H), 2.11-2.07 (m, 2H), 1.80-1.60 (m, 2H), 1.58-1.40 (m, 2H).

Example 54: N-(1-methyl-4-piperidyl)-7-morpholino-5-[3-(m-tolyl)pyrazol-1-yl]pyrazolo[1,5-a]pyrimidine-2-carboxamide Compound 54 was prepared by General Procedure 1. LC-MS (ESI+): m/z 501 (MH+). ¹H NMR (300 MHz, DMSO-d₆) δ8.72 (s, 1H), 8.16-8.06 (m, 1H), 7.83-7.80 (m, 2H), 7.38 (t, J=7.5 Hz, 1H), 7.23 (d, J=6.9 Hz, 1H), 7.14 (s, 1H), 7.08 (s, 1H), 6.84 (s, 1H), 3.90-3.80 (m, 9H), 2.95-2.86 (m, 2H), 2.40 (s, 3H), 2.32-2.21 (m, 5H), 1.91-1.73 (m, 4H).

Example 55: N-(1-methyl-4-piperidyl)-7-morpholino-5-[4-(m-tolyl)pyrazol-1-yl]pyrazolo[1,5-a]pyrimidine-2-carboxamide

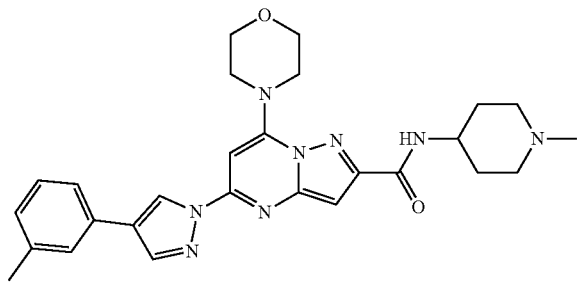

Compound 55 was prepared by General Procedure 1. LC-MS (ESI+): m/z 501 (MH+). $^1$H NMR (300 MHz, CDCl$_3$) δ 8.87 (s, 1H), 8.06 (s, 1H), 7.49-7.43 (m, 2H), 7.33-7.28 (m, 1H), 7.16-7.12 (m, 2H), 6.99-6.94 (m, 2H), 4.32-4.21 (m, 1H), 4.10-4.05 (m, 4H), 3.86-3.79 (m, 4H), 3.65-3.60 (m, 2H), 2.98-2.90 (m, 2H), 2.85 (s, 3H), 2.55-2.47 (m, 2H), 2.43 (s, 3H), 2.30-2.25 (m, 2H).

Example 56: 7-morpholino-5-[4-(m-tolyl)pyrazol-1-yl]-N-tetrahydropyran-4-yl-pyrazolo[1,5-a]pyrimidine-2-carboxamide

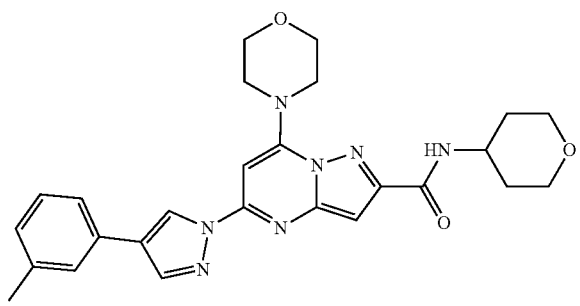 [SMILES: Cc1cccc(-c2cnn(-c3cc(N4CCOCC4)n4nc(C(=O)NC5CCOCC5)cc4n3)c2)c1]

Compound 56 was prepared by General Procedure 1. LC-MS (ESI+): m/z 488 (MH+). $^1$H NMR (300 MHz, CDCl$_3$) δ 8.86 (s, 1H), 8.04 (s, 1H), 7.44-7.41 (m, 2H), 7.37-7.31 (m, 1H), 7.14-7.09 (m, 2H), 7.03 (s, 1H), 6.86-6.83 (m, 1H), 4.30-4.21 (m, 1H), 4.10-4.00 (m, 6H), 3.85-3.75 (m, 4H), 3.61-3.54 (m, 2H), 2.41 (s, 3H), 2.08-2.03 (m, 2H), 1.71-1.58 (m, 2H).

Example 57: 4-[5-[4-(m-tolyl)pyrazol-1-yl]-2-pyrimidin-4-yl-pyrazolo[1,5-a]pyrimidin-7-yl]morpholine

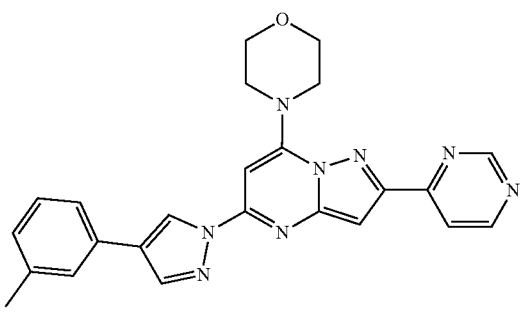 [SMILES: Cc1cccc(-c2cnn(-c3cc(N4CCOCC4)n4nc(-c5ccncn5)cc4n3)c2)c1]

Compound 57 was prepared by General Procedures 2 and 6. LC-MS (ESI+): m/z 439 (MH+). $^1$H NMR (300 MHz, CDCl$_3$) δ 9.33 (s, 1H), 8.89 (s, 1H), 8.86 (s, 1H), 8.09 (s, 1H), 8.05 (s, 1H), 7.53-7.42 (m, 2H), 7.34-7.29 (m, 2H), 7.14-7.12 (m, 1H), 7.06 (s, 1H), 4.10-4.00 (m, 4H), 3.92-3.81 (m, 4H), 2.42 (s, 3H).

Example 58: 4-[5-[4-(m-tolyl)pyrazol-1-yl]-2-pyrimidin-5-yl-pyrazolo[1,5-a]pyrimidin-7-yl]morpholine

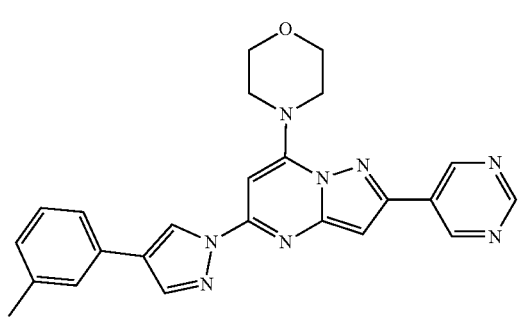 [SMILES: Cc1cccc(-c2cnn(-c3cc(N4CCOCC4)n4nc(-c5cncnc5)cc4n3)c2)c1]

Compound 58 was prepared by General Procedures 2 and 7. LC-MS (ESI+): m/z 439 (MH+). $^1$H NMR (300 MHz, CDCl$_3$) δ 9.38-9.25 (m, 2H), 8.85 (s, 1H), 8.04 (s, 1H), 7.55-7.41 (m, 2H), 7.34-7.29 (m, 2H), 7.13 (d, J=6.9 Hz, 1H), 7.06 (s, 1H), 6.85 (s, 1H), 4.10-4.00 (m, 4H), 3.95-3.86 (m, 4H), 2.42 (s, 3H).

Example 59: 3-[7-morpholino-5-[4-(m-tolyl)pyrazol-1-yl]pyrazolo[1,5-a]pyrimidin-2-yl]pyridin-2-amine

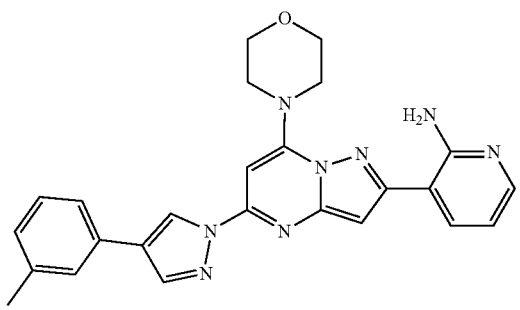 [SMILES: Cc1cccc(-c2cnn(-c3cc(N4CCOCC4)n4nc(-c5cccnc5N)cc4n3)c2)c1]

Compound 59 was prepared by General Procedures 2 and 7. LC-MS (ESI+): m/z 453 (MH+). ¹H NMR (300 MHz, DMSO-d$_6$) δ9.09 (s, 1H), 8.40 (s, 1H), 8.16 (d, J=6.3 Hz, 1H), 8.06 (d, J=4.2 Hz, 1H), 7.68 (s, 1H), 7.62 (d, J=7.5 Hz, 1H), 7.31 (t, J=7.5 Hz, 1H), 7.12-7.07 (m, 4H), 6.96 (s, 1H), 6.74-6.70 (m, 1H), 3.95-3.85 (m, 4H), 3.85-3.80 (m, 4H), 2.36 (s, 3H).

Example 60: 5-[7-morpholino-5-[4-(m-tolyl)pyrazol-1-yl]pyrazolo[1,5-a]pyrimidin-2-yl]pyrimidin-2-amine

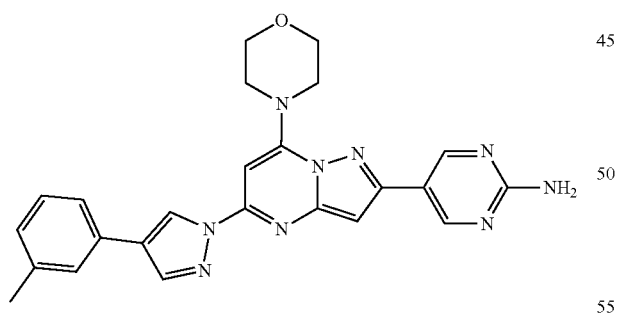

Compound 60 was prepared by General Procedures 2 and 7. LC-MS (ESI+): m/z 454 (MH+). ¹H NMR (300 MHz, DMSO-d$_6$) δ9.07 (s, 1H), 8.88 (s, 2H), 8.37 (s, 1H), 7.67 (s, 1H), 7.61 (d, J=8.7 Hz, 1H), 7.30 (t, J=7.5 Hz, 1H), 7.10 (d, J=7.2 Hz, 1H), 6.99 (s, 2H), 6.92 (d, J=9.0 Hz, 2H), 3.89 (s, 8H), 2.36 (s, 3H).

Example 61: 4-[2-(1-methylpyrazol-3-yl)-5-[3-(m-tolyl)pyrazol-1-yl]pyrazolo[1,5-a]pyrimidin-7-yl]morpholine

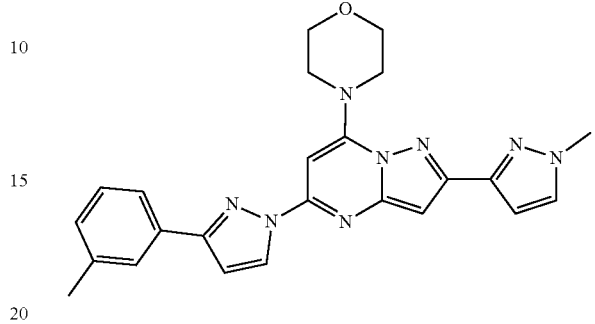

Compound 61 was prepared by General Procedures 2 and 7. LC-MS (ESI+): m/z 441 (MH+). ¹H NMR (300 MHz, CDCl$_3$) δ 8.66 (d, J=2.7 Hz, 1H), 7.77-7.61 (m, 2H), 7.42 (d, J=2.1 Hz, 1H), 7.35 (t, J=7.5 Hz, 1H), 7.22-7.15 (m, 1H), 7.05 (s, 1H), 6.83-6.81 (m, 2H), 6.76 (d, J=2.1 Hz, 1H), 4.13-4.08 (m, 4H), 4.02 (s, 3H), 3.95-3.90 (m, 4H), 2.45 (s, 3H).

Example 62: 4-[5-[3-(m-tolyl)pyrazol-1-yl]-2-(1H-pyrazol-3-yl)pyrazolo[1,5-a]pyrimidin-7-yl]morpholine

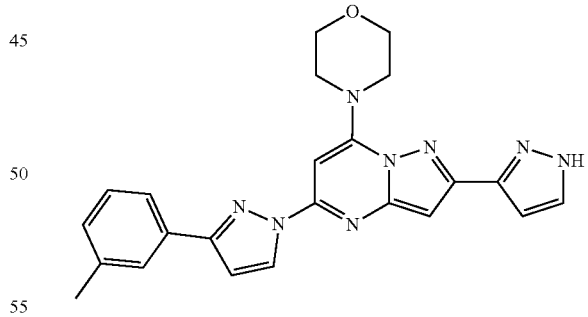

Compound 62 was prepared by General Procedures 2 and 7. LC-MS (ESI+): m/z 427 (MH+). ¹H NMR (300 MHz, DMSO-d$_6$+D$_2$O) δ 8.71 (d, J=2.4 Hz, 1H), 7.82-7.79 (m, 3H), 7.39 (t, J=7.5 Hz, 1H), 7.24 (d, J=7.2 Hz, 1H), 7.12 (d, J=2.4 Hz, 1H), 6.99 (s, 1H), 6.85-6.80 (m, 2H), 4.05 (s, 8H), 2.41 (s, 3H).

Example 63: 4-[5-(3-phenylpyrazol-1-yl)-2-pyrimidin-2-yl-pyrazolo[1,5-a]pyrimidin-7-yl]morpholine

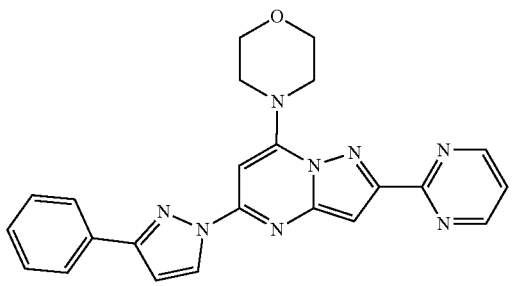

Compound 63 was prepared by General Procedures 2 and 6. LC-MS (ESI+): m/z 425 (MH+). ¹H NMR (300 MHz, CDCl₃) δ 8.90 (d, J=4.8 Hz, 2H), 8.69 (d, J=2.7 Hz 1H), 7.95 (d, J=2.7 Hz, 2H), 7.50-7.31 (m, 5H), 7.15 (s, 1H), 6.85 (d, J=2.7 Hz, 1H), 4.13-4.08 (m, 4H), 4.07-3.95 (m, 4H).

Example 64: 4-[5-(3-phenylpyrazol-1-yl)-2-(3-pyridyl)pyrazolo[1,5-a]pyrimidin-7-yl]morpholine

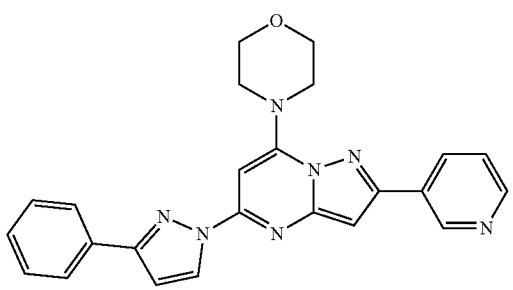 [SMILES: c1ccc(-c2ccn(-c3cc(N4CCOCC4)n4nc(-c5cccnc5)cc4n3)n2)cc1]

Compound 64 was prepared by General Procedures 2 and 7. LC-MS (ESI+): m/z 424 (MH+). ¹H NMR (300 MHZ, CDCl₃) δ 9.23 (s, 1H), 8.65 (d, J=2.7 Hz, 2H), 8.25 (d, J=7.8 Hz, 1H), 7.95 (d, J=7.2 Hz, 2H), 7.50-7.30 (m, 4H), 7.11 (s, 1H), 6.85 (d, J=2.7 Hz, 1H), 6.82 (s, 1H), 4.10-4.04 (m, 4H), 3.96-3.90 (m, 4H).

Example 65: 4-[2-(5-methyl-1H-pyrazol-3-yl)-5-[3-(m-tolyl)pyrazol-1-yl]pyrazolo[1,5-a]pyrimidin-7-yl]morpholine

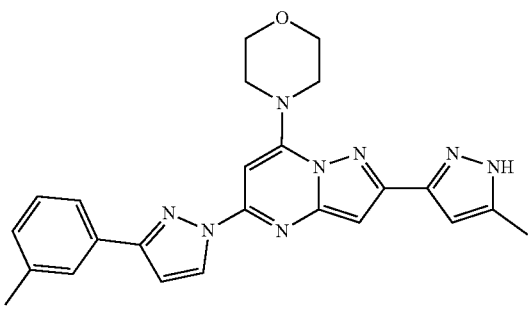

Compound 65 was prepared by General Procedures 2 and 7. LC-MS (ESI+): m/z 441 (MH+). ¹H NMR (300 MHz, CDCl₃) δ 8.63 (d, J=2.7 Hz, 1H), 7.76-7.61 (m, 2H), 7.38-7.32 (m, 2H), 7.22-7.15 (m, 1H), 7.06 (s, 1H), 6.81 (d, J=2.7 Hz, 1H), 6.73 (s, 1H), 6.56 (brs, 1H), 4.05-4.00 (m, 4H), 3.95-3.85 (m, 4H), 2.45 (s, 3H), 2.40 (s, 3H).

Example 66: 4-[2-(1-methylpyrazol-3-yl)-5-(3-phenylpyrazol-1-yl)pyrazolo[1,5-a]pyrimidin-7-yl]morpholine

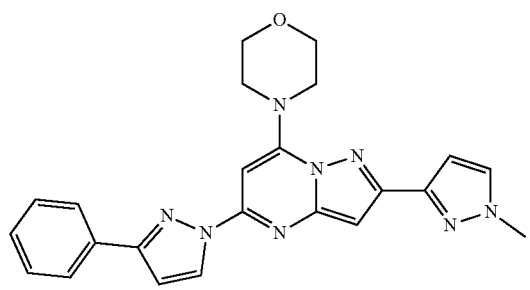 [SMILES: Cn1ccc(-c2cc3nc(-n4ccc(-c5ccccc5)n4)cc(N4CCOCC4)n3n2)n1]

Compound 66 was prepared by General Procedures 2 and 7. LC-MS (ESI+): m/z 427 (MH+). ¹H NMR (300 MHZ, CDCl₃) δ 8.66 (d, J=2.7 Hz, 1H), 7.94 (d, J=6.9 Hz, 2H), 7.48-7.32 (m, 4H), 7.05 (s, 1H), 6.82 (s, 2H), 6.73 (d, J=2.1 Hz, 1H), 4.15-4.05 (m, 4H), 4.02 (s, 3H), 3.95-3.88 (m, 4H).

Example 67: 4-[5-(3-phenylpyrazol-1-yl)-2-(1H-pyrazol-3-yl)pyrazolo[1,5-a]pyrimidin-7-yl]morpholine

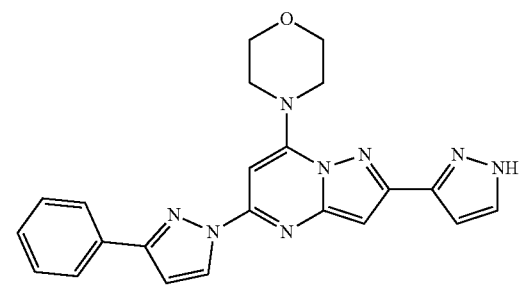 [SMILES: c1ccc(-c2ccn(-c3cc(N4CCOCC4)n4nc(-c5cc[nH]n5)cc4n3)n2)cc1]

Compound 67 was prepared by General Procedures 2 and 7. LC-MS (ESI+): m/z 413 (MH+). ¹H NMR (300 MHz, DMSO-d₆+D₂O) δ 8.73 (d, J=2.7 Hz, 1H), 8.02 (d, J=7.2 Hz, 2H), 7.78 (d, J=2.1 Hz, 1H), 7.53-7.40 (m, 3H), 7.15 (d, J=2.7 Hz, 1H), 6.99 (s, 1H), 6.80-6.78 (m, 2H), 3.92 (s, 8H).

Example 68: 4-[5-(3-phenylpyrazol-1-yl)-2-pyrimidin-4-yl-pyrazolo[1,5-a]pyrimidin-7-yl]morpholine

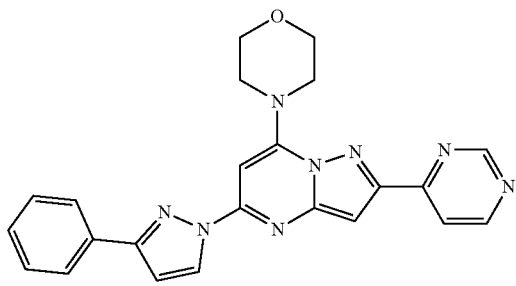 [SMILES: c1ccc(-c2ccn(-c3cc(N4CCOCC4)n4nc(-c5ccncn5)cc4n3)n2)cc1]

Compound 68 was prepared by General Procedures 2 and 6. LC-MS (ESI+): m/z 425 (MH+). ¹H NMR (300 MHZ, CDCl₃) δ 8.90 (d, J=2.7 Hz, 1H), 8.84 (d, J=4.8 Hz 1H), 8.68 (d, J=2.7 Hz, 1H), 8.10 (d, J=4.8 Hz, 1H), 7.94 (d, J=7.2 Hz, 2H), 7.50-7.37 (m, 3H), 7.23 (s, 1H), 7.17 (s, 1H), 6.85 (d, J=2.7 Hz, 1H), 4.13-4.06 (m, 4H), 3.95-3.90 (m, 4H).

Example 69: 4-[5-(3-phenylpyrazol-1-yl)-2-pyrimidin-5-yl-pyrazolo[1,5-a]pyrimidin-7-yl]morpholine

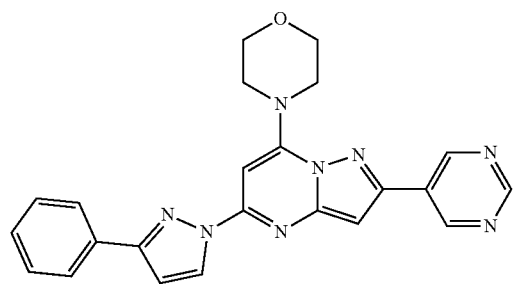

Compound 69 was prepared by General Procedures 2 and 7. LC-MS (ESI+): m/z 425 (MH+). ¹H NMR (300 MHZ, CDCl₃) δ 9.32 (s, 2H), 9.25 (s, 1H), 8.65 (d, J=2.7 Hz, 1H), 7.95 (d, J=6.9 Hz, 2H), 7.63-7.37 (m, 3H), 7.17 (s, 1H), 6.86-6.85 (m, 2H), 4.06-4.01 (m, 4H), 3.95-3.90 (m, 4H).

Example 70: 3-[7-morpholino-5-(3-phenylpyrazol-1-yl)pyrazolo[1,5-a]pyrimidin-2-yl]pyridin-2-amine

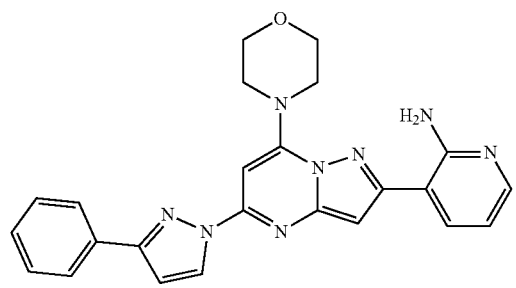 [SMILES: Nc1ncccc1-c1cc2nc(-n3ccc(-c4ccccc4)n3)cc(N3CCOCC3)n2n1]

Compound 70 was prepared by General Procedures 2 and 7. LC-MS (ESI+): m/z 439 (MH+). ¹H NMR (300 MHz, CDCl₃) δ 8.65 (d, J=2.7 Hz, 1H), 8.11-8.09 (m, 1H), 7.80-7.94 (m, 3H), 7.50-7.33 (m, 3H), 7.11 (s, 1H), 6.86-6.77 (m, 3H), 6.63 (s, 2H), 4.04-4.00 (m, 4H), 3.86-3.83 (m, 4H).

Example 71: 5-[7-morpholino-5-(3-phenylpyrazol-1-yl)pyrazolo[1,5-a]pyrimidin-2-yl]pyrimidin-2-amine

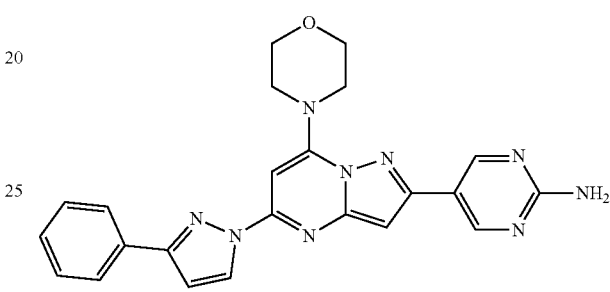

Compound 71 was prepared by General Procedures 2 and 7. LC-MS (ESI+): m/z 440 (MH+). ¹H NMR (300 MHz, CDCl₃) δ 8.67 (s, 2H), 8.64 (d, J=2.7 Hz, 1H), 7.94 (d, J=7.2 Hz, 2H), 7.50-7.33 (m, 3H), 7.09 (s, 1H), 6.83 (d, J=2.7 Hz, 1H), 6.67 (s, 1H), 5.20 (s, 2H), 4.04-4.00 (m, 4H), 3.96-3.87 (m, 4H).

Example 72: 4-[5-(3-phenylpyrazol-1-yl)-2-(2-pyridyl)pyrazolo[1,5-a]pyrimidin-7-yl]morpholine

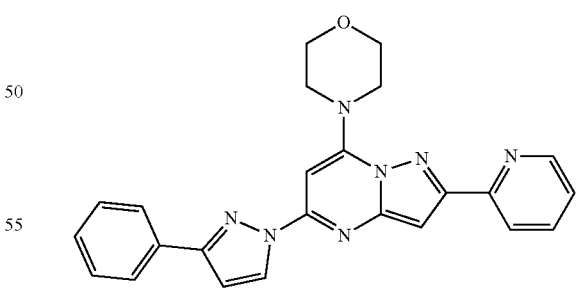

Compound 72 was prepared by General Procedures 2 and 6. LC-MS (ESI+): m/z 424 (MH+). ¹H NMR (300 MHZ, CDCl₃) δ 8.73 (d, J=4.2 Hz, 1H), 8.69 (d, J=2.7 Hz, 1H), 8.17 (d, J=8.1 Hz, 1H), 7.95 (d, J=8.1 Hz, 2H), 7.84-7.80 (m, 1H), 7.49-7.30 (m, 4H), 7.16 (s, 1H), 7.11 (s, 1H), 6.84 (d, J=2.7 Hz, 1H), 4.11-4.03 (m, 4H), 3.96-3.87 (m, 4H).

Example 73: N-isopropyl-7-morpholino-5-(3-phenylpyrazol-1-yl)pyrazolo[1,5-a]pyrimidine-2-carboxamide

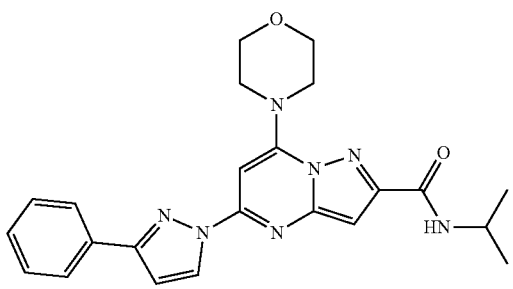 [SMILES: CC(C)NC(=O)c1cc2nc(-n3ccc(-c4ccccc4)n3)cc(N3CCOCC3)n2n1]

Compound 73 was prepared by General Procedure 1. LC-MS (ESI+): m/z 432 (MH$^+$). $^1$H NMR (300 MHZ, CDCl$_3$) δ 8.65 (d, J=2.7 Hz, 1H), 7.94 (d, J=6.9 Hz, 2H), 7.49-7.37 (m, 3H), 7.18 (s, 1H), 7.01 (s, 1H), 6.84 (d, J=2.7 Hz, 1H), 6.77-6.74 (m, 1H), 4.36-4.27 (m, 1H), 4.09-4.00 (m, 4H), 3.90-3.80 (m, 4H), 1.31 (d, J=6.6 Hz, 6H).

Example 74: N-[(1R)-1-cyclopropylethyl]-7-morpholino-5-(3-phenylpyrazol-1-yl)pyrazolo[1,5-a]pyrimidine-2-carboxamide

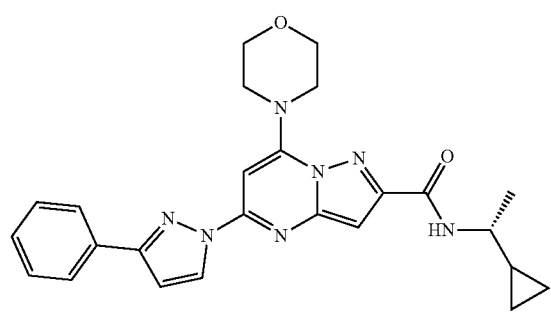 [SMILES: C[C@@H](NC(=O)c1cc2nc(-n3ccc(-c4ccccc4)n3)cc(N3CCOCC3)n2n1)C1CC1]

Compound 74 was prepared by General Procedure 1. LC-MS (ESI+): m/z 458 (MH$^+$). $^1$H NMR (300 MHz, CDCl$_3$) δ 8.65 (d, J=2.7 Hz, 1H), 7.94 (d, J=6.9 Hz, 2H), 7.49-7.37 (m, 3H), 7.18 (s, 1H), 7.01 (s, 1H), 6.93-6.85 (m, 1H), 6.84 (d, J=2.7 Hz, 1H), 4.09-4.00 (m, 4H), 3.90-3.80 (m, 4H), 3.71-3.60 (m, 1H), 1.35 (d, J=6.6 Hz, 3H), 1.00-0.90 (m, 1H), 0.57-0.40 (m, 3H), 0.34-0.31 (m, 1H).

Example 75: N-[(1S)-1-cyclopropylethyl]-7-morpholino-5-(3-phenylpyrazol-1-yl)pyrazolo[1,5-a]pyrimidine-2-carboxamide

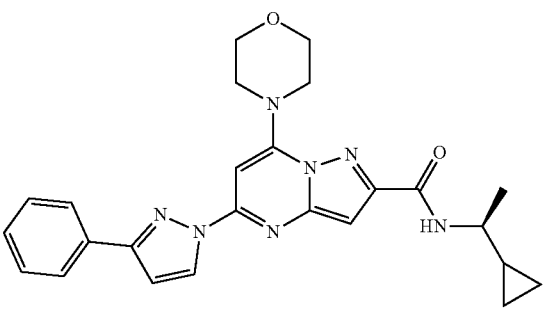 [SMILES: C[C@H](NC(=O)c1cc2nc(-n3ccc(-c4ccccc4)n3)cc(N3CCOCC3)n2n1)C1CC1]

Compound 75 was prepared by General Procedure 1. LC-MS (ESI+): m/z 458 (MH$^+$). $^1$H NMR (300 MHz, CDCl$_3$) δ 8.65 (d, J=2.7 Hz, 1H), 7.94 (d, J=6.9 Hz, 2H), 7.49-7.37 (m, 3H), 7.18 (s, 1H), 7.01 (s, 1H), 6.93-6.85 (m, 1H), 6.84 (d, J=2.7 Hz, 1H), 4.06-4.00 (m, 4H), 3.88-3.80 (m, 4H), 3.70-3.60 (m, 1H), 1.35 (d, J=6.6 Hz, 3H), 1.00-0.90 (m, 1H), 0.57-0.40 (m, 3H), 0.34-0.31 (m, 1H).

Example 76: 7-morpholino-N-(oxetan-3-ylmethyl)-5-(3-phenylpyrazol-1-yl)pyrazolo[1,5-a]pyrimidine-2-carboxamide Compound 76 was prepared by General Procedure 1. LC-MS (ESI+): m/z 460 (MH$^+$). $^1$H NMR (300 MHz, CDCl$_3$) δ 8.65 (d, J=2.7 Hz, 1H), 7.94 (d, J=6.9 Hz, 2H), 7.49-7.37 (m, 3H), 7.25-7.15 (m, 1H), 7.18 (s, 1H), 7.01 (s, 1H), 6.84 (d, J=2.7 Hz, 1H), 4.89-4.80 (m, 2H), 4.54-4.45 (m, 2H), 4.06-4.00 (m, 4H), 3.88-3.70 (m, 6H), 3.39-3.30 (m, 1H).

Example 77: N-cyclopentyl-7-morpholino-5-(3-phenylpyrazol-1-yl)pyrazolo[1,5-a]pyrimidine-2-carboxamide

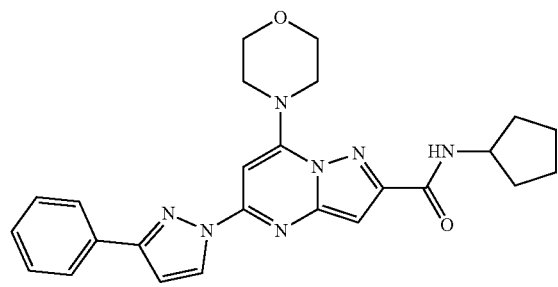 [SMILES: O=C(NC1CCCC1)c1cc2nc(-n3ccc(-c4ccccc4)n3)cc(N3CCOCC3)n2n1]

Compound 77 was prepared by General Procedure 1. LC-MS (ESI+): m/z 458 (MH$^+$). $^1$H NMR (300 MHz, CDCl$_3$) δ 8.65 (d, J=2.7 Hz, 1H), 7.94 (d, J=7.2 Hz, 2H), 7.49-7.37 (m, 3H), 7.18 (s, 1H), 7.01 (s, 1H), 6.91-6.88 (m, 1H), 6.84 (d, J=2.7 Hz, 1H), 4.50-4.40 (m, 1H), 4.06-4.00 (m, 4H), 3.88-3.75 (m, 4H), 2.16-2.08 (m, 2H), 1.80-1.60 (m, 4H), 1.60-1.50 (m, 2H).

Example 78: 4-[5-(4-phenylpyrazol-1-yl)-2-(2-pyridyl)pyrazolo[1,5-a]pyrimidin-7-yl]morpholine

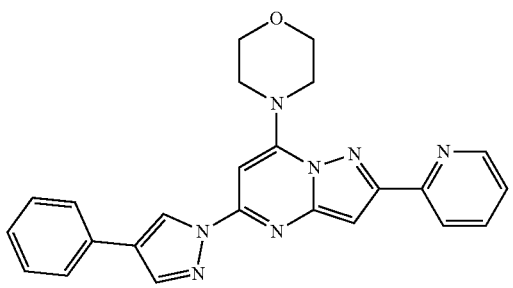

Compound 78 was prepared by General Procedures 2 and 6. LC-MS (ESI+): m/z 424 (MH$^+$). $^1$H NMR (300 MHz, CDCl$_3$) δ 8.90 (s, 1H), 8.73 (d, J=3.6 Hz, 1H), 8.17 (d, J=7.8 Hz, 1H), 8.04 (s, 1H), 7.80 (t, J=7.5 Hz, 1H), 7.63 (d, J=8.4 Hz, 2H), 7.45 (t, J=7.5 Hz, 2H), 7.33-7.20 (m, 2H), 7.16 (s, 1H), 7.01 (s, 1H), 4.11-4.03 (m, 4H), 3.96-3.88 (m, 4H).

Example 79: 4-[5-(4-phenylpyrazol-1-yl)-2-(3-pyridyl)pyrazolo[1,5-a]pyrimidin-7-yl]morpholine

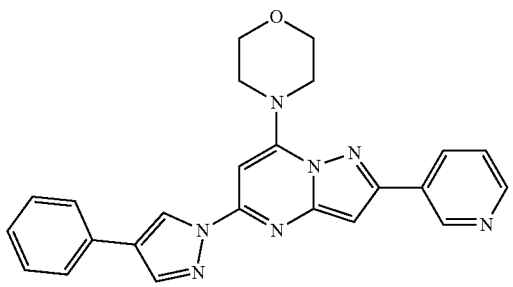 [SMILES: c1ccc(-c2cnn(-c3cc(N4CCOCC4)n4nc(-c5cccnc5)cc4n3)c2)cc1]

Compound 79 was prepared by General Procedures 2 and 7. LC-MS (ESI+): m/z 424 (MH$^+$). $^1$H NMR (300 MHz, DMSO-d$_6$) δ 9.28 (d, J=1.5 Hz, 1H), 9.12 (s, 1H), 8.68-8.60 (m, 1H), 8.43-8.41 (m, 2H), 7.83 (d, J=7.5 Hz, 2H), 7.57-7.53 (m, 1H), 7.45 (t, J=7.5 Hz, 2H), 7.32-7.29 (m, 1H), 7.16 (s, 1H), 6.97 (s, 1H), 3.92 (s, 8H).

Example 80: N-isopropyl-7-morpholino-5-(4-phenylpyrazol-1-yl)pyrazolo[1,5-a]pyrimidine-2-carboxamide

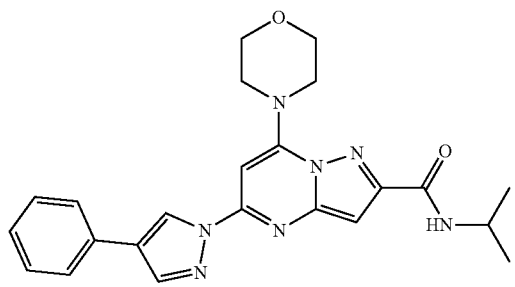 [SMILES: CC(C)NC(=O)c1cc2nc(-n3cc(-c4ccccc4)cn3)cc(N3CCOCC3)n2n1]

Compound 80 was prepared by General Procedure 1. LC-MS (ESI+): m/z 432 (MH$^+$). $^1$H NMR (300 MHz, CDCl$_3$) δ 8.87 (s, 1H), 8.04 (s, 1H), 7.61 (d, J=7.2 Hz, 2H), 7.33 (t, J=7.5 Hz, 2H), 7.32-7.29 (m, 1H), 7.06 (s, 1H), 7.03 (s, 1H), 6.76-6.70 (m, 1H), 4.39-4.27 (m, 1H), 4.08-4.00 (m, 4H), 3.85-3.80 (m, 4H), 1.31 (d, J=6.6 Hz, 6H).

Example 81: 4-[2-(5-methyl-1H-pyrazol-3-yl)-5-(3-phenylpyrazol-1-yl)pyrazolo[1,5-a]pyrimidin-7-yl]morpholine

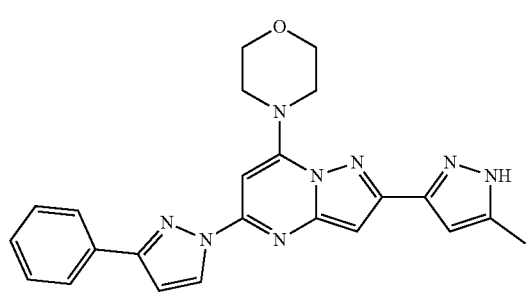 [SMILES: Cc1cc(-c2cc3nc(-n4ccc(-c5ccccc5)n4)cc(N4CCOCC4)n3n2)n[nH]1]

Compound 81 was prepared by General Procedures 2 and 7. LC-MS (ESI+): m/z 427 (MH$^+$). $^1$H NMR (300 MHz, DMSO-d$_6$+D$_2$O) δ 8.73 (d, J=2.7 Hz, 1H), 8.02 (d, J=7.2 Hz, 2H), 7.60-7.40 (m, 3H), 7.15 (d, J=2.7 Hz, 1H), 6.98 (s, 1H), 6.74 (s, 1H), 6.54 (s, 1H), 3.91 (s, 8H), 2.39 (s, 3H).

Example 82: 4-[5-(3-phenylpyrazol-1-yl)-2-pyrazin-2-yl-pyrazolo[1,5-a]pyrimidin-7-yl]morpholine

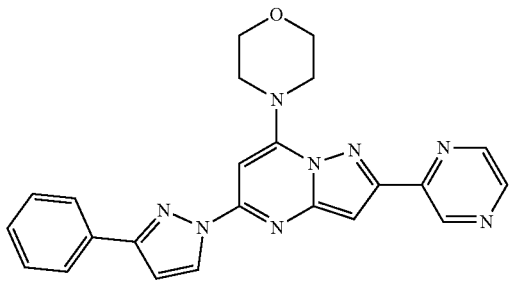

Compound 82 was prepared by General Procedures 2 and 6. LC-MS (ESI+): m/z 440 (MH$^+$). $^1$H NMR (300 MHZ, CDCl$_3$) δ 9.41 (s, 1H), 8.68 (d, J=2.7 Hz, 2H), 8.58 (s, 1H), 7.95 (d, J=7.2 Hz, 2H), 7.50-7.33 (m, 4H), 7.15 (s, 2H), 6.85 (d, J=2.7 Hz, 1H), 4.11-4.00 (m, 4H), 3.96-3.83 (m, 4H).

Example 83: N,N-dimethyl-2-[3-methyl-5-[7-morpholino-5-[3-(m-tolyl)pyrazol-1-yl]pyrazolo[1,5-a]pyrimidin-2-yl]pyrazol-1-yl]ethanamine

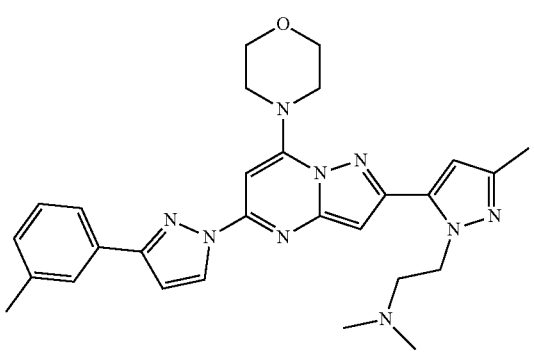

Compound 83 was prepared by General Procedure 2. LC-MS (ESI+): m/z 512 (MH$^+$). $^1$H NMR (300 MHz, DMSO-d$_6$) δ8.71 (d, J=2.7 Hz, 1H), 7.83-7.80 (m, 2H), 7.38 (t, J=7.5 Hz, 1H), 7.23 (d, J=7.5 Hz, 1H), 7.15 (d, J=2.7 Hz, 1H), 7.02 (s, 1H), 6.88 (s, 1H), 6.65 (s, 1H), 4.65-4.60 (m, 2H), 3.88 (s, 8H), 2.70-2.60 (m, 2H), 2.35 (s, 3H), 2.21 (s, 3H), 2.18 (s, 6H).

Example 84: 4-[2-(2,5-dimethylpyrazol-3-yl)-5-[3-(m-tolyl)pyrazol-1-yl]pyrazolo[1,5-a]pyrimidin-7-yl]morpholine

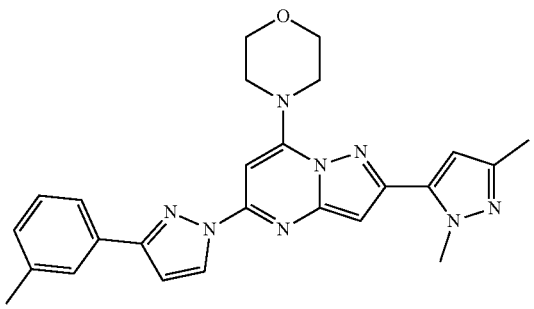

Compound 84 was prepared by General Procedures 2 and 5. LC-MS (ESI+): m/z 455 (MH$^+$). $^1$H NMR (300 MHz, CDCl$_3$) δ 8.60 (d, J=2.7 Hz, 1H), 7.75-7.70 (m, 2H), 7.33 (t, J=7.5 Hz, 1H), 7.20 (d, J=7.5 Hz, 1H), 7.04 (s, 1H), 6.79 (d, J=2.7 Hz, 1H), 6.59 (s, 1H), 6.44 (s, 1H), 4.17 (s, 3H), 4.02-3.90 (m, 4H), 3.88-3.85 (m, 4H), 2.43 (s, 3H), 2.32 (s, 3H).

Example 85: 4-[2-(2,5-dimethylpyrazol-3-yl)-5-(3-phenylpyrazol-1-yl)pyrazolo[1,5-a]pyrimidin-7-yl]morpholine

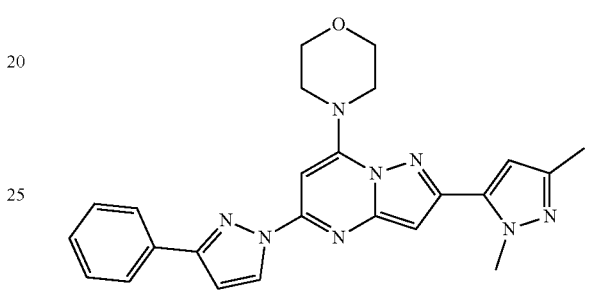

Compound 85 was prepared by General Procedures 2 and 5. LC-MS (ESI+): m/z 441 (MH$^+$). $^1$H NMR (300 MHz, CDCl$_3$) δ 8.63 (d, J=2.7 Hz, 1H), 7.94 (d, J=7.2 Hz, 2H), 7.49-7.35 (m, 3H), 7.09 (s, 1H), 6.84 (d, J=2.7 Hz, 1H), 6.63 (s, 1H), 6.46 (s, 1H), 4.19 (s, 3H), 4.12-3.99 (m, 4H), 3.90-3.85 (m, 4H), 2.32 (s, 3H).

Example 86: 4-[2-(1,5-dimethylpyrazol-3-yl)-5-(3-phenylpyrazol-1-yl)pyrazolo[1,5-a]pyrimidin-7-yl]morpholine

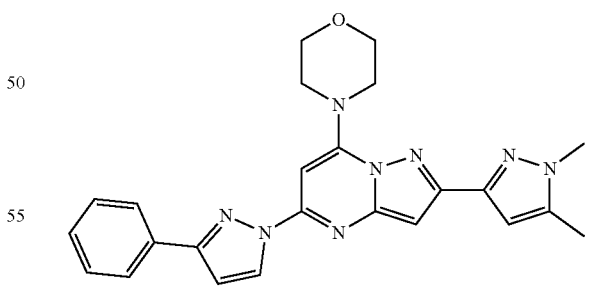

Compound 86 was prepared by General Procedures 2 and 5. LC-MS (ESI+): m/z 441 (MH$^+$). $^1$H NMR (300 MHz, CDCl$_3$) δ 8.63 (d, J=2.7 Hz, 1H), 7.93 (d, J=7.2 Hz, 2H), 7.49-7.35 (m, 3H), 7.04 (s, 1H), 6.79 (d, J=3.9 Hz, 2H), 6.53 (s, 1H), 4.12-3.99 (m, 4H), 3.90-3.85 (m, 4H), 3.78 (s, 3H), 2.32 (s, 3H).

Example 87: 4-[2-(1,5-dimethylpyrazol-3-yl)-5-[3-(m-tolyl)pyrazol-1-yl]pyrazolo[1,5-a]pyrimidin-7-yl]morpholine

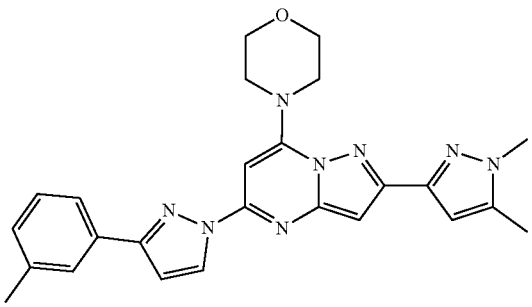

Compound 87 was prepared by General Procedures 2 and 5. LC-MS (ESI+): m/z 455 (MH+). ¹H NMR (300 MHz, CDCl₃) δ 8.67 (d, J=2.7 Hz, 1H), 7.79-7.73 (m, 2H), 7.36 (t, J=7.8 Hz, 1H), 7.22 (d, J=7.5 Hz, 1H), 7.05 (s, 1H), 6.83-6.82 (m, 2H), 6.56 (s, 1H), 4.07-4.02 (m, 4H), 3.95-3.90 (m, 4H), 3.89 (s, 3H), 2.47 (s, 3H), 2.36 (s, 3H).

Example 88: 4-[5-(3-phenylpyrazol-1-yl)-2-pyridazin-3-yl-pyrazolo[1,5-a]pyrimidin-7-yl]morpholine

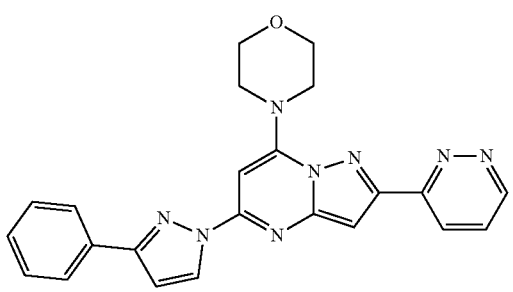

Compound 88 was prepared by General Procedures 2 and 6. LC-MS (ESI+): m/z 425 (MH+). ¹H NMR (300 MHz, CDCl₃) δ 9.21 (d, J=3.3 Hz, 1H), 8.70 (d, J=2.7 Hz, 1H), 8.30 (d, J=8.4 Hz, 1H), 7.95 (d, J=8.4 Hz, 2H), 7.61 (t, J=4.5 Hz, 1H), 7.50-7.37 (m, 4H), 7.15 (s, 1H), 6.85 (d, J=2.7 Hz, 1H), 4.11-4.02 (m, 4H), 3.96-3.85 (m, 4H).

Example 89: methyl N-[[7-morpholino-5-(3-phenylpyrazol-1-yl)pyrazolo[1,5-a]pyrimidin-2-yl]methyl]carbamate

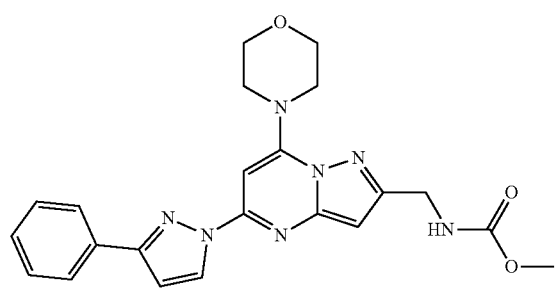 [SMILES: COC(=O)NCc1cc2nc(-n3ccc(-c4ccccc4)n3)cc(N3CCOCC3)n2n1]

Compound 89 was prepared by General Procedure 8. LC-MS (ESI+): m/z 434 (MH+). ¹H NMR (300 MHz, CDCl₃) δ 8.64 (d, J=2.7 Hz, 1H), 7.93 (d, J=6.9 Hz, 2H), 7.49-7.36 (m, 3H), 7.05 (s, 1H), 6.82 (d, J=2.4 Hz, 1H), 6.42 (s, 1H), 5.24 (brs, 1H), 4.59 (d, J=6.0 Hz, 2H), 4.13-4.02 (m, 4H), 3.86-3.80 (m, 4H), 3.74 (s, 3H).

Example 90: N-[[7-morpholino-5-(3-phenylpyrazol-1-yl)pyrazolo[1,5-a]pyrimidin-2-yl]methyl]propenamide

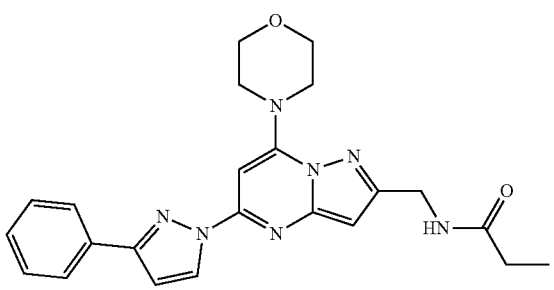 [SMILES: CCC(=O)NCc1cc2nc(-n3ccc(-c4ccccc4)n3)cc(N3CCOCC3)n2n1]

Compound 90 was prepared by General Procedure 8. LC-MS (ESI+): m/z 432 (MH+). ¹H NMR (300 MHZ, CDCl₃) δ 8.61 (d, J=2.7 Hz, 1H), 7.93 (d, J=6.9 Hz, 2H), 7.49-7.36 (m, 3H), 7.05 (s, 1H), 6.82 (d, J=2.7 Hz, 1H), 6.39 (s, 1H), 6.01 (brs, 1H), 4.66 (d, J=5.4 Hz, 2H), 4.10-3.99 (m, 4H), 3.87-3.80 (m, 4H), 2.31 (q, J=7.5 Hz, 2H), 1.16 (t, J=7.5 Hz, 3H).

Example 91: N,N-dimethyl-2-[5-methyl-3-[7-morpholino-5-[3-(m-tolyl)pyrazol-1-yl]pyrazolo[1,5-a]pyrimidin-2-yl]pyrazol-1-yl]ethanamine

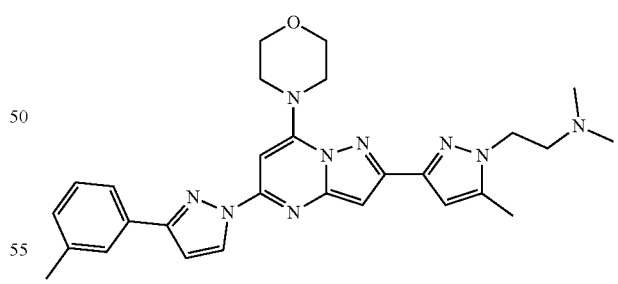

Compound 91 was prepared by General Procedure 2. LC-MS (ESI+): m/z 512 (MH+). ¹H NMR (300 MHz, CDCl₃) δ 8.65 (d, J=2.4 Hz, 1H), 7.76-7.61 (m, 2H), 7.35 (t, J=7.5 Hz, 1H), 7.19 (d, J=7.5 Hz, 1H), 7.03 (s, 1H), 6.81-6.75 (m, 2H), 6.53 (s, 1H), 4.35-4.25 (m, 2H), 4.10-4.00 (m, 4H), 3.95-3.85 (m, 4H), 3.00-2.85 (m, 2H), 2.45 (s, 3H), 2.39 (s, 9H).

Example 92: N,N-dimethyl-2-[5-methyl-3-[7-morpholino-5-[3-(2-pyridyl)pyrazol-1-yl]pyrazolo[1,5-a]pyrimidin-2-yl]pyrazol-1-yl]ethanamine

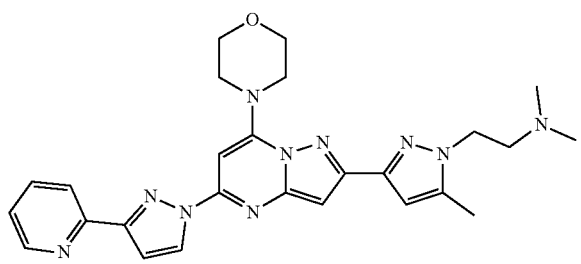 [SMILES: Cc1cc(-c2cc3nc(-n4ccc(-c5ccccn5)n4)cc(N4CCOCC4)n3n2)nn1CCN(C)C]

Compound 92 was prepared by General Procedure 2. LC-MS (ESI+): m/z 499 (MH+). ¹H NMR (300 MHz, CDCl₃) δ 8.71-8.68 (m, 2H), 8.13 (d, J=8.1 Hz, 1H), 7.82-7.79 (m, 1H), 7.30-7.27 (m, 1H), 7.14 (d, J=2.7 Hz, 1H), 7.04 (s, 1H), 6.82 (s, 1H), 6.53 (s, 1H), 4.35-4.20 (m, 2H), 4.10-4.00 (m, 4H), 3.95-3.85 (m, 4H), 2.92-2.80 (m, 2H), 2.39 (s, 3H), 2.36 (s, 6H).

Example 93: N,N-dimethyl-2-[5-methyl-3-[7-morpholino-5-[3-(4-pyridyl)pyrazol-1-yl]pyrazolo[1,5-a]pyrimidin-2-yl]pyrazol-1-yl]ethanamine

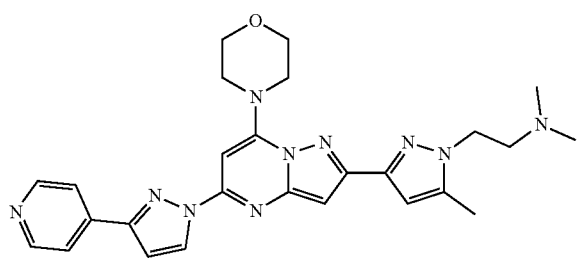 [SMILES: Cc1cc(-c2cc3nc(-n4ccc(-c5ccncc5)n4)cc(N4CCOCC4)n3n2)nn1CCN(C)C]

Compound 93 was prepared by General Procedure 2. LC-MS (ESI+): m/z 499 (MH+). ¹H NMR (300 MHz, CDCl₃) δ 8.72-8.69 (m, 3H), 7.81 (d, J=6.0 Hz, 2H), 7.00 (s, 1H), 6.90 (d, J=6.6 Hz, 1H), 6.82 (s, 1H), 6.53 (s, 1H), 4.30-4.20 (m, 2H), 4.10-4.00 (m, 4H), 3.95-3.85 (m, 4H), 2.91-2.80 (m, 2H), 2.38 (s, 3H), 2.35 (s, 6H).

Example 94: N,N-dimethyl-2-[5-methyl-3-[5-[3-(6-methyl-2-pyridyl)pyrazol-1-yl]-7-morpholino-pyrazolo[1,5-a]pyrimidin-2-yl]pyrazol-1-yl]ethanamine

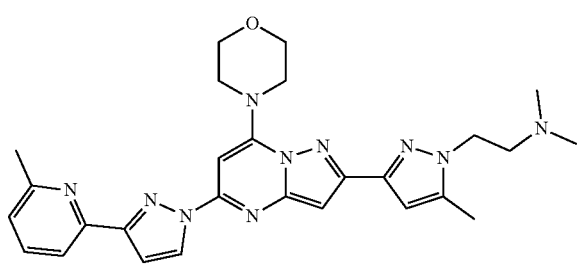 [SMILES: Cc1cccc(-c2ccn(-c3cc(N4CCOCC4)n4nc(-c5cc(C)n(CCN(C)C)n5)cc4n3)n2)n1]

Compound 94 was prepared by General Procedure 2. LC-MS (ESI+): m/z 513 (MH+). ¹H NMR (300 MHZ, CDCl₃) δ 8.69 (s, 1H), 7.99 (d, J=7.2 Hz, 1H), 7.67 (t, J=7.5 Hz, 1H), 7.20-7.10 (m, 2H), 7.05 (s, 1H), 6.80 (s, 1H), 6.53 (s, 1H), 4.40-4.20 (m, 2H), 4.10-4.00 (m, 4H), 3.95-3.85 (m, 4H), 3.07-2.89 (m, 2H), 2.58 (s, 3H), 2.40 (s, 9H).

Example 95: N,N-dimethyl-2-[5-methyl-3-[5-[3-(4-methyl-2-pyridyl)pyrazol-1-yl]-7-morpholino-pyrazolo[1,5-a]pyrimidin-2-yl]pyrazol-1-yl]ethanamine

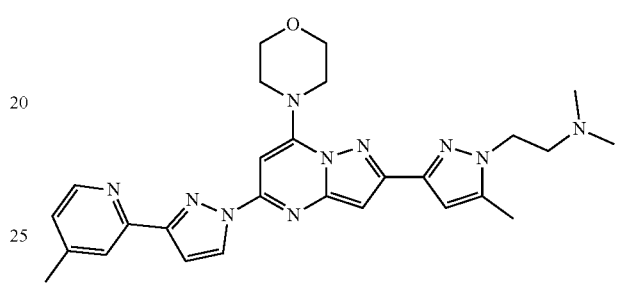

Compound 95 was prepared by General Procedures 2 and 4. LC-MS (ESI+): m/z 513 (MH+). ¹H NMR (300 MHZ, CDCl₃) δ 8.69 (d, J=2.7 Hz, 1H), 8.54 (d, J=5.1 Hz, 1H), 7.95 (s, 1H), 7.14-7.10 (m, 2H), 7.04 (s, 1H), 6.81 (s, 1H), 6.46 (s, 1H), 4.35-4.20 (m, 2H), 4.10-4.00 (m, 4H), 3.95-3.85 (m, 4H), 3.01-2.85 (m, 2H), 2.46 (s, 3H), 2.40 (s, 9H).

Example 96: N,N-dimethyl-2-[5-methyl-3-[5-[3-(2-methyl-4-pyridyl)pyrazol-1-yl]-7-morpholino-pyrazolo[1,5-a]pyrimidin-2-yl]pyrazol-1-yl]ethanamine

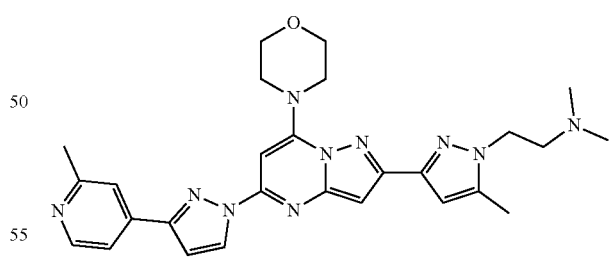

Compound 96 was prepared by General Procedures 2 and 4. LC-MS (ESI+): m/z 513 (MH+). ¹H NMR (300 MHz, CDCl₃) δ 8.70 (d, J=2.7 Hz, 1H), 8.57 (d, J=5.4 Hz, 1H), 7.68 (s, 1H), 7.62-7.60 (m, 1H), 7.00 (s, 1H), 6.87 (d, J=2.7 Hz, 1H), 6.82 (s, 1H), 6.53 (s, 1H), 4.27-4.22 (m, 2H), 4.05-4.00 (m, 4H), 3.95-3.91 (m, 4H), 2.85-2.81 (m, 2H), 2.65 (s, 3H), 2.38 (s, 3H), 2.34 (s, 6H).

Example 97: 2-[3-[5-[3-(3-chlorophenyl)pyrazol-1-yl]-7-morpholino-pyrazolo[1,5-a]pyrimidin-2-yl]-5-methyl-pyrazol-1-yl]-N,N-dimethyl-ethanamine

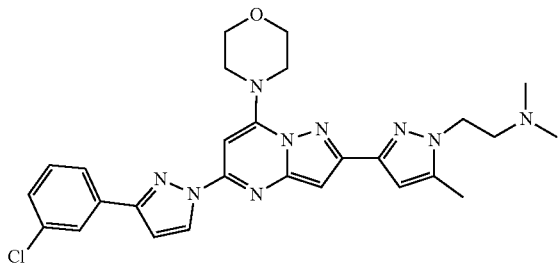 [SMILES: Cc1cc(-c2cc3nc(-n4ccc(-c5cccc(Cl)c5)n4)cc(N4CCOCC4)n3n2)nn1CCN(C)C]

Compound 97 was prepared by General Procedures 2 and 3. LC-MS (ESI+): m/z 532/534 (MH⁺). ¹H NMR (300 MHz, CDCl₃) δ 8.67 (d, J=2.7 Hz, 1H), 7.96 (s, 1H), 7.78 (d, J=7.2 Hz, 1H), 7.46-7.33 (m, 2H), 7.00 (s, 1H), 6.81-6.78 (m, 2H), 6.53 (s, 1H), 4.26-4.22 (m, 2H), 4.06-4.00 (m, 4H), 3.95-3.89 (m, 4H), 2.84-2.80 (m, 2H), 2.38 (s, 3H), 2.33 (s, 6H).

Example 98: 5-[7-morpholino-5-(3-phenylpyrazol-1-yl)pyrazolo[1,5-a]pyrimidin-2-yl]pyridin-2-amine

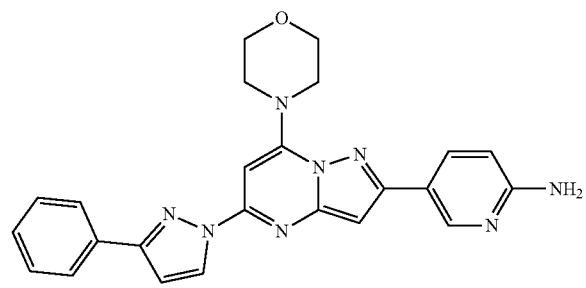

Compound 98 was prepared by General Procedures 2 and 7. LC-MS (ESI+): m/z 432 (MH⁺). ¹H NMR (300 MHz, CDCl₃) δ 8.64 (d, J=2.7 Hz, 2H), 8.05 (dd, J=8.1 Hz, 2.1 Hz, 1H), 7.94 (d, J=7.2 Hz, 2H), 7.49-7.36 (m, 3H), 7.05 (s, 1H), 6.82 (d, J=2.7 Hz, 1H), 6.67 (s, 1H), 6.62 (d, J=8.7 Hz, 1H), 4.96 (brs, 2H), 4.10-4.01 (m, 4H), 3.90-3.80 (m, 4H).

Example 99: N,N-dimethyl-2-[5-methyl-3-[7-morpholino-5-(3-phenylpyrazol-1-yl)pyrazolo[1,5-a]pyrimidin-2-yl]pyrazol-1-yl]ethanamine

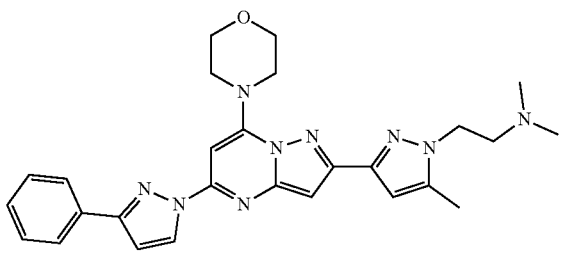 [SMILES: Cc1cc(-c2cc3nc(-n4ccc(-c5ccccc5)n4)cc(N4CCOCC4)n3n2)nn1CCN(C)C]

Compound 99 was prepared by General Procedure 2. LC-MS (ESI+): m/z 498 (MH⁺). ¹H NMR (300 MHZ, CDCl₃) δ 8.66 (d, J=2.7 Hz, 1H), 7.94 (d, J=6.9 Hz, 2H), 7.49-7.38 (m, 3H), 7.04 (s, 1H), 6.81 (d, J=2.7 Hz, 1H), 6.80 (s, 1H), 6.53 (s, 1H), 4.30-4.25 (m, 2H), 4.04-4.00 (m, 4H), 3.95-3.90 (m, 4H), 2.92-2.80 (m, 2H), 2.38 (s, 3H), 2.35 (s, 6H).

Example 100: 2-[3-[5-[3-(3-methoxyphenyl)pyrazol-1-yl]-7-morpholino-pyrazolo[1,5-a]pyrimidin-2-yl]-5-methyl-pyrazol-1-yl]-N,N-dimethyl-ethanamine

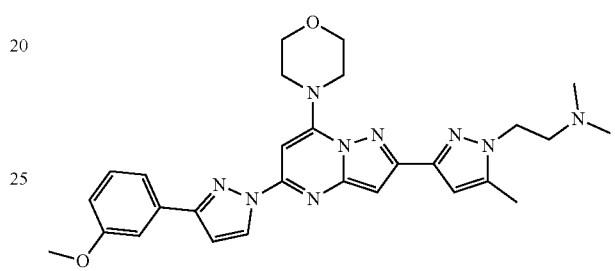

Compound 100 was prepared by General Procedure 2. LC-MS (ESI+): m/z 528 (MH⁺). ¹H NMR (300 MHZ, CDCl₃) δ 8.65 (d, J=2.7 Hz, 1H), 7.61-7.52 (m, 2H), 7.37 (t, J=8.1 Hz, 1H), 7.02 (s, 1H), 6.95-6.90 (m, 1H), 6.81-6.78 (m, 2H), 6.53 (s, 1H), 4.28-4.23 (m, 2H), 4.04-4.00 (m, 4H), 3.95-3.85 (m, 7H), 2.90-2.82 (m, 2H), 2.38 (s, 3H), 2.35 (s, 6H).

Example 101: 4-[5-[3-(3-chlorophenyl)pyrazol-1-yl]-2-(1-methylpyrazol-3-yl)pyrazolo[1,5-a]pyrimidin-7-yl]morpholine

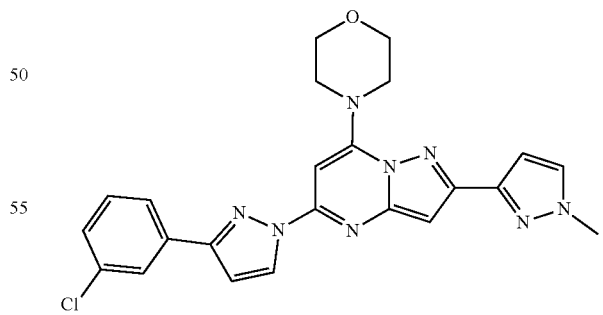

Compound 101 was prepared by General Procedures 2 and 3. LC-MS (ESI+): m/z 461/463 (MH⁺). ¹H NMR (300 MHz, CDCl₃) δ 8.67 (d, J=2.7 Hz, 1H), 7.97 (s, 1H), 7.79 (d, J=4.8 Hz, 1H), 7.47-7.33 (m, 3H), 7.02 (s, 1H), 6.84-6.77 (m, 3H), 4.10-4.00 (m, 7H), 3.95-3.91 (m, 4H).

Example 102: 4-[5-[3-(5-methyl-3-pyridyl)pyrazol-1-yl]-2-(3-pyridyl)pyrazolo[1,5-a]pyrimidin-7-yl]morpholine

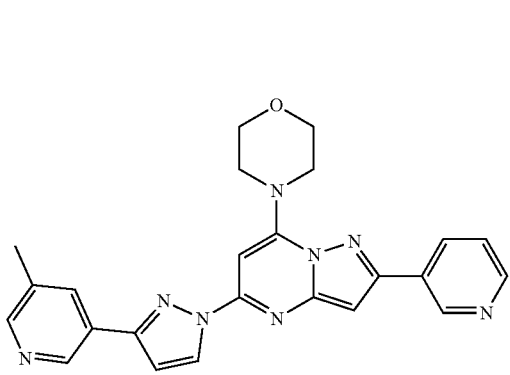 [SMILES: Cc1cncc(-c2ccn(-c3cc(N4CCOCC4)n4nc(-c5cccnc5)cc4n3)n2)c1]

Compound 102 was prepared by General Procedure 2. LC-MS (ESI+): m/z 439 (MH+). $^1$H NMR (300 MHz, CDCl$_3$) δ 9.23 (s, 1H), 8.98 (s, 1H), 8.69 (d, J=2.7 Hz, 1H), 8.66-8.64 (m, 1H), 8.46 (s, 1H), 8.25 (d, J=7.8 Hz, 1H), 8.07 (s, 1H), 7.50-7.40 (m, 1H), 7.07 (s, 1H), 6.87 (d, J=2.7 Hz, 1H), 6.84 (s, 1H), 4.13-4.03 (m, 4H), 3.98-3.91 (m, 4H), 2.46 (s, 3H).

Example 103: 4-[5-[3-(2-methyl-4-pyridyl)pyrazol-1-yl]-2-(3-pyridyl)pyrazolo[1,5-a]pyrimidin-7-yl]morpholine

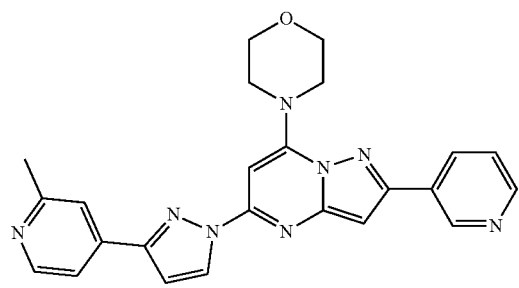 [SMILES: Cc1cc(-c2ccn(-c3cc(N4CCOCC4)n4nc(-c5cccnc5)cc4n3)n2)ccn1]

Compound 103 was prepared by General Procedures 2 and 4. LC-MS (ESI+): m/z 439 (MH+). $^1$H NMR (300 MHz, CDCl$_3$) δ 9.23 (s, 1H), 8.98 (s, 1H), 8.72 (d, J=2.7 Hz, 1H), 8.66-8.64 (m, 1H), 8.25 (d, J=7.8 Hz, 1H), 7.75-7.71 (m, 2H), 7.43-7.26 (m, 1H), 7.07 (s, 1H), 6.92-6.87 (m, 1H), 6.84 (s, 1H), 4.10-4.03 (m, 4H), 3.98-3.93 (m, 4H), 2.72 (s, 3H).

Example 104: 4-[7-morpholino-5-(3-phenylpyrazol-1-yl)pyrazolo[1,5-a]pyrimidin-2-yl]pyrimidin-2-amine

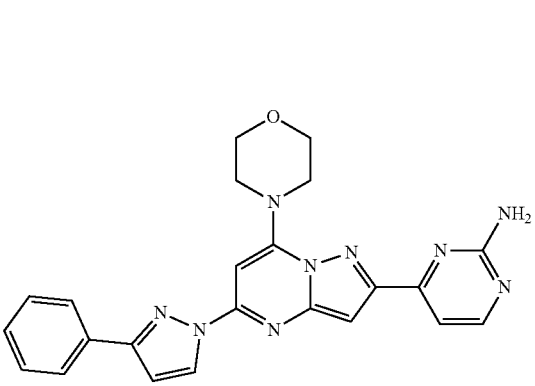 [SMILES: Nc1nccc(-c2cc3nc(-n4ccc(-c5ccccc5)n4)cc(N4CCOCC4)n3n2)n1]

Compound 104 was prepared by General Procedures 2 and 7. LC-MS (ESI+): m/z 440 (MH+). $^1$H NMR (300 MHz, CDCl$_3$) δ 8.67 (d, J=2.7 Hz, 1H), 8.40 (d, J=5.4 Hz, 1H), 7.95 (d, J=6.9 Hz, 2H), 7.49-7.36 (m, 4H), 7.14 (s, 1H), 7.11 (s, 1H), 6.84 (d, J=2.7 Hz, 1H), 5.32 (brs, 2H), 4.10-4.01 (m, 4H), 3.95-3.85 (m, 4H).

Example 105: 4-[5-[3-(3-chlorophenyl)pyrazol-1-yl]-2-(3-pyridyl)pyrazolo[1,5-a]pyrimidin-7-yl]morpholine

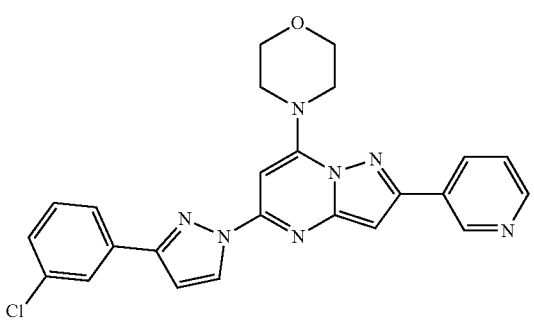

Compound 105 was prepared by General Procedures 2 and 3. LC-MS (ESI+): m/z 458/460 (MH+). $^1$H NMR (300 MHZ, DMSO-d$_6$) δ 9.23 (s, 1H), 8.76 (d, J=2.7 Hz, 1H), 8.65 (d, J=4.2 Hz, 1H), 8.41 (d, J=7.8 Hz, 1H), 8.08 (s, 1H), 8.00 (d, J=7.2 Hz, 1H), 7.57-7.40 (m, 3H), 7.26-7.25 (m, 1H), 7.18 (s, 1H), 7.05 (s, 1H), 3.98-3.87 (m, 8H).

Example 106: 4-[5-[3-(3-bromophenyl)pyrazol-1-yl]-2-(3-pyridyl)pyrazolo[1,5-a]pyrimidin-7-yl]morpholine

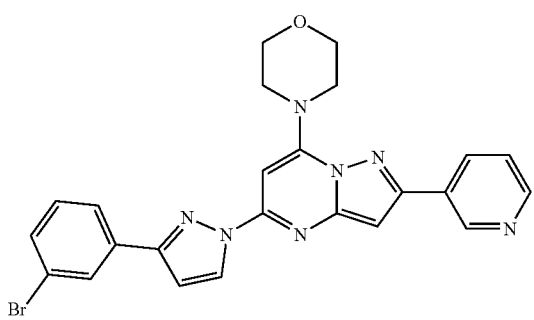 [SMILES: Clc1cccc(-c2ccn(-c3cc(N4CCOCC4)n4nc(-c5cccnc5)cc4n3)n2)c1]

Compound 106 was prepared by General Procedures 2 and 7. LC-MS (ESI+): m/z 502/504 (MH+). ¹H NMR (300 MHz, CDCl₃) δ 9.24 (s, 1H), 8.67-8.65 (m, 2H), 8.27 (d, J=7.8 Hz, 1H), 8.13 (t, J=1.5 Hz, 1H), 7.83 (d, J=8.1 Hz, 1H), 7.52 (d, J=8.1 Hz, 1H), 7.47-7.43 (m, 1H), 7.34 (t, J=8.1 Hz, 1H), 7.08 (s, 1H), 6.83 (s, 1H), 6.82 (d, J=6.6 Hz, 1H), 4.08-4.02 (m, 4H), 3.98-3.91 (m, 4H).

Example 107: 4-[5-[3-(3-methoxyphenyl)pyrazol-1-yl]-2-(3-pyridyl)pyrazolo[1,5-a]pyrimidin-7-yl]morpholine

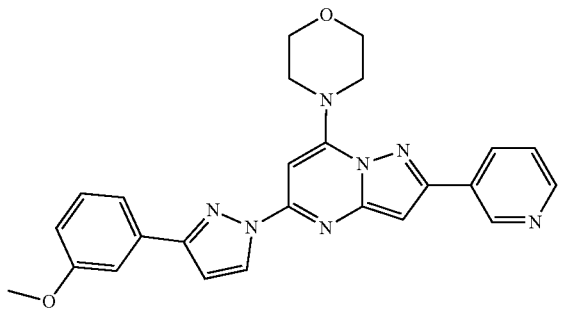 [SMILES: COc1cccc(-c2ccn(-c3cc(N4CCOCC4)n4nc(-c5cccnc5)cc4n3)n2)c1]

Compound 107 was prepared by General Procedures 2 and 3. LC-MS (ESI+): m/z 454 (MH+). ¹H NMR (300 MHz, CDCl₃) δ 9.23 (s, 1H), 8.65 (d, J=2.7 Hz, 2H), 8.26 (d, J=7.8 Hz, 1H), 7.61-7.50 (m, 2H), 7.46-7.36 (m, 2H), 7.10 (s, 1H), 6.96-6.91 (m, 1H), 6.84-6.80 (m, 2H), 4.10-4.03 (m, 4H), 3.98-3.90 (m, 4H), 3.89 (s, 3H).

Example 108: 4-[5-[3-(6-methyl-2-pyridyl)pyrazol-1-yl]-2-(3-pyridyl)pyrazolo[1,5-a]pyrimidin-7-yl]morpholine

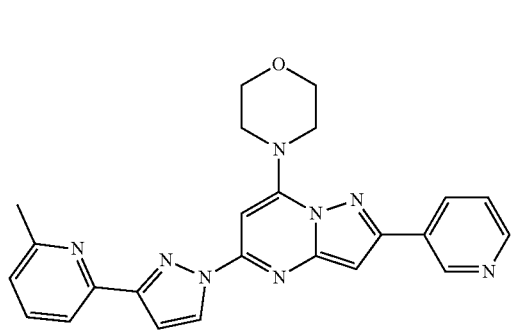

Compound 108 was prepared by General Procedure 2. LC-MS (ESI+): m/z 439 (MH+). ¹H NMR (300 MHz, CDCl₃) δ 9.25 (s, 1H), 8.71-8.62 (m, 2H), 8.26 (d, J=7.8 Hz, 1H), 7.91 (d, J=7.5 Hz, 1H), 7.68 (t, J=7.5 Hz, 1H), 7.43-7.36 (m, 1H), 7.17-7.13 (m, 3H), 6.83 (s, 1H), 4.10-4.03 (m, 4H), 3.98-3.90 (m, 4H), 2.66 (s, 3H).

Example 109: 6-[7-morpholino-5-(3-phenylpyrazol-1-yl)pyrazolo[1,5-a]pyrimidin-2-yl]pyridin-2-amine

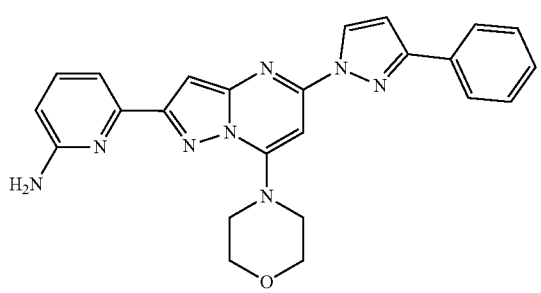 [SMILES: Nc1cccc(-c2cc3nc(-n4ccc(-c5ccccc5)n4)cc(N4CCOCC4)n3n2)n1]

Compound 109 was prepared by the methods described above. LC-MS (ESI+): m/z 438 (MH+).

Example 110: 4-[2-(3-methylisoxazol-5-yl)-5-[3-(m-tolyl)pyrazol-1-yl]pyrazolo[1,5-a]pyrimidin-7-yl]morpholine

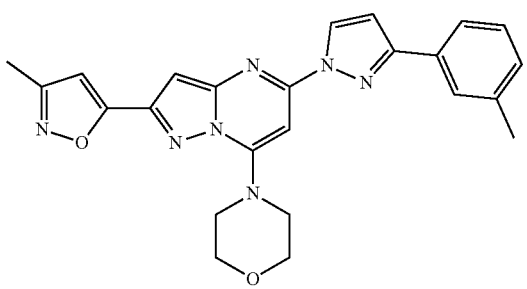 [SMILES: Cc1cccc(-c2ccn(-c3cc(N4CCOCC4)n4nc(-c5cc(C)no5)cc4n3)n2)c1]

Compound 110 was prepared by the methods described above. LC-MS (ESI+): m/z 441

Example 111: 4-[5-[3-(m-tolyl)pyrazol-1-yl]-2-thiazol-2-yl-pyrazolo[1,5-a]pyrimidin-7-yl]morpholine

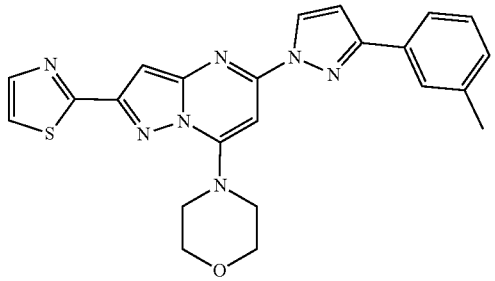 [SMILES: Cc1cccc(-c2ccn(-c3cc(N4CCOCC4)n4nc(-c5nccs5)cc4n3)n2)c1]

Compound 111 was prepared by the methods described above. LC-MS (ESI+): m/z 443 (MH+).

Example 112: 4-[2-(1-methylpyrazol-4-yl)-5-[3-(m-tolyl)pyrazol-1-yl]pyrazolo[1,5-a]pyrimidin-7-yl]morpholine

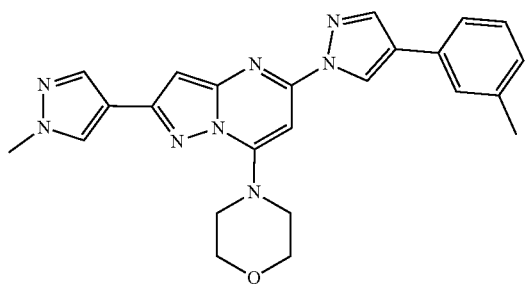 [SMILES: Cc1cccc(-c2cnn(-c3cc(N4CCOCC4)n4nc(-c5cnn(C)c5)cc4n3)c2)c1]

Compound 112 was prepared by the methods described above. LC-MS (ESI+): m/z 440 (MH+).

Example 113: 4-[5-[3-(m-tolyl)pyrazol-1-yl]-2-(1H-pyrazol-4-yl)pyrazolo[1,5-a]pyrimidin-7-yl]morpholine

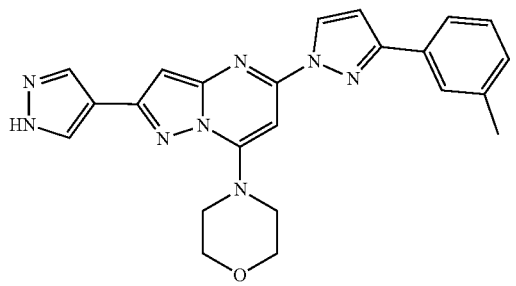 [SMILES: Cc1cccc(-c2ccn(-c3cc(N4CCOCC4)n4nc(-c5cn[nH]c5)cc4n3)n2)c1]

Compound 113 was prepared by the methods described above. LC-MS (ESI+): m/z 426

Example 114: 4-[5-(3-phenylpyrazol-1-yl)-2-thiazol-2-yl-pyrazolo[1,5-a]pyrimidin-7-yl]morpholine

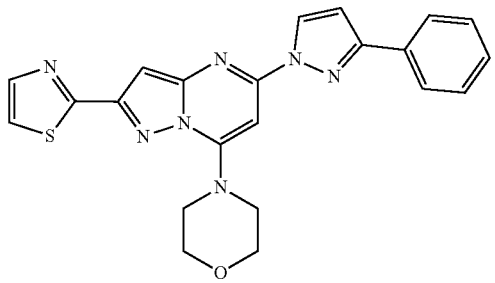 [SMILES: c1ccc(-c2ccn(-c3cc(N4CCOCC4)n4nc(-c5nccs5)cc4n3)n2)cc1]

Compound 114 was prepared by the methods described above. LC-MS (ESI+): m/z 429 (MH+).

Example 115: 4-[2-(1-methylpyrazol-4-yl)-5-(3-phenylpyrazol-1-yl)pyrazolo[1,5-a]pyrimidin-7-yl]morpholine

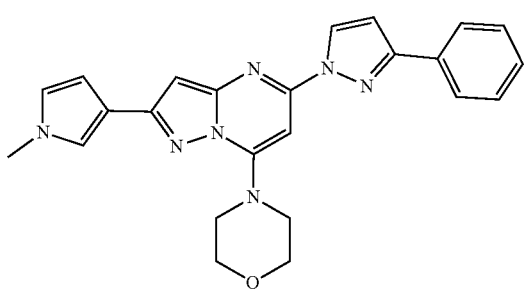 [SMILES: Cn1ccc(-c2cc3nc(-n4ccc(-c5ccccc5)n4)cc(N4CCOCC4)n3n2)c1]

Compound 115 was prepared by the methods described above. LC-MS (ESI+): m/z 426 (MH+).

Example 116: 4-[5-(3-phenylpyrazol-1-yl)-2-(1H-pyrazol-4-yl)pyrazolo[1,5-a]pyrimidin-7-yl]morpholine

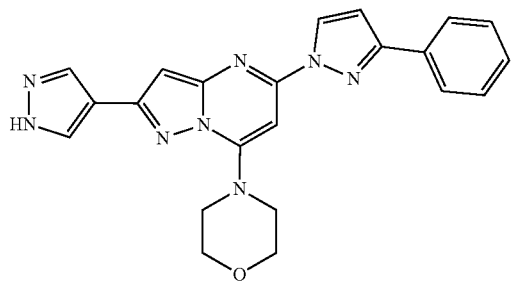 [SMILES: c1ccc(-c2ccn(-c3cc(N4CCOCC4)n4nc(-c5cn[nH]c5)cc4n3)n2)cc1]

Compound 116 was prepared by the methods described above. LC-MS (ESI+): m/z 412

Example 117: methyl 3-[1-[7-morpholino-2-(3-pyridyl)pyrazolo[1,5-a]pyrimidin-5-yl]pyrazol-3-yl]benzoate

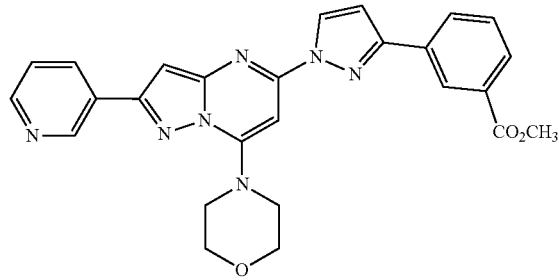 [SMILES: COC(=O)c1cccc(-c2ccn(-c3cc(N4CCOCC4)n4nc(-c5cccnc5)cc4n3)n2)c1]

Compound 117 was prepared by the methods described above. LC-MS (ESI+): m/z 481 (MH+).

Example 118: 3-[1-[7-morpholino-2-(3-pyridyl)pyrazolo[1,5-a]pyrimidin-5-yl]pyrazol-3-yl]benzamide

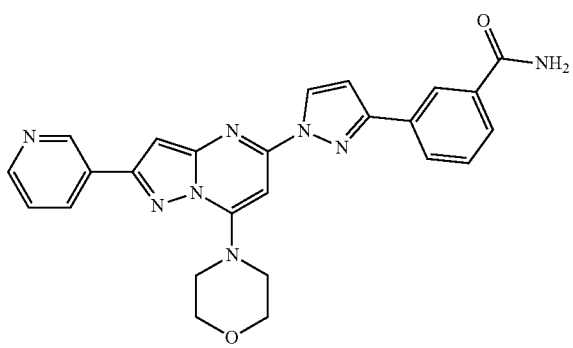 [SMILES: NC(=O)c1cccc(-c2ccn(-c3cc(N4CCOCC4)n4nc(-c5cccnc5)cc4n3)n2)c1]

Compound 118 was prepared by the methods described above. LC-MS (ESI+): m/z 482 (MH+).

Example 119: 3-[1-[7-morpholino-2-(3-pyridyl)pyrazolo[1,5-a]pyrimidin-5-yl]pyrazol-3-yl]benzonitrile

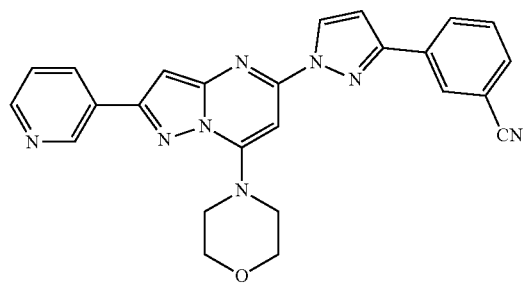 [SMILES: N#Cc1cccc(-c2ccn(-c3cc(N4CCOCC4)n4nc(-c5cccnc5)cc4n3)n2)c1]

Compound 119 was prepared by the methods described above. LC-MS (ESI+): m/z 448

Example 120: 4-[5-[3-(m-tolyl)pyrazol-1-yl]-2-oxazol-2-yl-pyrazolo[1,5-a]pyrimidin-7-yl]morpholine

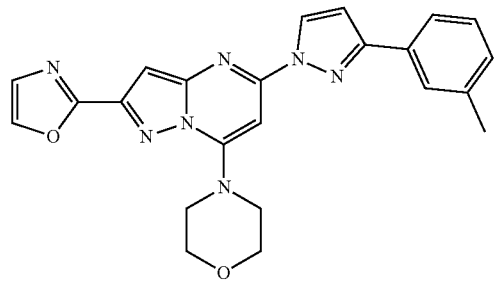 [SMILES: Cc1cccc(-c2ccn(-c3cc(N4CCOCC4)n4nc(-c5ncco5)cc4n3)n2)c1]

Compound 120 was prepared by the methods described above. LC-MS (ESI+): m/z 427 (MH+).

Example 121: 4-[2-(3-methylisoxazol-5-yl)-5-(3-phenylpyrazol-1-yl)pyrazolo[1,5-a]pyrimidin-7-yl]morpholine

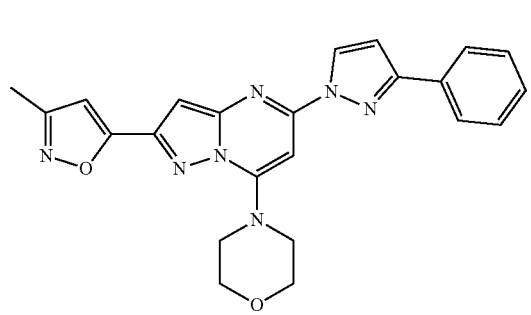 [SMILES: Cc1cc(-c2cc3nc(-n4ccc(-c5ccccc5)n4)cc(N4CCOCC4)n3n2)on1]

Compound 121 was prepared by the methods described above. LC-MS (ESI+): m/z 427 (MH+).

Example 122: 3-[1-[7-morpholino-2-(3-pyridyl)pyrazolo[1,5-a]pyrimidin-5-yl]pyrazol-3-yl]benzoic Acid

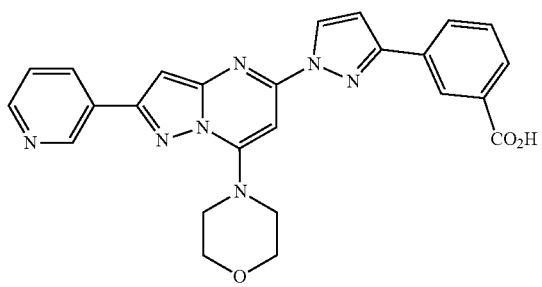 [SMILES: O=C(O)c1cccc(-c2ccn(-c3cc(N4CCOCC4)n4nc(-c5cccnc5)cc4n3)n2)c1]

Compound 122 was prepared by the methods described above. LC-MS (ESI+): m/z 467

Example 123: 4-[2-(1-methylpyrazol-3-yl)-5-[3-[3-(trideuteriomethyl)phenyl]pyrazol-1-yl]pyrazolo[1,5-a]pyrimidin-7-yl]morpholine

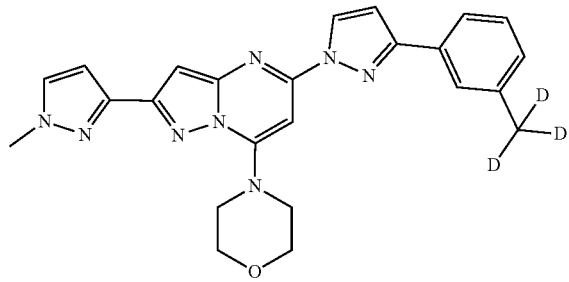 [SMILES: [2H]C([2H])([2H])c1cccc(-c2ccn(-c3cc(N4CCOCC4)n4nc(-c5ccn(C)n5)cc4n3)n2)c1]

Compound 123 was prepared by the methods described above. LC-MS (ESI+): m/z 443.

Biological Example 1: Inhibition of PIKfyve

Full length human recombinant PIKFYVE expressed in baculovirus expression system as N-terminal GST-fusion protein (265 kDa) was obtained from Carna Biosciences (Kobe, Japan). The kinase substrate was prepared by mixing and sonicating fluorescently-labeled phosphatidylinositol 3-phosphate (PI3P) with phospho-L-serine (PS) at a 1:10 ratio in 50 mM HEPES buffer pH7.5.

The kinase reactions were assembled in 384-well plates (Greiner) in a total volume of 20 mL as follows. Kinase protein was pre-diluted in an assay buffer comprising 25 mM HEPES, pH 7.5, 1 mM DTT, 2.5 mM $MgCl_2$, and 2.5 mM $MnCl_2$, and 0.005% Triton X-100, and dispensed into a 384-well plate (10 µL per well). Test compounds were serially pre-diluted in DMSO and added to the protein samples by acoustic dispensing (Labcyte Echo). The concentration of DMSO was equalized to 1% in all samples. All test compounds were tested at 12 concentrations. Apilimod was used as a reference compound and was tested in identical manner in each assay plate. Control samples (0%-inhibition, in the absence of inhibitor, DMSO only) and 100%-inhibition (in the absence of enzyme) were assembled in replicates of four and were used to calculate %-inhibition in the presence of compounds. The reactions were initiated by addition of 10 µL of 2× PI3P/PS substrate supplemented with ATP. The final concentration of enzyme was 2 nM, the final concentration of ATP was 10 mM, and the final concentration of PI3P/PS substrate was 1 µM (PI3P). The kinase reactions were allowed to proceed for 3 h at room temperature. Following incubation, the reactions were quenched by addition of 50 mL of termination buffer (100 mM HEPES, pH 7.5, 0.01% Triton X-100, 20 mM EDTA). Terminated plates were analyzed on a microfluidic electrophoresis instrument (Caliper LabChip® 3000, Caliper Life Sciences/Perkin Elmer). The change in the relative fluorescence intensity of the PI (3) P substrate and PI (3,5) P product peaks was measured. The activity in each test sample was determined as the product to sum ratio (PSR): P/(S+P), where P is the peak height of the product, and S is the peak height of the substrate. Percent inhibition ($P_{inh}$) was determined using the following equation:

$$P_{inh} = (PSR_{0\% \, inh} - PSR_{compound})/(PSR_{0\% \, inh} - PSR_{100\% \, inh}) * 100$$

in which $PSR_{compound}$ is the product/sum ratio in the presence of compound, $PSR_{0\% \, inh}$ is the product/sum ratio in the absence of compound, and the $PSR_{100\% \, inh}$ is the product/sum ratio in the absence of the enzyme. To determine the $IC_{50}$ of test compounds (50%-inhibition) the %-inh cdata ($P_{inh}$ versus compound concentration) were fitted by a four-parameter sigmoid dose-response model using XLfit software (IDBS).

The $IC_{50}$ values for certain compounds of the disclosure are provided in Table 1 below.

TABLE 1

| Compound #. | PIKfyve $IC_{50}$ (nM) |
| --- | --- |
| 1 | 2590 |
| 2 | 967 |
| 3 | 3150 |
| 4 | 550 |
| 5 | >10000 |
| 6 | 6100 |
| 7 | 38.4 |
| 8 | 6690 |
| 9 | >10000 |
| 10 | >10000 |
| 11 | 2600 |
| 12 | >10000 |
| 13 | 207 |
| 14 | 4.3 |
| 15 | 1100 |
| 16 | >10000 |
| 17 | 6.8 |
| 18 | 29.6 |
| 19 | 76.2 |
| 20 | 30.2 |
| 21 | 21.6 |
| 22 | 12.6 |
| 23 | 81.5 |
| 24 | 276 |
| 25 | 437 |
| 26 | 162 |
| 27 | 73.7 |
| 28 | 137 |
| 29 | 94.6 |
| 30 | 247 |
| 31 | 242 |
| 32 | 254 |
| 33 | 113 |
| 34 | 65.6 |
| 35 | 422 |
| 36 | 21.6 |
| 37 | 213 |
| 38 | 25.7 |
| 39 | 99.6 |
| 40 | 258 |
| 41 | 32.4 |
| 42 | 63.3 |
| 43 | 46.4 |
| 44 | 79 |
| 45 | 105 |
| 46 | 113 |
| 47 | 122 |
| 48 | 41.3 |
| 49 | 112 |
| 50 | 18.4 |
| 51 | 64.7 |
| 52 | 28.4 |
| 53 | 26.8 |
| 54 | 126 |
| 55 | 6420 |
| 56 | 3420 |
| 57 | 3750 |
| 58 | >20,000 |
| 59 | >20,000 |
| 60 | 6120 |
| 61 | 2.4 |
| 62 | 15.8 |
| 63 | 693 |

TABLE 1-continued

| Compound #. | PIKfyve IC$_{50}$ (nM) |
|---|---|
| 64 | 68.1 |
| 65 | 1.7 |
| 66 | 104 |
| 67 | 261 |
| 68 | 1660 |
| 69 | 752 |
| 70 | 378 |
| 71 | 143 |
| 72 | 281 |
| 73 | 335 |
| 74 | 353 |
| 75 | 334 |
| 76 | 1590 |
| 77 | 184 |
| 78 | 441 |
| 79 | 333 |
| 80 | 4390 |
| 81 | 34.3 |
| 82 | 169 |
| 83 | 22.6 |
| 84 | 2.6 |
| 85 | 215 |
| 86 | 32.2 |
| 87 | 0.9 |
| 88 | 208 |
| 89 | 1400 |
| 90 | 2160 |
| 91 | 9.4 |
| 92 | 5240 |
| 93 | >10,000 |
| 94 | 4390 |
| 95 | 350 |
| 96 | >10,000 |
| 97 | 126 |
| 98 | 29.9 |
| 99 | 127 |
| 100 | 8.4 |
| 101 | 41 |
| 102 | >10,000 |
| 103 | >10,000 |
| 104 | 106 |
| 105 | >10,000 |
| 106 | 19.9 |
| 107 | 7.1 |
| 108 | 1350 |
| 109 | 278 |
| 110 | 2.2 |
| 111 | 2.7 |
| 112 | 0.7 |
| 113 | 2.5 |
| 114 | 100 |
| 115 | 62.4 |
| 116 | 80.9 |

Biological Example 2: Cell Data

HEK/TDP Survival assay: Immortalized human embryonic kidney 293T (HEK 293T) were transfected with plasmids containing TDP-43 Q331K mutation, resulting in an increase in cell death that is biologically relevant to ALS patients. Cell death is measured as reductions in the amount of ATP, an indicator of metabolically active cells, that is quantified by a luminescence Cell-Titer-Glo® (CTG) reagent. Compounds are evaluated in this model for changes in CTG compared to no treatment group. Increased signal indicates improved survival (rescue) and decreased signal indicates decreased survival.

Cell rescue was measured in a 96-well format with eight different concentrations of the test compound over 48 hrs with 6 replicates. The Promega Cell-Titer-Glo® Luminescent Cell Viability Assay was used to quantify ATP, an indicator of metabolically active cells (see protocol: https://www.promega.com/-/media/files/resources/protocols/technical-manuals/101/celltiterglo-2-O-assay-protocol.pdf?la=en). The luminescence signal was detected using the PerkinElmer En Vision or Molecular Devices SpectraMax.

The effect of a compound at a given dose on cell viability was determined using a three step procedure. First, Hedge's g for the Cell Titer-Glo luminescence values using six untreated wells on every plate as a control was calculated. Second, as multiple experimental trials of each compound-dose pair were performed, these results were meta-analyzed to produce a single estimate of the effect size. Finally, values from all compound-dose pairs were corrected for multiple hypothesis testing using the Empirical Bayes framework of Stephens, M. (False discovery rates: a new deal, Biostatistics, 18 [2], 2017, 275-294) yielding credible intervals for the measured effect and associated s values.

Briefly, this method computes a local false sign rate for each experiment. Analogous to the local false discovery rate of Efron, B. (Size, power and false discovery rates, Ann. Statist. 35 [4], 2007, 1351-1377) this value measures the confidence in the sign of each effect (rather than confidence in each effect being non-zero). The s values reported in the previous figures are the expected fraction of errors if estimating the sign of all effects with greater absolute local false sign rate, defined in analogy to the q value of Storey, JD (The positive false discovery rate: a Bayesian interpretation and the q-value, Ann. Statist. 31 [6] 2003, 2013-2035).

Drugs that yielded signed log s values greater than 3 were considered hits. This threshold was determined by a separate calibration experiment in which Cell Titer-Glo® was measured in blank plates consisting of untreated cells to assess the noise inherent in the assay. Data are presented as the maximal effect of rescue obtained from the dose-response curve.

iPSC MN Survival assay: Fibroblasts from ALS patients with known SOD1 A4V mutation were reprogrammed into inducible pluripotent stem cells (iPSC) and then differentiated to motor neurons. In culture, ALS patient derived motor neurons show increased death rate compared to motor neurons derived from healthy individuals in a stressed condition (nutrient deprived media, Hank's buffered salt solution-HBSS). The SOD1 survival deficit is relevant to a subset of ALS patient biology and serves as a suitable cell-based model for gauging compound induced survival rescue.

Cell rescue was measured following more than two different concentrations of each compound for six days with greater than four replicates in a 96-well format to ensure studies with power >0.8. Cells are transduced with a GFP reporter and imaged once a day to track survival. A broad-spectrum caspase inhibitor served as the positive control.

Microscopy image-based readout: Cells are transduced with a GFP reporter and imaged once a day with a blue laser to track survival. Imagers used include the Biotek Cytation 5 and Thermo Fisher EVOS Auto FL 2. All Images undergo uniform processing consisting of rolling hat background subtraction and contrast adjustment.

Cells are identified by their shape and each cell is tracked across images and time points for each well. Survival is visually assessed from the Kaplan-Meier curves. Survival of the cells is modeled and tested using a mixed effects Cox regression where each well is modeled as the random effect, and the group (control/treatment) as the fixed effect. Hazard ratios between treatment and control are estimated within the Cox regression where a value of 1.0 denotes no change, values >1.0 indicate decreased survival in response to treatment, and values <1.0 indicate increased survival in response to treatment. Data are presented as the maximal reduction in hazard ratio scores measured at various concentrations.

TABLE 2

| Compound # | HEK/TDP EC$_{50}$ [nM] | C9 iPSC MN Significant survival rescue EC$_{50}$ [uM] | C9 iPSC MN Survival hazard ratio |
|---|---|---|---|
| 14 | 144 | >6 | 0.94 |
| 17 | 95 | 1 | 0.82 |
| 18 | 105 | 1 | — |
| 20 | 103 | Not determined | 0.85 |
| 21 | 110 | Not tested | Not tested |
| 22 | 112 | Not tested | Not tested |
| 34 | Not tested | Not determined | 0.82 |
| 36 | 67 | Not tested | Not tested |
| 41 | 67 | Not tested | Not tested |
| 43 | 92 | Not tested | Not tested |

The foregoing disclosure has been described in some detail by way of illustration and example, for purposes of clarity and understanding. Therefore, it is to be understood that the above description is intended to be illustrative and not restrictive. The scope of the disclosure should, therefore, be determined not with reference to the above description, but should instead be determined with reference to the following appended claims, along with the full scope of equivalents to which such claims are entitled.

What is claimed is:
1. A compound of Formula (I):

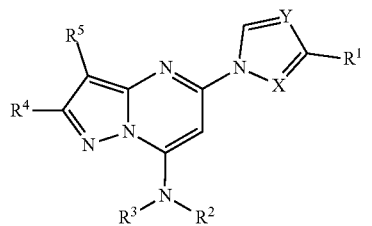

(I)

wherein:
X is N or CH, Y is N or CR$^a$ provided that when X is N, then Y is CR$^a$, when Y is N, then X is CH;
one of R$^a$ and R$^1$ is H, and the other is phenyl or heteroaryl, each optionally substituted with one, two, or three R$^d$ substituents;
wherein each R$^d$ substituent is independently C$_{1-4}$alkyl, C$_{1-4}$alkenyl, C$_{1-4}$alkynyl, —O—C$_{1-4}$alkyl, halo, cyano, nitro, azido, halo-C$_{1-4}$alkyl, —O—C$_{1-4}$-haloalkyl, —NR$^g$R$^h$, —NR$^g$C(=O)R$^h$, —NR$^g$C(=O)NR$^g$R$^h$, —NR$^g$C(=O)OR$^h$, =NOR$^g$, —NR$^g$S(=O)$_{1-2}$R$^h$, —NR$^g$S(=O)$_{1-2}$NR$^g$R$^h$, =NSO$_2$R$^g$, —C(=O)R$^g$, —C(=O)OR$^g$, —OC(=O)OR$^g$, —OC(=O)R$^g$, —C(=O)NR$^g$R$^h$, —OC(=O)NR$^g$R$^h$, —OR$^g$, —SR$^g$, —S(=O)R$^g$, —S(=O)$_2$R$^g$, —OS(=O)$_{1-2}$R$^g$, —S(=O)$_{1-2}$OR$^g$, —S(=O)$_{1-2}$NR$^g$R$^h$, phenyl, —C$_{1-4}$alkyl-phenyl, monocyclic cycloalkyl, —C$_{1-4}$alkyl-cycloalkyl, monocyclic heterocycloalkyl, or monocyclic heteroaryl;
wherein each phenyl, monocyclic cycloalkyl, monocyclic heterocycloalkyl, or monocyclic heteroaryl of R$^d$ is optionally substituted with one, two, or three substituents R$^e$;
wherein each R$^e$ substituent is independently C$_{1-4}$alkyl, C$_{1-4}$alkenyl, C$_{1-4}$alkynyl, halo, cyano, nitro, azido, —OH, halo-C$_{1-4}$alkyl, —O—C$_{1-4}$alkyl, or —O—C$_{1-4}$-haloalkyl;
R$^g$ and R$^h$ are each independently H or C$_{1-4}$alkyl;
or R$^g$ and R$^h$ taken together with the atom to which they are attached form a monocyclic cycloalkyl or heterocycloalkyl, optionally substituted with C$_{1-4}$alkyl;
wherein each of R$^2$ and R$^3$ is H or is a C$_{1-4}$alkyl, cycloalkyl, C$_{1-4}$alkylcycloalkyl, heterocyclyl, heterocycloalkyl, or R$^2$ and R$^3$ taken together with the nitrogen to which they are attached form a heterocyclyl, optionally substituted with one, two, or three R$^j$ substituents;
wherein each R$^j$ substituent is independently C$_{1-4}$alkyl, oxo, —OH, —NR$^k$R$^l$, halo, halo-C$_{1-4}$alkyl, —O—C$_{1-4}$alkyl, or —O—C$_{1-4}$-haloalkyl;
where R$^k$ and R$^l$ are each independently H or C$_{1-4}$alkyl;
R$^4$ is —C(O)NR$^x$R$^y$, or is a phenyl or heteroaryl, each optionally substituted with one, two, or three R$^z$ substituents;
wherein R$^x$ is H or C$_{1-4}$alkyl and R$^y$ is H, C$_{1-4}$alkyl, —O—C$_{1-4}$alkyl, —SO$_2$—C$_{1-4}$alkyl, C$_{1-4}$alkyl-SO$_2$—R$^r$, monocyclic cycloalkyl, —C$_{1-4}$alkyl (monocyclic cycloalkyl), monocyclic heterocyclyl, —O-monocyclic heterocyclyl, or monocyclic heterocycloalkyl, each optionally substituted with one, two, or three R$^g$ substituents;
or R$^x$ and R$^y$ taken together with the nitrogen to which they are attached form a heterocyclyl or a monocyclic heterocycloalkyl, optionally substituted with C$_{1-4}$alkyl;
wherein each R$^r$ is C$_{1-4}$alkyl or —NR$^p$R$^q$; and
each R$^z$ substituent is independently C$_{1-4}$alkyl, halo, —OH, or —OC$_{1-4}$alkyl, C$_{1-4}$alkylNR$^m$R$^n$, C(O)NHC$_{1-4}$alkyl-NR$^m$R$^n$, or —NR$^m$R$^n$;
wherein R$^m$ and R$^n$ are each independently H, C$_{1-4}$alkyl, or C$_{1-4}$alkylNR$^p$R$^q$, or R$^m$ and R$^n$ taken together with the nitrogen to which they are attached form a heterocyclyl, or a monocyclic heterocycloalkyl, optionally substituted with one or two R$^g$ substituents;
wherein each R$^o$ substituent is independently C$_{1-4}$alkyl, —OH, —OC$_{1-4}$alkyl, halo, cyano, or —NR$^p$R$^q$;
wherein R$^p$ and R$^q$ are each independently H or C$_{1-4}$alkyl, or R$^p$ and R$^q$ taken together with the nitrogen to which they are attached form a heterocyclyl; and
R$^5$ is H, C$_{1-4}$alkyl, halo, —OH, or —OC$_{1-4}$alkyl;
or a pharmaceutically acceptable salt thereof.
2. The compound of claim 1, wherein X is N and Y is CR$^a$.
3. The compound of claim 1, wherein R$^a$ is H.
4. The compound of claim 1, wherein R$^a$ or R$^1$ is optionally substituted phenyl.
5. The compound of claim 1, wherein R$^a$ or R$^1$ is unsubstituted phenyl or m-tolyl.
6. The compound of claim 1, wherein R$^2$ and R$^3$ taken together with the nitrogen to which they are attached form pyrrolidine, piperidine, piperazine, morpholine, thiomorpholine, thiomorpholine-1,1-dioxide, or 2-oxa-6-azaspiro[3.3]heptane, each optionally substituted with one, two, or three R$^j$ substituents.

7. The compound of claim 1, wherein $R^2$ and $R^3$ taken together with the nitrogen to which they are attached form morpholine, optionally substituted with one or two $R^j$ substituents.

8. The compound of claim 1, wherein $R^4$ is optionally substituted heteroaryl.

9. The compound of claim 1, wherein $R^4$ is optionally substituted pyrazole, thiazole, oxazole, pyridine or pyrimidine.

10. The compound of claim 1, wherein $R^4$ is pyrazole optionally substituted with one or two $R^z$ substituents.

11. The compound of claim 1, wherein each $R^z$ is independently methyl, —OH, halo, or —OCH$_3$.

12. The compound of claim 1, wherein $R^5$ is H, methyl, ethyl, chloro, bromo, fluoro, —OH, or —OCH$_3$.

13. The compound of claim 1, wherein $R^5$ is H.

14. A compound of Formula (II):

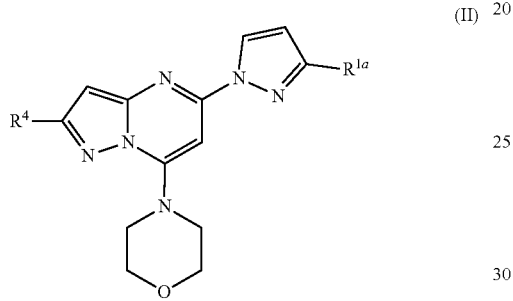

wherein $R^{1a}$ is phenyl or pyridyl, each optionally substituted with one or two substituents selected from $C_{1-4}$alkyl, $CO_2R^p$, —C(O)NR$^p$R$^q$, fluoro, chloro, bromo, NH$_2$, and —OCH$_3$; and $R^{4a}$ is —C(O)NR$^x$R$^y$, or is a phenyl, pyrazole, or pyridyl, each optionally substituted with one or two substituents selected from $C_{1-4}$alkyl, —CF$_3$, fluoro, chloro, —OCH$_3$, and —OCF$_3$;

wherein $R^x$ is H or $C_{1-4}$alkyl and $R^y$ is H, $C_{1-4}$alkyl, —O—$C_{1-4}$alkyl, —SO$_2$—$C_{1-4}$alkyl, $C_{1-4}$alkyl-SO$_2$—R', monocyclic cycloalkyl, —$C_{1-4}$alkyl (monocyclic cycloalkyl), monocyclic heterocyclyl, —O-monocyclic heterocyclyl, or monocyclic heterocycloalkyl, each optionally substituted with one or two substituents selected from $C_{1-4}$alkyl, —OH, —OC$_{1-4}$alkyl, halo, or cyano or —NR$^p$R$^q$;

wherein each R' is $C_{1-4}$alkyl or —NR$^p$R$^q$;

wherein $R^p$ and $R^q$ are each independently H or $C_{1-4}$alkyl, or $R^x$ and $R^y$ taken together with the nitrogen to which they are attached form a heterocyclyl, optionally substituted with $C_{1-4}$alkyl;

or a pharmaceutically acceptable salt thereof.

15. A compound selected from:

7-morpholino-2-(pyridin-4-yl)-N-(3-(p-tolyl)-1H-pyrazol-5-yl)pyrazolo[1,5-a]pyrimidin-5-amine;

7-morpholino-N-(5-phenyl-1H-pyrazol-3-yl)-2-(4-pyridyl)pyrazolo[1,5-a]pyrimidin-5-amine;

7-morpholino-N-[5-(o-tolyl)-1H-pyrazol-3-yl]-2-(4-pyridyl)pyrazolo[1,5-a]pyrimidin-5-amine;

7-morpholino-N-[3-(m-tolyl)-1H-pyrazol-5-yl]-2-(4-pyridyl)pyrazolo[1,5-a]pyrimidin-5-amine;

N-(5-methyl-1H-pyrazol-3-yl)-7-morpholino-2-(4-pyridyl)pyrazolo[1,5-a]pyrimidin-5-amine;

7-morpholino-2-(4-pyridyl)-N-[5-(4-pyridyl)-1H-pyrazol-3-yl]pyrazolo[1,5-a]pyrimidin-5-amine;

1-(7-morpholino-2-(pyridin-4-yl)pyrazolo[1,5-a]pyrimidin-5-yl)-3-phenyl-1H-pyrazol-5-amine;

1-(7-morpholino-2-(pyridin-4-yl)pyrazolo[1,5-a]pyrimidin-5-yl)-3-(o-tolyl)-1H-pyrazol-5-amine;

4-[5-(4-phenylpyrazol-1-yl)-2-(4-pyridyl)pyrazolo[1,5-a]pyrimidin-7-yl]morpholine;

4-[5-[4-(m-tolyl)pyrazol-1-yl]-2-(4-pyridyl)pyrazolo[1,5-a]pyrimidin-7-yl]morpholine;

4-[2-(4-pyridyl)-5-[4-(4-pyridyl)pyrazol-1-yl]pyrazolo[1,5-a]pyrimidin-7-yl]morpholine;

4-[5-(4-methylpyrazol-1-yl)-2-(4-pyridyl)pyrazolo[1,5-a]pyrimidin-7-yl]morpholine;

4-[5-(3-phenylpyrazol-1-yl)-2-(4-pyridyl)pyrazolo[1,5-a]pyrimidin-7-yl]morpholine;

4-[5-[3-(m-tolyl)pyrazol-1-yl]-2-(4-pyridyl)pyrazolo[1,5-a]pyrimidin-7-yl]morpholine;

4-[2-(4-pyridyl)-5-[3-(4-pyridyl)pyrazol-1-yl]pyrazolo[1,5-a]pyrimidin-7-yl]morpholine;

4-[5-(3-methylpyrazol-1-yl)-2-(4-pyridyl)pyrazolo[1,5-a]pyrimidin-7-yl]morpholine;

4-(2-(pyridin-3-yl)-5-(3-(m-tolyl)-1H-pyrazol-1-yl)pyrazolo[1,5-a]pyrimidin-7-yl)morpholine;

4-(2-(pyridin-2-yl)-5-(3-(m-tolyl)-1H-pyrazol-1-yl)pyrazolo[1,5-a]pyrimidin-7-yl)morpholine;

N-ethyl-7-morpholino-5-(3-(m-tolyl)-1H-pyrazol-1-yl)pyrazolo[1,5-a]pyrimidine-2-carboxamide;

N-cyclopropyl-7-morpholino-5-(3-(m-tolyl)-1H-pyrazol-1-yl)pyrazolo[1,5-a]pyrimidine-2-carboxamide;

(R)—N-(1-cyclopropylethyl)-7-morpholino-5-(3-(m-tolyl)-1H-pyrazol-1-yl)pyrazolo[1,5-a]pyrimidine-2-carboxamide;

(S)—N-(1-cyclopropylethyl)-7-morpholino-5-(3-(m-tolyl)-1H-pyrazol-1-yl)pyrazolo[1,5-a]pyrimidine-2-carboxamide;

N-(2-methoxyethyl)-7-morpholino-5-(3-(m-tolyl)-1H-pyrazol-1-yl)pyrazolo[1,5-a]pyrimidine-2-carboxamide;

N,N-dimethyl-7-morpholino-5-(3-(m-tolyl)-1H-pyrazol-1-yl)pyrazolo[1,5-a]pyrimidine-2-carboxamide;

N-ethyl-N-methyl-7-morpholino-5-(3-(m-tolyl)-1H-pyrazol-1-yl)pyrazolo[1,5-a]pyrimidine-2-carboxamide;

N-cyclopropyl-N-methyl-7-morpholino-5-(3-(m-tolyl)-1H-pyrazol-1-yl)pyrazolo[1,5-a]pyrimidine-2-carboxamide;

N-(cyclopropylmethyl)-7-morpholino-5-(3-(m-tolyl)-1H-pyrazol-1-yl)pyrazolo[1,5-a]pyrimidine-2-carboxamide;

azetidin-1-yl(7-morpholino-5-(3-(m-tolyl)-1H-pyrazol-1-yl)pyrazolo[1,5-a]pyrimidin-2-yl)methanone;

(7-morpholino-5-(3-(m-tolyl)-1H-pyrazol-1-yl)pyrazolo[1,5-a]pyrimidin-2-yl) (pyrrolidin-1-yl)methanone;

(7-morpholino-5-(3-(m-tolyl)-1H-pyrazol-1-yl)pyrazolo[1,5-a]pyrimidin-2-yl) (piperidin-1-yl)methanone;

morpholino (7-morpholino-5-(3-(m-tolyl)-1H-pyrazol-1-yl)pyrazolo[1,5-a]pyrimidin-2-yl)methanone;

(4-methylpiperazin-1-yl) (7-morpholino-5-(3-(m-tolyl)-1H-pyrazol-1-yl)pyrazolo[1,5-a]pyrimidin-2-yl)methanone;

N-methoxy-N-methyl-7-morpholino-5-(3-(m-tolyl)-1H-pyrazol-1-yl)pyrazolo[1,5-a]pyrimidine-2-carboxamide;

N-methoxy-7-morpholino-5-(3-(m-tolyl)-1H-pyrazol-1-yl)pyrazolo[1,5-a]pyrimidine-2-carboxamide;

N-(methylsulfonyl)-7-morpholino-5-(3-(m-tolyl)-1H-pyrazol-1-yl)pyrazolo[1,5-a]pyrimidine-2-carboxamide;
N-cyclopentyl-7-morpholino-5-(3-(m-tolyl)-1H-pyrazol-1-yl)pyrazolo[1,5-a]pyrimidine-2-carboxamide;
N-cyclopentyl-N-methyl-7-morpholino-5-(3-(m-tolyl)-1H-pyrazol-1-yl)pyrazolo[1,5-a]pyrimidine-2-carboxamide;
N-isopropyl-7-morpholino-5-(3-(m-tolyl)-1H-pyrazol-1-yl)pyrazolo[1,5-a]pyrimidine-2-carboxamide;
N-(1,3-dimethoxypropan-2-yl)-7-morpholino-5-(3-(m-tolyl)-1H-pyrazol-1-yl)pyrazolo[1,5-a]pyrimidine-2-carboxamide;
N-(2-(dimethylamino)ethyl)-7-morpholino-5-(3-(m-tolyl)-1H-pyrazol-1-yl)pyrazolo[1,5-a]pyrimidine-2-carboxamide;
N-(4-(dimethylamino)butyl)-7-morpholino-5-(3-(m-tolyl)-1H-pyrazol-1-yl)pyrazolo[1,5-a]pyrimidine-2-carboxamide;
7-morpholino-N-(oxetan-3-yl)-5-(3-(m-tolyl)-1H-pyrazol-1-yl)pyrazolo[1,5-a]pyrimidine-2-carboxamide;
7-morpholino-N-(oxetan-3-ylmethyl)-5-(3-(m-tolyl)-1H-pyrazol-1-yl)pyrazolo[1,5-a]pyrimidine-2-carboxamide;
N-((3-(hydroxymethyl) oxetan-3-yl)methyl)-7-morpholino-5-(3-(m-tolyl)-1H-pyrazol-1-yl)pyrazolo[1,5-a]pyrimidine-2-carboxamide;
(7-morpholino-5-(3-(m-tolyl)-1H-pyrazol-1-yl)pyrazolo[1,5-a]pyrimidin-2-yl) (2-oxa-6-azaspiro[3.3]heptan-6-yl)methanone;
(7-morpholino-5-(3-(m-tolyl)-1H-pyrazol-1-yl)pyrazolo[1,5-a]pyrimidin-2-yl) (6-oxa-1-azaspiro[3.3]heptan-1-yl)methanone;
7-morpholino-N-(oxetan-3-yloxy)-5-(3-(m-tolyl)-1H-pyrazol-1-yl)pyrazolo[1,5-a]pyrimidine-2-carboxamide;
N-[(3S)-1-methylpyrrolidin-3-yl]-7-morpholino-5-[3-(m-tolyl)pyrazol-1-yl]pyrazolo[1,5-a]pyrimidine-2-carboxamide;
N-[(3R)-1-methylpyrrolidin-3-yl]-7-morpholino-5-[3-(m-tolyl)pyrazol-1-yl]pyrazolo[1,5-a]pyrimidine-2-carboxamide;
7-morpholino-5-[3-(m-tolyl)pyrazol-1-yl]-N-[(3S)-tetrahydrofuran-3-yl]pyrazolo[1,5-a]pyrimidine-2-carboxamide;
7-morpholino-5-[3-(m-tolyl)pyrazol-1-yl]-N-[(3R)-tetrahydrofuran-3-yl]pyrazolo[1,5-a]pyrimidine-2-carboxamide;
N-[(3R)-1-methyl-3-piperidyl]-7-morpholino-5-[3-(m-tolyl)pyrazol-1-yl]pyrazolo[1,5-a]pyrimidine-2-carboxamide;
N-[(3S)-1-methyl-3-piperidyl]-7-morpholino-5-[3-(m-tolyl)pyrazol-1-yl]pyrazolo[1,5-a]pyrimidine-2-carboxamide;
N-(1-methyl-4-piperidyl)-7-morpholino-5-[3-(m-tolyl)pyrazol-1-yl]pyrazolo[1,5-a]pyrimidine-2-carboxamide;
N-(1-methyl-4-piperidyl)-7-morpholino-5-[4-(m-tolyl)pyrazol-1-yl]pyrazolo[1,5-a]pyrimidine-2-carboxamide;
7-morpholino-5-[4-(m-tolyl)pyrazol-1-yl]-N-tetrahydropyran-4-yl-pyrazolo[1,5-a]pyrimidine-2-carboxamide;
4-[5-[4-(m-tolyl)pyrazol-1-yl]-2-pyrimidin-4-yl-pyrazolo[1,5-a]pyrimidin-7-yl]morpholine;
4-[5-[4-(m-tolyl)pyrazol-1-yl]-2-pyrimidin-5-yl-pyrazolo[1,5-a]pyrimidin-7-yl]morpholine;
3-[7-morpholino-5-[4-(m-tolyl)pyrazol-1-yl]pyrazolo[1,5-a]pyrimidin-2-yl]pyridin-2-amine;
5-[7-morpholino-5-[4-(m-tolyl)pyrazol-1-yl]pyrazolo[1,5-a]pyrimidin-2-yl]pyrimidin-2-amine;
4-[2-(1-methylpyrazol-3-yl)-5-[3-(m-tolyl)pyrazol-1-yl]pyrazolo[1,5-a]pyrimidin-7-yl]morpholine;
4-[5-[3-(m-tolyl)pyrazol-1-yl]-2-(1H-pyrazol-3-yl)pyrazolo[1,5-a]pyrimidin-7-yl]morpholine;
4-[5-(3-phenylpyrazol-1-yl)-2-pyrimidin-2-yl-pyrazolo[1,5-a]pyrimidin-7-yl]morpholine;
4-[5-(3-phenylpyrazol-1-yl)-2-(3-pyridyl)pyrazolo[1,5-a]pyrimidin-7-yl]morpholine;
4-[2-(5-methyl-1H-pyrazol-3-yl)-5-[3-(m-tolyl)pyrazol-1-yl]pyrazolo[1,5-a]pyrimidin-7-yl]morpholine;
4-[2-(1-methylpyrazol-3-yl)-5-(3-phenylpyrazol-1-yl)pyrazolo[1,5-a]pyrimidin-7-yl]morpholine;
4-[5-(3-phenylpyrazol-1-yl)-2-(1H-pyrazol-3-yl)pyrazolo[1,5-a]pyrimidin-7-yl]morpholine;
4-[5-(3-phenylpyrazol-1-yl)-2-pyrimidin-4-yl-pyrazolo[1,5-a]pyrimidin-7-yl]morpholine;
4-[5-(3-phenylpyrazol-1-yl)-2-pyrimidin-5-yl-pyrazolo[1,5-a]pyrimidin-7-yl]morpholine;
3-[7-morpholino-5-(3-phenylpyrazol-1-yl)pyrazolo[1,5-a]pyrimidin-2-yl]pyridin-2-amine;
5-[7-morpholino-5-(3-phenylpyrazol-1-yl)pyrazolo[1,5-a]pyrimidin-2-yl]pyrimidin-2-amine;
4-[5-(3-phenylpyrazol-1-yl)-2-(2-pyridyl)pyrazolo[1,5-a]pyrimidin-7-yl]morpholine;
N-isopropyl-7-morpholino-5-(3-phenylpyrazol-1-yl)pyrazolo[1,5-a]pyrimidine-2-carboxamide;
N-[(1R)-1-cyclopropylethyl]-7-morpholino-5-(3-phenylpyrazol-1-yl)pyrazolo[1,5-a]pyrimidine-2-carboxamide;
N-[(1S)-1-cyclopropylethyl]-7-morpholino-5-(3-phenylpyrazol-1-yl)pyrazolo[1,5-a]pyrimidine-2-carboxamide;
7-morpholino-N-(oxetan-3-ylmethyl)-5-(3-phenylpyrazol-1-yl)pyrazolo[1,5-a]pyrimidine-2-carboxamide;
N-cyclopentyl-7-morpholino-5-(3-phenylpyrazol-1-yl)pyrazolo[1,5-a]pyrimidine-2-carboxamide;
4-[5-(4-phenylpyrazol-1-yl)-2-(2-pyridyl)pyrazolo[1,5-a]pyrimidin-7-yl]morpholine;
4-[5-(4-phenylpyrazol-1-yl)-2-(3-pyridyl)pyrazolo[1,5-a]pyrimidin-7-yl]morpholine;
N-isopropyl-7-morpholino-5-(4-phenylpyrazol-1-yl)pyrazolo[1,5-a]pyrimidine-2-carboxamide;
4-[2-(5-methyl-1H-pyrazol-3-yl)-5-(3-phenylpyrazol-1-yl)pyrazolo[1,5-a]pyrimidin-7-yl]morpholine;
4-[5-(3-phenylpyrazol-1-yl)-2-pyrazin-2-yl-pyrazolo[1,5-a]pyrimidin-7-yl]morpholine;
N,N-dimethyl-2-[3-methyl-5-[7-morpholino-5-[3-(m-tolyl)pyrazol-1-yl]pyrazolo[1,5-a]pyrimidin-2-yl]pyrazol-1-yl]ethanamine;
4-[2-(2,5-dimethylpyrazol-3-yl)-5-[3-(m-tolyl)pyrazol-1-yl]pyrazolo[1,5-a]pyrimidin-7-yl]morpholine;
4-[2-(2,5-dimethylpyrazol-3-yl)-5-(3-phenylpyrazol-1-yl)pyrazolo[1,5-a]pyrimidin-7-yl]morpholine;
4-[2-(1,5-dimethylpyrazol-3-yl)-5-(3-phenylpyrazol-1-yl)pyrazolo[1,5-a]pyrimidin-7-yl]morpholine;
4-[2-(1,5-dimethylpyrazol-3-yl)-5-[3-(m-tolyl)pyrazol-1-yl]pyrazolo[1,5-a]pyrimidin-7-yl]morpholine;
4-[5-(3-phenylpyrazol-1-yl)-2-pyridazin-3-yl-pyrazolo[1,5-a]pyrimidin-7-yl]morpholine;
methyl N-[[7-morpholino-5-(3-phenylpyrazol-1-yl)pyrazolo[1,5-a]pyrimidin-2-yl]methyl]carbamate;
N-[[7-morpholino-5-(3-phenylpyrazol-1-yl)pyrazolo[1,5-a]pyrimidin-2-yl]methyl]propanamide;

N,N-dimethyl-2-[5-methyl-3-[7-morpholino-5-[3-(m-tolyl)pyrazol-1-yl]pyrazolo[1,5-a]pyrimidin-2-yl]pyrazol-1-yl]ethanamine;

N,N-dimethyl-2-[5-methyl-3-[7-morpholino-5-[3-(2-pyridyl)pyrazol-1-yl]pyrazolo[1,5-a]pyrimidin-2-yl]pyrazol-1-yl]ethanamine;

N,N-dimethyl-2-[5-methyl-3-[7-morpholino-5-[3-(4-pyridyl)pyrazol-1-yl]pyrazolo[1,5-a]pyrimidin-2-yl]pyrazol-1-yl]ethanamine;

N,N-dimethyl-2-[5-methyl-3-[5-[3-(6-methyl-2-pyridyl)pyrazol-1-yl]-7-morpholino-pyrazolo[1,5-a]pyrimidin-2-yl]pyrazol-1-yl]ethanamine;

N,N-dimethyl-2-[5-methyl-3-[5-[3-(4-methyl-2-pyridyl)pyrazol-1-yl]-7-morpholino-pyrazolo[1,5-a]pyrimidin-2-yl]pyrazol-1-yl]ethanamine;

N,N-dimethyl-2-[5-methyl-3-[5-[3-(2-methyl-4-pyridyl)pyrazol-1-yl]-7-morpholino-pyrazolo[1,5-a]pyrimidin-2-yl]pyrazol-1-yl]ethanamine;

2-[3-[5-[3-(3-chlorophenyl)pyrazol-1-yl]-7-morpholino-pyrazolo[1,5-a]pyrimidin-2-yl]-5-methyl-pyrazol-1-yl]-N,N-dimethyl-ethanamine;

5-[7-morpholino-5-(3-phenylpyrazol-1-yl)pyrazolo[1,5-a]pyrimidin-2-yl]pyridin-2-amine;

N,N-dimethyl-2-[5-methyl-3-[7-morpholino-5-(3-phenylpyrazol-1-yl)pyrazolo[1,5-a]pyrimidin-2-yl]pyrazol-1-yl]ethanamine;

2-[3-[5-[3-(3-methoxyphenyl)pyrazol-1-yl]-7-morpholino-pyrazolo[1,5-a]pyrimidin-2-yl]-5-methyl-pyrazol-1-yl]-N,N-dimethyl-ethanamine;

4-[5-[3-(3-chlorophenyl)pyrazol-1-yl]-2-(1-methylpyrazol-3-yl)pyrazolo[1,5-a]pyrimidin-7-yl]morpholine;

4-[5-[3-(5-methyl-3-pyridyl)pyrazol-1-yl]-2-(3-pyridyl)pyrazolo[1,5-a]pyrimidin-7-yl]morpholine;

4-[5-[3-(2-methyl-4-pyridyl)pyrazol-1-yl]-2-(3-pyridyl)pyrazolo[1,5-a]pyrimidin-7-yl]morpholine;

4-[7-morpholino-5-(3-phenylpyrazol-1-yl)pyrazolo[1,5-a]pyrimidin-2-yl]pyrimidin-2-amine;

4-[5-[3-(3-chlorophenyl)pyrazol-1-yl]-2-(3-pyridyl)pyrazolo[1,5-a]pyrimidin-7-yl]morpholine;

4-[5-[3-(3-bromophenyl)pyrazol-1-yl]-2-(3-pyridyl)pyrazolo[1,5-a]pyrimidin-7-yl]morpholine;

4-[5-[3-(3-methoxyphenyl)pyrazol-1-yl]-2-(3-pyridyl)pyrazolo[1,5-a]pyrimidin-7-yl]morpholine;

4-[5-[3-(6-methyl-2-pyridyl)pyrazol-1-yl]-2-(3-pyridyl)pyrazolo[1,5-a]pyrimidin-7-yl]morpholine;

6-[7-morpholino-5-(3-phenylpyrazol-1-yl)pyrazolo[1,5-a]pyrimidin-2-yl]pyridin-2-amine;

4-[2-(3-methylisoxazol-5-yl)-5-[3-(m-tolyl)pyrazol-1-yl]pyrazolo[1,5-a]pyrimidin-7-yl]morpholine;

4-[5-[3-(m-tolyl)pyrazol-1-yl]-2-thiazol-2-yl-pyrazolo[1,5-a]pyrimidin-7-yl]morpholine;

4-[2-(1-methylpyrazol-4-yl)-5-[3-(m-tolyl)pyrazol-1-yl]pyrazolo[1,5-a]pyrimidin-7-yl]morpholine;

4-[5-[3-(m-tolyl)pyrazol-1-yl]-2-(1H-pyrazol-4-yl)pyrazolo[1,5-a]pyrimidin-7-yl]morpholine;

4-[5-(3-phenylpyrazol-1-yl)-2-thiazol-2-yl-pyrazolo[1,5-a]pyrimidin-7-yl]morpholine;

4-[2-(1-methylpyrazol-4-yl)-5-(3-phenylpyrazol-1-yl)pyrazolo[1,5-a]pyrimidin-7-yl]morpholine;

4-[5-(3-phenylpyrazol-1-yl)-2-(1H-pyrazol-4-yl)pyrazolo[1,5-a]pyrimidin-7-yl]morpholine;

methyl 3-[1-[7-morpholino-2-(3-pyridyl)pyrazolo[1,5-a]pyrimidin-5-yl]pyrazol-3-yl]benzoate;

3-[1-[7-morpholino-2-(3-pyridyl)pyrazolo[1,5-a]pyrimidin-5-yl]pyrazol-3-yl]benzamide;

3-[1-[7-morpholino-2-(3-pyridyl)pyrazolo[1,5-a]pyrimidin-5-yl]pyrazol-3-yl]benzonitrile;

4-[5-[3-(m-tolyl)pyrazol-1-yl]-2-oxazol-2-yl-pyrazolo[1,5-a]pyrimidin-7-yl]morpholine;

4-[2-(3-methylisoxazol-5-yl)-5-(3-phenylpyrazol-1-yl)pyrazolo[1,5-a]pyrimidin-7-yl]morpholine;

3-[1-[7-morpholino-2-(3-pyridyl)pyrazolo[1,5-a]pyrimidin-5-yl]pyrazol-3-yl]benzoic acid; and 4-[2-(1-methylpyrazol-3-yl)-5-[3-[3-(trideuteriomethyl)phenyl]pyrazol-1-yl]pyrazolo[1,5-a]pyrimidin-7-yl]morpholine;

and pharmaceutically acceptable salts thereof.

16. The compound of claim 1, wherein the compound of Formula (I) is selected from 4-[2-(5-methyl-1H-pyrazol-3-yl)-5-(3-phenylpyrazol-1-yl)pyrazolo[1,5-a]pyrimidin-7-yl]morpholine and pharmaceutically acceptable salts thereof.

17. The compound of claim 16, wherein the compound of Formula (I) is 4-[2-(5-methyl-1H-pyrazol-3-yl)-5-(3-phenylpyrazol-1-yl)pyrazolo[1,5-a]pyrimidin-7-yl]morpholine.

18. A compound or a pharmaceutically acceptable salt of claim 1, wherein one or more hydrogen atoms attached to carbon atoms of the compound are replaced by deuterium atoms.

19. A pharmaceutical composition comprising a compound and/or a pharmaceutically acceptable salt of claim 1 and a pharmaceutically acceptable excipient.

20. A method of inhibiting PIKfyve kinase in a subject in need thereof comprising administering to the subject an effective amount of a compound of claim 1.

21. A method of treating a neurological disease associated with PIKfyve activity in a subject in need thereof comprising administering to the subject an effective amount of a pharmaceutical composition of claim 19.

22. The method of claim 21, wherein the neurological disease is amyotrophic lateral sclerosis (ALS), primary lateral sclerosis (PLS), Charcot-Marie-Tooth (CMT; including type 4J (CMT4J)), and Yunis-Varon syndrome, autophagy, polymicrogyria (including polymicrogyria with seizures), temporo-occipital polymicrogyria, Pick's disease, Parkinson's disease, Parkinson's disease with Lewy bodies, dementia with Lewy bodies, Lewy body disease, frontotemporal dementia, diseases of neuronal nuclear inclusions of polyglutamine and intranuclear inclusion bodies, disease of Marinesco and Hirano bodies, tauopathy, Alzheimer's disease, neurodegeneration, spongiform neurodegeneration, peripheral neuropathy, leukoencephalopathy, inclusion body disease, progressive supranuclear palsy, corticobasal syndrome, chronic traumatic encephalopathy, traumatic brain injury (TBI), cerebral ischemia, Guillain-Barré Syndrome, chronic inflammatory demyelinating polyneuropathy, multiple sclerosis, a lysosomal storage disease, Fabry's disorder, Gaucher's disorder, Niemann Pick C disease, Tay-Sachs disease, and Mucolipidosis type IV, neuropathy, Huntington's disease, a psychiatric disorder, ADHD, schizophrenia, a mood disorder, major depressive disorder, depression, bipolar disorder I, or bipolar disorder II.

23. The method of claim 22, wherein the disease is ALS, FTD, Alzheimer's disease, Parkinson's disease, Huntington's disease, or CMT.

24. The method of claim 23, wherein the disease is ALS.

25. The method of claim 23, wherein the compound is selected from 4-[2-(5-methyl-1H-pyrazol-3-yl)-5-(3-phenylpyrazol-1-yl)pyrazolo[1,5-a]pyrimidin-7-yl]morpholine and pharmaceutically acceptable salts thereof.

26. The method of claim 25, wherein the compound is 4-[2-(5-methyl-1H-pyrazol-3-yl)-5-(3-phenylpyrazol-1-yl)pyrazolo[1,5-a]pyrimidin-7-yl]morpholine.

27. The method of claim 22, wherein the disease is a tauopathy such as Alzheimer's disease, progressive supranuclear palsy, corticobasal syndrome, frontotemporal dementia, or chronic traumatic encephalopathy.

28. The method of claim 22, wherein the disease is a lysosomal storage disease such as Fabry's disorder, Gaucher's disorder, Niemann Pick C disease, Tay-Sachs disease, or Mucolipidosis type IV.

29. The method of claim 22, wherein the disease is a psychiatric disorder such as ADHD, schizophrenia, or mood disorders such as major depressive disorder, depression, bipolar disorder I, or bipolar disorder II.

* * * * *